(12) United States Patent
Furukawa et al.

(10) Patent No.: US 7,787,428 B2
(45) Date of Patent: Aug. 31, 2010

(54) INTEGRATED INFORMATION COMMUNICATION SYSTEM

(75) Inventors: Hisao Furukawa, Kawagoe (JP); Shoji Miyaguchi, Ichikawa (JP)

(73) Assignees: The Distribution Systems Research Institute, Tokyo (JP); Miyaguchi Research Co., Ltd., Chiba (JP)

( * ) Notice: Subject to any disclaimer, the term of this patent is extended or adjusted under 35 U.S.C. 154(b) by 404 days.

(21) Appl. No.: 11/700,107

(22) Filed: Jan. 31, 2007

(65) Prior Publication Data

US 2007/0133573 A1    Jun. 14, 2007

Related U.S. Application Data

(62) Division of application No. 10/392,979, filed on Mar. 21, 2003, now Pat. No. 7,266,115, which is a division of application No. 09/165,212, filed on Oct. 2, 1998, now Pat. No. 6,618,366.

(30) Foreign Application Priority Data

Dec. 5, 1997    (JP) ............................. 1997-350224
Feb. 20, 1998   (JP) ............................. 1998-39007

(51) Int. Cl.
| | |
|---|---|
| H04L 12/46 | (2006.01) |
| H04L 12/66 | (2006.01) |
| H04W 4/00  | (2009.01) |
| H04M 1/64  | (2006.01) |
| H04M 11/00 | (2006.01) |
| G06F 15/16 | (2006.01) |
| G06F 15/173| (2006.01) |

(52) U.S. Cl. .................. 370/338; 370/352; 370/401; 370/409; 370/465; 379/88.17; 379/93.07; 709/220; 709/230; 709/238; 709/249

(58) Field of Classification Search .................. 370/338, 370/352, 401, 409, 465; 709/220, 230, 238, 709/249; 379/88.17, 93.07
See application file for complete search history.

(56) References Cited

U.S. PATENT DOCUMENTS 5,060,228 A    10/1991  Tsutsui et al.

(Continued)

FOREIGN PATENT DOCUMENTS

EP    0281785    9/1888

(Continued)

OTHER PUBLICATIONS

Perkins et al., "Mobility Support in IPv6", Proceedings of the Second Annual International Conference on Mobile Computing and Networking (MobiCom '96), Nov. 10-12, 1996.

*Primary Examiner*—Alpus H Hsu
(74) *Attorney, Agent, or Firm*—Wenderoth, Lind & Ponack, L.L.P.

(57) ABSTRACT

To provide an integrated information communication system without using dedicated lines or the Internet, ensuring communication speed, communication quality, communication trouble countermeasures in a unified manner, wherein security and reliability in communication is ensured. The system is comprised of an access control apparatus for connecting a plurality of computer communication networks or information communication equipment to each, and a relay device for networking the aforementioned access control apparatus, the system having functions for performing routing by transferring information by a unified address system, and is configured such that the aforementioned plurality of computer communication networks or information communication equipment can perform communications in an interactive manner.

3 Claims, 126 Drawing Sheets

U.S. PATENT DOCUMENTS

| | | |
|---|---|---|
| 5,208,811 A | 5/1993 | Kashio et al. |
| 5,367,635 A | 11/1994 | Bauer et al. |
| 5,442,633 A | 8/1995 | Perkins et al. |
| 5,493,564 A | 2/1996 | Mullan |
| 5,568,487 A | 10/1996 | Sitbon et al. |
| 5,598,536 A | 1/1997 | Slaughter, III et al. |
| 5,604,737 A | 2/1997 | Iwami et al. |
| 5,931,911 A | 8/1999 | Remy et al. |
| 6,014,379 A * | 1/2000 | White et al. ................. 370/389 |
| 6,021,126 A * | 2/2000 | White et al. ................. 370/352 |
| 6,028,864 A | 2/2000 | Marttinen et al. |
| 6,075,783 A | 6/2000 | Voit |
| 6,104,711 A | 8/2000 | Voit |
| 6,145,011 A | 11/2000 | Furukawa et al. |
| 6,205,139 B1 | 3/2001 | Voit |
| 6,215,790 B1 | 4/2001 | Voit |
| 6,243,374 B1 * | 6/2001 | White et al. ................. 370/352 |
| 6,381,650 B1 * | 4/2002 | Peacock ..................... 709/245 |
| 6,539,015 B2 | 3/2003 | Voit |
| 6,683,870 B1 | 1/2004 | Archer |
| 6,721,306 B1 | 4/2004 | Farris et al. |
| 7,149,815 B1 * | 12/2006 | Furukawa et al. ........... 709/249 |
| 2001/0006519 A1 | 7/2001 | Voit |

FOREIGN PATENT DOCUMENTS

| | | |
|---|---|---|
| EP | 0 281 785 | 9/1988 |
| EP | 0606079 | 7/1994 |
| GB | 2320167 | 6/1998 |
| JP | 64-23646 | 1/1989 |
| JP | 5-14438 | 1/1993 |
| JP | 7-170288 | 7/1995 |
| JP | 9-233112 | 9/1997 |
| JP | 9233112 | 9/1997 |
| JP | 9321805 | 12/1997 |
| WO | 97/05727 | 2/1997 |
| WO | 97/23977 | 7/1997 |
| WO | 97/28628 | 8/1997 |
| WO | 97/39560 | 10/1997 |
| WO | 98/12860 | 3/1998 |
| WO | 98/13986 | 4/1998 |
| WO | 98/16046 | 4/1998 |

* cited by examiner

| Transmitting IC Network Add. | Sender ICS User Add. (Intra) | Sender ICS User Add. (Inter) | Receiver ICS User Add. | Receiving ICS Network Add. | Request ID | Speed | | | |
|---|---|---|---|---|---|---|---|---|---|
| 7711 | 0012 | 2212 | 1156 | 8822 | 2 | 64K | | | |
| | | | 0034 | 9922 | 1 | | | | |
| | | | | | | | | | |
| | | | | | | | | | |
| 7712 | | | | | | | | | |
| ---- | ---- | ---- | ---- | ---- | ---- | ---- | ---- | ---- | ---- |

FIG.16

| Transmitting ICS Network Add. | Sender ICS User Add. | Receiver ICS User Add. | Receiving ICS Network Add. | Request ID | |
|---|---|---|---|---|---|
| 8822 | 1156 | 2212 | 7711 | 2 | |
| -------- | -------- | -------- | -------- | -------- | -------- |

FIG.17

| Transmitting ICS Network Add. | Sender ICS User Add. | Sender ICS User Add. (Inter) | Receiver ICS User Add. | Receiving ICS Network Add. | Request ID | |
|---|---|---|---|---|---|---|
| | | | | | | ...... |
| 7711 | | | | 9921 | 3 | |
| 7712 | | | | 6611 | 3 | |
| | | | | 8822 | 3 | |
| ...... | ...... | ...... | ...... | ...... | ...... | ...... |

FIG.21

ATM Address Conversion Table 1533-5

| Receiving ICS N.W. Address | Receiving ATM Address | Channel Quality |
|---|---|---|
| 9922 | 3999 | 64K |
| 9933 | 3999 | 128K |

VC Address Conversion Table 1433-5

| Receiving ICS N.W. Address | Receiving ICS N.W. Address | Channel Type | Virtual Channel ID |
|---|---|---|---|
| 7711 | 9922 | 11 | 33 |
| 7722 | 9922 | 11 | 77 |
| 7733 | 9944 | 22 | 55 |
| 7744 | 9955 | 22 | 55 |

FIG.29

ATM Address Conversion Table ~1533-6

| Receiving ICS N.W. Address | Receiving ATM Address | Channel Quality |
|---|---|---|
| 7711 | 3977 | 64K |
| 7722 | 3977 | 128K |

VC Address Conversion Table ~1433-6

| Receiving ICS N.W. Address | Receiving ICS N.W. Address | Channel Type | Virtual Channel ID |
|---|---|---|---|
| 9922 | 7711 | 11 | 44 |
| 9922 | 7722 | 11 | 88 |
| 9944 | 7733 | 22 | 66 |
| 9955 | 7744 | 22 | 66 |

FIG.30

FR Address Conversion Table — 1532-5

| Receiving ICS N.W. Address | Receiving FR Address | Channel Quality |
|---|---|---|
| 9922 | 2999 | 64K |
| 9933 | 2999 | 128K |

DLC Address Conversion Table — 1432-5

| Transmitting ICS N.W. Address | Receiving ICS N.W. Address | Channel Type | DLCI |
|---|---|---|---|
| 7711 | 9922 | 10 | 16 |
| 7722 | 9922 | 10 | 17 |
| 7733 | 9944 | 20 | 18 |
| 7744 | 9955 | 20 | 18 |

FIG.41

FR Address Conversion Table 1532-6

| Receiving ICS N.W. Address | Receiving FR Address | Channel Quality |
|---|---|---|
| 7711 | 2977 | 64K |
| 7722 | 2977 | 128K |

DLC Address Conversion Table 1432-6

| Transmitting ICS N.W. Address | Receiving ICS N.W. Address | Channel Type | DLCI |
|---|---|---|---|
| 9922 | 7711 | 10 | 26 |
| 9922 | 7722 | 10 | 27 |
| 9944 | 7733 | 20 | 28 |
| 9955 | 7744 | 20 | 28 |

FIG. 42

| Transmitting ICS N.W. Add. | Sender ICS User Add. (Intra-Corp.) | Sender ICS User Add. (Inter-Corp.) | Receiver ICS User Add. | Receiving ICS N.W. Add. | Request ID | Speed |
|---|---|---|---|---|---|---|
| 7721 | | 3400 | 2500 | 5522 | 2 | 64K |
| 7722 | | | | 5523 | 3 | |
| 7723 | | 3600 | 2700 | 5524 | 2 | |
| 7724 | | 3700 | 2800 | 5525 | 2 | |
| 7725 | 0012 | | 2900 | 5526 | 1 | |
| 7726 | | 3900 | 2400 | 5521 | 2 | |
| | | | 2000 | 7821 | 4 | |

| Receiver ICS User Add. | Priority Order of Telephone No. | Telephone Number |
|---|---|---|
| 3601 | 1 | 03-1111-1111 |
|  | 2 | 03-2222-2222 |
|  | 3 | 03-3333-3333 |
| 3602 | 1 | 03-1111-1111 |
|  | 2 | 03-3333-3333 |
| 3700 | 1 | 03-3333-3333 |
|  | 2 | 03-1111-1111 |
|  | 3 | 03-2222-2222 |
| --- | -- | ----- |

| Trans. ICS N.W. Add. | Sender ICS User Add. | Receiver ICS User Add. | Receiving ICS N.W. Add. | Req. ID | Code of Receiving Priority Degree |
|---|---|---|---|---|---|
| 7821 | 2100 | 2500 | 7200 | 1 | pr-7821 |
| 7821 | 2110 | 2600 | 7300 | 1 | pr-7821 |
| 7822 | | | 7400 | 3 | pr-7822 |
| 7822 | | | 7500 | 3 | pr-7822 |
| 7823 | 2200 | 2610 | 7300 | 2 | pr-7823 |
| 7823 | 2210, | 2700 | 7600 | 2 | pr-7823 |
| 7824 | 2300 | 2710 | 7600 | 2 | pr-7824 |
| 7824 | 2310 | 2800 | 7700 | 2 | pr-7824 |
| 7825 | 2400 | 2720 | 7600 | 2 | pr-7825 |
| 7825 | 2410 | 2810 | 7700 | 2 | pr-7825 |
| | | 2000 | 8200 | 4 | pr-0000 |

| Code of Receiving Priority Degree | Priority Degree of Protocol | Priority Degree of TCP Socket | Priority Degree of UDP Socket |
|---|---|---|---|
| pr-7821 | p-1 | t-1 | NULL |
| pr-7822 | p-1 | t-2 | NULL |
| pr-7823 | p-2 | NULL | u-1 |
| pr-7824 | p-2 | NULL | u-2 |
| pr-7825 | p-1 | t-3 | u-3 |
| pr-0000 | NULL | NULL | NULL |

FIG.80

| Priority Degree of Protocol (Large ⟷ Small) ||
|---|---|
| p-1 | TCP, UDP, ICMP, IGMP |
| p-2 | UDP, TCP, ICMP, IGMP |
| p-3 | ICMP, IGMP, UDP, TCP, |

| Priority Degree of TCP Socket ||
|---|---|
| t-1 | sk-1, sk-7 |
| t-2 | sk-2 |
| t-3 | sk-5 |

| Priority Degree of UDP Socket ||
|---|---|
| u-1 | sk-3, sk-8 |
| u-2 | sk-4 |
| u-3 | sk-6 |

| Socket Destination ||||
|---|---|---|---|
| Socket Code | From/To | IP-address | port-no. |
| sk-1 | To | 2100 | 30 |
| sk-2 | From | 1240 | 32 |
| sk-3 | To | 2200 | 40 |
| sk-4 | From | 2710 | 40 |

| Socket Destination ||||
|---|---|---|---|
| Socket Code | From/To | IP-address | port-no. |
| sk-5 | To | 2400 | 50 |
| sk-6 | From | 2810 | 52 |
| sk-7 | From | 2600 | 130 |
| sk-8 | From | 2700 | 140 |

| Trans. ICS N.W. Add. | Sender ICS User Add. | Receiver ICS User Add. | Receiving ICS N.W. Add. | Req. ID | Code of Transmitting Priority Degree |
|---|---|---|---|---|---|
| 7821 | 2100 | 2500 | 7200 | 1 | ps-7821 |
| 7821 | 2110 | 2600 | 7300 | 1 | ps-7821 |
| 7822 | | | 7400 | 3 | ps-7822 |
| 7822 | | | 7500 | 3 | ps-7822 |
| 7823 | 2200 | 2610 | 7300 | 2 | ps-7823 |
| 7823 | 2210 | 2700 | 7600 | 2 | ps-7823 |
| 7824 | 2300 | 2710 | 7600 | 2 | ps-7824 |
| 7824 | 2310 | 2800 | 7700 | 2 | ps-7824 |
| 7825 | 2400 | 2720 | 7600 | 2 | ps-7825 |
| 7825 | 2410 | 2810 | 7700 | 2 | ps-7825 |
| | | 2000 | 8200 | 4 | ps-0000 |

| Code of Receiving Priority Degree | Priority Degree of Protocol | Priority Degree of TCP Socket | Priority Degree of UDP Socket |
|---|---|---|---|
| ps-7821 | p-21 | t-21 | NULL |
| ps-7822 | p-21 | t-22 | NULL |
| ps-7823 | p-22 | NULL | u-21 |
| ps-7824 | p-22 | NULL | u-22 |
| ps-7825 | p-21 | t-23 | u-23 |
| ps-0000 | NULL | NULL | NULL |

FIG.84

| Priority Degree of Protocol (Large ⬌ Small) | |
|---|---|
| p-21 | TCP, UDP, ICMP, IGMP |
| p-22 | UDP, TCP, ICMP, IGMP |
| p-23 | ICMP, IGMP, UDP, TCP, |

| Priority Degree of TCP Socket | |
|---|---|
| t-21 | sk-21, sk-27 |
| t-22 | sk-22 |
| t-23 | sk-25 |

| Priority Degree of UDP Socket | |
|---|---|
| u-21 | sk-23, sk-28 |
| u-22 | sk-24 |
| u-23 | sk-26 |

| Socket Destination | | | |
|---|---|---|---|
| Socket Code | From/To | IP-address | port-no. |
| Sk-21 | From | 2100 | 30 |
| sk-22 | To | 1240 | 32 |
| sk-23 | From | 2200 | 40 |
| sk-24 | To | 2710 | 40 |

| Socket Destination | | | |
|---|---|---|---|
| Socket Code | From/To | IP-address | port-no. |
| sk-25 | From | 2400 | 50 |
| sk-26 | To | 2810 | 52 |
| sk-27 | To | 2600 | 130 |
| sk-28 | To | 2700 | 140 |

| Trans. ICS N.W. Add. | Sender ICS User Add. (Intra) | Sender ICS User Add. (Inter) | Receiver ICS User Add. | Receiving ICS N.W. Add. | Req. ID | Speed |
|---|---|---|---|---|---|---|
| 7721 |  | 3400 | 2500 | 5522 | 2 |  |
|  |  |  |  |  |  |  |
| 7722 |  |  |  | 5523 | 3 |  |
|  |  |  |  |  |  |  |
| 7723 |  | 3600 | 2700 | 5524 | 2 |  |
|  |  |  |  |  |  |  |
| 7724 |  | 3700 | 2800 | 5525 | 2 |  |
| 7725 | 0012 |  | 2900 | 5526 | 1 |  |
| 7726 |  | 3900 | 2400 | 5521 | 2 |  |
|  |  |  | 2000 | 7821 | 4 |  |

| Trans. ICS N.W. Add. | Sender ICS User Add. (Intra) | Sender ICS User Add. (Inter) | Receiver ICS User Add. | Receiving ICS N.W. Add. | Req. ID | Speed |
|---|---|---|---|---|---|---|
| 8700 |  |  |  | 9820 | 3 |  |
|  |  |  |  |  |  |  |

| ICS N.W. Add. | Class ★ | ICS Logic Terminal | | ICS N.W. Server | | Appropriate ID Code | Appropriate Date |
|---|---|---|---|---|---|---|---|
| | | Node ID Code | Logic Terminal ID Code | Node ID Code | Port No. | | |
| 7700 | L | ACU-1 | LT-001 | | | user-1 | 98-04-01 |
| 7720 | L | ACU-1 | LT-002 | | | user-2 | 98-05-01 |
| 6930 | Sv | | | SVU-1 | 620 | Sv-001 | 98-02-01 |
| 9630 | Sv | | | SVU-1 | 630 | Sv-002 | 98-01-20 |
| 7920 | L | ACU-2 | LT-004 | | | user-3 | 98-07-01 |
| 7930 | L | ACU-2 | LT-007 | | | user-4 | 98-03-01 |
| | | | | | | | |

★ L→Logic Terminal   Sv→Server

| ICS User Add. | ICS Name | Request ID | Appropriate ID Code | Appropriate Date |
|---|---|---|---|---|
| 4 6 1 0 | dd1.cc1.bb1.aa1.jp | 2 | user-1 | 98-04-01 |
| 4 6 2 0 | dd2.cc1.bb1.aa1.jp | 2 | user-1 | 98-04-01 |
| 4 7 0 0 | dd1.cc1.bb1.aa1.jp | 2 | user-2 | 98-05-01 |
| 1 2 0 0 | rr1.qq.pp.jp | 4 | Sv-001 | 98-02-01 |
| 1 3 0 0 | rr2.qq.pp.jp | 4 | Sv-002 | 98-01-20 |
| 2 6 0 0 | dd1.cc2.bb1.aa1.jp | 2 | user-3 | 98-07-01 |
| 2 6 1 0 | dd2.cc2.bb1.aa1.jp | 2 | user-3 | 98-07-01 |
| 4 8 0 0 | dd2.cc2.bb1.aa1.jp | 2 | user-4 | 98-03-01 |
| | | | | |

| Request ID | Trans. ICS N.W. Add. | Sender ICS User Add. | Receiver ICS User Add. | Receiving ICS N.W. Add. | Receiving Port | Speed Class | Priority | Signature | Trans. Signature | Receiving Signature | Encryption Class | Billing Class | Open-zone Class | Dynamic Change Class |
|---|---|---|---|---|---|---|---|---|---|---|---|---|---|---|
| 2 | 7700 | 4610 | null | null | null | 3 | 3 | 1 | YES | NO | 1 | 4 | 0 | 2 |
| 2 | 7700 | 4610 | null | null | null | 3 | 3 | 1 | YES | NO | 1 | 4 | 0 | 2 |
| 4 | null | Null | 1200 | 9630 | 620 | 1 | 1 | 0 | NO | NO | 0 | 1 | 1 | 0 |
| 4 | null | null | 1200 | 9630 | 630 | 1 | 1 | 0 | NO | NO | 0 | 1 | 1 | 0 |

| Request ID | Trans. ICS N.W. Add. | Sender ICS User Add. | Receiver ICS User Add. | Receiving ICS N.W. Add. | Receiving Port | Speed Class | Priority | Signature | Trans. Signature | Receiving Signature | Encryption Class | Billing Class | Open-zone Class | Dynamic Change Class |
|---|---|---|---|---|---|---|---|---|---|---|---|---|---|---|
| 2 | 7700 | 4610 | 4520 | 9820 | null | 3 | 3 | 1 | YES | NO | 1 | 4 | 0 | 2 |
| 2 | 7700 | 4620 | null | null | null | 3 | 3 | 1 | YES | NO | 1 | 4 | 0 | 2 |

| Request ID | Trans. ICS N.W. Add. | Sender ICS User Add. | Receiver ICS User Add. | Receiving ICS N.W. Add. | Receiving Port | Speed Class | Priority | Signature | Trans. Signature | Receiving Signature | Encryption Class | Billing Class | Open-zone Class | Dynamic Change Class |
|---|---|---|---|---|---|---|---|---|---|---|---|---|---|---|
| 2 | 7700 | 4610 | 4520 | 9820 | null | 2 | 3 | 1 | YES | NO | 1 | 4 | 0 | 2 |
| 2 | 7700 | 4620 | null | null | null | 3 | 3 | 1 | YES | NO | 1 | 4 | 0 | 2 |

FIG.104

| Request ID | Trans. ICS N.W. Add. | Sender ICS User Add. | Receiver ICS User Add. | Receiving ICS N.W. Add. | Receiving Port | Speed Class | Priority | Signature | Trans. Signature | Receiving Signature | Encryption Class | Billing Class | Open-zone Class | Dynamic Change Class |
|---|---|---|---|---|---|---|---|---|---|---|---|---|---|---|
| 2 | 7700 | 4610 | 2600 | 7920 | null | 3 | 3 | 1 | YES | NO | 1 | 4 | 0 | 2 |
| 2 | 7700 | 4610 | 2610 | 7920 | null | 3 | 3 | 1 | YES | NO | 1 | 4 | 0 | 2 |
| 2 | 7700 | 4620 | 2600 | 7920 | null | 3 | 3 | 1 | YES | NO | 1 | 4 | 0 | 2 |
| 2 | 7700 | 4620 | 2610 | 7920 | null | 3 | 3 | 1 | YES | NO | 1 | 4 | 0 | 2 |
| 4 | Null | null | 1200 | 9630 | 620 | 1 | 1 | 0 | NO | NO | 0 | 1 | 1 | 0 |
| 4 | null | null | 1300 | 9630 | 630 | 1 | 1 | 0 | NO | NO | 0 | 1 | 1 | 0 |

| Request ID | Trans. ICS N.W. Add. | Sender ICS User Add. | Receiver ICS User Add. | Receiving ICS N.W. Add. | Receiving Port | Speed Class | Priority | Signature | Trans. Signature | Receiving Signature | Encryption Class | Billing Class | Oper-zone Class | Dynamic Change Class |
|---|---|---|---|---|---|---|---|---|---|---|---|---|---|---|
| 1 | 7720 | 4700 | 2200 | 7840 | null | 3 | 3 | 1 | YES | NO | 1 | 4 | 0 | 2 |
| 1 | 7720 | 4700 | 2210 | 7840 | null | 3 | 3 | 1 | YES | NO | 1 | 4 | 0 | 2 |
| 3 | 7920 | null | null | 7810 | null | 2 | 3 | 1 | NO | YES | 1 | 2 | 0 | 1 |

| Level-1, domain=root, d-addr=9500, upper=null, upper-d-addr=null |||||
|---|---|---|---|---|
| lower-d-name | Endpoint | lower-d-addr | port | |
| a1 | No | 9610 | 440 | |
| a2 | No | 9620 | 440 | |
| a3 | No | 9630 | 440 | |
| . . | | | | |

19600-1

| Level-2, domain=a1, d-addr=9610, upper=root, u-d-addr=9500 |||||
|---|---|---|---|---|
| lower-d-name | Endpoint | lower-d-addr | port | |
| b1 | No | 9710 | 440 | |
| b2 | No | 9720 | 440 | |
| b3 | No | 9730 | 440 | |
| . . | | | | |

19610-1

| Level-3, domain=b2 d-nw-addr=9720, upper=a1, u-d-addr=9610 |||||
|---|---|---|---|---|
| lower-d-name | Endpoint | lower-d-addr | port | lower-user-addr |
| c4 | Yes | 9810 | null | 4510 |
| c5 | Yes | 9820 | null | 4520 |
| c6 | Yes | 9830 | null | 4530 |
| . . | | | | |

19620-1

| Trans. ICS N.W. Add. | Sender ICS User Add. | Receiver ICS User Add. | Receiving ICS N.W. Add. | Port No. | Request ID | Speed Class |
|---|---|---|---|---|---|---|
| Null | null | 4600 | 7800 | 600 | 4 | 2 |
| 7830 | 4510 | 5600 | 7830 | null | 2 | 3 |
| 7830 | 1200 | 4540 | 7820 | null | 2 | 2 |
| 7820 | 4540 | 4600 | 7820 | null | 2 | 3 |

20013-1

| | | | | | | |
|---|---|---|---|---|---|---|
| 7830 | 1200 | 4520 | 7920 | null | 2 | 1 |

| Level-3, domain= "3"  d-addr=8610, upper=root-obn, u-d-addr=8510 ||||   /—20131-1
|---|---|---|---|---|
| lower-d-name | Endpoint | lower-d-addr | port | |
| "11" | No | 8710 | 440 | |
| "12" | No | 8720 | 440 | |
| "13" | No | 8730 | 440 | |
| . . | | | | |

| Level-4, domain= "12", d-addr=8720, upper= "3", u-d-addr=8610 ||||   /—20141-1
|---|---|---|---|---|
| lower-d-name | Endpoint | lower-d-addr | port | |
| "33" | No | 8810 | 440 | |
| "34" | No | 8820 | 440 | |
| "35" | No | 8830 | 440 | |
| . . | | | | |

| Level-5, domain= "34", d-addr=8820, upper= "12", u-d-addr=8720 |||||   /—20151-1
|---|---|---|---|---|
| lower-d-name | Endpoint | lower-d-addr | port | lower-user-addr |
| "5677" | Yes | 7910 | null | 4510 |
| "5678" | Yes | 7920 | null | 4520 |
| "5679" | Yes | 7930 | null | 4530 |
| . . | | | | |

FIG.125

Verifying Server (NW-addr=7981, port=710) — 21100-1 / 21100-2

| Domain-name | Endpoint | Admini. No. | Encryption No. | Billing Class | PW | Expd-date | Roaming | Billing Record |
|---|---|---|---|---|---|---|---|---|
| c1.b1.a1 | Yes | 1 | 2 | 1 | 224691 | 98-12-31 | Yes | |
| c3.b1.a1 | Yes | 2 | 1 | 2 | 983746 | 99-12-31 | Yes | 120 |
| | | | | | | | | |

| Trans. ICS N.W. Add. | Sender ICS User Add. | Receiver ICS User Add. | Receiving ICS N.W. Add. | Port | Request ID | Billing Class MNY | Billing Destination | Connection Term |
|---|---|---|---|---|---|---|---|---|
| | | 6300 | 7831 | 831 | 4 | | | |
| | | 6310 | 7832 | 832 | 4 | | | |
| 7800 | 1200 | 2500 | 8200 | | 10 | 1 | 8115-1200 | 5-day |
| 7810 | 1900 | 2610 | 8200 | | 10 | 2 | 7981-710-1 | 1-day |

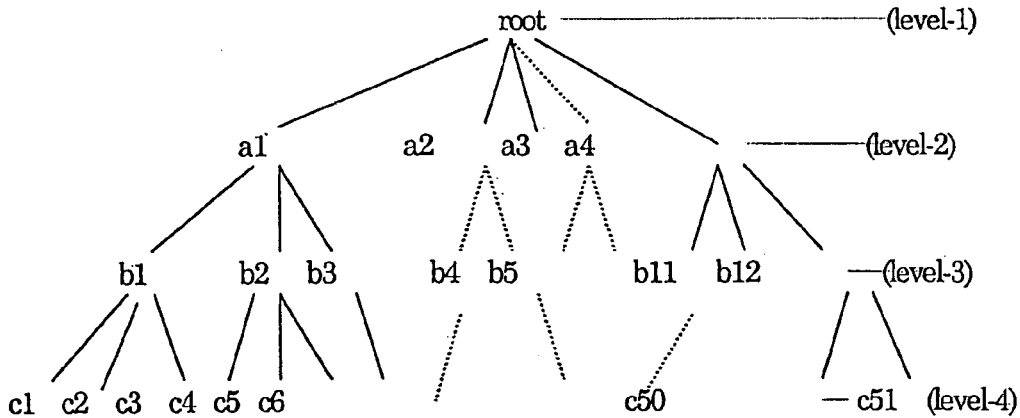

FIG.128

| Level-1,domain=root, d-addr=7960 ,port=710,upper=null, upper -d-addr=null | | | | |
|---|---|---|---|---|
| lower-d-name | Endpoint | lower-d-addr | port | |
| a1 | No | 7971 | 710 | |
| a2 | No | 7972 | 710 | |
| a3 | No | 7973 | 710 | |
| . . | | | | |

FIG.129

| Level-2,domain=a1, d-addr=7971 ,port=710,upper=obn, upper -d-addr=7960 | | | | |
|---|---|---|---|---|
| Lower-d-name | Endpoint | lower-d-addr | port | |
| b1 | No | 7981 | 710 | |
| b2 | No | 7982 | 710 | |
| b3 | No | 7983 | 710 | |
| . . | | | | |

FIG.130

| Level-3,domain=b1, d-addr=7981 ,port=710,upper=a1, upper -d-addr=7971 | | | | | | | | |
|---|---|---|---|---|---|---|---|---|
| Domain -name | End point | Admin. No. | Cip. No. | Bill Class | PW | Expd- date | Roa- ming | Bill. Rec. |
| c1.b1.a1. | Yes | 1 | 2 | 1 | 224691 | 98-12-31 | Yes | |
| c3.b1.a1. | Yes | 2 | 1 | 2 | 983746 | 99-12-31 | Yes | 120 |
| . . | | | | | | | | |

FIG.131

| Request ID | Trans. ICS N.W. Add. | Sender ICS User Add. (Intra) | Sender ICS User Add. (Inter) | Receiver ICS User Add. | Receiving ICS N.W. Add. | Network Identifier | Other |
|---|---|---|---|---|---|---|---|
| 1 | 8100 | 1500 | | 1100 | 7100 | A001 | .. |
| 1 | 8100 | 1510 | | 1110 | 7100 | A002 | .. |
| 4 | Null | | | 6100 | 9100 | A001 | .. |
| 4 | Null | | | 6110 | 9110 | A002 | .. |
| 2 | 8200 | | 5200 | 4200 | 7200 | B001 | .. |
| 2 | 8200 | | 5210 | 4210 | 7200 | B002 | .. |
| 4 | Null | | | 6200 | 9200 | B001 | .. |
| 4 | Null | | | 6210 | 9210 | B002 | .. |
| 4 | 8200 | | 5250 | Null | Null | B002 | .. |
| 3 | 8300 | | | 6300 | 9300 | C001 | .. |
| 3 | 8300 | | | 6305 | 9305 | C001 | .. |
| 3 | 8300 | | | Null | 7300 | C001 | .. |
| | | | | | | | |

| Request ID | Trans. ICS N.W. Add. | Sender ICS User Add. (Intra) | Sender ICS User Add. (Inter) | Receiver ICS User Add. | Receiving ICS N.W. Add. | Network Identifier | Other |
|---|---|---|---|---|---|---|---|
| 1 | 7100 | 1100 | | 1500 | 8100 | A001 | ... |
| 1 | 7100 | 1110 | | 1510 | 8100 | A002 | ... |
| 4 | Null | | | 6100 | 9100 | A001 | ... |
| 4 | Null | | | 6110 | 9110 | A002 | ... |
| 2 | 7200 | | 4200 | 5200 | 8200 | B001 | ... |
| 2 | 7200 | | 4210 | 5210 | 8200 | B002 | ... |
| 4 | Null | | | 6200 | 9200 | B001 | ... |
| 4 | Null | | | 6210 | 9210 | B002 | ... |
| 3 | 7300 | | | 6300 | 9300 | C001 | ... |
| 3 | 7300 | | | 6305 | 9305 | C001 | ... |
| 3 | 7300 | | | Null | 8300 | C001 | ... |

| Request ID | Trans. ICS N.W. Add. | Sender ICS User Add. (Intra) | Sender ICS User Add. (Inter) | Receiver ICS User Add. | Receiving ICS N.W. Add. | Network Idnetifier | Other |
|---|---|---|---|---|---|---|---|
| 3 | 8350 | | | 6310 | 9310 | C002 | .. |
| 3 | 8350 | | | Null | 7350 | C002 | .. |
| 2 | 8400 | | 5410 | 4410 | 7400 | Open | .. |
| 2 | 8400 | | 5420 | 4420 | 7405 | Open | .. |
| 2 | 8450 | 1430 | 5430 | 4410 | 7400 | Open | .. |
| 2 | 8450 | 1440 | 5440 | 4420 | 7405 | Open | .. |
| 4 | Null | | 6500 | 6400 | 9400 | Open | .. |
| 4 | 8500 | | 6960 | Null | Null | Open | .. |
| 4 | 8505 | 1960 | | Null | Null | Open | .. |
| 4 | Null | | | 6600 | 9500 | Open | |

| Request ID | Trans. ICS N.W. Add. | Sender ICS User Add. (Intra) | Sender ICS User Add. (Inter) | Receiver ICS User Add. | Receiving ICS N.W. Add. | Network Identifier | Other |
|---|---|---|---|---|---|---|---|
| 3 | 7350 | | | 6310 | 9310 | C002 | .. |
| 3 | 7350 | | | Null | 8350 | C002 | .. |
| 2 | 7400 | | 4410 | 5410 | 8400 | Open | .. |
| 2 | 7400 | | 4410 | 5430 | 8450 | Open | .. |
| 2 | 7405 | 1420 | 4420 | 5420 | 8400 | Open | .. |
| 2 | 7405 | 1420 | 4420 | 5440 | 8450 | Open | .. |
| 4 | Null | | | 6400 | 9400 | Open | .. |

Verifying SV (NW-addr=7981, port=710) — 21100-2

| Domain-name | Endpoint | Admin. No. | Encryption No. | Billing Class | PW | Expd-date | Roaming | Billing Record | Network Identifier |
|---|---|---|---|---|---|---|---|---|---|
| c1.b1.a1 | Yes | 1 | 2 | 1 | 224691 | 98-12-31 | Yes |  | B001 |
| c3.b1.a1 | Yes | 2 | 1 | 2 | 983746 | 99-12-31 | Yes | 120 | Open |

| Request ID | Trans. ICS N.W. Add. | Sender ICS User Add. | Receiver ICS User Add. | Receiving ICS N.W. Add. | Port | Network Identifier | Billing Class (MNY) | Billing Destination | Connection Term |
|---|---|---|---|---|---|---|---|---|---|
| 4 |  |  | 6300 | 7831 | 831 | Open |  |  |  |
| 4 | 7800 | 1200 | 6310 | 7832 | 832 | Open |  |  |  |
| 10 | 7810 | 1900 | 2500 | 8200 |  | B001 | 1 | 8115-1200 | 5-day |
| 10 |  |  | 2610 | 8200 |  | Open | 2 | 7981-710-1 | 1-day |

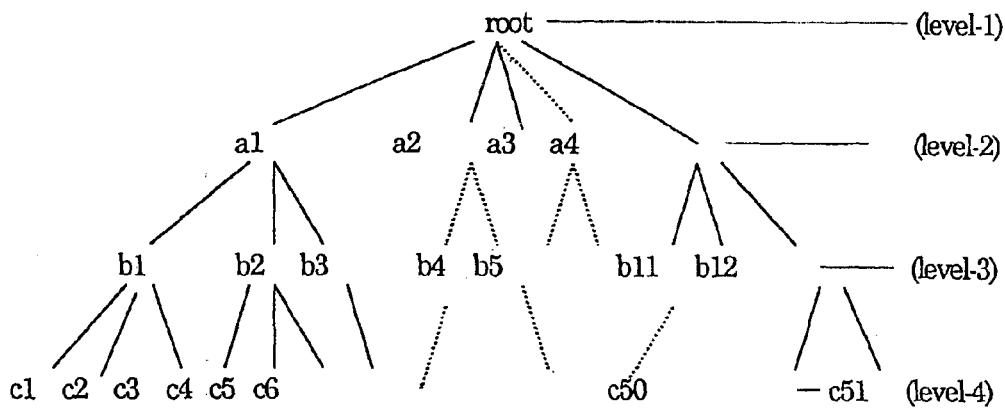

| Level-1,domain=root, d-addr=7960 ,port=710,upper=null, upper -d-addr=null ||||
|---|---|---|---|
| lower-d-name | Endpoint | lower-d-addr | port |
| a1 | No | 7971 | 710 |
| a2 | No | 7972 | 710 |
| a3 | No | 7973 | 710 |
| . . | | | |

| Level-2,domain=a1, d-addr=7971 ,port=710,upper=obn, upper -d-addr=7960 ||||
|---|---|---|---|
| lower-d-name | Endpoint | lower-d-addr | port |
| b1 | No | 7981 | 710 |
| b2 | No | 7982 | 710 |
| b3 | No | 7983 | 710 |
| . . | | | |

| Level-3,domain=b1, d-addr=7981 ,port=710,upper=a1, upper -d-addr=7971 |||||||||
|---|---|---|---|---|---|---|---|---|
| Domain -name | End point | Admin. No. | Cip. No. | Bill No. | PW | Expd- date | Roa- ming | Bill Rec. | N.W. Ident. |
| c1.b1.a1. | Yes | 1 | 2 | 1 | 224691 | 98-12-31 | Yes | | B001 |
| c3.b1.a1. | Yes | 2 | 1 | 2 | 983746 | 99-12-31 | Yes | 120 | Open |
| . . | | | | | | | | | |

FIG.151

INTEGRATED INFORMATION COMMUNICATION SYSTEM

This application is a divisional of U.S. application Ser. No. 10/392,979, filed Mar. 21, 2003, which is a divisional of U.S. application Ser. No. 09/165,212, filed Oct. 2, 1998, now U.S. Pat. No. 6,618,366.

BACKGROUND OF THE INVENTION

1. Field of the Invention

The present invention relates to an integrated information communication system connecting information communication equipments or information communication systems such as personal computers, LANs (Local Area Networks), telephones (including cellular phones), FAXs (Facsimile), CATVs (Cable Television), Internet and the like, not only via dedicated lines, but also via ISDN (Integrated Services Digital Network), FR (Frame Relay), ATM (Asynchronous Transfer Mode), IPX (Integrated Packet Exchange), satellite, wireless and public lines. Integrated information communication equipments perform communication provided with an address (for information communication) for distinguishing the integrated information communication equipment from other equipment. Particularly, the present invention relates to an integrated information communication system which integrates data transfer services based on connection-less networks (e.g., RFC791 or RFC1883 IP (Internet Protocol) technology) and improves the overall economics of the information communication system by employing a unified address system, and ensuring security to realize interactive communications between connected terminals or systems.

2. Description of the Prior Art

In accordance with computer and information communication technology, computer communication networks have in recent years come to be widely used in universities, research institutes, government organizations, and intra-corporation/inter-corporation situations. LANs are used for intra-corporation communication networks, and in the event that the geographic locale is on a national basis, the form thereof becomes such as shown in FIG. 1. In the example described in FIG. 1, each local LAN uses a common protocol, with each being connected by dedicated lines. Here, e.g., a corporation X has LAN-X 1, LAN-X2 and LAN-X3 as LANs, a corporation Y has LAN-Y1, LAN-Y2 and LAN-Y3 as LANs, and both corporations X and Y use communication address systems ADX and ADY for performing computer communications. Since it is necessary to lay a separate dedicated line for each corporation with such a LAN network, system architecture becomes costly, and in the event that connection is to be made to a LAN network of another corporation, interfacing must be matched such as the communication address system, making inter-connection very difficult and very costly.

On the other hand, the Internet has recently become widespread as a global-scale computer communication network. On the Internet, networks are connected using a router of a provider, a communication protocol called TCP/IP (Transmission Control Protocol/Internet Protocol) is employed, dedicated lines or FR networks are used for connecting remote areas, and Ethernets which are 10 Mbps LANs or FDDIs (Fiber Distributed Data Interface) which are 10 Mbps LANs are used as communication paths within structures. FIG. 2 shows an example of an Internet connection, in which the routers in the providers maintain mutual connection by exchanging routing table connection information. Each router is connected to a plurality of networks, and judgment is made based on the routing table regarding to which router connected to which provider's network received data should go next. Thus, on the Internet, the IP address attached to each IP packet (IP datagram) is checked, judgment is made to which router the IP packet should be sent, and that IP packet is sent accordingly. Thus, IP packets are transferred one after another and delivered to the destination computer, by means of all routers performing the above-described operation.

FIG. 3 illustrates the information contents of an RFC791 IP packet used by the Internet, divided into a control field and a data field. FIG. 4 illustrates the information contents of a similar RFC1883, divided into a control field and a data field. In either figure, the parentheses ( ) indicate the number of bits.

However, with the Internet, the path control is restricted by IP, so that one cannot tell whether the other party with which communication is being made is the authorized party, and the system is such that the communication path is not administrated in an integrated manner, meaning that there are problems regarding security in that information may be eavesdropped. Also, in reality, addresses within the LANs are being separately decided by the LAN users, so there is the necessity to replace the LAN user addresses when connecting the LAN to the Internet. Also, communication quality such as communication speed and communication error rate for the trunk lines making up the Internet communication path differ from one line to another for each LAN, and are practically non-uniform. Also, there are problems such as an attempt to send a 10 Mbps TV signal for video-conferencing not achieving the desired communication speed. Further, there is no administrator for performing maintenance of the network such as in the case of failure, or for integrating the overall network for future planning for the network and so forth. Also, with LAN networks and the Internet, the terminals are personal computers (computers), and it has been difficult to use telephones, FAX and CATV in an Integrated manner therein.

SUMMARY OF THE INVENTION

The present embodiment has been made in accordance with the above-described situations, and it is an object of the present invention to provide an integrated information communication system capable of containing a plurality of VANs (Value Added Networks) which perform IP packet transfer of which security and reliability in communications has been ensured, by means of not using dedicated lines or the Internet so as to improve economic considerations of the information communication system architecture, and ensuring communication speed, communication quality and communication trouble countermeasure in a unified manner. Also, it is another object of the present invention to provide an integrated information communication system which uses a single information transfer which is not dependent on the type of service, such as sound, image (motion and still), text, etc., so as to interconnect services which have conventionally been provided separately, such as total communication services, analog/digital telephone line services, Internet provider services, FAX services, computer data exchange services, CATV services and so forth. Further, it is another object of the present invention to provide an integrated information communication system which enables inter-corporation communication with very little change to the computer communication address systems which have been independently and separately created within each separate corporation (including universities, research institutes, government organizations, etc.).

The present invention relates to an integrated information communication system, and the above objects of the present invention are realized as follows: the present invention is configured by providing an access control apparatus for connecting a plurality of computer communication networks or information communication equipment to each other, and a relay device for networking the aforementioned access control apparatus, the system having functions for performing routing by transferring information by a unified address system, and is configured such that the aforementioned plurality of computer communication networks or information communication equipments can perform communications in an interactive manner. In FIG. 1 which is given as an example of a conventional arrangement, the range of dedicated lines used for intra-corporation and inter-corporation communications is indicated by solid lines, and this is replaced with the equivalent of a computer communications network according to IP as a common communication network indicated by broken lines.

The above-described objects of the present invention are achieved by an ICS (Information Communication System) user packet having a unique ICS user address system ADX being converted into an ICS network packet having an address system ADS, based on the administration of a conversion table provided within an access control apparatus, and by being arranged such that in the case that transmission is made over at least one VAN contained therein following rules of the aforementioned address system ADS, and the destination other access control apparatus is reached, conversion is made to the aforementioned ICS user address system ADX based on the administration of the aforementioned conversion table, and another external information communication apparatus is reached. Also, the above-described objects of the present invention are achieved by an ICS user packet having a unique ICS user address system ADX being converted into an ICS network packet corresponding with a reception ICS network address registered beforehand to the conversion table in accordance with a user logic communication line, rather than using an ICS user address within the aforementioned ICS user packet based on the administration of a conversion table provided within the access control apparatus, and by being arranged such that in the case that transmission of the aforementioned ICS network packet is made to another access control apparatus via at least one VAN following rules of the ICS address system ADS, the transfer destination of the aforementioned ICS network packet being either 1 or N, this is returned to the aforementioned ICS network packet based on the administration of a conversion table provided within the aforementioned access control apparatus, and another external information communication apparatus is reached.

BRIEF DESCRIPTION OF THE DRAWINGS

In the accompanying drawings:

FIG. 16 is a diagram to show an example of a conversion table;

FIG. 17 is a diagram to show an example of a temporary conversion table;

FIG. 21 is a diagram to show an example of the conversion table;

FIG. 29 is a diagram to show an example of an ATM address conversion table and a VC address conversion table;

FIG. 30 is a diagram to show an example of an ATM address conversion table and a VC address conversion table;

FIG. 41 is a diagram to show an example of an FR address conversion table and a DLC address conversion table;

FIG. 42 is a diagram to show an example of an FR address conversion table and a DLC address conversion table;

FIG. 53 shows an example of the conversion table;

FIG. 58 is a diagram to show an example of description of router table in a dial-up router.

FIG. 80 is a portion of a diagram to explain a thirteenth embodiment;

FIG. 81 is a portion of a diagram to explain a thirteenth embodiment;

FIGS. 84 and 85 are diagrams to show an example of a conversion table used in a $14^{th}$ embodiment;

FIG. 88 is a diagram to show an example of a conversion table used in a $15^{th}$ embodiment;

FIG. 89 is a diagram to show an example of a conversion table used in a $15^{th}$ embodiment;

FIG. 100 is a diagram to show an example of an ICS network address appropriation record table used in a $16^{th}$ embodiment;

FIG. 101 is a diagram to show an example of an ICS user address appropriation record table used in a $16^{th}$ embodiment;

FIG. 102 is a diagram to show an example of a conversion table used in a $16^{th}$ embodiment;

FIG. 103 is a diagram to show an example of a conversion table used in a $16^{th}$ embodiment;

FIG. 104 is a diagram to show an example of a conversion table used in a $16^{th}$ embodiment;

FIG. 106 is a diagram to show an example of a conversion table used in a $16^{th}$ embodiment;

FIG. 108 is a diagram to show an example of a conversion table used in a $16^{th}$ embodiment;

FIG. 117 is a diagram to show an example of a conversion table;

FIG. 125 is a diagram to show an example of a verifying server;

FIG. 126 is a diagram to show an example of a conversion table;

FIG. 127 is a timing chart to explain register procedure from a home IP terminal;

FIG. 128 is a diagram to explain an accessing method of a verifying server;

FIG. 129 is a diagram to show an example of an inner table used in an 18$^{th}$ embodiment;

FIG. 130 is a diagram to show an example of an inner table used in an 18$^{th}$ embodiment;

FIG. 131 is a diagram to show an example of an inner table used in an 18$^{th}$ embodiment;

FIG. 132 is a block diagram to show a call of a verifying server;

FIG. 133 is a portion of a constructional block diagram illustrating a 19$^{th}$ embodiment (closed-zone network communication and open-zone communication used network discriminator) according to the present invention;

FIG. 134 is a portion of a constructional block diagram illustrating a 19$^{th}$ embodiment according to the present invention;

FIG. 135 is a portion of a constructional block diagram illustrating a 19$^{th}$ embodiment according to the present invention;

FIG. 136 is a portion of a constructional block diagram illustrating a 19$^{th}$ embodiment according to the present invention;

Figure 141:
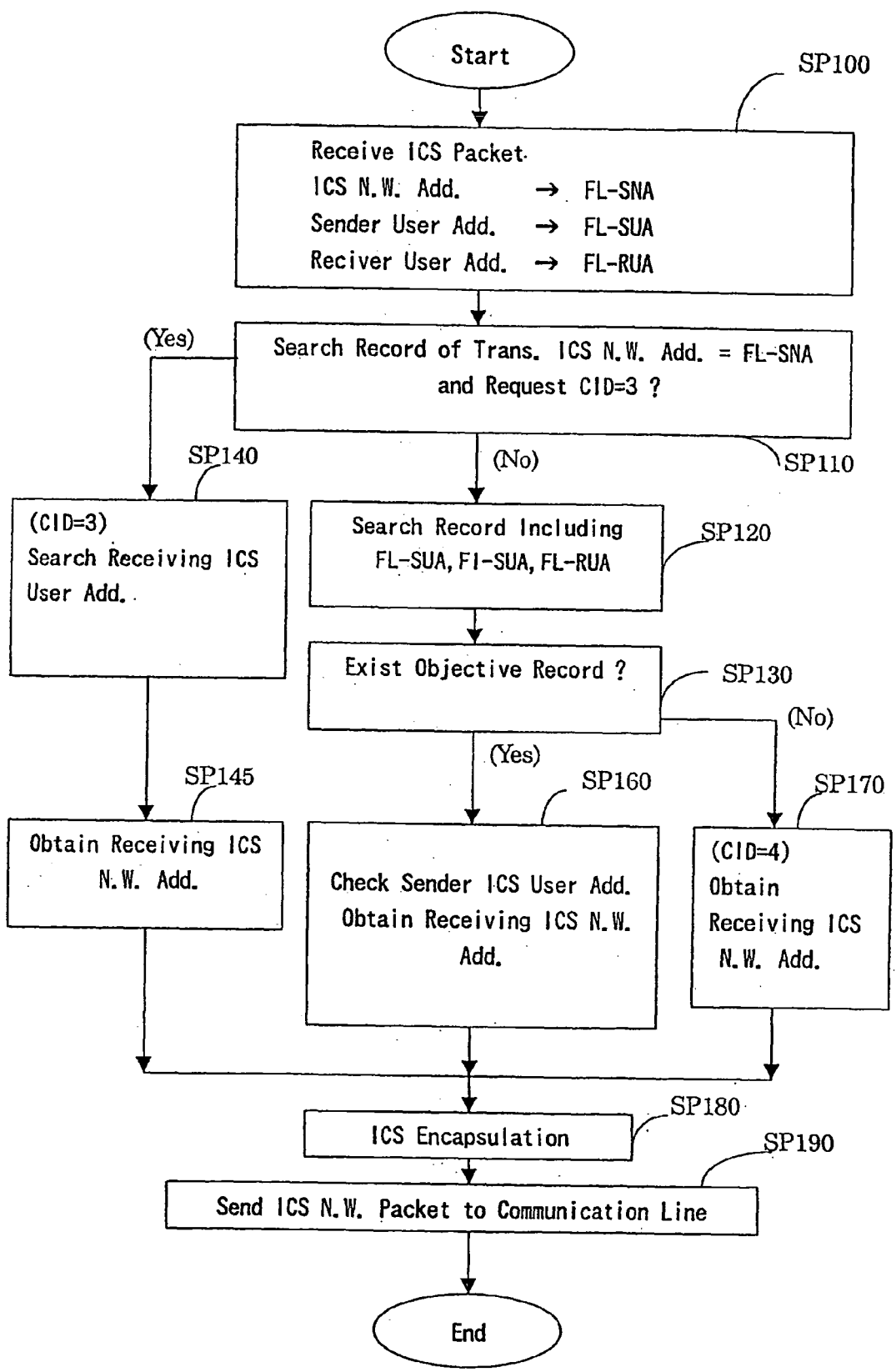
Figure 142:
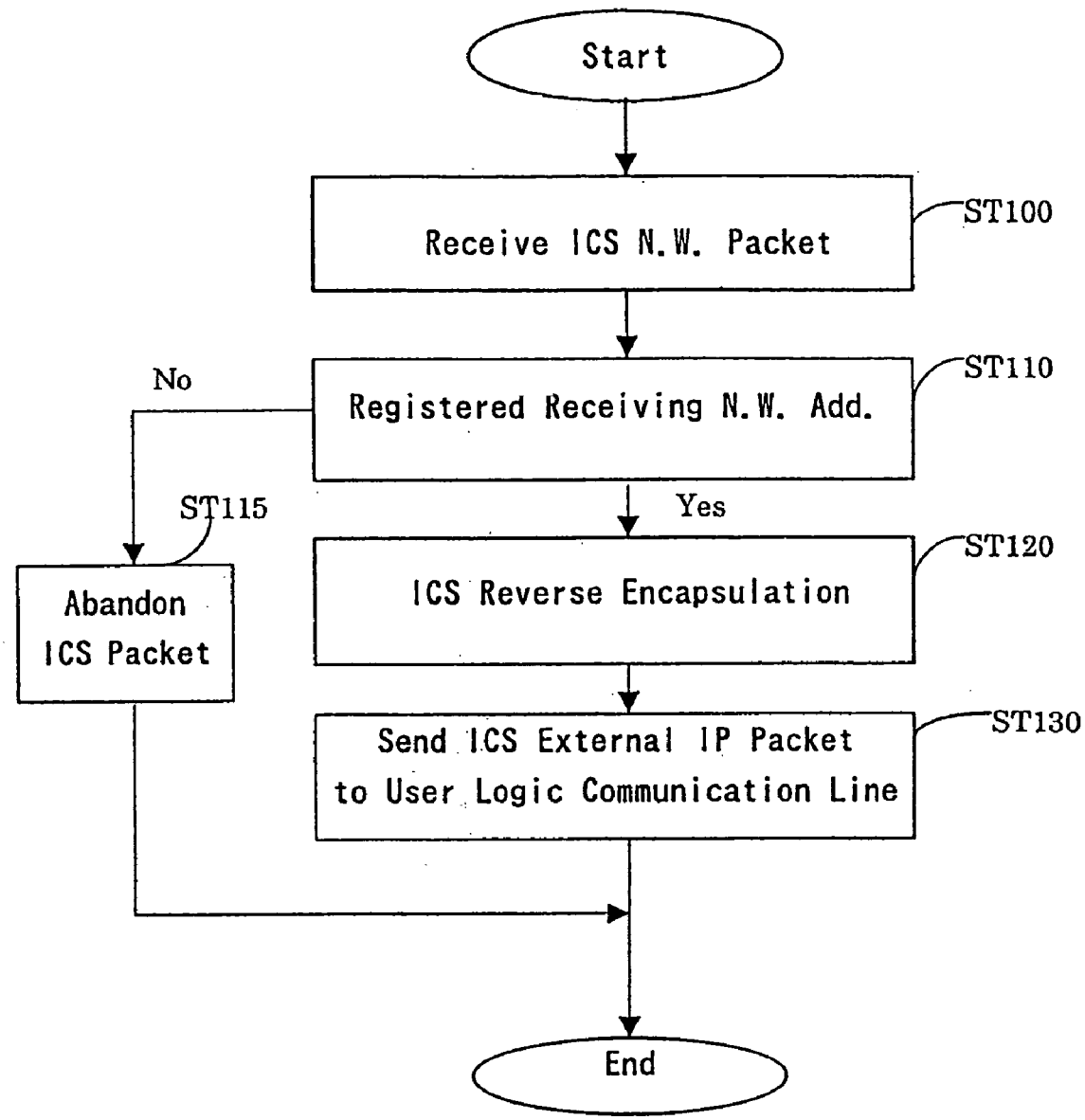
Figure 143:
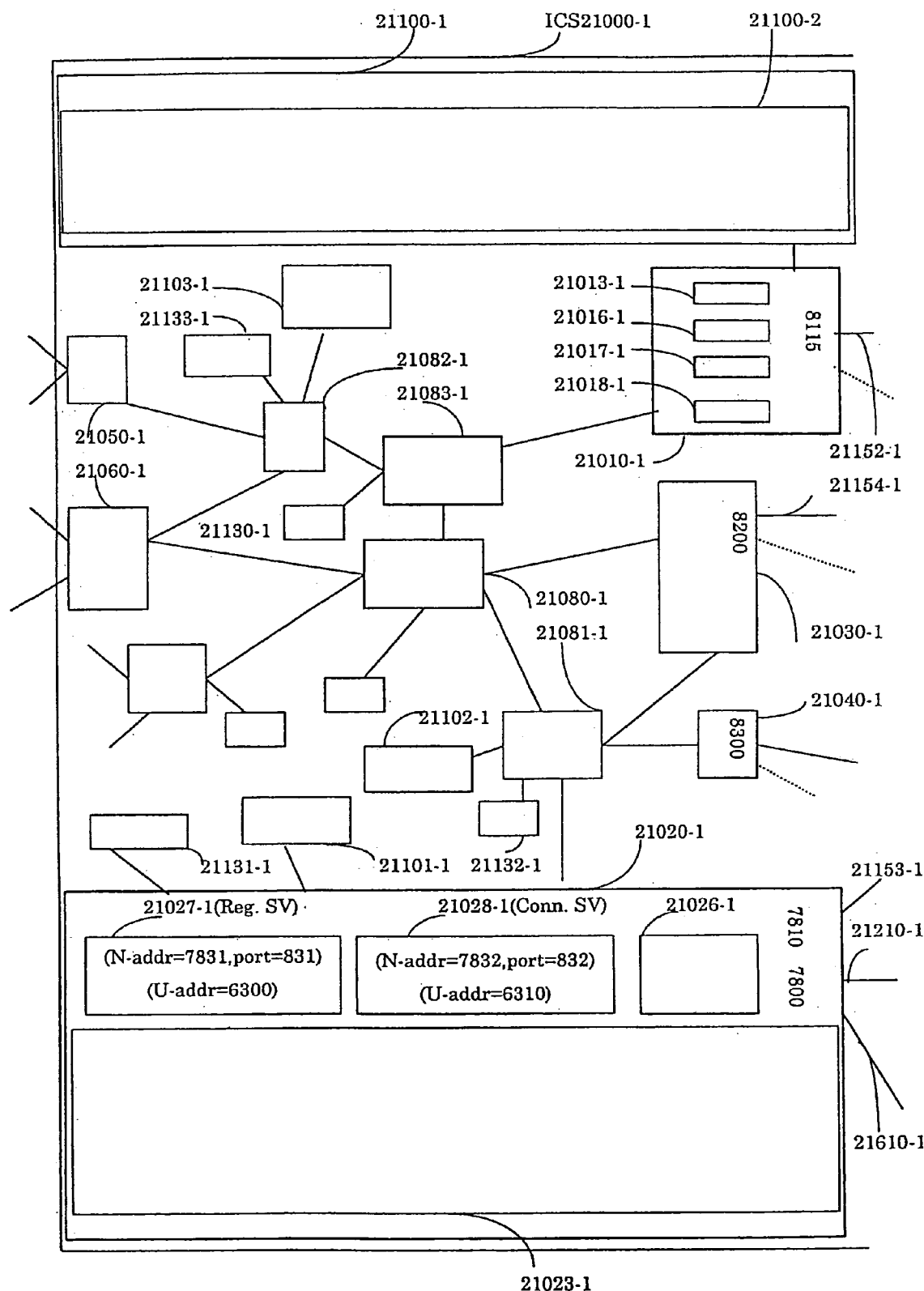
Figure 144:
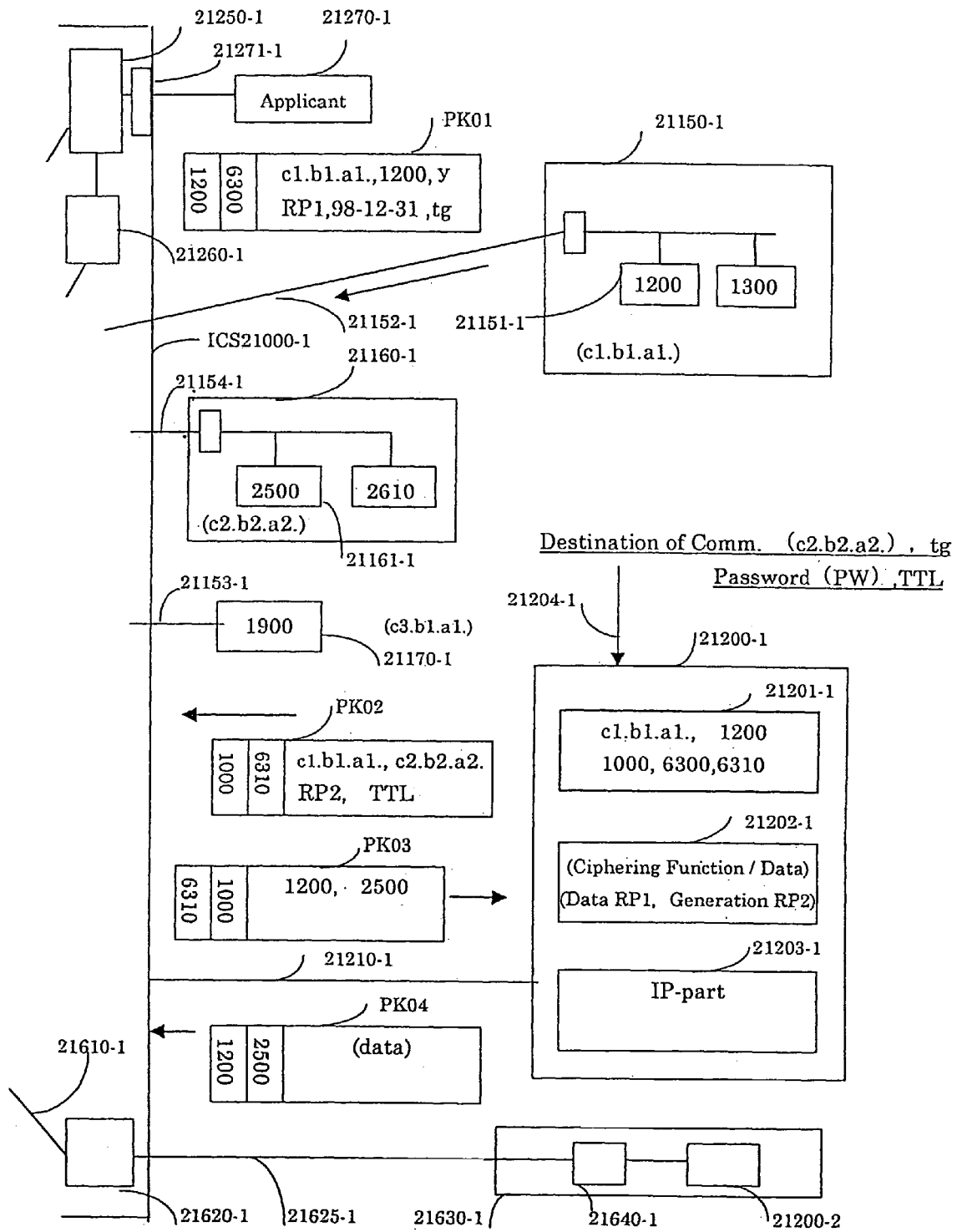
Figure 147:
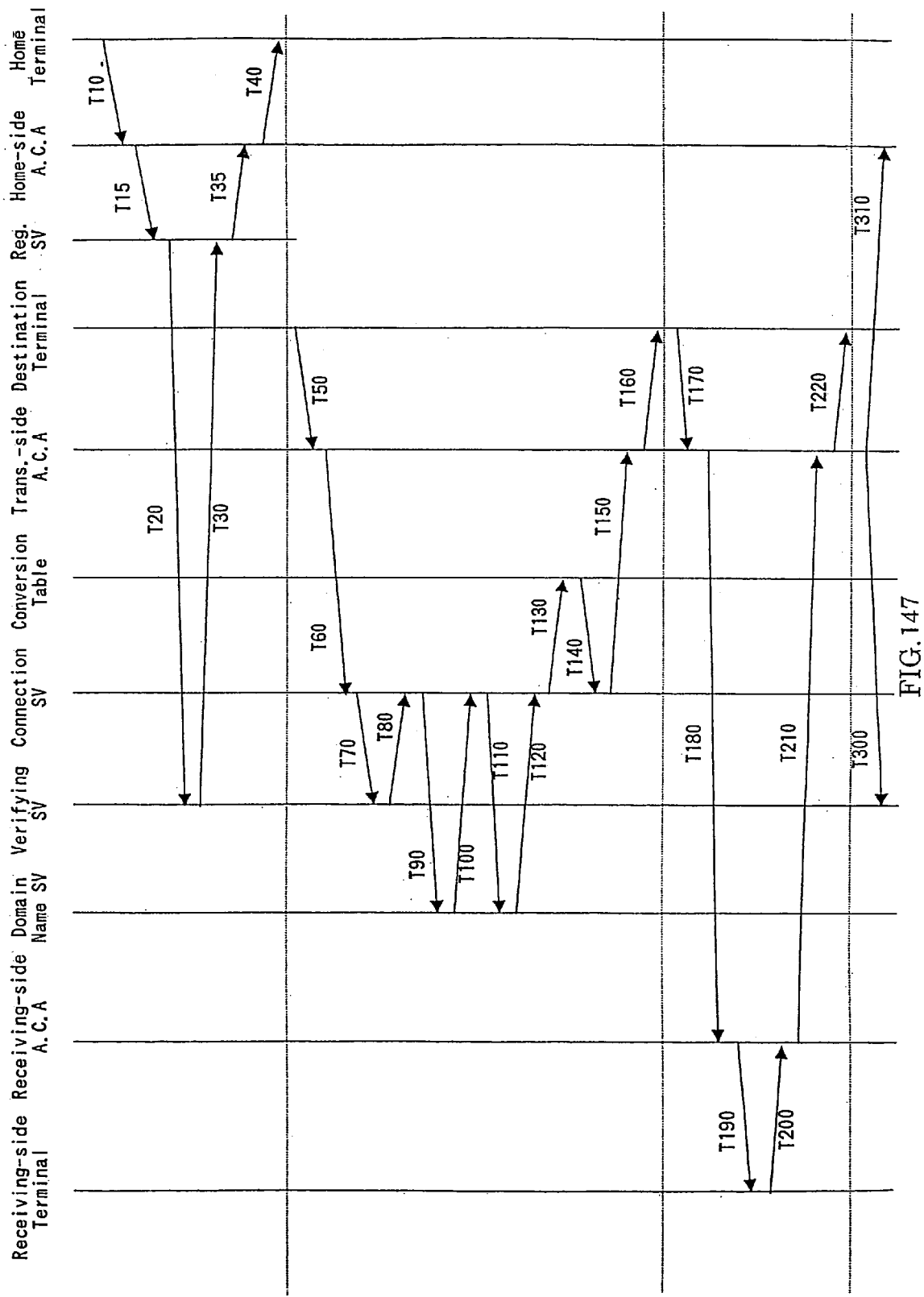
Figure 152:
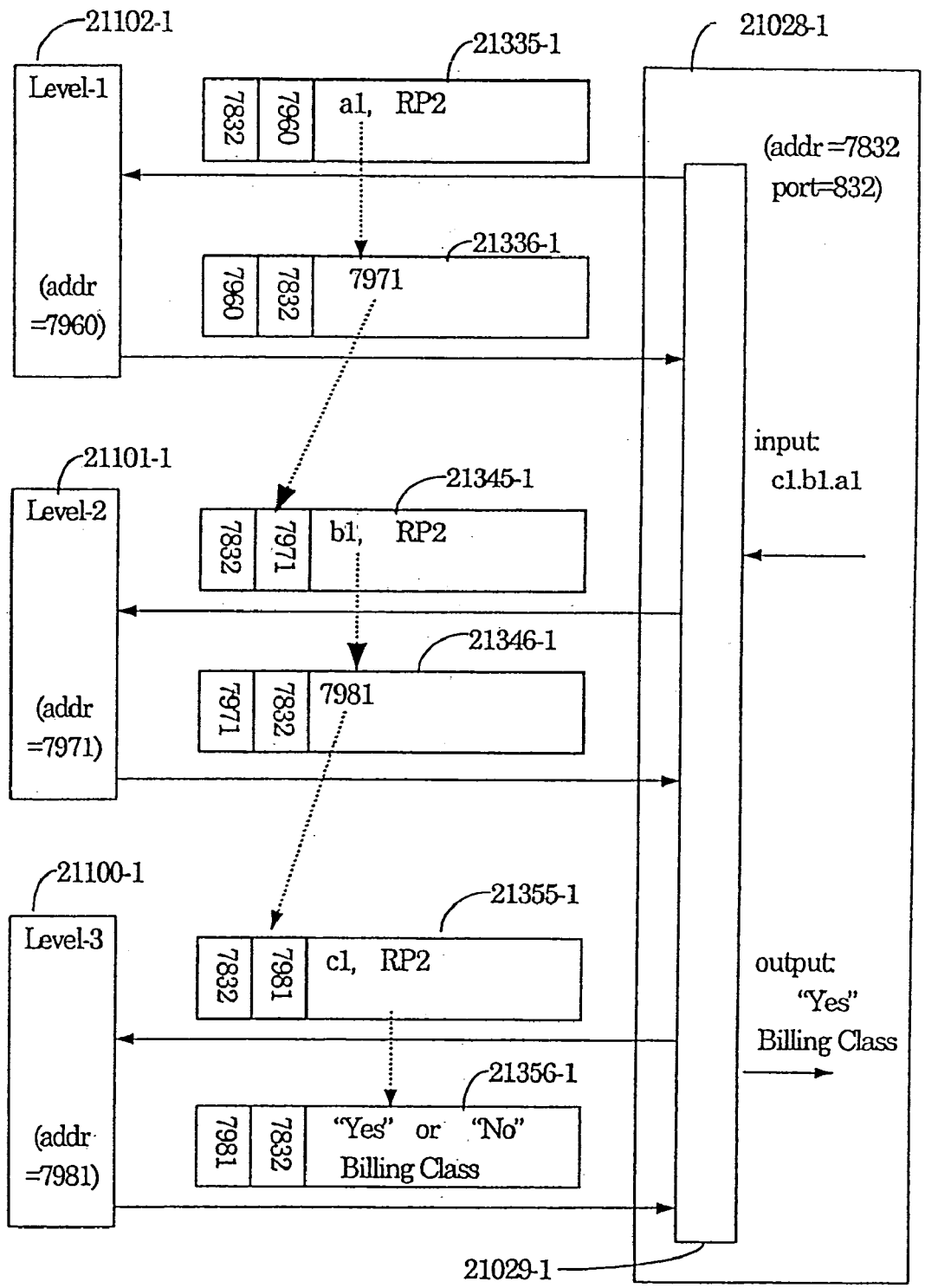

FIG. 137 is a diagram to show an example of a conversion table used in a 19$^{th}$ embodiment;

FIG. 138 is a diagram to show an example of a conversion table used in a 19$^{th}$ embodiment;

FIG. 139 is a diagram to show an example of a conversion table used in a 19$^{th}$ embodiment;

FIG. 140 is a diagram to show an example of a conversion table used in a 19$^{th}$ embodiment;

FIG. 141 is a flowchart to show an example of an operation of a 19$^{th}$ embodiment;

FIG. 142 is a flowchart to show an example of an operation of a 19$^{th}$ embodiment;

FIG. 143 is a portion of a constructional block diagram illustrating a 20$^{th}$ embodiment (IP terminal to be connected with plural access control apparatus having network identifier) according to the present invention;

FIG. 144 is a portion of a constructional block diagram illustrating a 20$^{th}$ embodiment according to the present invention;

FIG. 145 is a diagram to show an example of a verifying server used in a 20$^{th}$ embodiment;

FIG. 146 is a diagram to show an example of a conversion table used in a 20$^{th}$ embodiment;

FIG. 147 is a signal flowchart to explain an operation of a 20$^{th}$ embodiment;

FIG. 148 is a diagram to explain a 20$^{th}$ embodiment;

FIG. 149 is a diagram to explain a 20$^{th}$ embodiment;

FIG. 150 is a diagram to explain a 20$^{th}$ embodiment;

FIG. 151 is a diagram to explain a 20$^{th}$ embodiment;

FIG. 152 is a diagram to explain a 20$^{th}$ embodiment; and

Figure 153:
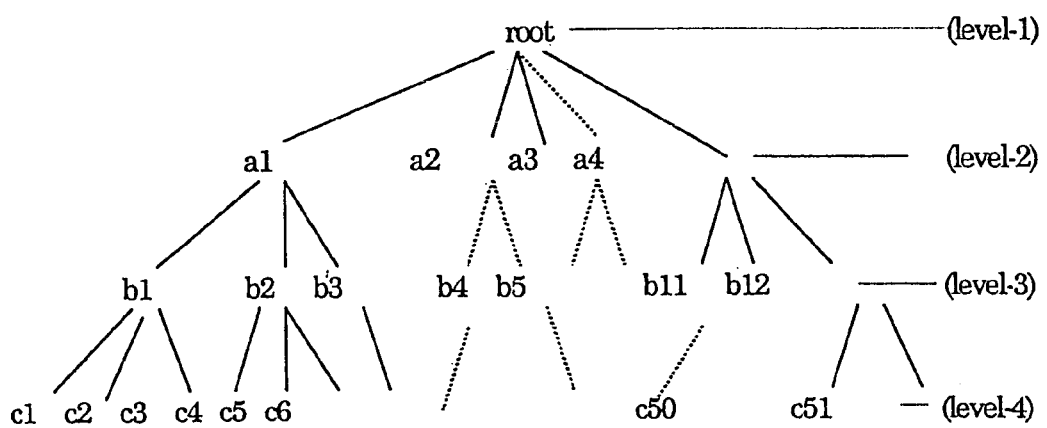

FIG. 153 is a diagram to explain a 20$^{th}$ embodiment.

DESCRIPTION OF THE PREFERRED EMBODIMENTS

Figure 5:
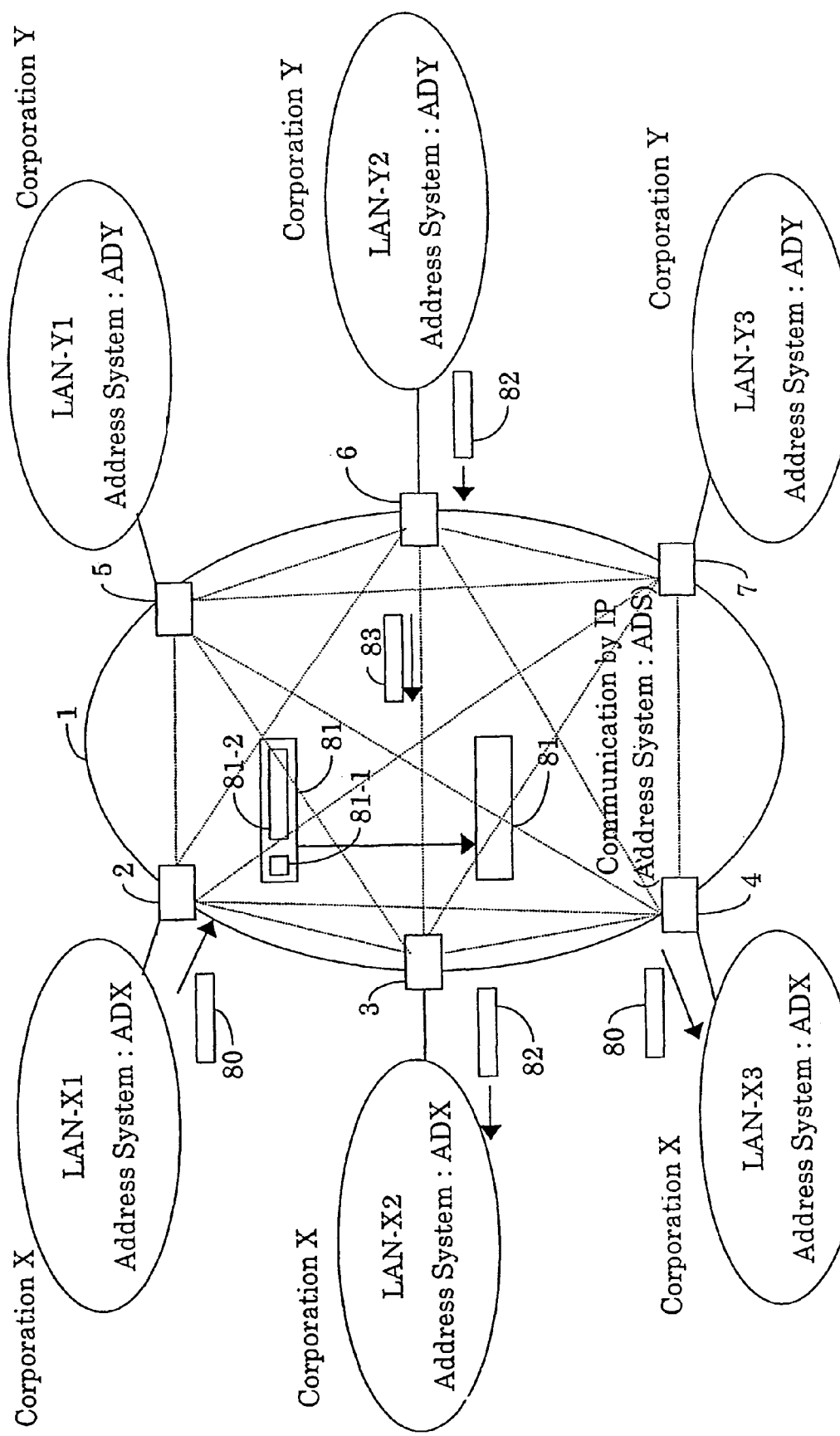
FIG. 5 is a block diagram systematically illustrating the basic principle of the present invention.

FIG. 5 systematically illustrates the basic principle of the present invention, wherein the integrated information communication system (hereafter referred to as "ICS") 1 according to the present invention has self-appointed address providing rules as a computer information/communication address. i.e., the system has a unique address system ADS, and has access control apparatuses (2 through 7 in the present example) which serve as access points for connecting a plurality of computer communication networks or information communication equipments, e.g., a great number of LANs (in the present example, corporation X's LAN-X1, LAN-X2 and LAN-X3, and corporation Y's LAN-Y1, LAN-Y2 and LAN-Y3). Here, corporation X's LAN-X1, LAN-X2 and LAN-X3 have the same address system ADX, and corporation Y's LAN-Y1, LAN-Y2 and LAN-Y3 have the same address system ADY. The access control apparatuses 2, 3 and 4 have conversion tables for administrating mutual conversion between the address system ADS and the address system ADX. The access control apparatuses 5, 6 and 7 have conversion tables for administrating mutual conversion between the address system ADS and the address system ADY. The computer communication data (ICS packet) within the ICS 1 uses addresses according to the address system ADS of the ICS 1, and performs IP communication such as is used on the Internet.

Now, description will be made regarding the operation in the case of communication within a single corporation. The computer communication data (ICS packet) 80 transmitted from the LAN-X1 of the corporation X is provided with addressing following the address system ADX but is subjected to address conversion following the address system ADS under administration of the conversion table of the access control apparatus within the ICS 1, and becomes ICS packet 81. This is then sent within the ICS 1 following the rules of the address system ADS, and upon reaching the destination access control apparatus 4, is restored to the computer communication data 80 of the address system ADX under the administration of the conversion table thereof, and is sent to the LAN-X3 within the same corporation X. Here, the ICS frame being sent and received within the ICS 1 is referred to as an ICS network packet, and the ICS packet being sent and received outside of the ICS 1 is referred to as an ICS user packet. The ICS user packet is such as stipulated by the Internet protocol RFC791 or RFC1883 as a rule, but dealing with ICS packets which do not follow this rule will be described later in conjunction with description of another embodiment.

The ICS network packet 81 is comprised of a network control field 81-1 and a network data field 81-2, with the network control field 81-1 storing the addresses (address system ADS) of the access control apparatuses 2 and 4 therein. The ICS user packet is either used as the network data field 81-2 with no change to the data value thereof, or is subjected to data format conversion following stipulations determined within the ICS 1 and is used as network data field 81-2. An example of the data format conversion stipulations might be conversion to ciphertext or data compression, and the access control apparatus 2 may be provided with ciphering means, deciphering means for returning the ciphertext to the original plain-text, data compression means, and data decompression means for returning the compressed data to the original data. In the access control apparatus 2, the ICS user packet 80 is used as the ICS network packet 81-2, and each of the operations of adding the network control field 81-1 to the ICS network packet 81-2 are referred to as "ICS encapsulation". Also, in the access control apparatus 4, the operations of removing the network control field 81-1 from the ICS network packet 81 are referred to as "ICS reverse encapsulation".

Now, description will be made regarding the operation in the case of communication between corporations. The computer communication data (ICS user packet) 82 transmitted from the LAN-Y2 of the corporation Y is provided with addressing following the address system ADY, but is subjected to address conversion following the address system ADS under administration of the conversion table of the access control apparatus 6 within the ICS 1, and becomes ICS packet 83. This is then sent within the ICS 1 following the rules of the address system ADS, and upon reaching the destination access control apparatus 3, is converted to the computer communication data 82 of the address system ADX under the administration of the conversion table thereof and is sent to the LAN-X2 within the corporation X. While address lengths of 32 bits and 128 bits are used in the present invention, the present invention is by no means restricted to these. Even if the length of the addresses are changed to such other than 32-bit or 128-bit, this does not change the principle of address conversion which is the principle idea of the present invention.

Thus, according to the present invention, both intra-corporation and inter-corporation computer communications are enabled by unified address administration by the ICS 1. Generally used user terminals for computer communications are incorporated within the LAN within the structure of the user, and incorporated within the VAN (Value Added Network) via access line, and user data packets are sent which have differing data formats and differing address system for each type of service. For example, an IP address is used for Internet services, a telephone number/ISDN number (E.164 address) for telephone services, and an X.121 address is used for X.25 packet services. Conversely, according to the ICS 1 of the present invention, address conversion is performed with the conversion table of the access control apparatus based on the input ICS user packet, thus realizing sending of information frames of data of varied structures unified under a single data format and address system, i.e., converted to ICS packets.

Figure 6:
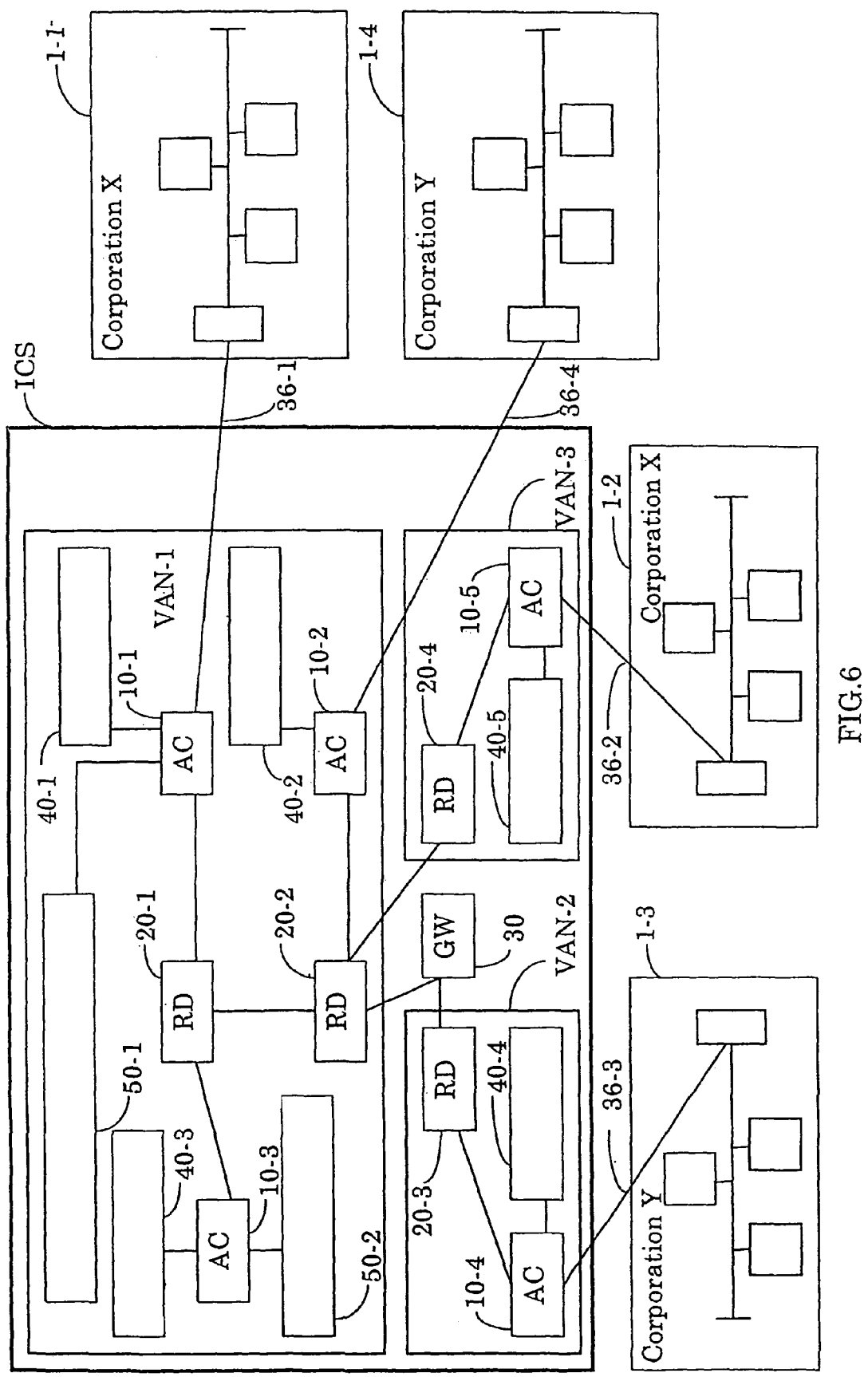
FIG. 6 is a block diagram illustrating an example of a network wherein an ICS according to the present invention is constructed of a plurality of VANs.
Figure 7:
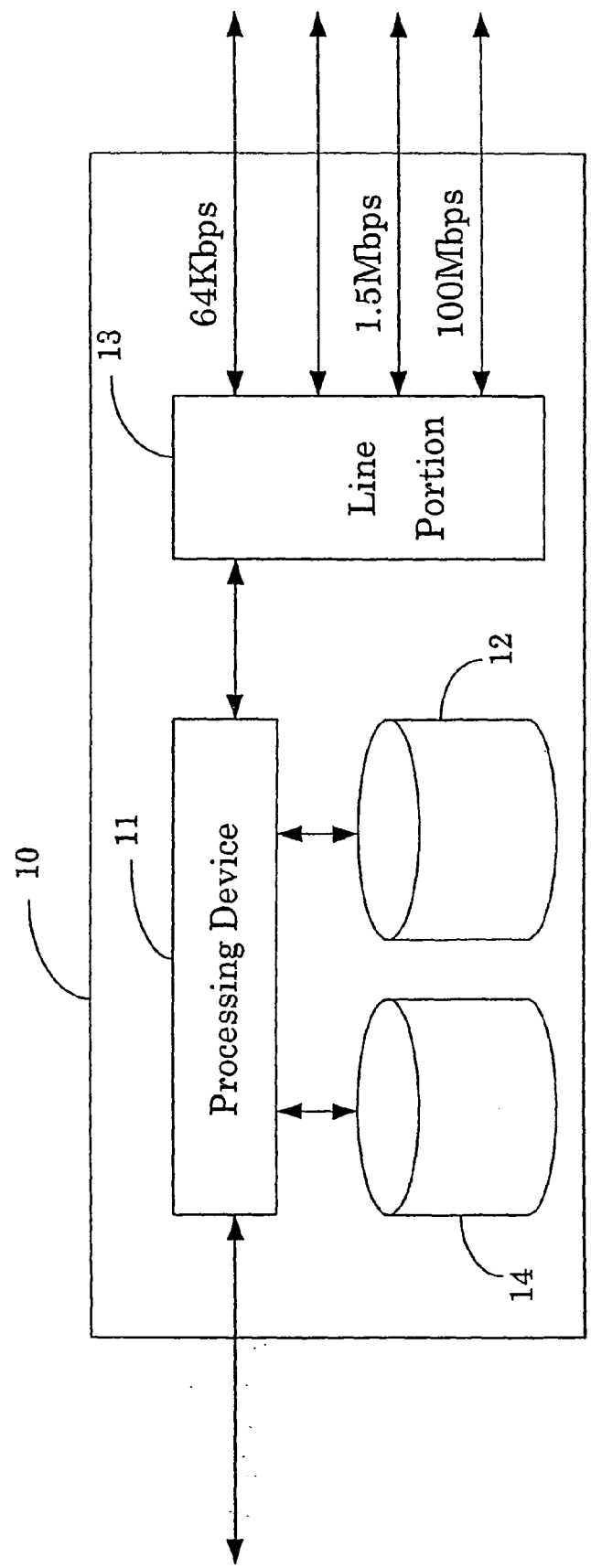
FIG. 7 is a block diagram illustrating an example of configuring the access control apparatus.
Figure 8:
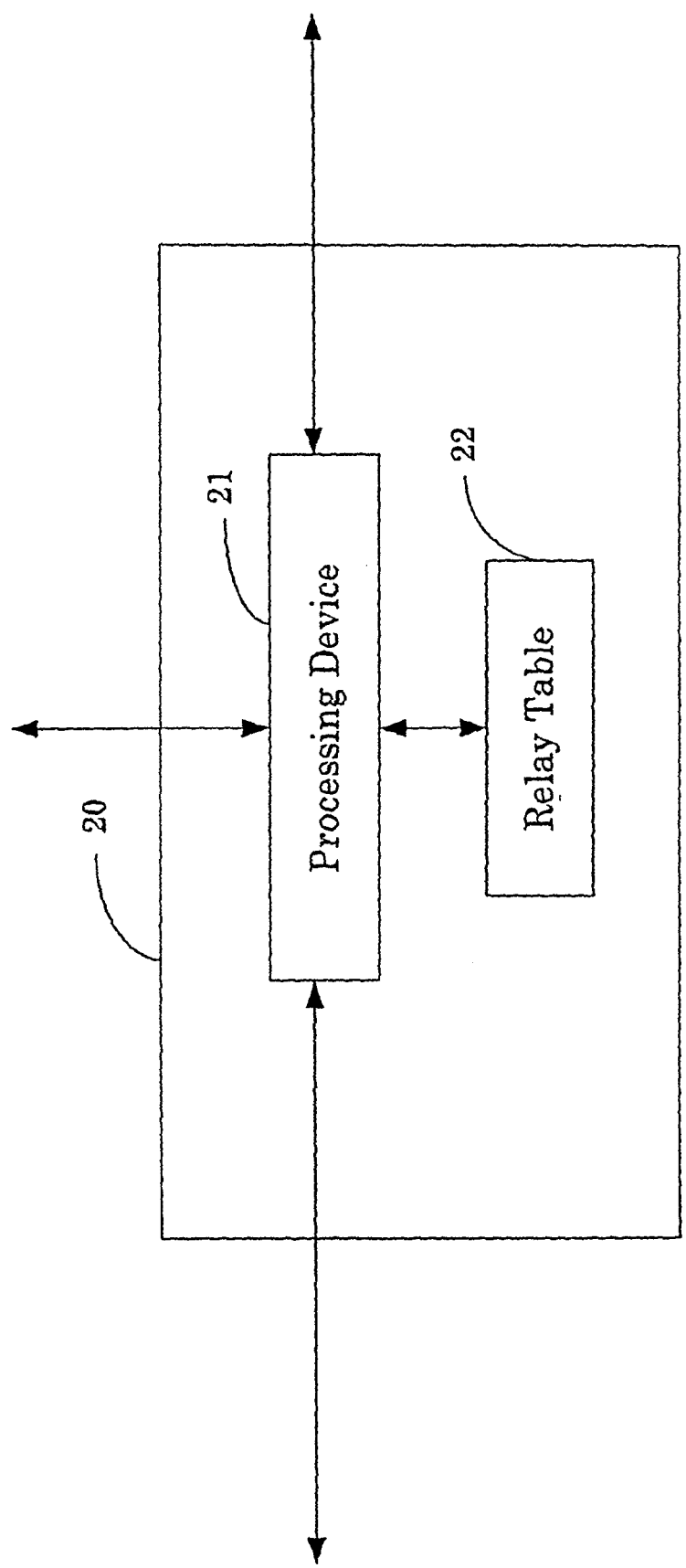
FIG. 8 is a block diagram illustrating an example of configuring the relay apparatus.
Figure 9:
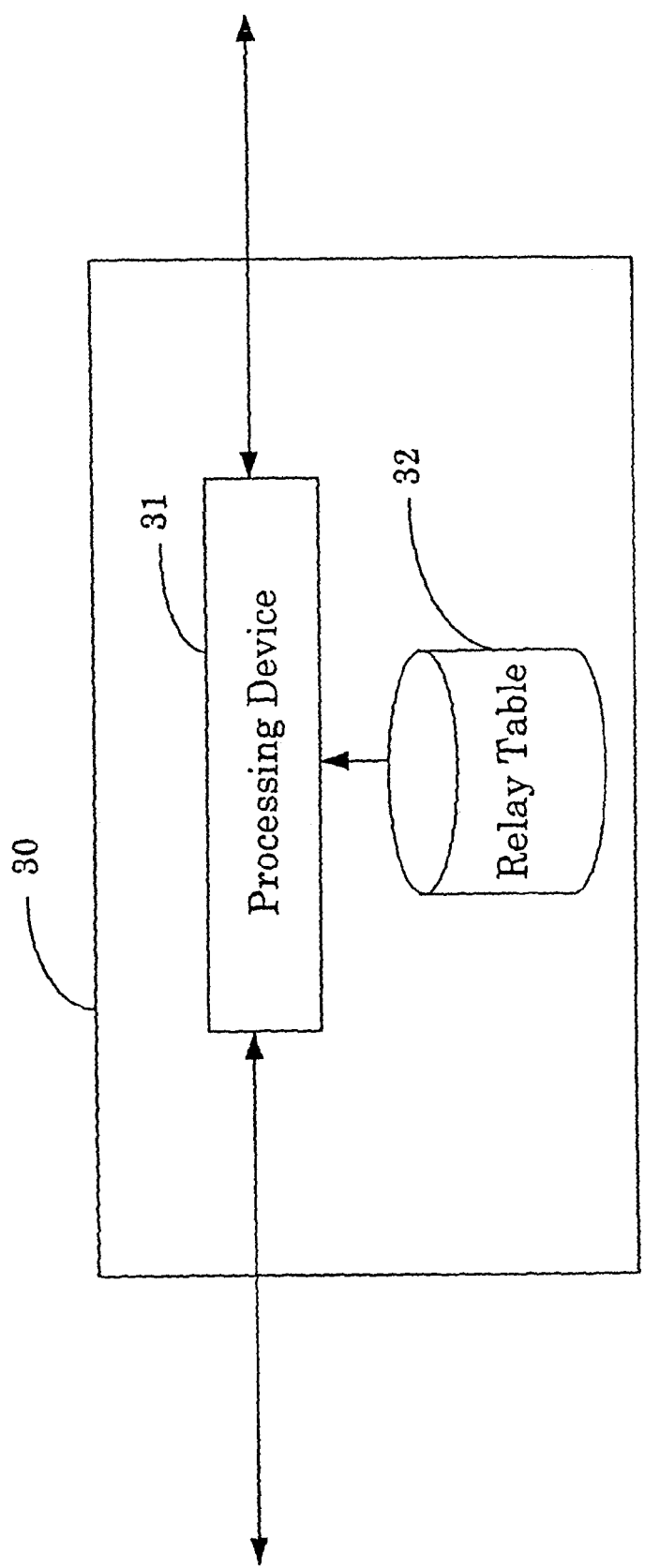
FIG. 9 is a block diagram illustrating an example of configuring the inter-VAN gateway.

FIG. 6 schematically illustrates an example wherein the ICS 1 of the present invention is comprised of a plurality of VANs (VAN-1, VAN-2, VAN-3), with each VAN being administered by a VAN operator. An ICS 1 user applies to the VAN operator for a user communication line, and the VAN operator decides the ICS address and ICS network address for the user and registers this information with the circuit type in a conversion table 12 within the access control apparatus 10 such as shown in FIG. 7. The ICS 1 has, as access points serving as external connection elements with the LANs (or terminals) of the corporations X and Y, the access control apparatuses 10-1, 10-2, 10-3, 10-4 and 10-5, as shown in FIG. 7, and further has relay apparatuses 20-1, 20-2, 20-3 and 20-4, and also ICS network servers 40-1, 40-2, 40-3, 40-4 and 40-5, as well as ICS address administration servers 50-1 and 50-2. A relay apparatus 20 such as shown in FIG. 8 is provided to the communication path within each of the VANs, and an inter-VAN gateway 30 such as illustrated in FIG. 9 is provided as the connection element of VAN-2 and VAN-3. The LANs 1-1, 1-2, 1-3 and 1-4 are respectively connected to the access control apparatuses 10-1, 10-5, 10-4 and 10-2, via the user communication lines 36-1, 36-2, 36-3 and 36-4.

The access control apparatus 10 (10-1, 10-2, 10-3, 10-4 and 10-5) are devices containing the user communication lines from the user (corporations X and Y) to the ICS 1, and as shown in FIG. 7, are comprised of a processing device 11 comprised of a CPU or the like, a conversion table 12 serving as a database for performing address conversion and the like, an input/output interface line portion 13, and a temporary conversion table 14. Also, the relay apparatus 20 has network packet transferring functions and path specification routing functions, and as shown in FIG. 8 has a processing device 21 comprised of a CPU or the like and a conversion table 22, the conversion table 22 being used for determining the communication destination when the ICS network frame is transferred within the ICS 1. The inter-VAN gateway 30 has a processing device 31 comprised of a CPU or the like and a relay table 32 for determining where to send ICS network packets between VANs, as shown in FIG. 5.

Figure 10:
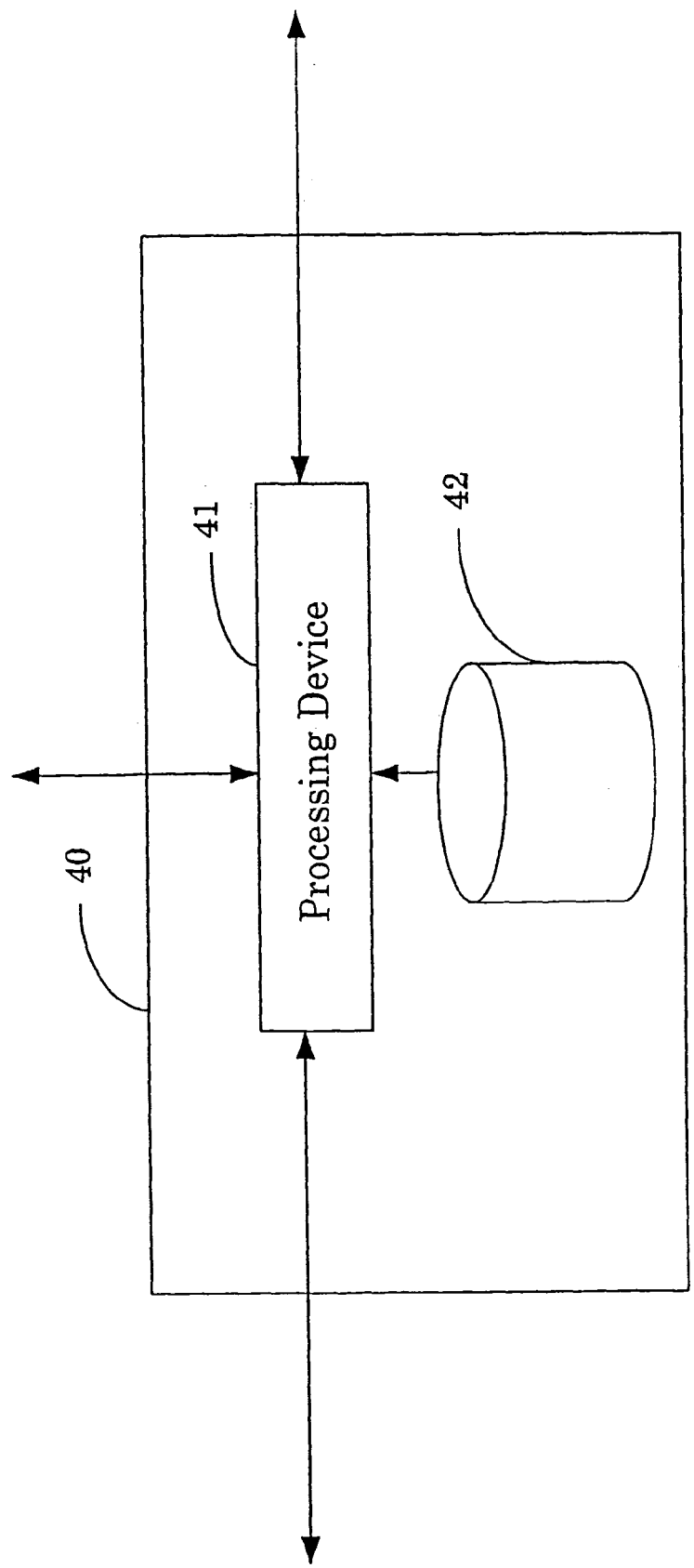
FIG. 10 is a block diagram illustrating an example of configuring the ICS network server.
Figure 11:
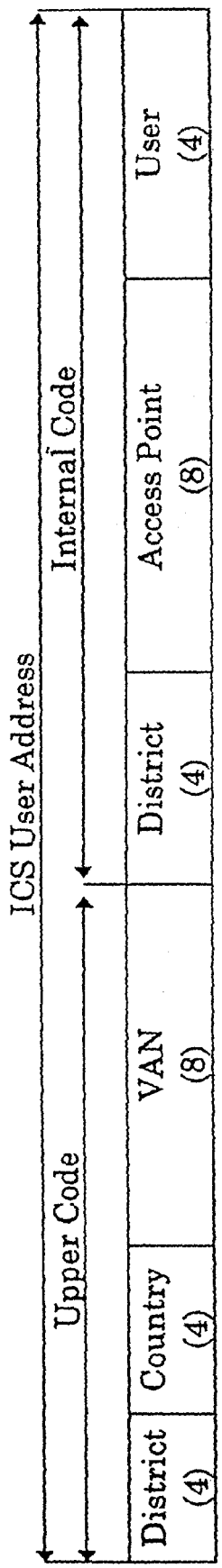
FIG. 11 is an array diagram illustrating an example of the ICS user address used in the present invention.

As shown in FIG. 10, the ICS server 40 is comprised of a processing device 41 and an ICS network database 42, the usage of the ICS network database 42 not being restricted. Examples of this usage include: user-specific data corresponding with the ICS address (such as the name or address of the user), data not corresponding with the ICS address, such as data indicating the state of communication trouble within the VAN, or data not directly related to the VAN, such as an electronic library which maintains and discloses digital documents, public keys for a public encryption system using encryption technology employed in verifying the authenticity of the sender and receiver, and maintaining data such as public proof data and related data or secret keys for a secret encryption system and related data. The processing device 41 refers to the ICS network database 42, and obtains corresponding data and sends the data to the access control apparatus 10. Further, not only does the ICS network database 42 operate in stand-alone manner, but also is capable of communicating with other ICS network servers and obtaining data therefrom, by means of sending and receiving ICS network frames based on IP communication technology. Within the ICS, the ICS network server is the only component provided with an ICS network address.

According to the present invention, the address used to identify computers, terminals and the like used within the ICS network packet is referred to as an ICS network address, and the address used to identify the computers, terminals and the like used within the ICS user packet is referred to as an ICS user address. The ICS network address is used only within the ICS, one or both of the two types being used; 32-bit and/or 128-bit. Similarly, the ICS user address also uses one or both of the two types; 32-bit and/or 128-bit. The access control apparatus 10, the relay apparatus 20, the VAN gateway 30 and the ICS network server are arranged so as to be provided each with an ICS network address so as to be uniquely identified. Also, the ICS user address is formed of a VAN upper code and VAN internal code. With the length of the VAN upper code being represented as C1 bits and the length of the VAN internal code being represented as C2 bits, the ICS user address is used such that the total of C1+C2 equals either 32 bits or 128 bits.

In the present invention, no particular method for deciding the VAN upper code and VAN internal code is stipulated, but in the case of C1+C2=32 bits, the following example can be given for a method for deciding such:

VAN upper address=district administration code (4-bit)||country code (4-bit)||VAN code (8-bit)

VAN internal code=VAN district code (4-bit)||VAN access point code (8-bit)||user logic code (4-bit)

Figure 1:
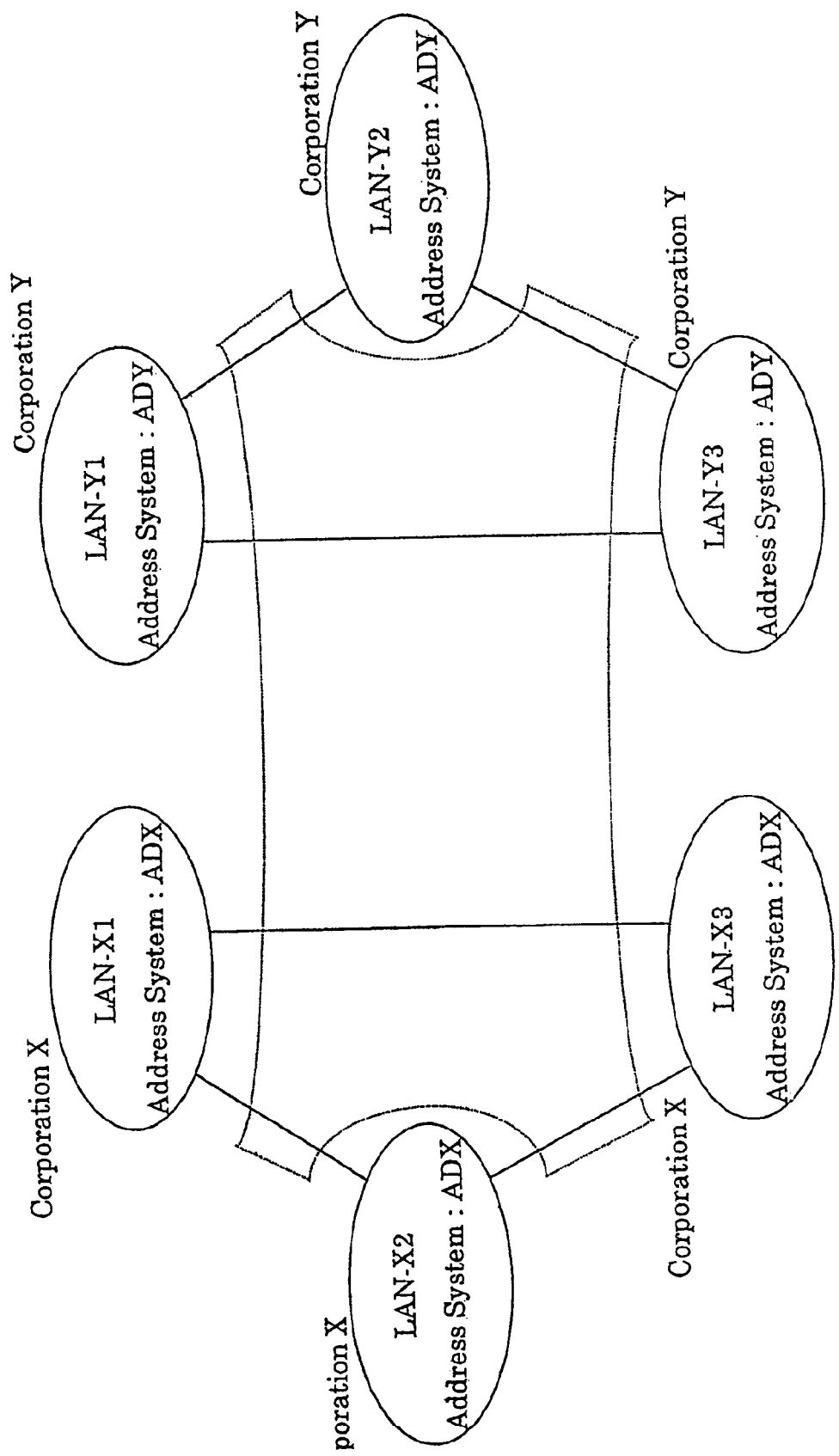
FIG. 1 is a block diagram to explain a conventional LAN network.
Figure 2:
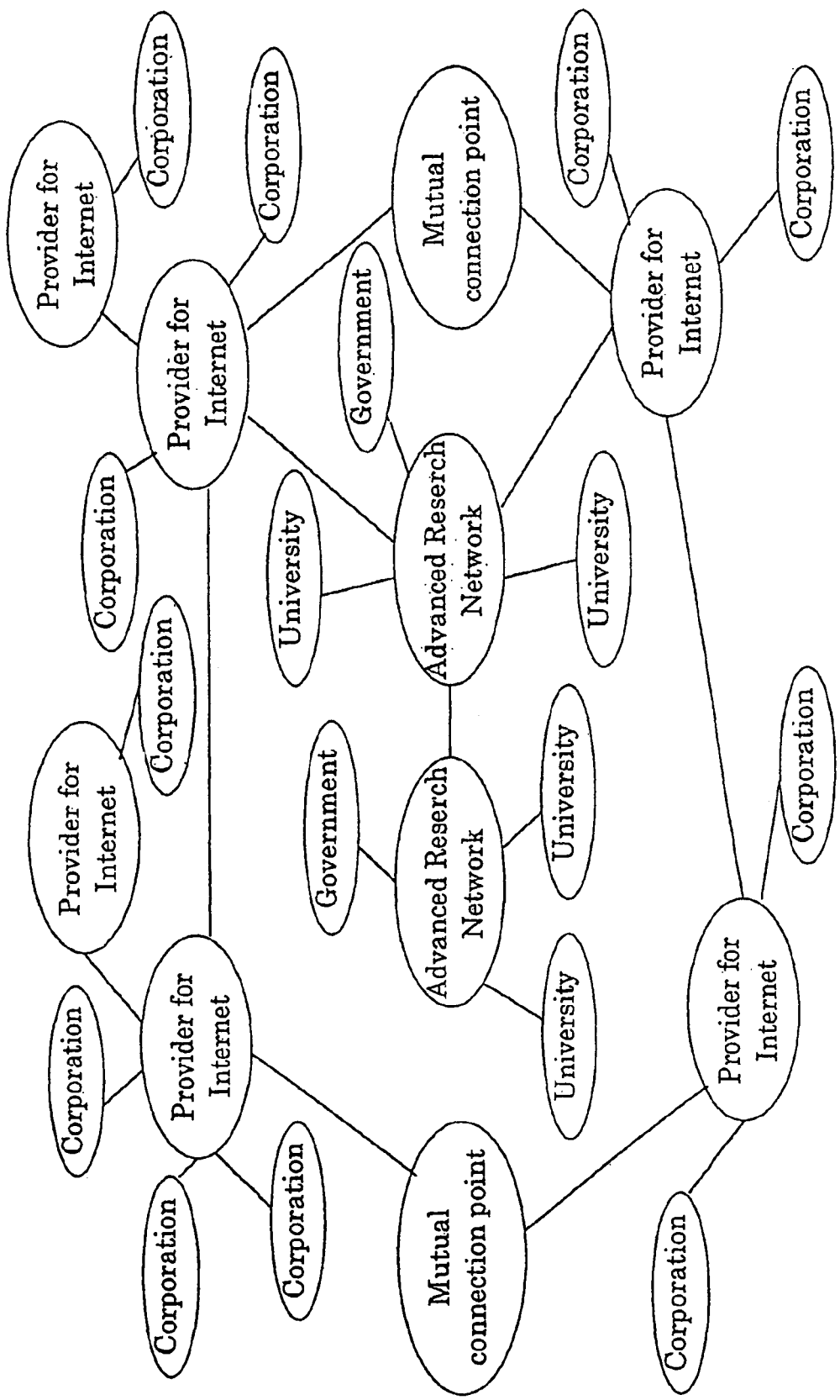
FIG. 2 is a diagram illustrating a form of Internet.

FIG. 1 makes description thereof using an example of an ICS user address. Here, the symbol "a||b" indicates linkage of data "a" and "b", i.e., data obtained by means of arrayed data "a" and "b" in this order. The ICS network address can be provided with locality in the same manner as with the user network address. That is, ICS network address=district administration code||country code||VAN code||VAN district code||user logic communications line code Thus, the relay apparatus can efficiently find the transfer destination by means of deciding the transferring destination with consideration to the district. The address can be determined in the same way in the case of C1+C2=128 bits, as well. Incidentally, with the present invention, the ICS frame can be constructed as described later, as long as C1+C2=32 bits or C1+C2=128 bits is kept, regardless of how the field sections for the VAN upper code and VAN internal code are made, or the length of each of the sections.

Also, when deciding the VAN upper code and VAN internal code, part of these codes may be made to be unique to the user. That is, the user can make a user-specific address system. The address values within a 32 bit address value are from address 0 to address ($2^{32}-1$), the present invention is carried out by providing an address decided uniquely to the user within the range of address $10\times2^{24}$ to address ($10\times2^{24}+2^{24}-1$), i.e., address ($172\times2^{24}+16\times2^{16}$) to address ($172\times2^{24}+32\times2^{16}-1$) or address ($192\times2^{24}+168\times2^{16}$) to address ($192\times2^{24}+169\times2^{16}-1$).

Figure 12:
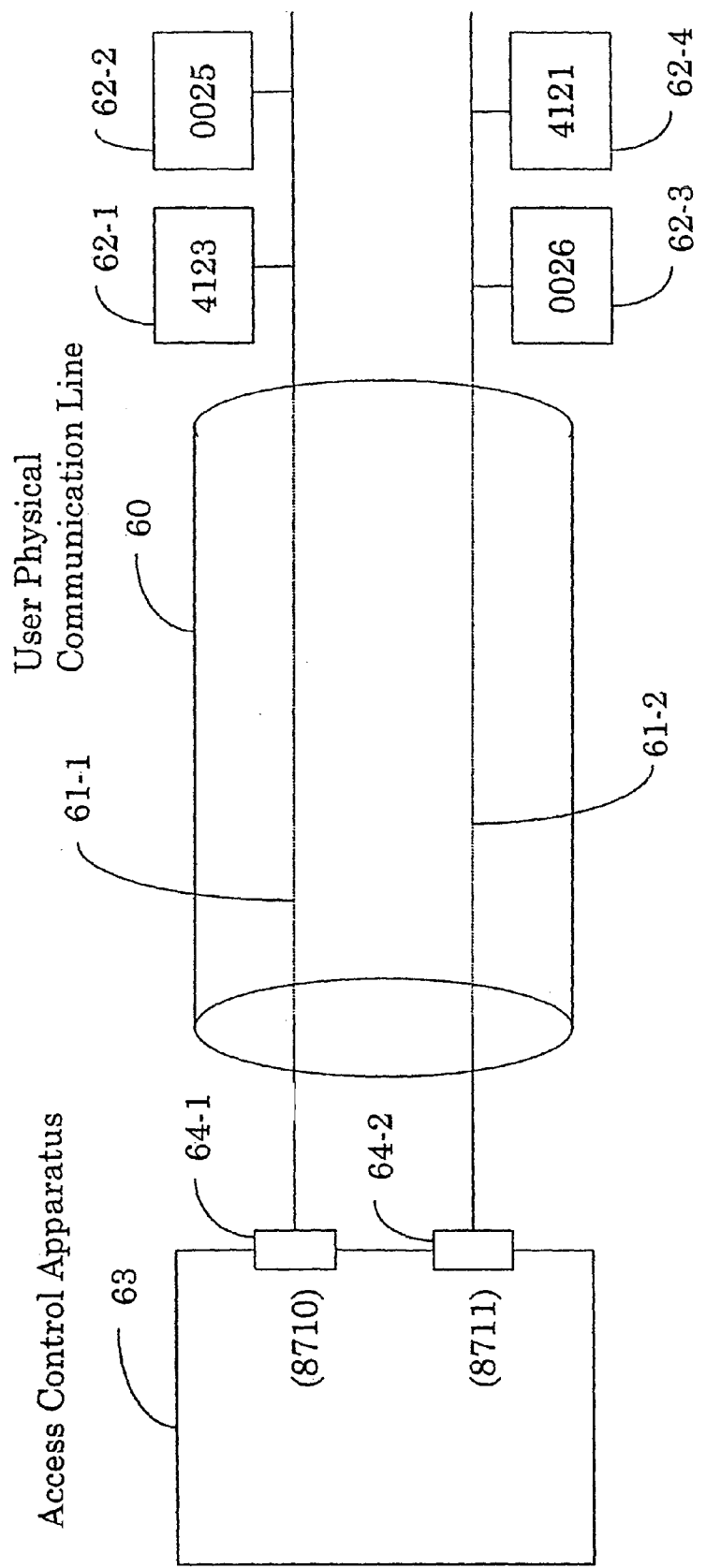
FIG. 12 is a wiring diagram illustrating the connection relation between the ICS logic terminal and user communication line.

A physical communication line can be separated into a plurality of communication lines and used, this being realized in conventional art as frame relay (FR) multiplex communication method, for example. According to the present invention, the user's communication line is separated into a user physical communication line and one or more user logic communication lines. FIG. 12 illustrates an example of the above, wherein a user physical communication line 60 is separated into two user logic communication lines 61-1 and 61-2 of the communication rate 50 Mbps. Also, separate computer communication apparatuses 62-1, 62-2, 62-3, and 62-4 are each connected to respective user logic communication lines, and the ICS user addresses "4123,0025,0026,4124" are provided to each of the computer communication apparatuses 62-1 through 624. The user physical communication line 60 is connected to the access control apparatus 63, and the point of contact between the two is called "ICS logic terminal". The ICS logic terminal is provided with an only ICS network address within the ICS. In the example shown in FIG. 12 user logic communication lines 61-1 and 61-2 are connected to the access control apparatus 63, and ICS network addresses "8710" and "8711" are provided to the contact point ICS logic terminals 64-1 and 64-2, respectively.

As described above, the ICS network server 40 is also provided with an only ICS network address, so that the ICS network address can determine that the ICS logic terminal or the ICS network server is the only one within the ICS. The ICS network server is capable of exchanging information with other ICS servers by means of sending and receiving ICS network packets provided with each other's ICS network addresses, using the IP communication technology. This function is referred to as "ICS network server communication function". The access control apparatus is also provided with an only ICS network address within the ICS, and is capable of exchanging information with other ICS servers by means of the ICS network server communication function. The ICS network server communication function is realized by using conventional TCP or UDP (User Datagram Protocol) technology.

Figure 13:
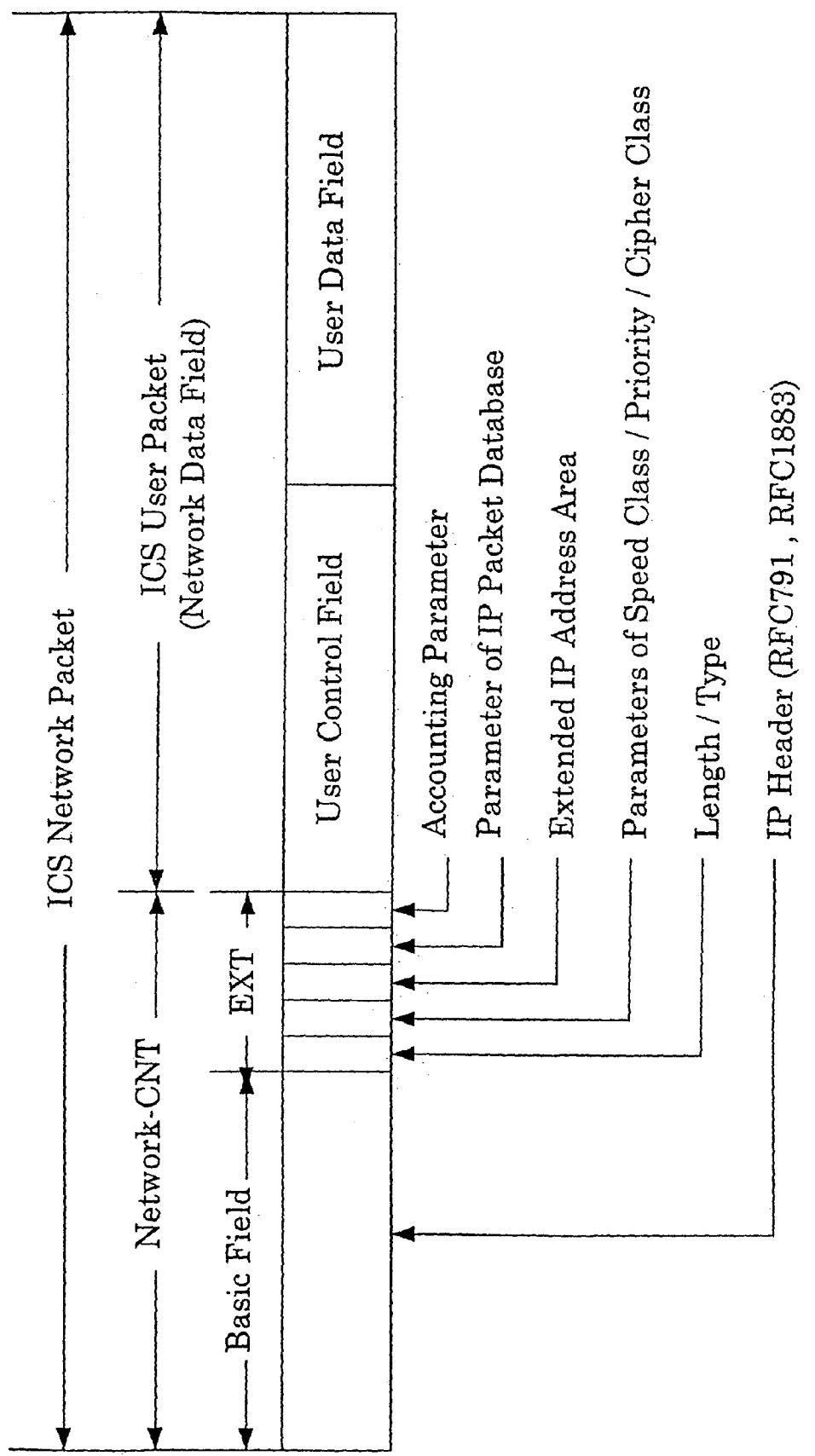
FIG. 13 is a diagram illustrating the relation between the ICS user packet and the ICS network packet, used in the present invention.

There are two types of ICS packets in the present invention, as described earlier, the ICS network packet which is sent and received within the ICS, and the ICS user packet which is sent and received outside of the ICS. Each packet is comprised of a control field and a data field, and, as shown in FIG. 13, the packets are comprised of a network control field (Network-CNT), a user control field, a network data field and a user data field, so as to allow usage by ICS encapsulation and ICS reverse encapsulation. That is, when the ICS user packet enters the ICS from the access control apparatus, the ICS user packet becomes part of the data of the ICS network packet, and the control field of the ICS network packet (network control field) is added thereto (ICS encapsulation). The network control field is divided into a basic field and an external field. The basic field is used as a header of RFC791 or RFC1833 stipulation and the external field is used for ciphering or the like.

Inside the network control field of the ICS packet is placed a range for storing the sender's address and the intended receiver's address. There are two types of ICS packets, those with a 32-bit address length and those with a 128-bit address length, with a packet format being employed according to the RFC791 stipulation shown in FIG. 3, for example. In the event that 32 bits is insufficient for the ICS network address, for example, in the event that a 64-bit address is to be used, following the RFC791 stipulation, the lacking 32 bits (64 bits−32 bits) are written into the option portion of the ICS network packet control field, thus making the network address usable at 64 bits. Now, supplemental description will be made regarding the aforementioned user-specific address. In the event that a great number of users have a private address (a type of ICS address) in the section between ($10\times2^{24}$) and ($10\times2^{24}2^{24}-1$) for example, in the case that the length of the ICS user address is 32 bits, the 32 bits is insufficient for the ICS network address, since the ICS network address is provided corresponding to the ICS user address, and 64 bits is required, for example. In this case, as described above, the lacking 32 bits are written into the option portion of the ICS network packet control field, thus making the network address usable at 64 bits.

Figure 4:
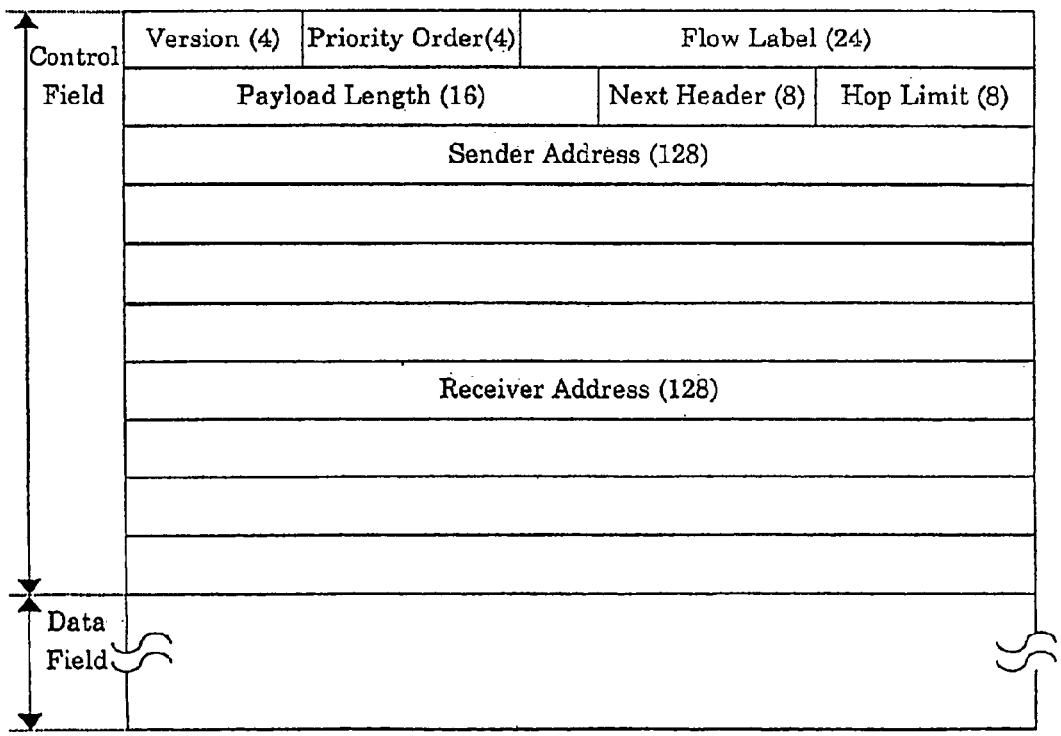
FIG. 4 is a diagram illustrating an IP packet according to RFC1883 stipulation.

The fact that communication between the same user (called "intra-corporation communication") is possible using a private address will be described in the first embodiment. Also, in the event that the address length is 128 bits, the present embodiment is carried out following packet format according to the RFC1883 stipulation such as shown in FIG. 4, for example. The transmitting address range within the network control field, and the address stored in the destination address are made to be ICS network addresses, each respectively being the transmitting ICS network address and the receiving ICS network address. Further, the transmitting address range within the user control field, and the address stored in the destination address are made to be ICS user addresses, each respectively being the sender ICS user address and the receiver ICS user address.

Incidentally, there is no need to follow the RFC791 or RFC1883 stipulation for the ICS packet format in carrying out the present invention; the present invention can be carried out as long as the packet format is such that it uses addresses of 32 bits or 128 bits in length. Generally, ICSs receive ICS user packets stipulated by RFC791 or RFC1883, but other packet formats can be handled within the ICS network by converting to ICS user packets with conversion means.

Embodiment-1

Basic ICS, Intra-Corporation Communication and Intra-Corporation Communication

Figure 14:
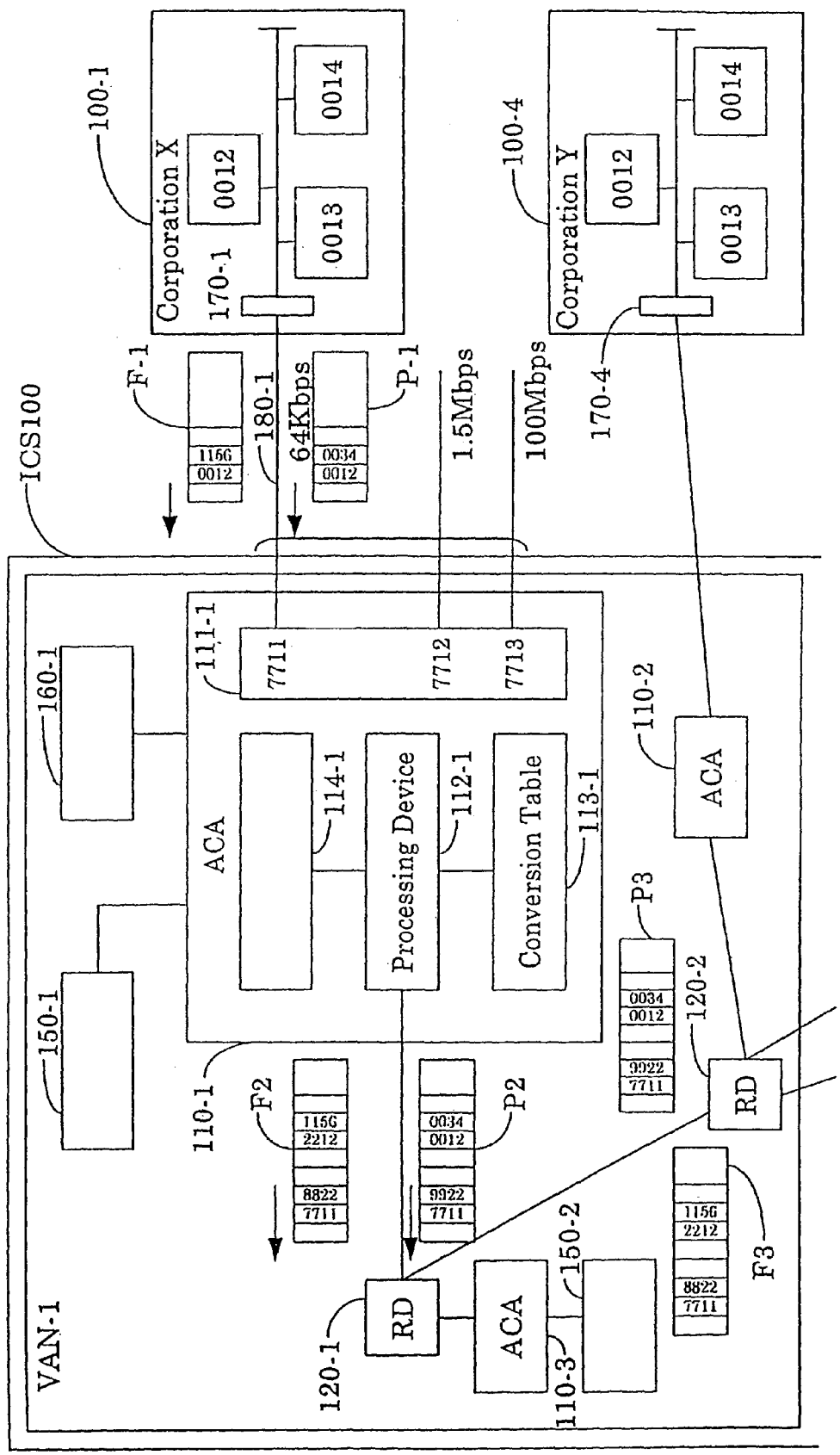
FIG. 14 is a portion of a constructional block drawing illustrating a first embodiment (intra-corporation communication, inter-corporation communication) according to the present invention.
Figure 15:
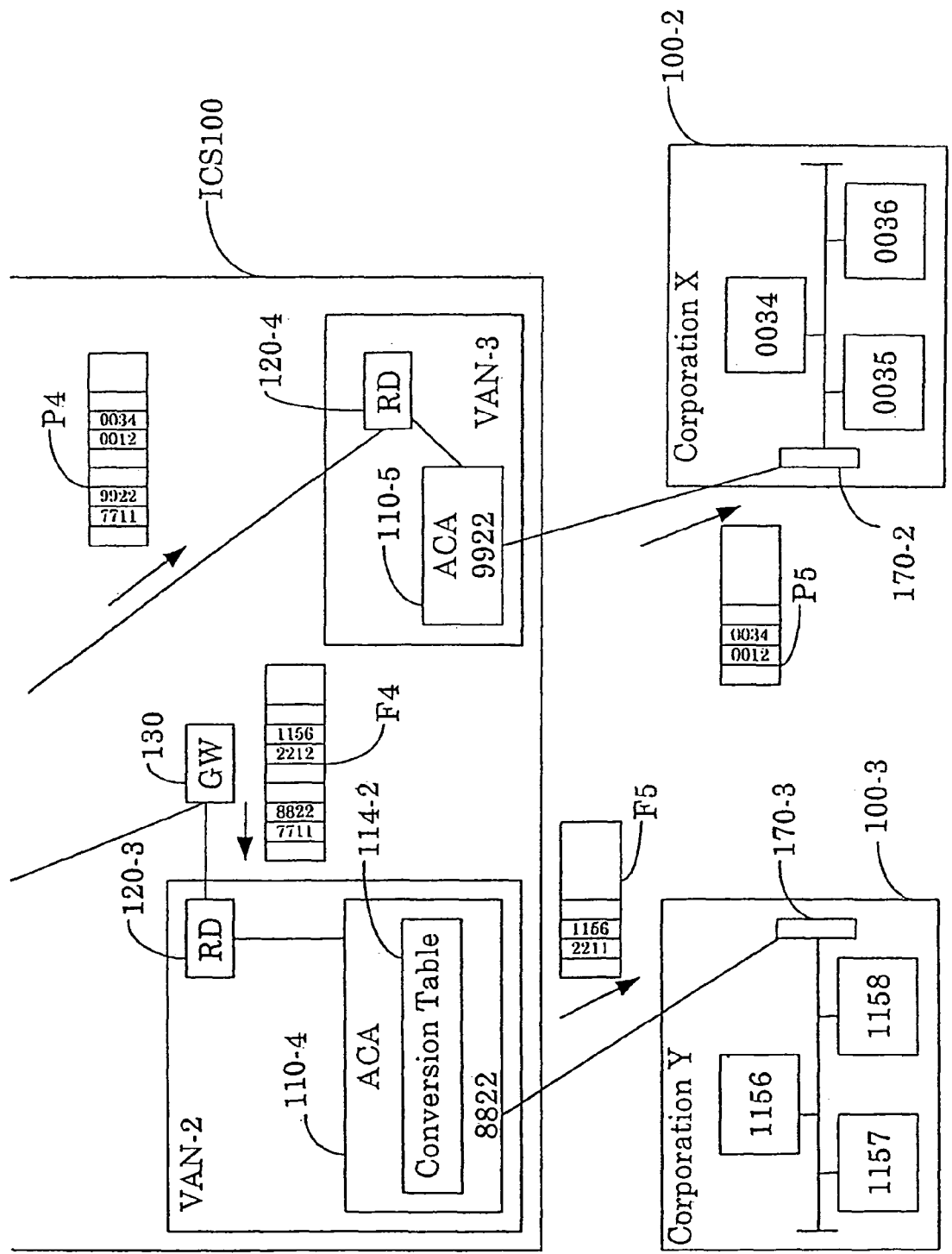
FIG. 15 is a portion of a constructional block drawing illustrating a first embodiment according to the present invention.

A first embodiment of the present invention will be described with reference to FIGS. 14 and 15, regarding basic communication wherein the transfer destination within the ICS is determined from the receiver's ICS user address, based on administration by a conversion table. In the figures, 170-1, 170-2, 170-3 and 170-4 respectively denote gateways provided within the LANs 100-1, 100-2, 100-3 and 100-4, and the ICS packets can pass through these gateways 170-1 through 170-4.

First, description will be made regarding communication between a terminal which is connected to LAN 100-1 of a corporation X which has a unique address system ADX and a terminal which is connected to LAN 100-2 of the same corporation X. That is, this is communication between a terminal which has an ICS user address "0012" on the LAN 100-1, and a terminal which has an ICS user address "0034" on the LAN 100-2. This communication is typical of communication made between terminals which have set addresses based on a unique address system within a single corporation (ADX in this example), the communication being made via the ICS 100 in an interactive manner. This type of communication is referred to as intra-corporation communication service (or intra-corporation communication). Next, description will be made regarding communication between a terminal which is connected to LAN 100-1 of a corporation X which has a unique address system ADX, and a terminal which is connected to LAN 100-3 of a corporation Y which has a unique address system ADY. That is, this is communication between a terminal which has an ICS user address "0012" on the LAN 100-1, and a terminal which has an ICS user address "1156" on the LAN 100-3. This communication is typical of communication made between terminals which have different address systems within different corporations, the communication being made using an ICS address system which can be shared between the two. This type of communication is referred to as inter-corporation communication service (or inter-corporation communication).

<<Common Preparation>>

In describing the present embodiment, the address format and so forth is determined as described below, but the specific numeric values and formats are all but an example, and the present invention is by no means limited to these. The ICS network address is represented by a 4-digit number, and the sender ICS user address and the receiver ICS user address are both represented by a 4-digit number. Of the sender ICS user address and the receiver ICS user address, addresses of which the upper two digits are not "00" are used as inter-corporation communication addresses, and these inter-corporation communication addresses are an only value within the ICS 100. Of the sender ICS user address and the receiver ICS user address, addresses of which the upper two digits are "00" are used as intra-corporation communication addresses, and these intra-corporation communication addresses may be duplicate of other intra-corporation communication addresses within the ICS 100. The ICS address administration server 150-1 is capable of uniquely identifying the inter-corporation communication addresses. Also, the conversion table 113-1 provided to the access control apparatus 110-1 contains the following: originating ICS network addresses, receiving ICS network addresses, sender ICS network addresses, receiver ICS network addresses, request identification, speed segments and so forth. The request identification registered to the conversion table 113-1 is such that, e.g., "1" represents intra-corporation communication service, "2" represents inter-corporation communication service, and "3" represents virtual dedicated line connection. The speed segment is the line speed that the communication from the ICS network address requires, including throughput (e.g., the number of ICS packets sent within a certain amount of time).

<<Preparation for Intra-Corporation Communication>>

The users of LAN 100-1 and LAN 100-2 specify the terminal and apply to a VAN operator in order that the intra-corporation communication of the terminals connected to the LANs can perform communication via the VAN-1 and VAN-3. The VAN operator responds to the application and sets the aforementioned ICS network address, ICS user address, request identification number, etc. to the conversion tables of the access control apparatuses 110-1 and 110-5 connected to the LAN 100-1 and LAN 100-2.

The items to be set for the VAN-1 are as follows. The ICS network address is decided by the ICS logic terminal of the access control apparatus 110-1 to which the LAN 100-1 is connected, with the ICS network address of the ICS logic terminal in this case being set as "7711". The intra-corporation communication address of the terminal connected to the LAN 100-1 from which the application was made is set as "0012", and this is used as the sender ICS user address. The intra-corporation communication address used by the terminal of the address is set as "2212", and this is used as the sender ICS user address. Next, the intra-corporation communication address of the terminal connected to the LAN 100-2 from which the application was made is decided by the ICS logic terminal of the access control apparatus 110-5 to which the LAN 100-2 is connected, in this case the ICS network address being set as "9922", and this is used as the receiving ICS network address. Further, the ICS user address used by the terminal connected to the LAN 100-2 is set as "0034", and this is used as the receiver ICS user address. The number "1" is set as the request identification, indicating the intra-corporation communication service that was applied for, and the above is registered to the conversion table 113-1.

The items to be set for the VAN-3 are as follows. Values necessary for reverse communication (communication from LAN 100-2 to LAN-1) are set to the conversion table of the access control apparatus 110-5 connecting the LAN 100-2 from which application was made. That is, data is set reverse to the transmitting ICS network address and the receiving ICS network address, and at the same time, data is set reverse to the sender ICS user address and the receiver ICS user address. The ICS network address of the LAN 100-2 is set as "9922", and this is used as the transmitting ICS network address.

Numeral "0034" is set as the sender ICS user address for the intra-corporation ICS user address of the terminal connected to the LAN 100-2, and the ICS user address "0012" of the terminal of the other party is used as the receiver ICS user address. Also, the ICS user address "7711" of the LAN 100-1 is used as the receiving ICS network address and the value "1" is set as the request identification, indicating intra-corporation communication services. The above is written to the conversion table of the access control apparatus 110-5 and registered.

<<Operation of Intra-Corporation Communication>>

Regarding communication between a terminal connected to LAN 100-1 and having a sender ICS user address "0012", and a terminal connected to LAN 100-2 and having a receiver ICS user address "0034", the sender "0012" sends an ICS user packet to the receiver "0034". This ICS user packet has set as the sender ICS user address "0012", and as the receiver ICS user address has set "0034", and the terminal with the ICS user address "0012" performs sending thereof.

Figure 18:
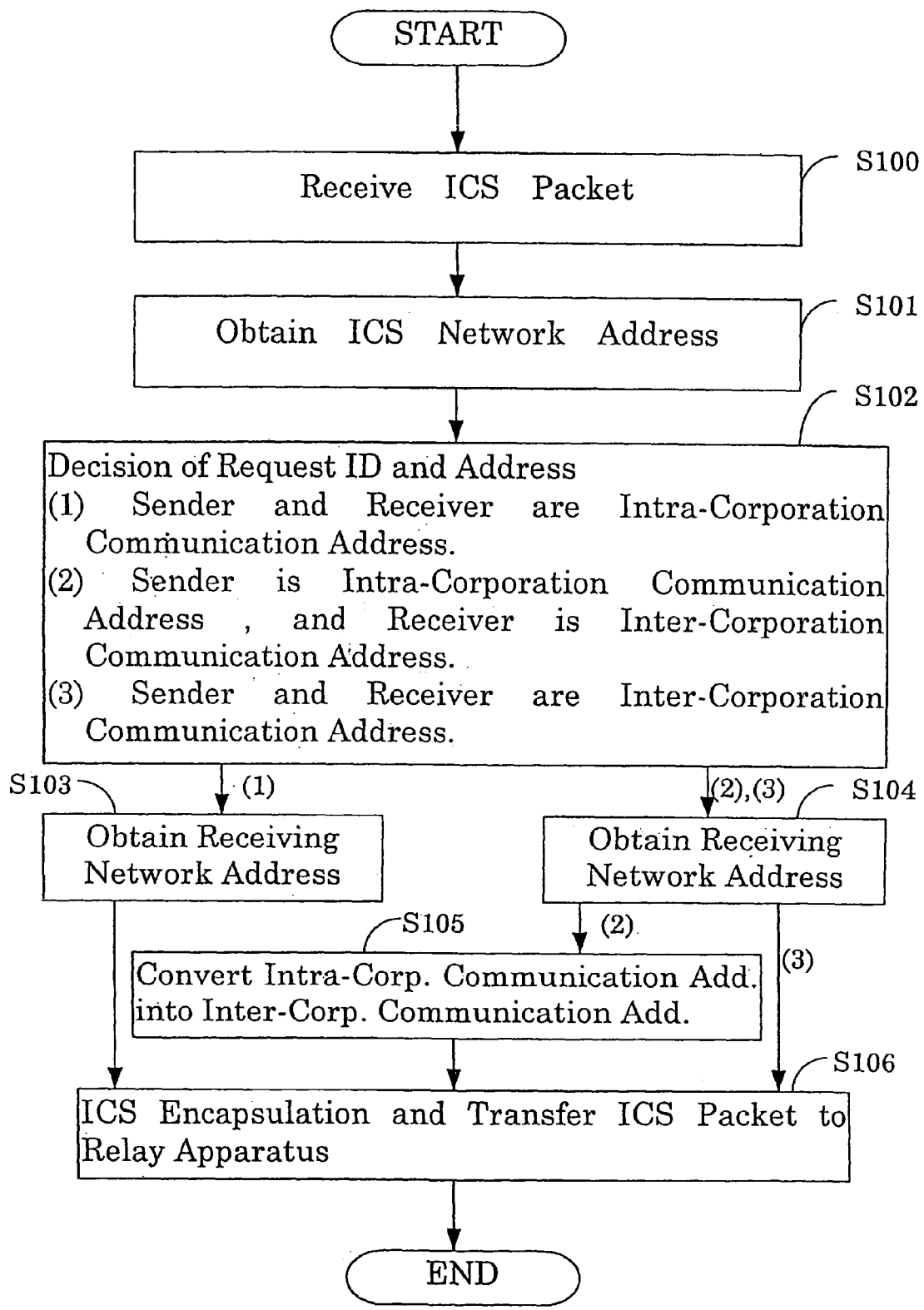
FIG. 18 is a flowchart illustrating an example of operation of the access control apparatus.

The operation will be explained with reference to a flowchart in FIG. 18. The conversion table 113-1 is shown in FIG. 16 and the temporary conversion table 114-2 is shown in FIG. 17.

The ICS user packet P1 is sent via the user logic communication line 180-1, and transferred to the access control apparatus 110-1 as the ICS user packet P1. The access control apparatus 110-1 refers to the conversion table 113-1 from the transmitting ICS network address "7711" (Steps S100 and S101) and the receiver ICS user address "0034" of the received ICS user packet, and knows that the communication is an intra-corporation communication from the request identification value "1" obtained at the same time (Step S102). Then, the receiving ICS network address "9922" corresponding to the sender ICS user address "0034" is obtained (Step S103) and is ICS-encapsulated (Step S106). The above procedures illustrated in a flowchart are as shown in FIG. 18, with the intra-corporation being flow (1) therein. The sender ICS user address may be used to specify a source of the ICS packet.

The access control apparatus 110-1 performs the ICS encapsulation, forming the ICS network packet P2 which is sent to the relay apparatus 120-1. Since the ICS network address of the network field is ensured of its uniqueness within the ICS, there is no conflict with other ICS packets. The ICS network packet P2 passes through the relay apparatus 120-1 and 120-2 based on the receiving ICS network address, and reaches the access control apparatus 110-5 of the VAN-3. The access control apparatus 110-5 removes the network control field from the ICS network packet P4 and performs ICS reverse encapsulation, and re-creates a user data packet P5 which is the same as the ICS user packet P1 from the network data field of the ICS packet, and sends it to the LAN 100-2. The ICS user packet is routed through the LAN 100-2, and is transferred to the terminal which has the ICS user address "0034".

<<Preparation for Inter-Corporation Communication>>

As an example of performing inter-corporation communication, the communication between a terminal which has an ICS user address "0012" and is connected to a LAN 100-1 following address system ADX, and a terminal which has an ICS user address "1156" and is connected to a LAN 100-3 following address system ADY, will be described. The users of the LAN 100-1 and LAN 100-3 specify the terminal to the VAN each is connected to so as to be able to perform the communication via VAN-1 and VAN-2, and make application to the VAN operator. The VAN operator sets the necessary items in the conversion table of the access control apparatus which is connected to the LAN 100-1 and LAN 100-3, in accordance with the application.

The items to be set regarding VAN-1 are as follows. The ICS network address of the LAN 100-1 is made to be "7711", the intra-corporation communication address held by the terminal connected to the LAN 100-1 from which there was application is made to be "0012", and 'this is' made to be the sender ICS user address. The inter-corporation communication address provided to the terminal of the above ICS user address made to be "2212", and this is made to be the sender user address (inter-corporation). The ICS network address is determined by the ICS logic terminal of the access control apparatus 110-4 connected to the ICS network address of the LAN 100-3 from which there was application, the ICS network address here being "8822", and this is made to be the receiving ICS network address. Also, the ICS user address of a terminal connected to the LAN 100-3 is made to be "1156", and this is made to be the receiver ICS user address. Further, a value "2" is set as the request identification, indicating the inter-corporation communication service that was applied for, and the above is registered to the conversion table 113-1.

The items to be set regarding VAN-2 are as follows. As a conversion table for the access control apparatus 110-4 to which the LAN 100-3 is connected, a temporary conversion table 114-2 which holds reverse data for a certain time, e.g., 24 hours, is set. That is, regarding the ICS network address "8822" to which is connected the LAN 100-3 which uses the inter-corporation communication service, the following are provided within the access control apparatus 110-4: a transmitting ICS network address, a sender ICS user address, a receiver ICS user address, a receiving ICS network address and temporary conversion table 114-2 which includes a request identification and so forth.

<<Operation of Inter-Corporation Communication>>

A terminal having an ICS user address "0012" sends an ICS user packet F1 wherein the sender ICS user address is set as "0012" and the receiver ICS user address is set as "1156". The ICS user packet F1 is transferred to the access control apparatus 110-1 via the user logic communications line 180-1.

The access control apparatus 110-1 refers to the conversion table 113-1 from the originating ICS network address "7711" of the LAN 100-1 (Steps S100 and S101) and the receiver ICS user address "1156", and knows that the request identification value is "2", i.e., this communication is an inter-corporation communication (Step S102). The receiving ICS network address corresponding to the receiver ICS user address "1156" is known as "8822" (Step S104), and then the sender ICS user address "0012" is converted into an inter-corporation communication address "2212" (Step S105). The access control apparatus 110-1 adds a network control field, from the obtained transmitting ICS network address "7711", the sender ICS user address "2212", the receiver ICS user address "1156" and the receiving ICS network address "8822", and performs the ICS encapsulation, forming the ICS network packet F2 which is sent to the relay apparatus 120-1 (Step S106). The above procedures are illustrated in a flow (2) in FIG. 18.

In the above inter-corporation communication, in the event that the sender ICS user address within the ICS user packet F1 is made to be the inter-corporation communication address "2212", the sender and the receiver perform the inter-corporation communication using an inter-corporation communication address (Steps S102 and S104). In this case, the access control apparatus 110-1 does not perform the process of converting the sender ICS user address "2212" into the inter-corporation communication address "2212", as such is not necessary. The above procedures are illustrated in a flow (3) in FIG. 18. The sender ICS user address may be used to specify a source of the ICS packet.

Figure 19:
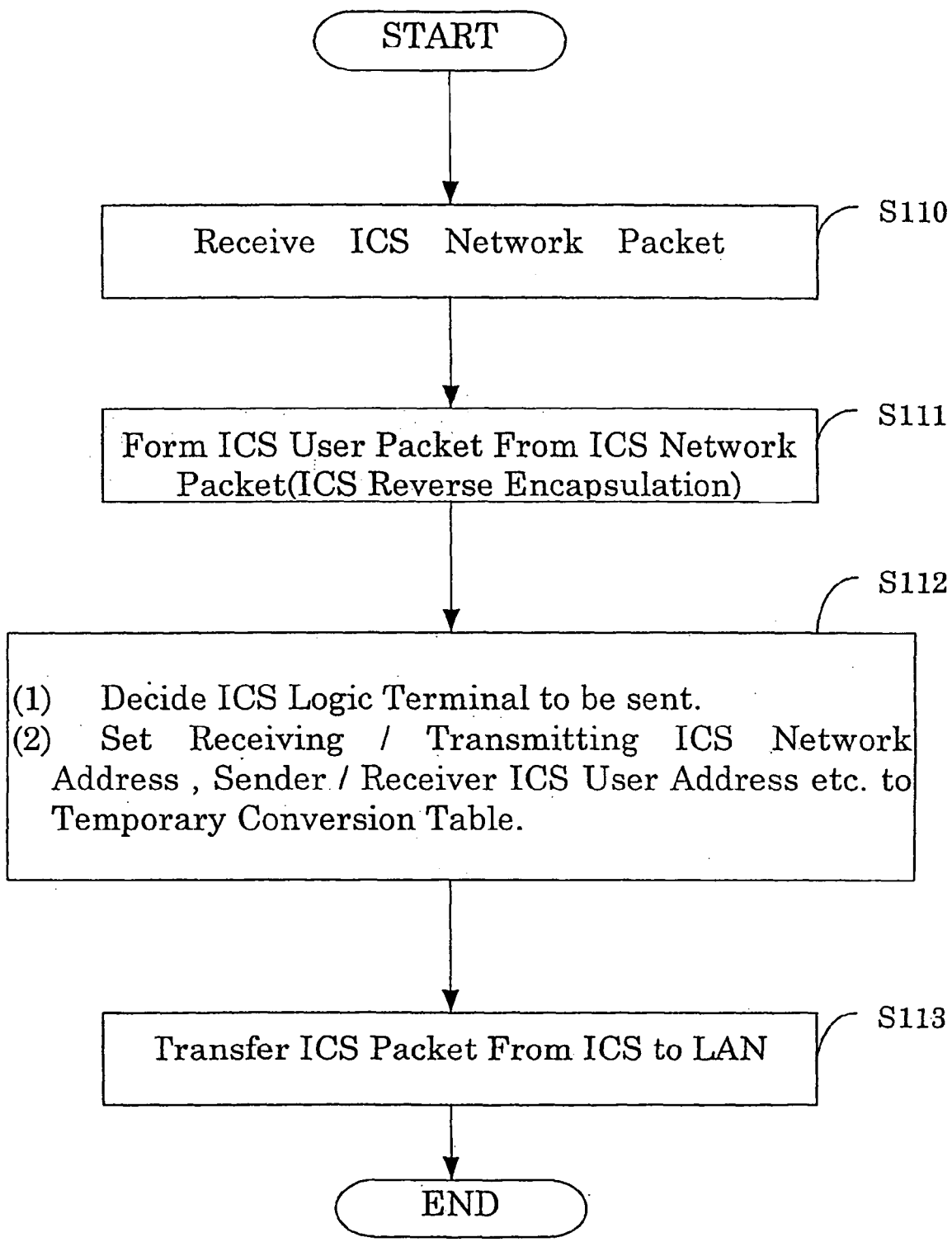
FIG. 19 is a flowchart illustrating an example of operation of the access control apparatus in inter-corporation communication.

The relay apparatus 120-1 transfers the ICS network packet to the access control apparatus 110-4 within the VAN-2 via the relay apparatus 120-2 within the VAN-1, the inter-VAN gateway 130 and the relay apparatus 120-3 within the VAN-2, based on the receiving ICS network address. The operation will be explained with reference to FIG. 19. The access control apparatus 110-4 receives the ICS network packet (Step S110), creates an ICS user packet F5 from the network data field (Step S111: ICS reverse encapsulation), and decides from the receiving ICS network address the logic terminal for sending ((1) of Step S112) and sends it to the LAN 100-3 (Step S113). At the same time, in the event that the relation among the transmitting ICS network address "8822", the sender ICS user address "1156", the receiver ICS user address "2212" and the receiving ICS network address "7711" is not registered in the conversion table within the access control apparatus 110-4, a value "2" of the request identification, i.e., a designation of the inter-corporation communication is set to the temporary conversion table 114-2 ((2) of Step S112). The registration contents of the temporary conversion table 114-2 are updated according to processes such as the contents being deleted if there is no usage thereof for 24 hours. The ICS user packet is routed through the LAN 100-3, and is transferred to the terminal having the ICS user address "1156". In a case that the column of the sender ICS user address in the conversion table 114-2 is separated as "intra-corporation" and "inter-corporation" of the conversion table 113-1, e.g., in the case that "1159" is described in the conversion table as the sender ICS user address "1159" which is described at the address column of user control field of ICS user packet just after the ICS reverse encapsulation is processed. Then, the process in which the address of the user control field is rewritten to "0023" is added to the process of the Step S112(1). As described above, although the ICS user address "0023" for the intra-corporation communication is used within LAN, the ICS "1159" for the corporations outside LAN. In another embodiment, the values are not set in the temporary conversion table. Further, in another embodiment, the conversion table 113-1 does not include the sender ICS address (intra-corporation) and the sender ICS user address (inter-corporation) and does not include the flow (2) in FIG. 18, i.e., Step S105. At the Step S104, the sender ICS user address is not referred. An effect of this embodiment is that register number of the conversion table is to be reduced to one of the sender ICS user address when there are many of the sender ICS user addresses.

Embodiment-2

Virtual Dedicated Line

Figure 20:
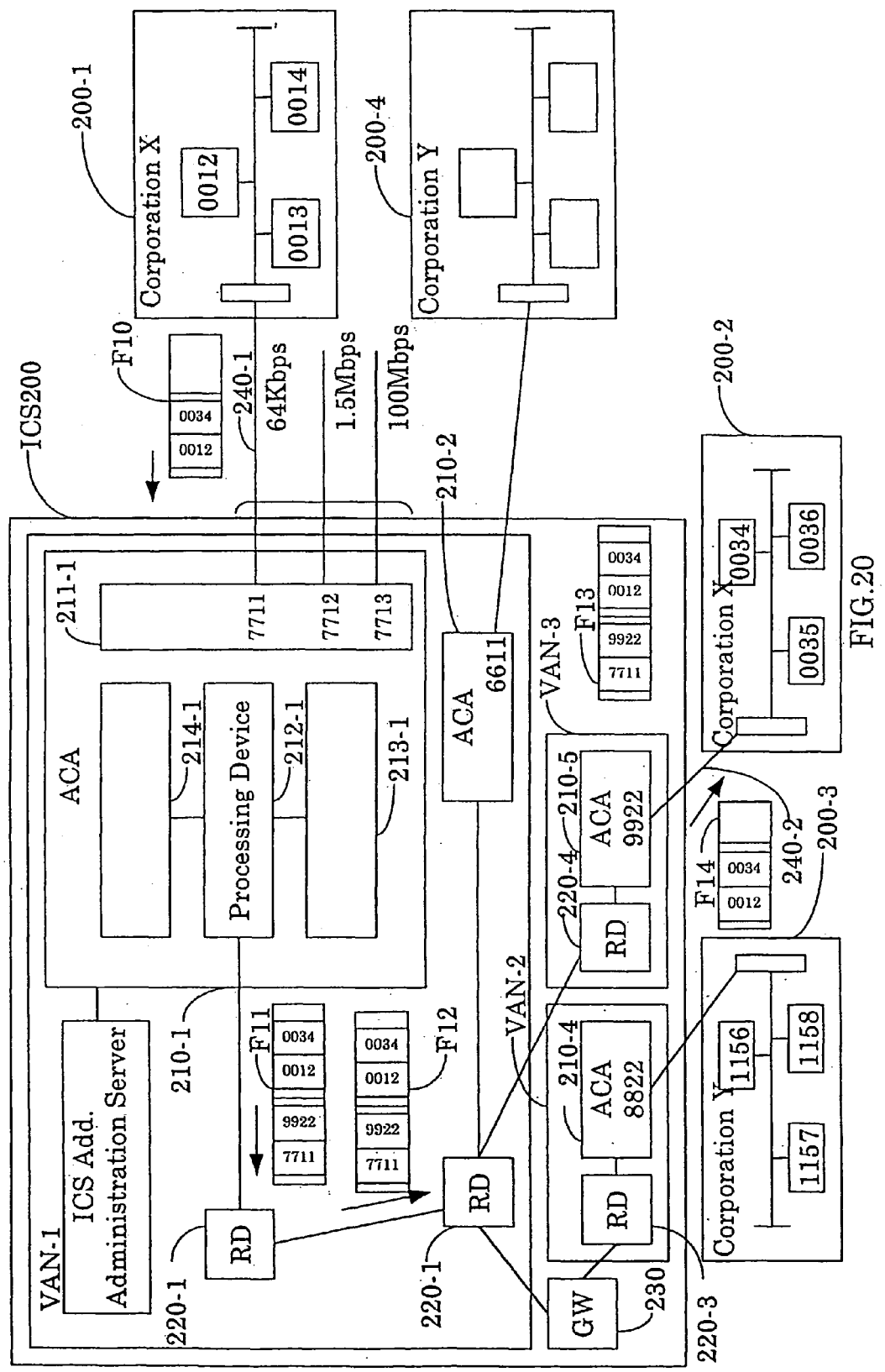
FIG. 20 is a constructional block drawing illustrating a second embodiment (virtual dedicated line) according to the present invention.

Now, description of the operation of a virtual dedicated line connection according to the present invention will be made with reference to FIG. 20. Here, the virtual dedicated line connection refers to communication wherein ICS user packets are transferred in a fixed manner to a receiving ICS network address already registered in the conversion table, regardless of the ICS user address within the user control field of the ICS user packet, in which the format taken is one-on-one or one-on-N. While the components of FIG. 20 are the same as those of Embodiment-1 shown in FIGS. 14 and 15, what is different is the contents of registration in the conversion table. In the conversion table of the access control apparatus, the receiving ICS network address is determined from the transmitting ICS network address in a fixed manner, so that either the sender ICS user address (intra-corporation), the sender ICS user address (inter-corporation) and the receiver ICS user address are either not registered, or ignored if registered.

Description will now be given regarding a case in which a corporation X uses virtual dedicated line connection, and the communication is conducted between LAN 200-1 of the corporation X which is connected to the access control apparatus 210-1, and LAN 200-2 of the corporation X which is connected to the access control apparatus 210-5. The conversion table 213-1 is shown in FIG. 21.

<<Preparation>>

The user applies to a VAN operator for virtual dedicated line connection. The VAN operator determines the ICS network address "7711" of the ICS logic terminal at the connection point between the access control apparatus 210-1 for connecting the LAN 200-1 of the corporation X and the user logic communications line 240-1, and similarly determines the ICS network address "9922" of the ICS logic terminal at the connection point between the access control apparatus 210-5 for connecting the LAN 200-2 of the corporation X and the user logic communications line 240-2. Next, the VAN operator performs setting to the conversion table 213-1 of the access control apparatus 210-1 of the following: the transmitting ICS network address "7711", the receiving ICS network address "9922" and the request type. Illustrated in FIG. 20 is an example wherein the request type "3" has been made to serve as the virtual dedicated line connection. Similarly, the VAN operator performs setting to the conversion table of the access control apparatus 210-5 of the following: the transmitting ICS network address "9922", the receiving ICS network address "7711" and the request type.

<<Procedures>>

Figure 22:
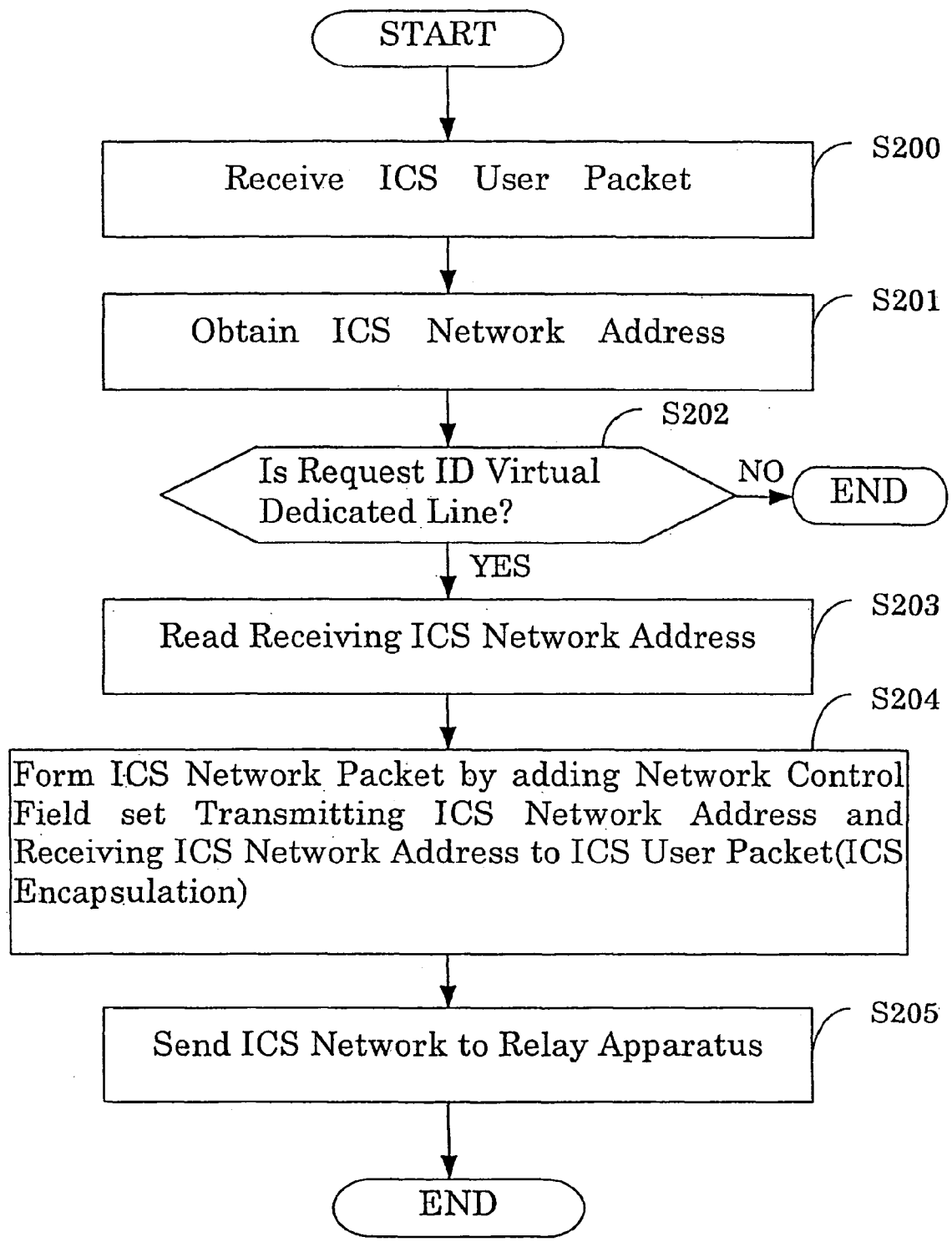
FIG. 22 is a flowchart illustrating an example of operation of the access control apparatus in virtual dedicated line connection.

The operation will be explained with reference to FIG. 22. The LAN 200-1 of the corporation X sends a user packet F10 to the ICS 200 via the user logic communication line 240. The access control apparatus 210-1 which has received the ICS user packet F10 from the logic terminal of the ICS network address "7711" makes reference to the request type of the transmitting ICS network address "7711" (Steps S200 and S201) and identifies this as a virtual dedicated line connection by referring the request identification "3" (Step S202), and reads the receiving ICS network address "9922" (Step S203). Next, the access control apparatus 210-1 adds a network control field to the ICS user packet F10 in which the receiving ICS network address is set to "9922" and the transmitting ICS network address is set to "7711", thus forming an ICS network packet F11 (Step S204: ICS encapsulation), and sends this to the relay apparatus 220-1 (Step S205). The relay apparatus 200-1 which receives the ICS network packet F11 determines the destination based on the receiving ICS network address of the ICS network packet F11, and sends an ICS network packet F12 to the relay apparatus 220-2. The ICS network packet F12 is transferred to the access control apparatus 210-5 via the relay apparatus 220-4 within the VAN-3.

The access control apparatus 210-5 removes the network control field from the ICS network packet F13 (ICS reverse encapsulation), and sends the ICS network packet F14 from the logic terminal of the ICS network address "9922" to the user logic communications line 240-2. Then, the LAN 200-2 of the corporation X receives the ICS user packet F14. Transmission can be made in the same say as described from the LAN 200-2 to the LAN 200-1, and thus, interactive communication is available. Using the same method, ICS user packets can be transferred from the LAN 200-1 of the corporation X to a LAN 200-3 of another corporation Y.

Also, while the above description has been made with reference to a case of one-on-one communication, one-on-N communication can also be performed. For example, a plurality of ICS network addresses may be set to the conversion table 213-1 of the access control apparatus 210-1 shown in FIG. 20, as indicated by the transmitting ICS network address "7712". In the present example, two ICS network addresses are set, "6611" and "8822". The access control apparatus 210-1, upon receiving the ICS user packet from the ICS logic terminal with an ICS network address "7712", creates a first ICS network packet wherein a network control field set with "6611" for the receiving ICS network address is added thereto, and a second ICS network packet wherein a network control field set with "8822" for the receiving ICS network address is added thereto, these being sent to the relay apparatus 220-1. Consequently, one-on-two communication can be performed. Subsequently, one-on-N communication can be performed by transferring each ICS network packet in the same manner as described above.

Embodiment-3

Embodiment Using an ATM Network

An embodiment will be described wherein the network inside the ICS according to the present invention is configured using an ATM network. The present embodiment will be described in the following order: (1) supplementary explanation of ATM-related conventional art, (2) description of components, (3) flow of packets using SVC, (4) flow of packets using PVC, (5) one-on-N or N-on-one communication using PVC, and (6) N-on-N communication using PVC. Incidentally, since the present embodiment mainly discloses art regarding address conversion between ICS network packets and ATM networks, so any of the following can be applied to the present embodiment: intra-corporation communication service and inter-corporation communication service described in Embodiment-1 and virtual dedicated line service described in Embodiment-2.

Figure 23:
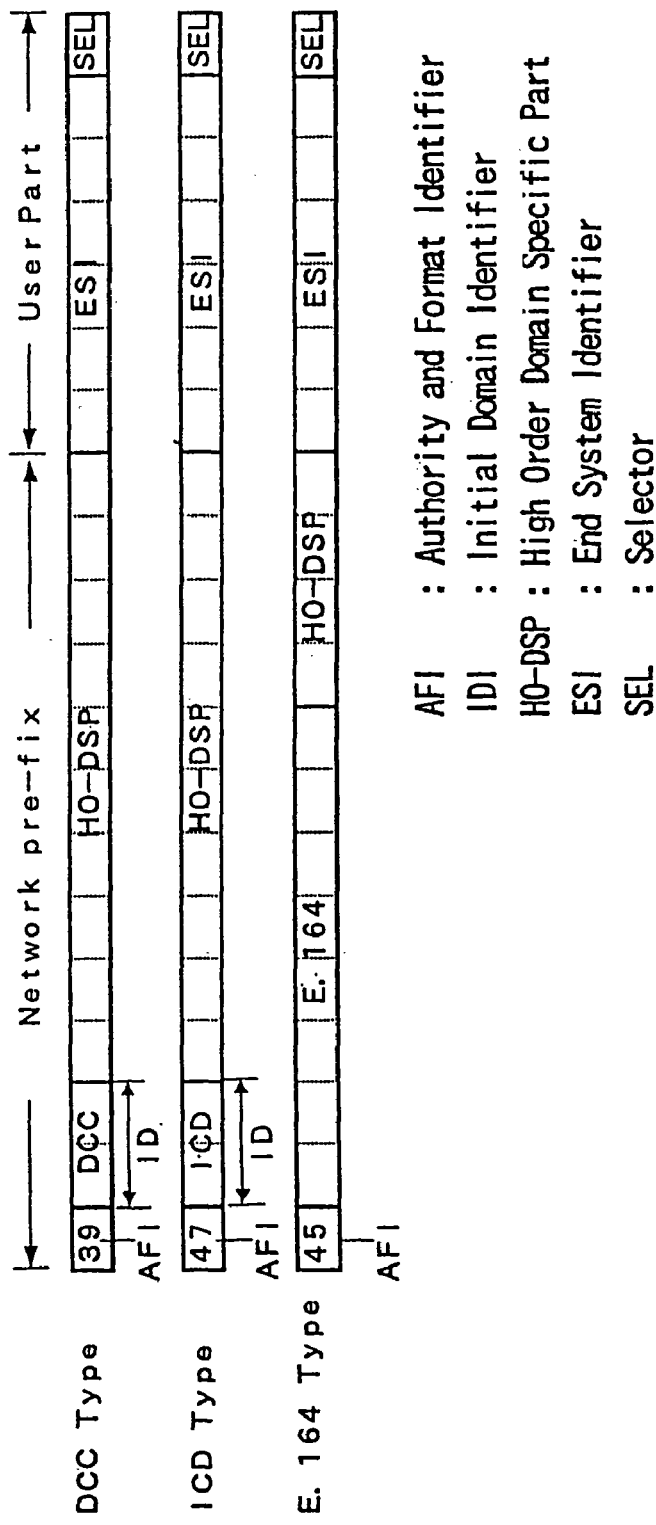
FIG. 23 is a diagram to show an example of format of NSAP type ATM address.

(1) Supplementary Explanation of ATM-Related Conventional Art:

First, supplementary explanation will be made regarding ATM-related conventional art to the extent that is necessary to describe the present embodiment. With an ATM network, a plurality of non-fixed logic channels which can flexibly deal with communication speed and so forth can be set on a physical line, these logic channels being referred to as VCs (Virtual Channel). There are two types of virtual channels stipulated according to the way of setting, SVC (Switched Virtual Channel) and PVC (Permanent Virtual Channel). The SVC performs call setting of a virtual channel whenever necessary, and can establish a logic line having the necessary speed for a necessary duration with an arbitrary ATM terminal (a general term for communication devices which are connected to the ATM network and perform communications using the ATM network). Call setting of the virtual channel is performed by the ATM terminal which is attempting to initiate communication, and the "signaling method" is standardized in ITU-T regarding this method. An address for identifying the destination ATM terminal to which call setting is to be performed (this address hereafter referred to as "ATM address") is necessary for call setting, and the ATM addresses are systematized so that each ATM terminal has a unique ATM address within the ATM network, in order to enable identification of the ATM terminals. There are the following address systems: E.164 format stipulated in the ITU-T Recommendations Q.2931, and the three types of NSAP method ATM addresses such as shown in FIG. 23 following the ATM Forum UNI 3.1 Specifications. Now, regarding ICS, which of the above ATM address systems is used is decided by the specific construction of the ATM network, so description of the present embodiment will proceed using the term "ATM address".

The PVC performs call setting in a semi-permanent manner, and can be considered to be a virtual line as viewed from the ATM terminal. IDs for identifying virtual channels (hereafter referred to as "virtual channel ID") are appropriated to established virtual channels for both the VC and PVC. A virtual channel ID is comprised of the VPI (Virtual Path Identifier) and the VCI (Virtual Channel Identifier) of the cell header portion of the ATM cell format (63 bytes) shown in FIG. 24.

Figure 24:
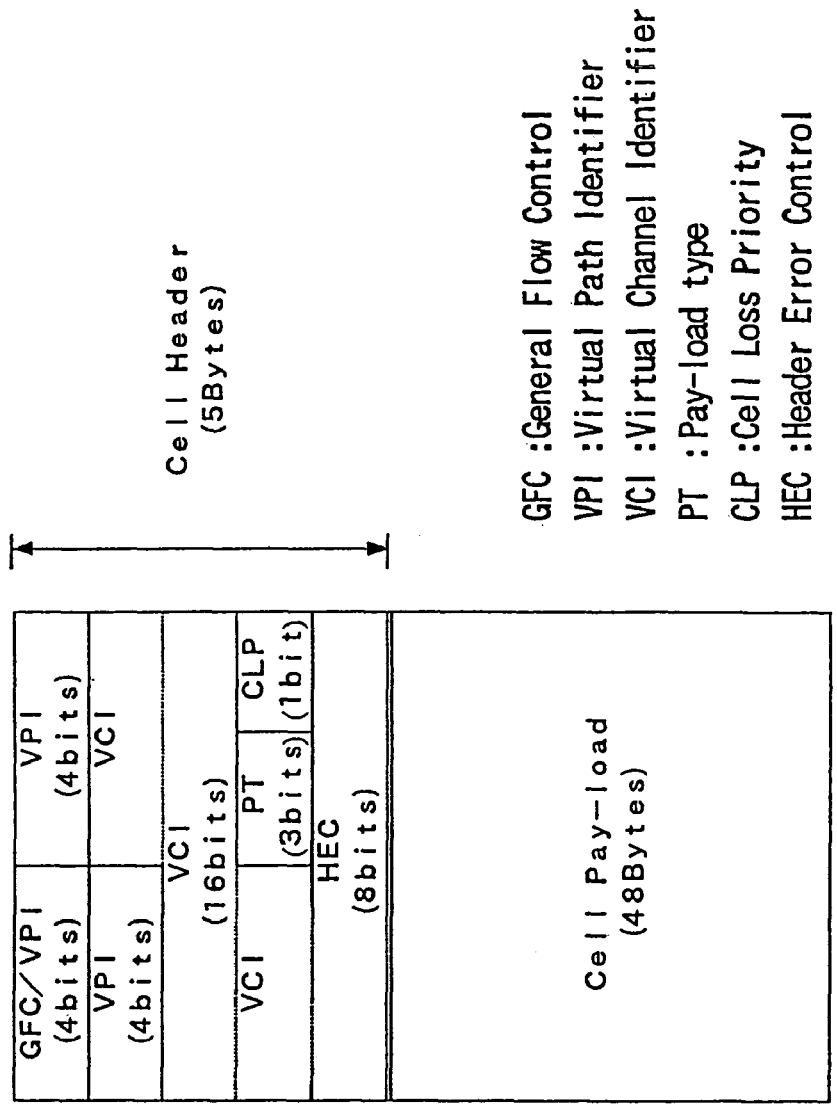
FIG. 24 is a diagram to show an information unit of ATM cell type.

Information communication within the ATM network is performed in information units of the ATM cell format shown in FIG. 24, so there is the necessity to convert the ICS network packets into the ATM cells in order to send over an ATM network. This conversion is performed in two steps: conversion to CPCS (Common Part Convergence Sublayer) shown in FIG. 25, and degradation of the CPCS frames to the ATM frames as shown in FIG. 26. Dividing a communication packet into ATM cells results in a plurality of the ATM cells in most circumstances, so the series of ATM cells related to the since communication packet is referred to as an ATM cell sequence. Reception of an ATM cell sequence results in reverse conversion, which is performed in two steps: assembling a CPCS frame from the ATM cell sequence shown in FIG. 26, and extracting and reproducing the communication packet (ICS network packet) from the CPCS frame shown in FIG. 25. Conversion to the CPCS frame and degradation/assembly of the ATM cells constitute known art, which has been standardized following the ITU-T Recommendations. Also, protocol headers within the CPCS frame user information have been standardized in RFC1483 of IETF.

Figure 27:
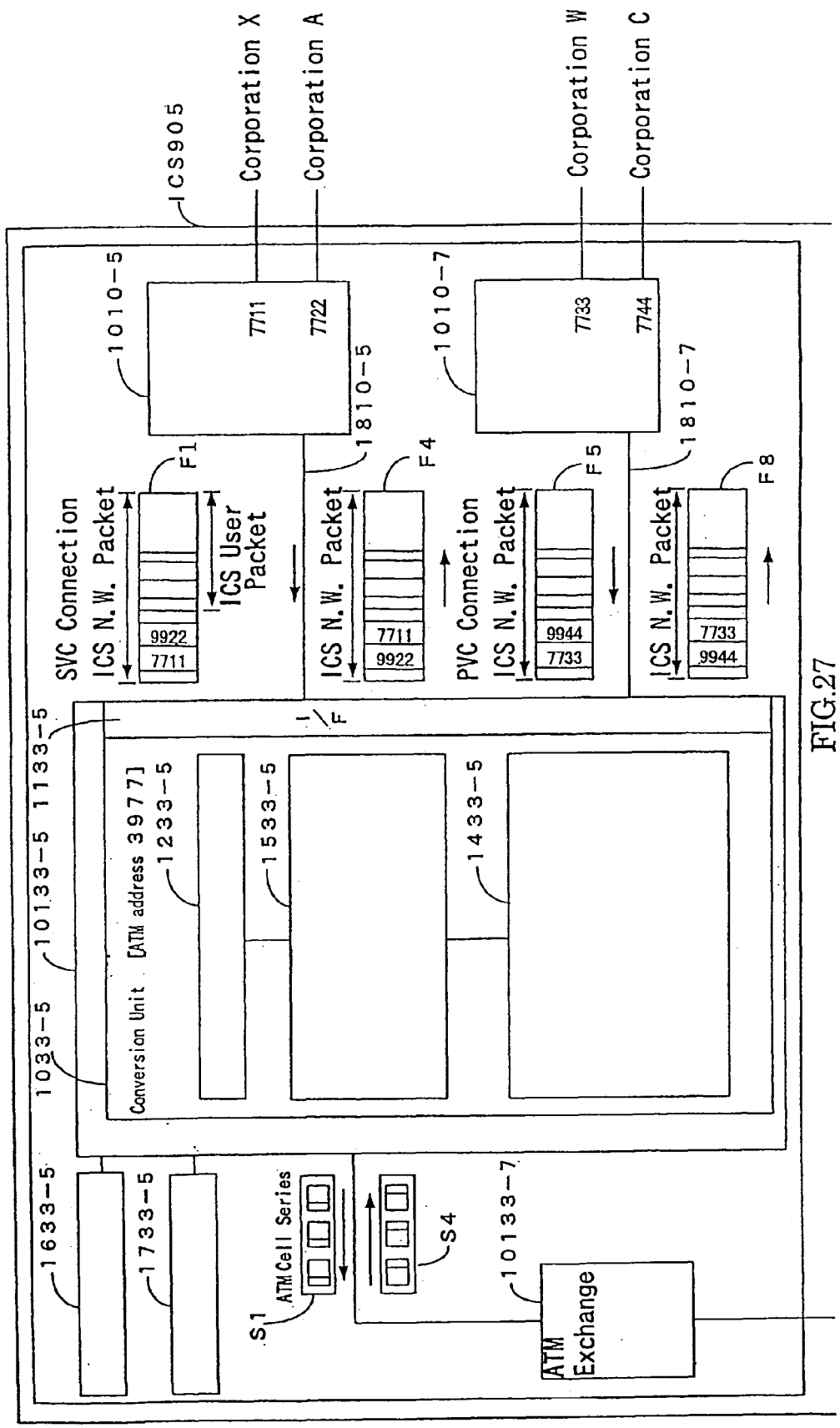
FIG. 27 is a portion of a constructional block showing a $3^{rd}$ embodiment (embodiment using ATM network) according to the present invention.
Figure 28:
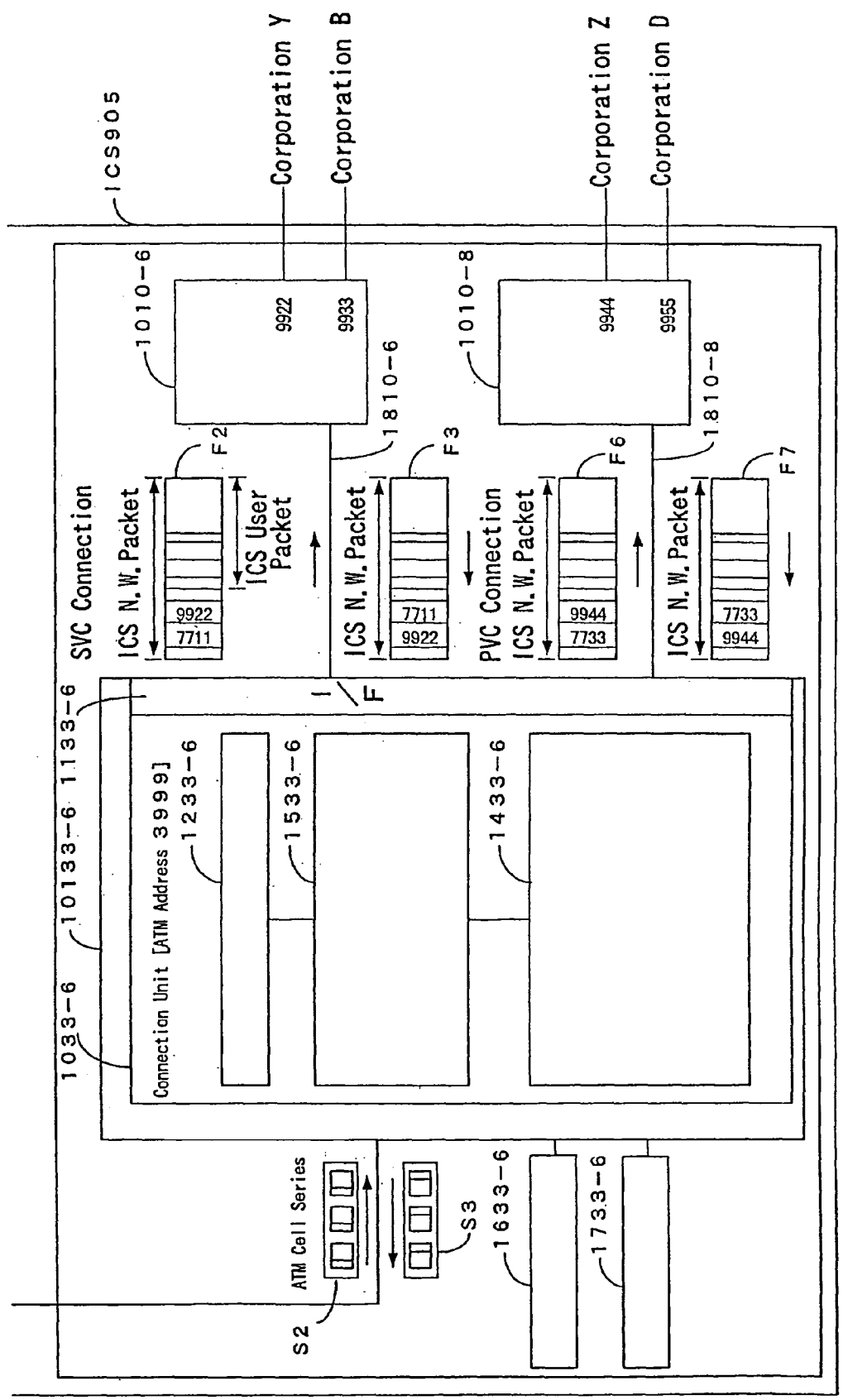
FIG. 28 is a portion of a constructional block showing a $3^{rd}$ embodiment according to the present invention.

(2) Description of Components:

FIGS. 27 and 28 focus on the ATM network 1042, in which the internal construction of the conversion unit 1033-1 within the ATM exchange 10133-1 and of the conversion unit 1033-2 within the ATM exchange 10133-2 is described, and also the access control apparatus 1010-2 and 1010-1 are described in a simplified manner. Contents of an ATM address conversion table 1533-5 and a VC address conversion table 1433-5 are shown in FIG. 29, and contents of an ATM address conversion table 1533-6 and a VC address conversion table 1433-6 are shown in FIG. 30. In the present embodiment, the internal configuration of the access control apparatus and the operation of the processing device within the access control apparatus are basically the same in principle as the description given in Embodiment-1.

Appropriated to the access control apparatus 1010-5 shown in FIG. 27 are ICS network addresses "7711" and "7722", serving as connection points (ICS logic terminals) for corporations X and A which are the users of the ICS 905. Also appropriated to the access control apparatus 1010-7 are ICS network addresses "7733" and "7744", serving as connection points for corporations W and C, similarly. In FIG. 28, appropriated to the access control apparatus 1010-6 are ICS network addresses "9922" and "9933", serving as connection points for corporations Y and B, and similarly appropriated to the access control apparatus 1010-8 are ICS network addresses "9944" and "9955", serving as connection points for corporations Z and D. Here, in the ATM network embodiment, the corporations X Y and so forth, which are given as examples of users, may be differing locations within a single corporation which performs intra-corporation communication, or may be different corporations which perform inter-corporation communication.

An interface unit 1133-5 is provided in the conversion unit 1033-5 within the ATM exchange 10133-5, this interface unit 1133-5 handling the processing of rectifying interfacing (physical layers, data link layer protocol) of the communication lines connecting the access control apparatus 1010-5 and the ATM exchange 10133-5. The conversion unit 1033-5 is comprised of a processing device 1233-5, and also an ATM address conversion table 1533-5 for call setting with the SVC, and a VC address conversion table 1433-5 for converting addresses from ICS network addresses used by both SVC and PVC to virtual channel. Also, the ATM exchange 10133-5 connects the ATM address administration server 1633-5 serving as an information processing device for storing the ATM address conversion table with, in the case of using PVC, the PVC address administration server 1733-5 serving as an information processing device for storing the VC address conversion table, thereby performing the information processing relating to address conversion. The components making up the ATM exchange 10133-6 are the same as the description given regarding the ATM exchange 10133-5. In FIGS. 27 and 28, the access control apparatus 1010-5 and the access control apparatus 1010-7 are connected to the ATM exchange 10133-5 via the communication line 1810-5 and communication line 1810-7, respectively, and also, the access control apparatus 1010-6 and the access control apparatus 1010-8 are connected to the ATM exchange 10133-6 via the communication line 1810-6 and communication line 1810-8, respectively. An ATM address "3977" unique to the network is set to the conversion unit 1033-5 within the ATM exchange 10133-5, and an ATM address "3999" unique to the network is set to the conversion unit 1033-6 within the ATM exchange 10133-6. The ATM exchange 10133-5 and the ATM exchange 10133-6 are connected via the ATM exchange 10133-7 in the present embodiment.

(3) Flow of Packets Using SVC:

An embodiment wherein SVC is applied as a communication path within the ATM network will be described with an example of an ICS user packet sent from a terminal of a corporation X toward a terminal of a corporation Y, with reference to FIGS. 27 and 28.

<<Preparation>>

A receiving ICS network address indicating the destination of the ICS network packet, a receiving ATM address for indicating the other party for call setting of the virtual channel on the ATM network, and channel capabilities such as communication speed requested by the virtual channel, are registered in the ATM address conversion table 1533-5. Also, similar registration is made to the ATM address conversion table 1533-6. In the embodiment, the values set in the ATM address conversion table 1533-5 are as follows: "9922" which is the ICS network address appropriated to the ICS logic terminal of the access control apparatus 1010-6 is set as the communication address of the corporation Y, and the ATM address "3999" which is uniquely appropriated to the conversion unit 1033-6 within the ATM network is registered as the receiving ATM address. In the present embodiment, a communication speed of 64 Kbps is set as the channel capabilities.

The contents registered to the ATM address conversion table 1533-5 are also written to the ATM address administration server 1633-5.

The values set in the ATM address conversion table 1533-6 are as follows: "7711" which is the ICS network address appropriated to the ICS logic terminal of the access control apparatus 1010-5 is set as the communication address of the corporation X, and the ATM address "3977" which is uniquely appropriated in the ATM network to the conversion unit 1033-5 within the ATM exchange 10133-5 to which the access control apparatus 1010-5 is connected is registered as the receiving ATM address. In the present embodiment, a communication speed of 64 Kbps is set as the channel capabilities. The contents registered to the ATM address conversion table 1533-6 are also written to the ATM address administration server 1633-6.

<<Transferring ICS Network Packets from the Access Control Apparatus>>

As described in Embodiment-1, the ICS user packets sent from a terminal of the corporation X toward the terminal of the corporation Y connected to the access control apparatus 1010-6 via the access control apparatus 1010-5 is encapsulated upon passing through the access control apparatus 1010-5, and becomes an ICS network packet F1 having the transmitting ICS network address "7711" and the receiving ICS network address "9922" as an ICS packet header. The ICS network packet F1 is sent from the access control apparatus 1010-5 to the ATM exchange 10133-5, and reaches the conversion unit 1033-5. The following is a description thereof made with reference to FIG. 31.

<<Obtaining a Virtual Channel ID>>

Once the conversion unit 1033-5 receives the ICS network packet F1 (Step S1601), there is the need to request a virtual channel ID of the SVC virtual channel determined by the relation of the transmitting ICS network address "7711" and the receiving ICS network address "9922" in the ICS packet header, in order to correctly transfer the received packet F1 to the ATM exchange 10133-5. In the case that the communication is based on the SVC, there are cases that the virtual channel corresponding with the communication path is established at the time of the receiving the ICS network packet, and cases in which the virtual channel has not yet been established. In order to find out whether or not the virtual channel has been established, the processing device 1233-5 first searches whether or not a virtual channel corresponding with the pair of a transmitting ICS network address "7711" and a receiving ICS network address "9922" is registered in the VC address conversion table 1433-5 (Step S1602), and in the event that there is registration here, establishment of the virtual channel can be thus confirmed. That is, the fact that the virtual channel corresponding with the pair of transmitting ICS network address "7711" and receiving ICS network address "9922" is "33" is obtained, and further, it can be found that this virtual channel is communicating based on the SVC, from the value "11" of the channel type obtained at the same time. In the event that there is no such registration on the VC address conversion table 1433-5, the requested virtual channel is established with the latter-described <<call setting>>, and the virtual channel ID is obtained from the information registered to the VC address conversion table 1433-5 at that point (Step S1603).

<<Call Setting>>

Regarding the above-mentioned case wherein "there is no registration of a virtual channel ID corresponding with a communication path determined by correspondence between a transmitting ICS network address and a receiving ICS network address on the VC address conversion table 1433-5", i.e., in the case that there is no virtual channel ID corresponding with the communication path established yet, it becomes necessary to perform the following call setting, to establish a virtual channel within the ATM network comprising ICS 905. An example of operation of the call setting will now be described.

The processing device 1233-5 of the conversion unit 1033-5, upon making reference to the VC address conversion table 1433-5 and finding that there is no registration of a virtual channel ID corresponding with the pair of transmitting ICS network address "7711" and receiving ICS network address "9922" (Step S1602), the processing device 1233-5 of the conversion unit 1033-5 refers to the VC address conversion table 1533-5, finds the receiving ICS network address "9922" registered in the VC address conversion table 1533-5 matching the receiving ICS network address "9922", and obtains transmitting ATM address "3999" corresponding thereto and channel capabilities "64K" corresponding thereto, and so forth. The processing device 1233-5 uses the obtained transmitting ATM address "3999" to perform a request for call setting to the ATM exchange 10133-5, and also requested at this time is channel capabilities such as communication speed of the virtual channel simultaneously obtained from the VC address conversion table 1533-5 and so forth. The ATM exchange 10133-5, upon receiving the call setting request, uses a signal method which is provided standard to ATM exchanges proper as known technique to establish a virtual channel within the ATM network which reaches the ATM exchange 10133-6 (Step S1606). The virtual channel ID appropriated for identification of the virtual channel is notified from the ATM exchanges to conversion units 1033-5 and 1033-6 therein, but in the event that this is based on stipulations of a signal method according to known technique, the value notified from the calling party ATM exchange 10133-5 (e.g., "33") and the value notified from the receiving party ATM exchange 10133-6 (e.g., "44") may not be the same value. At the conversion unit 1033-5, the virtual channel ID "33" which is notified from the ATM exchange 10133-5 is registered in the VC address conversion table 1433-5 along with the transmitting ICS network address "7711" and the receiving ICS network address "9922" (Step S1607), and stores these on the VC address conversion table 1433-5 while the connection of this virtual channel is established. When the virtual channel connection is no longer necessary, the conversion unit 1033-5 requests call release of the virtual channel to the ATM exchange 10133-5, and at the same time deletes the registration corresponding with virtual channel ID "33" on the VC address conversion table 1433-5. Registration to the VC address conversion table 1433-6 in the conversion unit 1033-6 will be described later.

<<Packet Transfer>>

Figure 25:
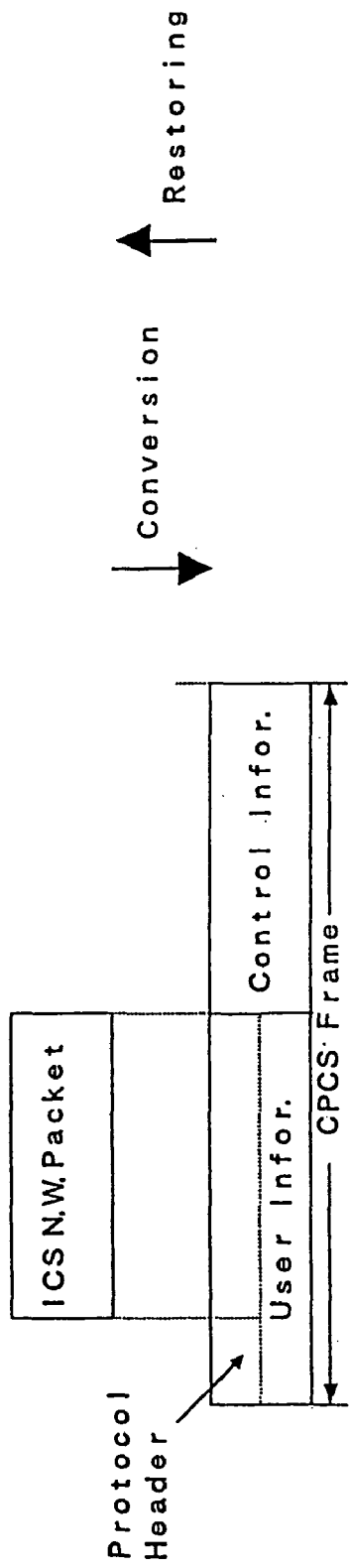
FIG. 25 is a diagram to explain conversion/restoring operation between ICS network packet and CPCS packet.
Figure 26:
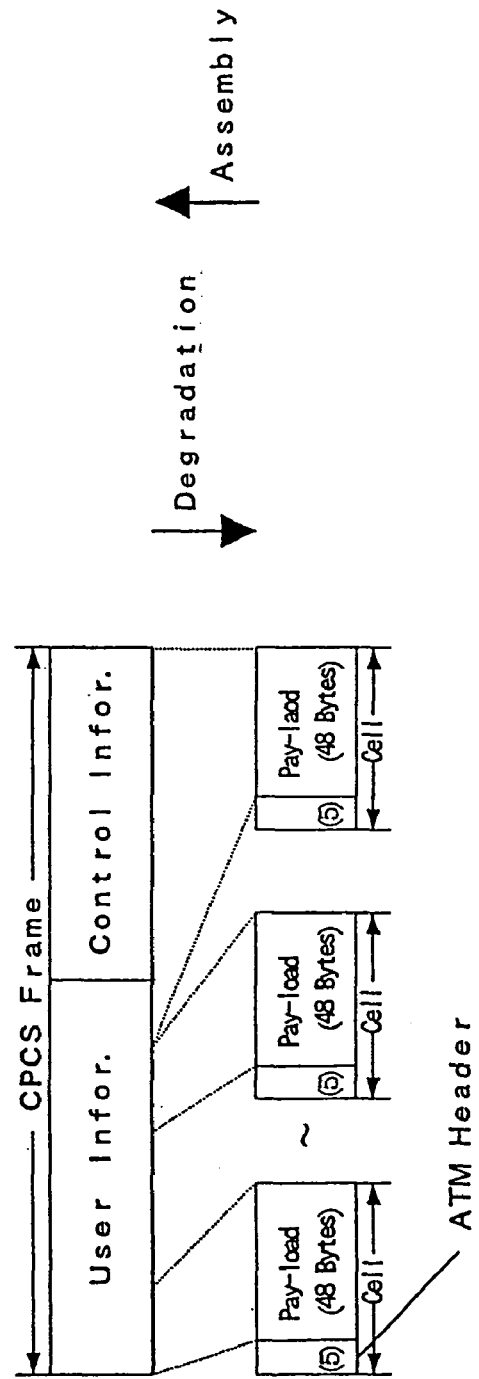
FIG. 26 is a diagram to explain dissolution/assembly between CPCS frame and cell.

The processing device 1233-5 of the conversion unit 1033-5 converts the ICS network packet F1 received from the access control apparatus 1010-5 into a CPCS frame shown in FIG. 25 according to the virtual channel (virtual channel ID "33") established according to the above description, and further performs degradation into ATM cells as shown in FIG. 26 and transfers to the relay ATM exchange 10133-7 (Step S1604).

<<Transfer of ATM Cells>>

According to the above-described method, the ATM cell series S1 comprised of a plurality of cells obtained by converting the ICS network packet F1 is transferred from the ATM exchange 10133-5 to the relay ATM exchange 10133-7, and further is transferred to the ATM exchange 10133-6 as ATM cell series S2. The following is a description thereof with reference to the flowchart in FIG. 32.

<<Operation Following Arrival of Packet>>

Once the ATM cell series S2 reaches the ATM exchange 10133-6 (Step S1610), this ATM cell series S2 is transferred from the ATM exchange 10133-6 to the conversion unit 1033-6. At the conversion unit 1033-6 as shown in FIG. 26, the received ATM cells are assembled into a CPCS frame, and further, as shown in FIG. 25, an ICS network packet is restored from the CPCS frame (Step S1611). In FIG. 28, the restored ICS network packet is shown as ICS network packet F2, but the contents thereof are identical to that of the ICS network packet F1. The ICS network packet F2 is transferred to an access control apparatus determined by the receiving ICS network address "9922" in the header thereof, i.e., to access control apparatus 1010-6 which has an ICS logic terminal appropriated with ICS network address "9922" (Step S1612).

At this time, at the conversion unit 1033-6, the transmitting ICS network address "7711", the receiving ICS network address "9922", the channel type "11" indicating the fact this is SVC identified at the point of receiving the call, and the virtual channel ID "44" appropriated at the time of call setting of the SVC virtual channel are registered in the VC address conversion table 1433-6 (Step S1614), and at this time, the transmitting ICS network address "7711" of the ICS network packet F2 is written to the receiving ICS network address of the VC address conversion table 1433-6, and the receiving ICS network address "9922" is written to the transmitting ICS network address of the VC address conversion table 1433-6, i.e., these are written in reverse positions. However, if at the point of registration an item already exists within the VC address conversion table 1433-6 identical to that regarding which registration is being attempted, no registration is made. The address conversion information registered in the VC address conversion table 1433-6 is stored on the VC address conversion table 1433-5 while the connection of the virtual channel having a corresponding virtual channel (in this example, virtual channel ID "44") is established (Step S1613).

<<Reverse Packet Flow>>

Now, description of the case of reverse flow of the ICS packet, i.e., flow from a corporation Y to a corporation X, will be made with reference to FIGS. 27 and 28, under the presumption that call setting of the SVC virtual channel has been made according to the above description. An ICS user packet sent out from the corporation Y to the corporation X is converted into an ICS network packet F3 having the transmitting ICS network address "9922" and the receiving ICS network address "7711" in the header portion thereof, and the processing following the flow shown in FIG. 31 as described above is performed by the processing device 1233-6 of the conversion unit 1033-6 within the ATM exchange 10133-6.

Figure 31:
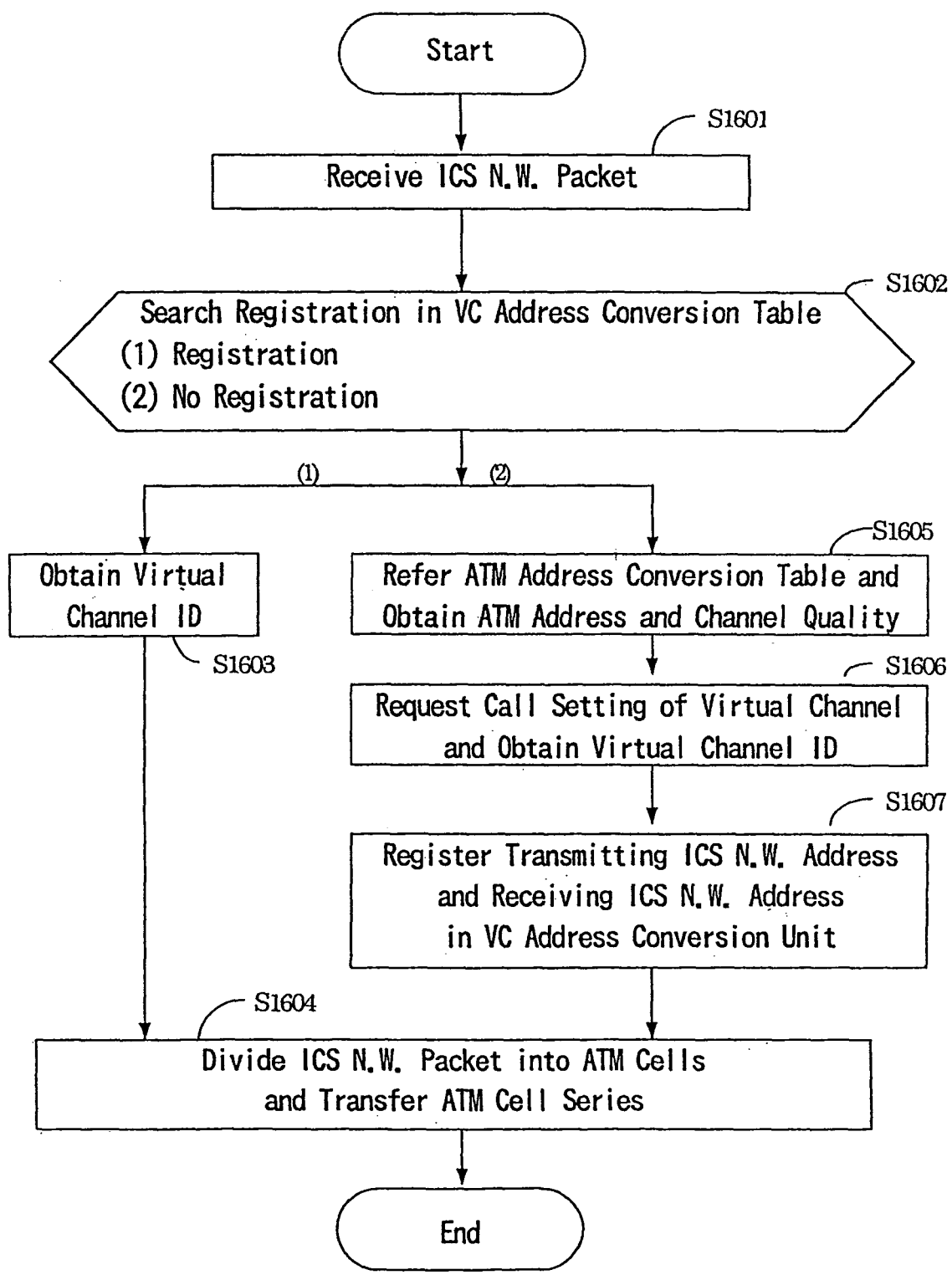
FIG. 31 is a flowchart to show a flow of packet using SVC and PVC.

In this case, the VC address conversion table 1433-6 in the conversion unit 1033-6 has registered therein a virtual channel ID "44" with a channel type "11" which means SVC, corresponding with the transmitting ICS network address "9922" and receiving ICS network address "7711", so the system operates following the flow (1) shown in FIG. 31, thereby converting the ICS network packet F3 into a plurality of ATM cells (ATM series S3) and transferring, with regard to the virtual channel ID "44". The ICS network packet F3 is relayed and transferred by the relay ATM exchange 10133-7, becomes ATM series S4 and reaches the ATM exchange 10133-5. The ATM series S4 is received via the virtual channel having virtual channel ID "33" in the conversion unit 1033-5 thereof, and restored into an ICS network packet F4 having identical contents with the ICS network packet F3. In the conversion unit 1033-5, the pair of the transmitting ICS network address "9922" and the receiving ICS network address "7711" in the header of the ICS network packet F4 is already registered in the VC address conversion table 1433-5 in reverse fashion, so registration to the VC address conversion table is not performed, and the ICS network packet F4 is transferred to the access control apparatus 1010-5.

<<Example of Application to Half-Duplex Communication>>

The above description has been made with reference to cases wherein an ICS packet is transferred from the corporation X to the corporation Y, and reverse from the corporation Y to the corporation X with a network within the ICS 905 having been configured of an ATM network, being carried out with a single SVC virtual channel. For example, applying this transfer and reverse transfer to a request packet to a server terminal of the corporation Y to be connected to the ICS from a client terminal of the corporation X to be connected to the ICS (transfer), and a response packet to this request packet from the client terminal of the corporation X to server terminal of the corporation Y (reverse transfer) results in an application example of half-duplex communication in which one-way communication is performed at times, and both-way communication is realized by switching the communication direction by time frames.

<<Example of Application to Full-Duplex Communication>>

The virtual channel set on the ATM network is capable of full-duplex communication, i.e., simultaneous both-way communication, due to the ATM stipulations. For example, applying the transfer and reverse transfer to request packets to a plurality of server terminals of the corporation Y to be connected to the ICS from a plurality of client terminals of the corporation X to be connected to the ICS (transfer), and response packets to the request packets from the plurality of client terminals of the corporation X to the plurality of server terminals of the corporation Y (reverse transfer) results in asynchronous transfer of packets between the client terminals and the server terminals, so simultaneous both-way communication is conducted on the single SVC virtual channel serving as the communication path, thereby making for an application example of full-duplex communication.

(4) Flow of Packets Using PVC

An embodiment wherein the network within the ICS 906 is configured with an ATM network and PVC is applied as a communication path within the ATM network will be described with an example of an ICS user packet sent from a terminal of a corporation W toward a terminal of a corporation Z, with reference to FIGS. 27 and 28.

<<Preparation>>

A transmitting ICS network address, a receiving ICS address, the virtual channel ID of the PVC fixed on the ATM network (indicating the communication path between the ATM exchange 10133-5 and the ATM exchange 10133-6), and the channel type indicating that the virtual channel ID is PVC, are registered in the VC address conversion table 1433-5. This registration is different from the case of SVC, in that registration is made in the VC address conversion table 1433-5 at the same time that the PVC virtual channel is set in the ATM exchanges (10133-5, 10133-7, 10133-6) serving as the communication path, and is saved in a fixed manner while the communication path is necessary, i.e., until the setting of the PVC virtual channel is canceled. Also, the registration is made to the VC address conversion table 1433-6 in the same manner. Incidentally, the PVC virtual channel ID is appropriated to the respective ATM exchanges at the time that PVC is fixedly connected between the ATM exchanges.

The values set in the VC address conversion table 1433-5 are as follows: value "7733" which is the transmitting ICS network address appropriated to the ICS logic terminal of the access control apparatus 1010-7 is set as the communication address of the corporation W, and value "9944" which is the receiving ICS network address appropriated to the ICS logic terminal of the access control apparatus 1010-8 is set as the communication address of the corporation Z. Further, the PVC virtual channel ID "55" which is appropriated to the ATM exchange 10133-5 is set as the virtual channel ID, and value "22" is set as the channel type, indicating the PVC. Also, settings for registering to the VC address conversion table 1433-5 are written to the PVC address administration server 1733-5, and stored.

In the same way, similar settings are made in the VC address conversion table 1433-6 in the conversion unit 1033-6 in the ATM exchange 10133-6, with the transmitting ICS network address and the receiving ICS network address reversed. In this case, even if the same PVC is being implied, the virtual channel ID stored in conversion table 1433-6 may be of a different value than the VC address stored in conversion table 1433-5. When the registering to VC address conversion table 1433-6 in this instance, this is also written to and stored in the PVC address administration server 1733-6.

The values set in the VC address conversion table 1433-6 are as follows: value "9944" which is the transmitting ICS network address appropriated to the ICS logic terminal of the access control apparatus 1010-8 is set as the communication address of the corporation Z, and value "7733" which is the receiving ICS network address appropriated to the ICS logic terminal of the access control apparatus 1010-7 is set as the communication address of the corporation W. Further, the PVC virtual channel ID "66" which is appropriated to the ATM exchange 10133-6 is set as the virtual channel ID, and value "22" is set as the channel type, indicating PVC.

<<Transferring ICS Network Packets from Access Control Apparatus>>

The ICS user packet sent toward the terminal of the corporation Z connected to the access control apparatus 1010-8 via the access control apparatus 1010-7 is ICS-encapsulated upon passing through the access control apparatus 1010-7, and becomes an ICS network packet F5 having the transmitting ICS network address "7733" and the receiving ICS network address "9944" as an ICS packet header. The ICS network packet F5 is sent from the access control apparatus 1010-7 to the ATM exchange 10133-5, and reaches the conversion unit 1033-5 via the interface unit 1133-5.

<<Obtaining a Virtual Channel ID>>

The processing device 1233-5 refers to the VC address conversion table 1433-5 using the transmitting ICS network address "7733" and the receiving ICS network address "9944" in the header of the received ICS network packet F5, and obtains the fact that the virtual channel ID identifying the virtual channel set between the conversion units 1033-5 and 1033-6 inside the ATM exchange 10133-6 connected to the access control apparatus 1010-8 with the ICS logic terminal provided with a receiving ICS network address "9944" is "55". At the same time, it can be found that the virtual channel is PVC, from the value "22" of the channel type obtained.

<<Transfer of packets>>

The processing device 1233-5 converts the ICS network packet F5 received from the access control apparatus 1010-7 into an ATM cell series, and transfers this to the ATM exchange 10133-7, with regard to the PVC virtual channel "55" obtained as described above. The method of ATM cell conversion is the same as that described above in the embodiment of SVC. The above processing procedures of the conversion unit 1033-5 are as shown in FIG. 31, and PVC always follows the flow (1).

<<Transfer of ATM Cells>>

The ATM cell series S1 comprised of a plurality of cells obtained by converting the ICS network packet F5 is transferred from the ATM exchange 10133-5 to the relay ATM exchange 10133-7, and further is transferred to the ATM exchange 10133-6 as ATM cell series S2. This operation is the same as with SVC.

<<Operation Following Arrival of Packet>>

Figure 32:
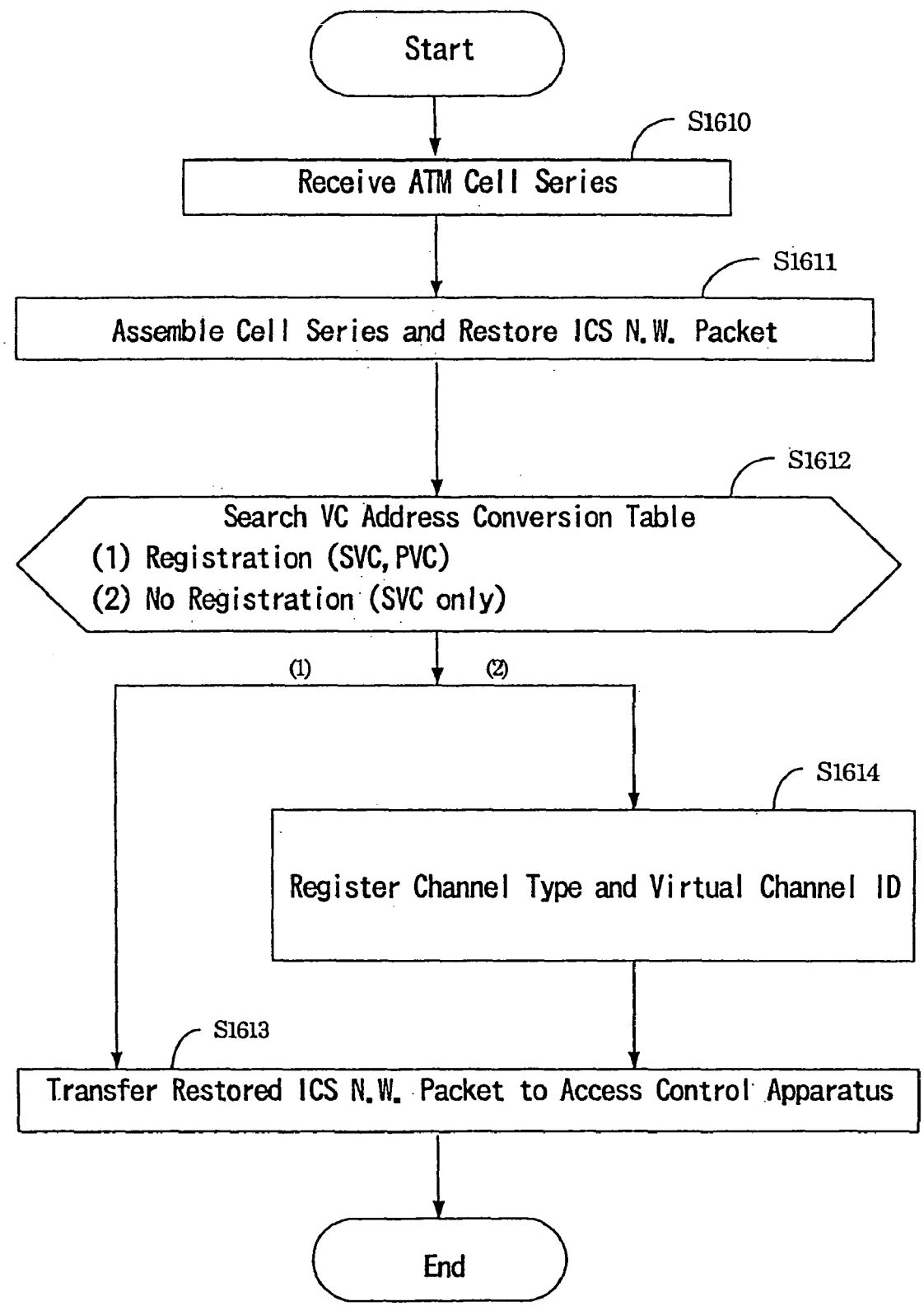
FIG. 32 is a flowchart to show a flow of packet using SVC and PVC.

Once the ATM cell series S2 reaches the ATM exchange 10133-6, this ATM cell series S2 is transferred from the ATM exchange 10133-6 to the conversion unit 1033-6 within the ATM exchange 10133-6. The conversion unit 1033-6 assembles the received ATM cells into a CPCS frame, which is the same as with SVC. In FIG. 28, the restored ICS network packet is shown as an ICS network packet F6, but the contents thereof are identical to that of the ICS network packet F5. The ICS network packet F6 is transferred to an access control apparatus determined by the receiving ICS network address "9944" in the header thereof i.e., to access control device 1010-8 which has an ICS logic terminal appropriated with ICS network address "9944". The above processing procedures of the conversion unit 1033-6 are as shown in FIG. 32, and PVC always follows the flow (1).

<<Reverse Packet Flow>>

Next, description of the case of reverse flow of the ICS packet, i.e., flow from the corporation Z to the corporation W, will be made with reference to FIGS. 27 and 28, in the same manner as above. An ICS user packet sent out from the corporation Z to the corporation W is ICS-encapsulated into an ICS network packet F7 having the transmitting ICS network address "9944" and the receiving ICS network address "7733" in the header portion thereof, and the processing following the flow shown in FIG. 31 as described above is performed by the processing device 1233-6 of the conversion unit 1033-6 within the ATM exchange 10133-6. In this case, the VC address conversion table 1433-6 in the conversion unit 1033-6 has registered therein a virtual channel ID "66" corresponding with a transmitting ICS network address "9944" and a receiving ICS network address "7733", so the system converts the ICS network packet F7 into a plurality of ATM cell series and transfers, with regard to the virtual channel ID "66".

The ATM cell series transferred through the ATM network reach the converting unit 1033-5 of the ATM exchange 10133-5, are received via the virtual channel having virtual channel ID "55", and restored into an ICS network packet F8 having identical contents with the ICS network frame F7. However, in the conversion unit 1033-5, the pair of the transmitting ICS network address "9944" and the receiving ICS network address "7733" in the header of the ICS network packet F4 is already registered in the VC address conversion table 1433-5 in reverse fashion, and information that the virtual channel ID "55" as to this transmitting/receiving address pair is channel type "22" is obtained, so registration to the VC address conversion table is not performed, and the ICS network packet F8 is transferred to the access control apparatus 1010-7.

<<Example of Application to Half-Duplex Communication>>

The above description has been made with reference to an embodiment of transferring an ICS packet using PVC with a network within ICS 905 having been configured of an ATM network, but the difference between the PVC and the SVC is whether the virtual channel is fixed or called and set as necessary, so there is no difference in the operation itself of transferring packets over the set virtual channel. Accordingly, regarding the ICS according to the present invention, an example of application to half-duplex communication using an ATM network PVC virtual channel is the same as an example of application to half-duplex communication using a SVC network PVC virtual channel.

<<Example of Application to Full-Duplex Communication>>

The example of application of PVC full-duplex communication is equivalent to the example of application of full-duplex communication in SVC, due to the same reason as the example of application to half-duplex communication.

(5) One-on-N or N-on-One Communication Using PVC

In the above example, an embodiment was described wherein one virtual channel was described as a communication path connecting one corporation (location) with one corporation (location), i.e., a communication path connecting one ICS logic terminal with one ICS logic terminal, but one PVC virtual channel can be used as a communication path connecting one ICS logic terminal with a plurality of ICS logic terminals. Such One-on-N or N-on-one communication will be described with reference to FIGS. 33 and 34.

<<Description of Components>>

Figure 33:
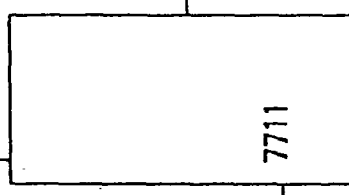
FIGS. 33 and 34 are block diagrams to show 1:N communication or N:1 communication using PVC.
Figure 34:
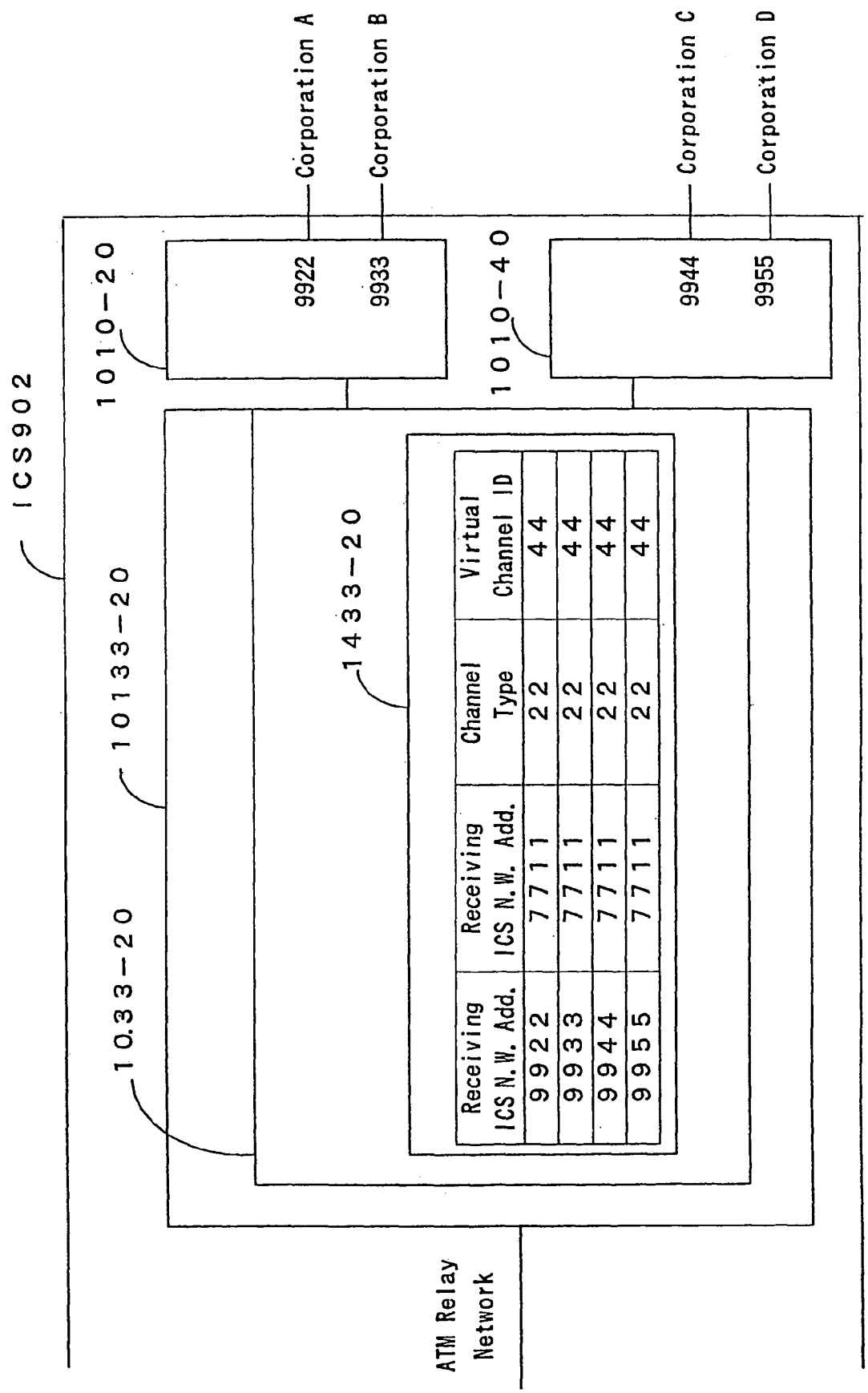

In FIGS. 33 and 34, regarding the access control apparatus 1010-10, the corporation X is connected to an ATM exchange 10133-10 with an ICS logic terminal within the access control apparatus 1010-10 provided with the ICS network address "7711". With the parties to be reached from the corporation X as the corporations A through D, the corporation A is connected to an ICS logic terminal within the access control apparatus 1010-20 provided with the ICS network address "9922", and the corporation B is connected to an ICS logic terminal within the access control apparatus 1010-20 provided with the ICS network address "9923". In the same manner, the corporation C is connected to an ICS logic terminal within the access control apparatus 1010-40 provided with the ICS network address "9944", and the corporation D is connected to an ICS logic terminal within the access control apparatus 1010-40 provided with the ICS network address "9955". The access control apparatuses 1010-20 and 1010-40 are connected to the ATM exchange 10133-20, and the ATM exchanges 10133-10 and 10133-20 are connected via a relay network.

<<Preparation>>

With regard to the ATM exchanges 10133-10 and 10133-20, a single PVC virtual channel connecting the conversion unit 1033-10 within the ATM exchange 10133-10 and the conversion unit 1033-20 within the ATM exchange 10133-20, setting "33" as the virtual channel ID provided to the conversion unit 1033-10 of the virtual channel, and "44" as the virtual channel ID provided to the conversion unit 1033-20 of the virtual channel. Registration such as shown in FIGS. 33 and 34 is performed regarding the VC address conversion table 1433-10 within the conversion unit 1033-10 and the VC address conversion table 1433-20 within the conversion unit 1033-20.

<<Packet Flow for One-On-N Communication>>

The flow of packets for one-on-N communication will be described concerning packets sent from the corporation X to each of the corporations A through D. An ICS network packet sent from the corporation X toward the corporation A, having a transmitting ICS network address "7711" and a receiving network address "9922", is transferred to the PVC virtual channel with a virtual channel ID "33", by means of making reference to the VC address conversion table 1433-10 in the conversion unit 1033-10. An ICS network packet sent from the corporation X toward the corporation B, having a transmitting ICS network address "7711" and a receiving network address "9933", is also transferred to the PVC virtual channel with a virtual channel ID "33". An ICS network packet sent from the corporation X toward the corporation C, having a transmitting ICS network address "7711" and a receiving network address "9944", and an ICS network packet sent from the corporation X toward the corporation D, having a transmitting ICS network address "7711" and a receiving network address "9955" are transferred to the PVC virtual channel with a virtual channel ID "33" in the same manner. This indicates that one-on-N (corporation X to corporations A through D) communication is being performed while sharing a single PVC virtual channel. Reverse packet flow, i.e., transfer from the corporations A through D to the corporation X, will be described in the next section.

<<Packet flow for N-On-One Communication>>

The flow of packets for N-on-one communication will be described concerning packets sent to the corporation X from each of the corporations A through D. An ICS network packet sent toward the corporation X from the corporation A, having a transmitting ICS network address "9922" and a receiving network address "7711", is transferred to the PVC virtual channel with a virtual channel ID "44", by means of making reference to the VC address conversion table 1433-20 in the conversion unit 1033-20. An ICS network packet sent toward the corporation X from the corporation B, having a transmitting ICS network address "9933" and a receiving network address "7711", is also transferred to the PVC virtual channel with a virtual channel ID "44". An ICS network packet sent toward the corporation X from the corporation C, having a transmitting ICS network address "9944" and a receiving network address "7711", and an ICS network packet sent toward the corporation X from the corporation D, having a transmitting ICS network address "9955" and a receiving network address "7711" are transferred to the PVC virtual channel with a virtual channel ID "44" in the same manner. This indicates that N-on-one (corporations A through D to corporation X) communication is being performed while sharing a single PVC virtual channel.

(6) N-on-N Communication Using PVC

Using the same method as one-on-N communication, one PVC virtual channel can be used as a communication path connecting a plurality of ICS logic terminals with a plurality of ICS logic terminals. Such N-on-N communication will be described with reference to FIGS. 35 and 36.

<<Description of Components>>

The corporation X has ICS logic terminal address "7711" of the access control apparatus 1010-11 as the contact point thereof, the corporation Y has ICS logic terminal address "7722" of the access control apparatus 1010-11 as the contact point thereof, and the access control apparatus 1010-11 is connected to the ATM exchange 10133-11. With the other party which the corporation X or corporation Y is attempting to reach as the corporation A or corporation C. The corporation A has ICS logic terminal address "9922" of the access control apparatus 1010-21 as the contact point thereof, the corporation Y has ICS logic terminal address "9944" of the access control apparatus 1010-41 as the contact point thereof The access control apparatuses 1010-21 and 1010-41 are connected to the ATM exchange 10133-21, and the ATM exchanges 10133-11 and 10133-21 are connected via a relay network.

<<Preparation>>

Figure 35:
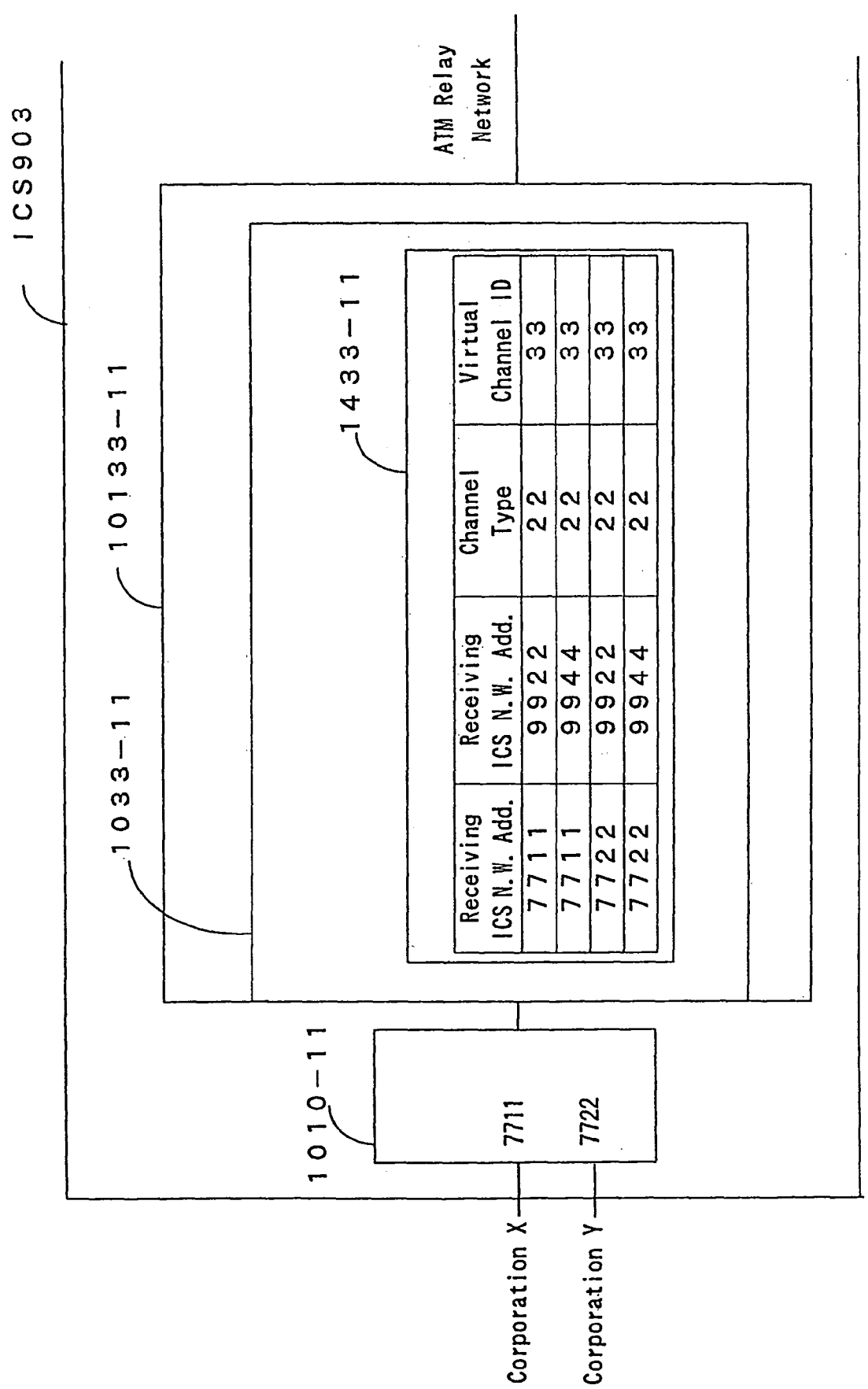
FIGS. 35 and 36 are block diagrams to show N:N communication using PVC.
Figure 36:
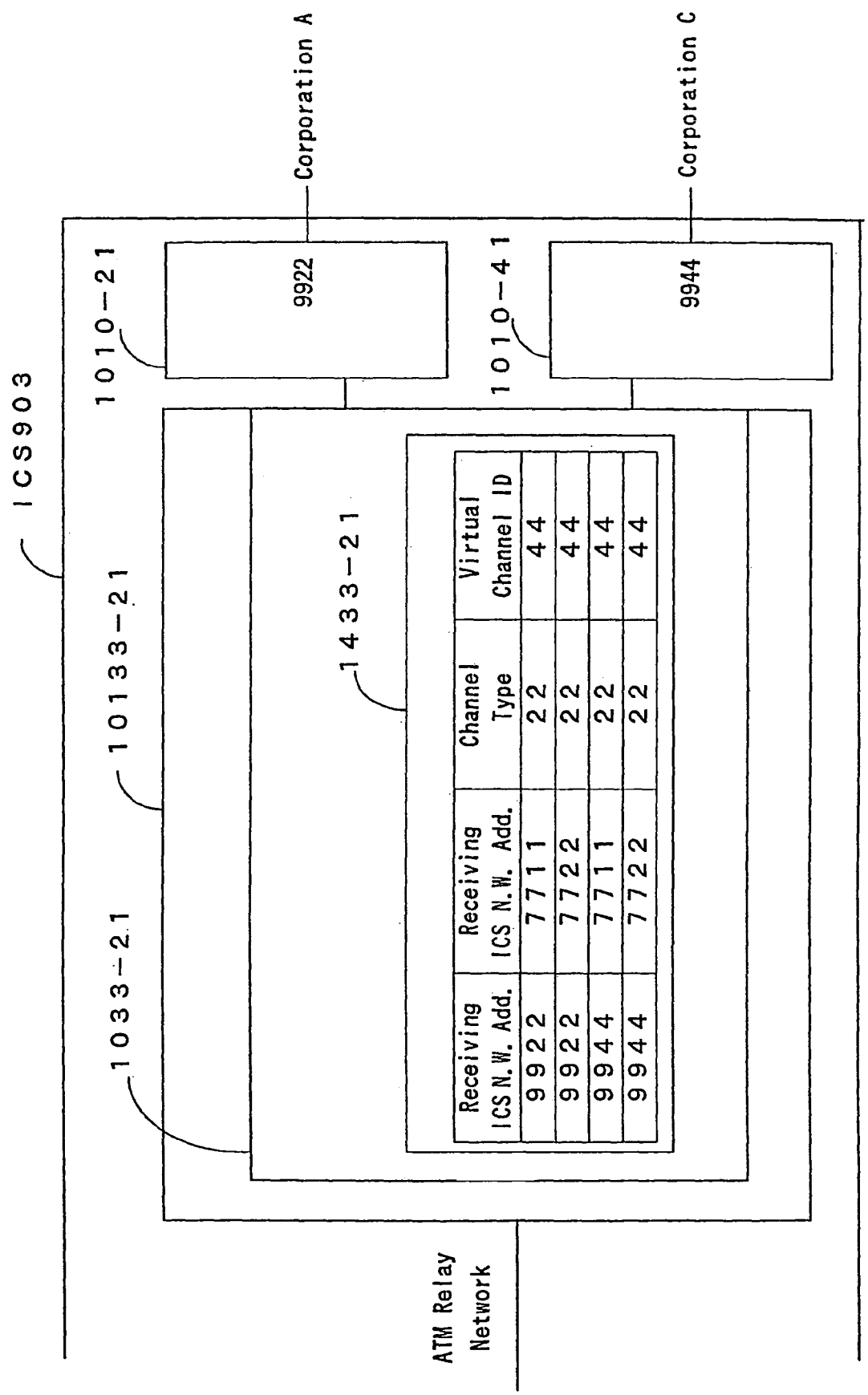

With regard to the ATM exchanges 10133-11 and 10133-21, a single PVC virtual channel connects the conversion unit 1033-11 within the ATM exchange 10133-11 and the conversion unit 1033-21 within the ATM exchange 10133-21, setting "33" as the virtual channel ID provided to the conversion unit 1033-11 of the virtual channel, and "44" as the virtual channel ID provided to the conversion unit 1033-21 of the virtual channel. Registration such as shown in FIGS. 35 and 36 is performed regarding the VC address conversion table 1433-11 within the conversion unit 1033-11 and the VC address conversion table 1433-21 within the conversion unit 1033-21.

<<Packet flow for N-On-N Communication>>

The flow of packets for N-on-N communication will first be described concerning packets sent from the corporation X to each of the corporations A and C. An ICS network packet sent from the corporation X toward the corporation A, having a transmitting ICS network address "7711" and a receiving network address "9922", is transferred to the PVC virtual channel with a virtual channel ID "33", by means of making reference to the VC address conversion table 1433-11 in the conversion unit 1033-11. An ICS network packet sent from the corporation X toward the corporation C, having a transmitting ICS network address "7711" and a receiving network address "9944", is also transferred to the PVC virtual channel with a virtual channel ID "33". Next, the flow of packets will be described concerning packets sent from the corporation Y to each of the corporations A and C. An ICS network packet sent from the corporation Y toward the corporation A, having a transmitting ICS network address "7722" and a receiving network address "9922", is transferred to the PVC virtual channel with a virtual channel ID "33", by means of making reference to the VC address conversion table 1433-11 in the conversion unit 1033-11. An ICS network packet sent from the corporation Y toward the corporation C, having a transmitting ICS network address "7722" and a receiving network address "9944", is also transferred to the PVC virtual channel with a virtual channel ID "33".

Next, reverse packet flow will be described concerning packets sent to each of the corporations X and Y from the corporation A. An ICS network packet sent toward the corporation X from the corporation A, having a transmitting ICS network address "9922" and a receiving network address "7711", is transferred to the PVC virtual channel with a virtual channel ID "44", by means of making reference to the VC address conversion table 1433-21 in the conversion unit 1033-21. An ICS network packet sent toward the corporation Y from the corporation A, having a transmitting ICS network address "9922" and a receiving network address "7722", is also transferred to the PVC virtual channel with a virtual channel ID "44", by means of making reference to the VC address conversion table 1433-21 in the conversion unit 1033-21. An ICS network packet sent toward the corporation X from the corporation C, having a transmitting ICS network address "9944" and a receiving network address "7711", is transferred to the PVC virtual channel with a virtual channel ID "44". An ICS network packet sent toward the corporation Y from the corporation C, having a transmitting ICS network address "9944" and a receiving network address "7722", is also transferred to the PVC virtual channel with a virtual channel ID "44". Thus, N-on-N communication is performed while sharing a single PVC virtual channel.

Embodiment-4

Embodiment Using an FR Network

An embodiment will be described wherein the network inside the ICS according to the present invention is configured using an FR network. The present embodiment will be described in the following order: (1) supplementary explanation of FR-related conventional art, (2) description of components, (3) flow of packets using SVC, (4) flow of packets using PVC, (5) one-on-N or N-on-one communication using PVC, and (6) N-on-N communication using PVC. With the present embodiment, two types of methods using SVC or PVC may be used separately, or these may be used in conjunction. Description will be given regarding each of the cases of using SVC and PVC. Also, intra-corporation communication service and inter-corporation communication service described in Embodiment-1, and virtual dedicated line service described in Embodiment-2, can both be realized with the access control apparatus according to the present invention, so there is no need to consider these separately regarding network packet communication with the network within the ICS. Rather, in the present embodiment, these communication services will be described integrally.

(1) Supplementary Explanation of FR-Related Conventional Art:

First, supplementary explanation will be made regarding FR-related conventional art to the extent that is necessary to describe the present embodiment.

A frame relay consists of using communication information units called packets with variable lengths to perform communication and to specify the communication path for each packet. This is a conventional art which has been standardized in the ITU.TI.233 Recommendations and so forth which have realized accumulated exchange of packets within a circuit network, and also logic multiplexing (a technique for multiplexing a single physical line into a plurality of logic lines). The service using the above technique is referred to as Frame Mode Bearer Service (hereafter referred to as "FMBS"), and stipulated for FMBS are: the Frame Switch Bearer Service (hereafter referred to as "FSBS") wherein the other party to which connection is to be made is selected (SVC); and the Frame Relay Bearer Service (hereafter referred to as "FRBS") wherein the other party to which connection is to be made is fixed (PVC). The term "Frame Relay" generally only indicates FRBS ("Frame Relay" in the narrow sense) at times, but with the present invention, "Frame Relay" is used as a term indicating all FMBS including FSBS and FRBS. In the event that only FSBS is to be specifically indicated, the term "frame relay using SVC" will be used, and in the event that only FRBS is to be specifically indicated, the term "frame relay using PVC" will be used. Hereafter, the above-defined "frame relay in the wide sense (FMBS)" will be referred to as FR, and packets transferred over an FR network will be called "FR packets" in order to distinguish these from ICS packets.

As described earlier, with an FR network, a plurality of logic lines can be set on a physical line, these logic lines being referred to as logic channels. Identifiers appropriated to FR terminals connecting to both ends of the logic channels (an overall reference to communication equipment connected to the FR network and communicating using the FR network) in order to identify the logic channels are called Data Link Connection Identifiers (hereafter referred to as "DLCI"). SVC and PVC are stipulated to logic channels, depending on the way of setting. SVC performs call setting of the logic channel when necessary, and is capable of obtaining a logic line with any FR terminal for a necessary duration, at a necessary speed. Call setting of the logic channel is performed by the FR terminal attempting to initiate communication, the method thereof being standardized in ITU-T. Call setting requires an address for identifying the FR terminal of the other party to which the call is to be set (hereafter referred to as "FR address"), the FR addresses being systematized so as to be unique in the FR network thereby enabling identification of each FR terminal. PVC is for fixedly setting a call setting to the FR exchange, and can be viewed as a virtual dedicated line from the point of the FR terminal.

Figure 37:
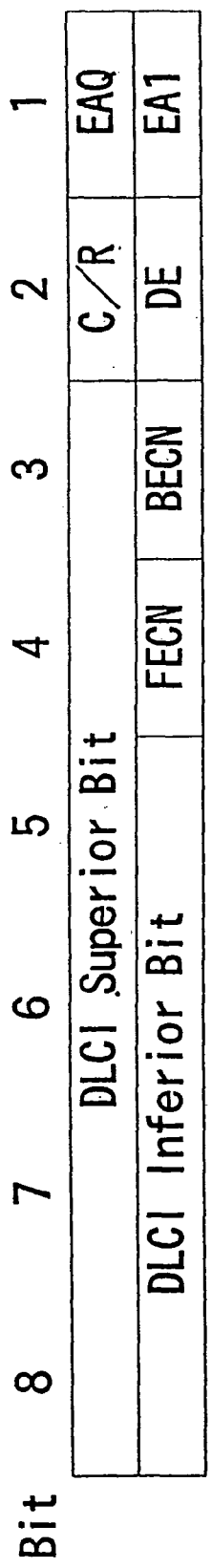
FIG. 37 is a diagram to show an example of FR frame address portion.

Regarding the established logic channels, DLCIs (Data Link Connection Identifiers) for identifying logic channels are appropriate for both SVC and PVC, and in the event of transferring an FR packet, the DLCI is set at the DLCI bit portion on the FR packet address portion shown in FIG. 37. There are three formats stipulated for the FR packet address portion, FIG. 37 showing the 2-byte format which is one of these. Logic channel capabilities (channel capabilities) of the FR network include: Committed Information Rate (hereafter referred to as "CIR") which is the information transfer speed guaranteed at a normal state (a state wherein there is no congestion) of the FR network.

Figure 38:
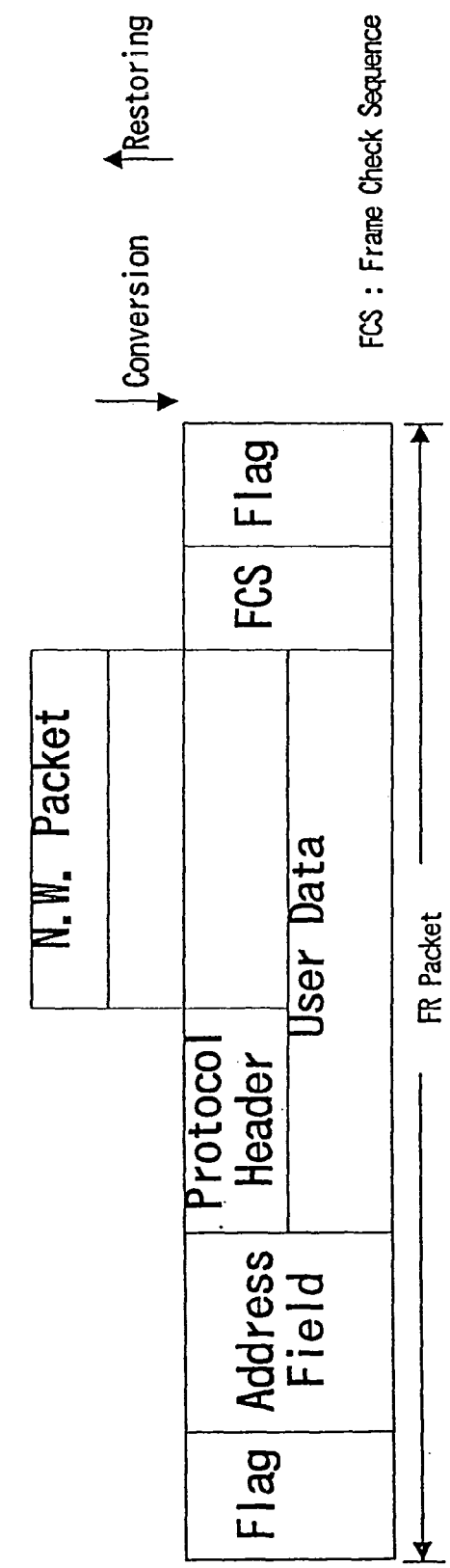
FIG. 38 is a diagram to show a variation between ICS network packet and FR frame.

There is the necessity to convert ICS network packets into FR packets in order to send such communication packets over an FR network, as shown in FIG. 38. Reception of an FR packet results in reverse conversion, consisting of extracting and reproducing the communication packet (ICS network packet) from the FR packet as shown in FIG. 38. Conversion of this FR packet has been standardized following the ITU-T Recommendations. Also, protocol headers within the FR packet user information have been standardized in RFC1490 of IETF.

Figure 39:
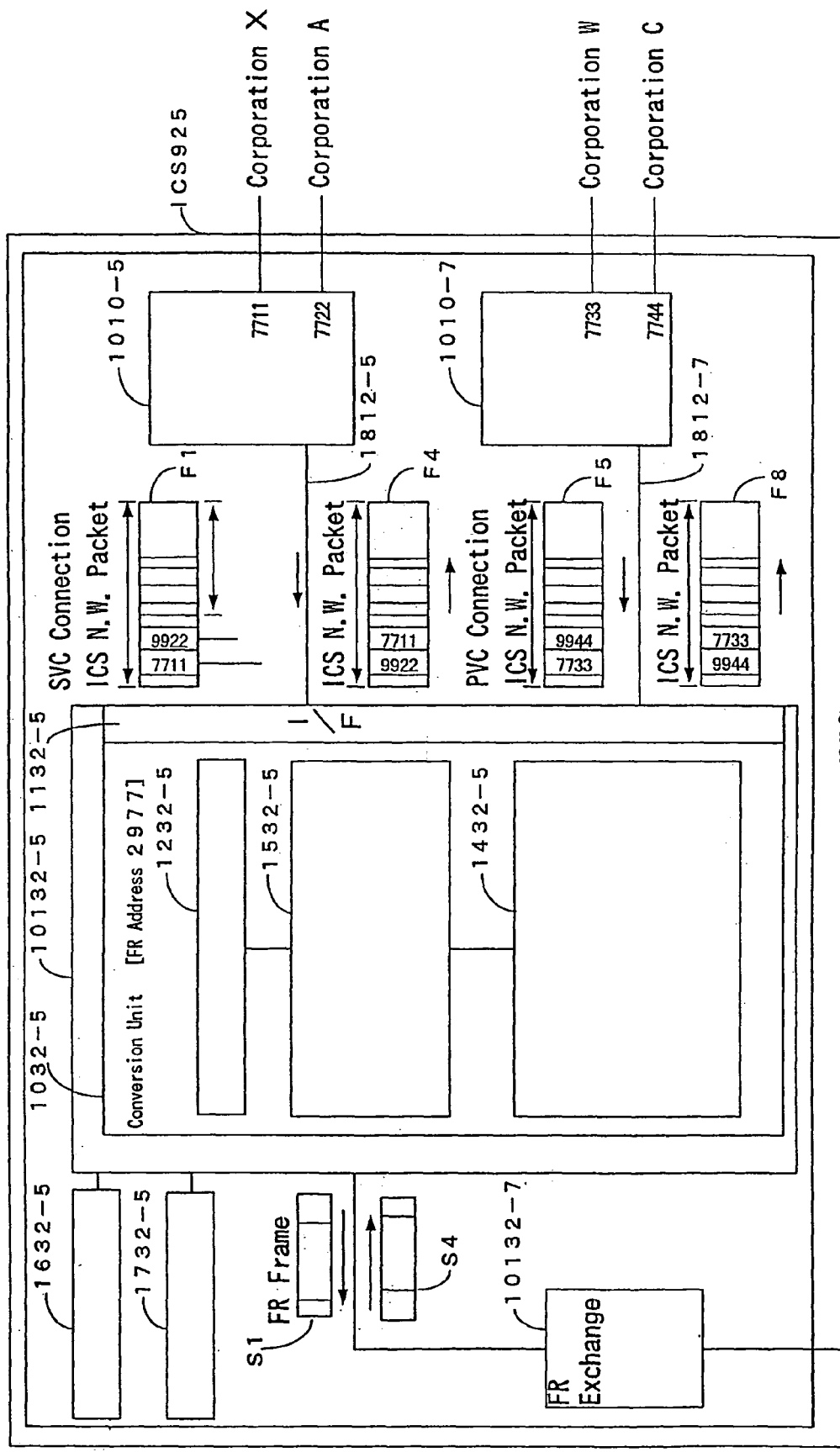
FIG. 39 is a portion of a constructional block showing a fourth embodiment (embodiment using FR network) according to the present invention.
Figure 40:
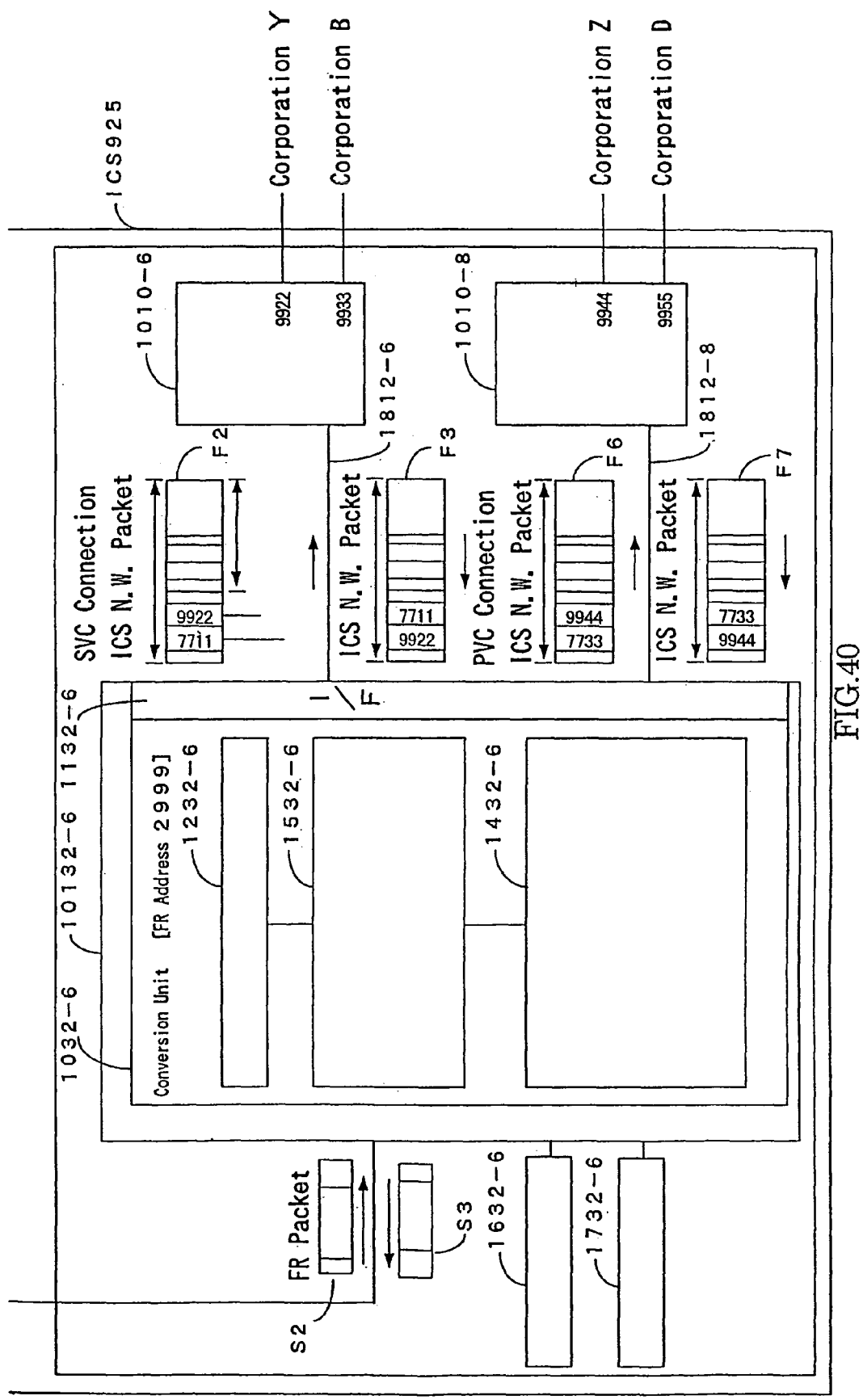
FIG. 40 is a portion of a constructional block showing a fourth embodiment according to the present invention.

(2) Description of Components:

FIGS. 39 and 40 show a forth embodiment of the present invention. In the present embodiment, the internal configuration of the access control apparatus and the operation of the processing device within the access control apparatus are basically the same in principle as the description given in Embodiment-1.

Appropriated to the access control apparatus 1010-5 are ICS network addresses "7711" and "7722", serving as connection points (ICS logic terminals) for the corporations X and A which are the users of the ICS 925. Also appropriated to the access control apparatus 1010-7 are ICS network addresses "7733" and "7744", serving as connection points for the corporations W and C, similarly. Appropriated to the access control apparatus 1010-6 are ICS network addresses "9922" and "9933", serving as connection points for the corporations Y and B, and similarly appropriated to the access control apparatus 1010-8 are ICS network addresses "9944" and "9955", serving as connection points for the corporations Z and D. Here, in the embodiment shown in FIGS. 39 and 40, etc., the corporations X, Y and so forth, which are given as examples of users, may be differing locations within a single corporation which performs the intra-corporation communication, or may be different corporations which perform the inter-corporation communication.

An interface unit 1132-5 is provided in the conversion unit 1032-5 within the FR exchange 10132-5, this interface unit 1132-5 handling the processing of rectifying interfacing of the communication line 1812-5 connecting the access control apparatus 1010-5 and the FR exchange 10132-5, and the communication line 1812-7 connecting the access control apparatus 1010-7 and the FR exchange 10132-5 (physical layers, data link layer protocol). The conversion unit 1032-5 is comprised of a processing device 1232-5, and also an FR address conversion table 1532-5 for call setting with SVC, and a DLC address conversion table 1432-5 for converting addresses from ICS network addresses used by both SVC and PVC to logic channel. Also, the FR exchange 10132-5 connects the FR address administration server 1632-5 serving as an information processing device for storing the FR address conversion table with, in the case of using PVC, the DLC address administration server 1732-5 serving as an information processing device for storing the DLC address conversion table, thereby performing an information processing relating to address conversion. The components making up the FR exchange 10132-6 are the same as the description given regarding the FR exchange 10132-5. In the present embodiment, the access control apparatuses 1010-5 and 1010-7 are connected to the FR exchange 10132-5 via the communication lines 1812-5 and 1812-7, respectively, and also, the access control apparatuses 1010-6 and 1010-8 are connected to the FR exchange 10132-6 via the communication lines 1812-6 and 1812-8, respectively. An FR address "2977" unique to the network is set to the conversion unit 1032-5 within the FR exchange 10132-5, and an FR address "2999" unique to the network is set to the conversion unit 1032-6 within the FR exchange 10132-6. The FR exchanges 10132-5 and 10132-6 are connected via the FR relay network, but in the present embodiment, connecting is made via the FR exchange 10132-7 representing the FR relay network.

(3) Flow of Packets Using SVC:

An embodiment wherein the network within an ICS is configured of an FR network, and SVC is applied as a communication path within the FR network, will be described with an example of an ICS user packet sent from a terminal of the corporation X toward a terminal of the corporation Y, with reference to FIGS. 39 and 40.

<<Preparation>>

A receiving ICS network address indicating the destination of the ICS network packet to be transferred from the conversion unit 1032-5 to the FR network, a receiving FR address for indicating the other party for call setting of the logic channel on the FR network, and channel capabilities such as communication speed requested by the logic channel, are registered in the FR address conversion table 1532-5 within the conversion unit 1032-5 inside the FR exchange 10132-5. Also, similar registration is made to the FR address conversion table 1532-6.

In the embodiment, the values set in the FR address conversion table 1532-5 are as follows: "9922" which is the ICS network address appropriated to the ICS logic terminal of the access control apparatus 1010-6 is set as the communication address of the corporation Y, and the FR address "2999" which is uniquely appropriated to the conversion unit 1032-6 within the FR network is registered as the receiving FR address. In the present embodiment, a communication speed of 64 Kbps is set as the channel capabilities. The contents registered to the FR address conversion table 1532-5 are also written to the FR address administration server 1632-5.

The values set in the FR address conversion table 1532-6 are as follows: value "7711" which is the ICS network address appropriated to the ICS logic terminal of the access control apparatus 1010-5 is set as the communication address of the corporation X and the FR address "2977" which is uniquely appropriated in the FR network to the conversion unit 1032-5 within the FR exchange 10132-5 to which the access control apparatus 1010-5 is connected is registered as the receiving FR address. In the present embodiment, a communication speed of 64 Kbps is set as the channel capabilities. The contents registered to the FR address conversion table 1532-6 are also written to the FR address administration server 1632-6.

<<Transferring ICS Network Packets from Access Control Apparatus>>

The ICS user packet sent toward the terminal of the corporation Y connected to the access control apparatus 1010-6 via the access control apparatus 1010-5 is ICS-encapsulated upon passing through the access control apparatus 1010-5, and becomes an ICS network packet F1 having the transmitting ICS network address "7711" and the receiving ICS network address "9922" as an ICS packet header. The ICS network packet F1 is sent from the access control apparatus 1010-5 to the FR exchange 10132-5, and reaches the conversion unit 1032-5 via an interface unit 1132-5 which processes conversion/rectifying of electric signals in the communication path. The following is a description thereof made with reference to the flowchart in FIG. 43.

<<Obtaining a DLCI>>

Once the conversion unit 1032-5 receives the ICS network packet F1 (Step S1701), there is the need to request a DLCI of the SVC logic channel determined by the relation of the transmitting ICS network address "7711" and the receiving ICS network address "9922" in the ICS packet header, in order to correctly transfer the received packet F1 to the FR exchange 10132-5. In the case that the communication is based on SVC, there are cases that the logic channel corresponding with the communication path is established at the time of receiving the ICS network packet, and cases in which the logic channel has not yet been established. In order to find out whether or not the logic channel has been established, the processing device 1232-5 first searches whether or not a logic channel corresponding with the pair of a transmitting ICS network address "7711" and a receiving ICS network address "9922" is registered in the DLC address conversion table 1432-5 (Step S1702), and in the event that there is registration here, establishment of the logic channel can be thus confirmed. That is, the fact that the logic channel corresponding with the pair of transmitting ICS network address "7711" and receiving ICS network address "9922" is "16" is obtained, and further, it can be found that this logic channel is communicating based on SVC, from the value "10" of the channel type obtained at the same time. In the event that there is no such registration on the DLC address conversion table 1432-5, the requested logic channel is established with the latter-described <<call setting>>, and DLCI is obtained from the information registered to the DLC address conversion table 1432-5 at that point (Step S1703).

<<Call Setting>>

Regarding the above-mentioned case wherein "there is no registration of a DLCI corresponding with a communications path determined by correspondence between a transmitting ICS network address and a receiving ICS network address on the DLC address conversion table 1432-5", i.e., in the case that there is no DLCI corresponding with this communications path established yet, it becomes necessary to perform the following call setting, to establish a logic channel within the FR network comprising ICS 925. An example of operation of the call setting will now be described.

The processing device 1232-5 of the conversion unit 1032-5, upon making reference to the DLC address conversion table 1432-5 and finding that there is no registration of a DLCI corresponding with the pair of transmitting ICS network address "7711" and receiving ICS network address "9922" (Step S1702), the processing device 1232-5 of the conversion unit 1032-5 refers to the DLC address conversion table 1532-5, finds the receiving ICS network address "9922" registered in the DLC address conversion table 1532-5 matching the receiving ICS network address "9922", and obtains transmitting FR address "2999" corresponding thereto and channel capabilities "64K" corresponding thereto, and so forth (Step S1705). As described in the above <<Preparation>> section, this transmitting FR address "2999" is an address which is uniquely appropriated within the FR network to the conversion unit 1032-6 in the FR exchange 10132-6 to which the access control apparatus 1010-6 is connected, this access control apparatus 1010-6 having the ICS logic terminal provided with a receiving ICS network address "9922".

The processing device 1232-5 uses the obtained transmitting FR address "2999" to perform a request for call setting to the FR exchange 10132-5, and also requested at this time is channel capabilities such as communication speed of the logic channel simultaneously obtained from the FR address conversion table 1532-5 and so forth (Step S1706). The FR exchange 10132-5, upon receiving the call setting request, uses a signal method which is provided standard to FR exchanges proper as known technique to establish a logic channel within the FR network which reaches the FR exchange 10132-6. The DLCI appropriated for identification of the logic channel is notified from the FR exchanges to conversion units 1032-5 and 1032-6 therein, but in the event that this is based on stipulations of a signal method according to known technique, the value notified from the calling party FR exchange 10132-5 (e.g., "16") and the value notified from the receiving party FR exchange 10132-3 (e.g., "26") may not be the same value. At the conversion unit 1032-5, the DLCI "16" which is notified from the FR exchange 10132-5 is registered in the FR address conversion table 1432-5 along with the transmitting ICS network address "7711" and the receiving ICS network address "9922" (Step S1707), and stores these on the FR address conversion table 1432-5 while the connection of the above logic channel is established. When the logic channel connection is no longer necessary, the conversion unit 1032-5 requests call release of the logic channel to the FR exchange 10132-5, and at the same time deletes the registration corresponding with DLCI "16" on the FR address conversion table 1432-5. Registration to the FR address conversion table 1432-6 in the conversion unit 1032-6 will be described later.

<<Packet Transfer>>

The processing device 1232-5 of the conversion unit 1032-5 converts the ICS network packet F1 received from the access control apparatus 1010-5 into a FR packet shown in FIG. 38 according to the logic channel (DLCI "16") established according to the above description, and further performs the conversion into FR packets and transfers to the relay FR exchange 10132-7 (Step S1704).

<<Transfer of FR Packets>>

According to the above-described method, the FR packet S1 obtained by converting the ICS network packet F1 is transferred from the FR exchange 10132-5 to the relay FR exchange 10132-7, and further is transferred to the FR exchange 10132-6 as FR packet S2. The following is a description thereof with reference to the flowchart in FIG. 44.

<<Operation Following Arrival of Packet>>

Once the FR packet S2 reaches the FR exchange 10132-6 (Step S1710), this FR packet S2 is transferred from the FR exchange 10132-6 to the conversion unit 1032-6. At the conversion unit 1032-6, as shown in FIG. 38, an ICS network packet is restored from the received FR packet (Step S1711). In FIG. 40, the restored ICS network packet is shown as an ICS network packet F2, but the contents thereof are identical to that of the ICS network packet F1. The ICS network packet F2 is transferred to an access control apparatus determined by the receiving ICS network address "9922" in the header thereof, i.e., to access control apparatus 1010-6 which has an ICS logic terminal appropriated with ICS network address "9922" (Step S1712).

At this time, at the conversion unit 1032-6, the transmitting ICS network address "7711", the receiving ICS network address "9922", the channel type "10" indicating the fact this is SVC identified at the point of receiving the call, and DLCI "26" appropriated at the time of call setting of the SVC logic channel are registered in the FR address conversion table 1432-6 (Step S1714), and at this time, the transmitting ICS network address "7711" of the ICS network packet F2 is written to the receiving ICS network address of the FR address conversion table 1432-6, and the receiving ICS network address "9922" is written to the transmitting ICS network address of the FR address conversion table 1432-6, i.e., these are written in reverse positions. However, if at the point of registration an item already exists within the FR address conversion table 1432-6 identical to that regarding which registration is being attempted, no registration is made. The address conversion information registered in the FR address conversion table 1432-6 is stored on the DLC address conversion table 1432-6 while the connection of the logic channel having a corresponding logic channel (in this example, DLCI "26") is established.

<<Reverse Packet Flow>>

Now, description of the case of reverse flow of the ICS packet, i.e., flow from the corporation Y to the corporation X, will be made with reference to FIGS. 39 and 40, under the presumption that call setting of the SVC logic channel has been made according to the above description.

An ICS user packet sent out from the corporation Y to the corporation X is ICS-encapsulated upon passing through the access control apparatus 1010-6 and is converted into an ICS network packet F3 having the transmitting ICS network address "9922" and the receiving ICS network address "7711" in the header portion thereof, and is transferred to the conversion unit 1032-6 within the FR exchange 10132-6. The processing following the flow shown in FIG. 43 as described above is performed by the processing device 1232-6 of the conversion unit 1032-6, but the FR address conversion table 1432-6 in the conversion unit 1032-6 has registered therein a DLCI "26" with a channel type "10" which means SVC, corresponding with transmitting ICS network address "9922" and receiving ICS network address "7711", so the system operates following the flow (1) shown in FIG. 43, thereby converting the ICS network packets F3 into an FR packet (FR packet S3) and transferring, with regard to DLCI "26".

The FR packet S3 is relayed and transferred by the relay FR exchange 10132-7, becomes FR packet S4 and reaches the FR exchange 10132-5. The FR packet S3 is received via the logic channel having DLCI "16" in the conversion unit 1032-6 thereof, and restored into an ICS network packet F4 having identical contents with the ICS network packet F3. In the conversion unit 1032-5, the pair of the transmitting ICS network address "9922" and the receiving ICS network address "7711" in the header of the ICS network packet F4 is already registered in the FR address conversion table 1432-5 in reverse fashion, so registration to the FR address conversion table is not performed, and the ICS network packet F4 is transferred to the access control apparatus 1010-5.

<<Example of Application to Half-Duplex Communication>>

The above description has been made with reference to cases wherein an ICS packet is transferred from the corporation X to the corporation Y, and reverse from the corporation Y to the corporation X with an network within ICS 925 having been configured of an FR network, being carried out with a single SVC logic channel. For example, applying the transfer and reverse transfer to a request packet to a server terminal of the corporation Y to be connected to the ICS from a client terminal of the corporation X to be connected to the ICS (transfer), and a response packet to the request packet from the client terminal of the corporation X to server terminal of the corporation Y (reverse transfer) results in an application example of half-duplex communication in which one-way communication is performed at times, and both-way communication is realized by switching the communication direction by time frames.

<<Example of Application to Full-Duplex Communication>>

The logic channel set on the FR network is capable of full-duplex communication, i.e., simultaneous both-way communication, due to the FR stipulations. For example, applying the transfer and reverse transfer to request packets to a plurality of server terminals of the corporation Y to be connected to the ICS from a plurality of client terminals of the corporation X to be connected to the ICS (transfer), and response packets to the request packets from the plurality of client terminals of the corporation X to the plurality of server terminals of the corporation Y (reverse transfer) results in asynchronous transfer of packets between the client terminals and the server terminals, so simultaneous both-way communication is conducted on the single SVC logic channel serving as the communication path, thereby making for an application example of full-duplex communication.

(4) Flow of Packets Using PVC:

An embodiment wherein the network within the ICS 925 is configured with an FR network and PVC is applied as a communication path within the FR network will be described with an example of an ICS user packet sent from a terminal of the corporation W toward a terminal of the corporation Z.

<<Preparation>>

A transmitting ICS network address of an ICS network packet to be transferred to the FR network from the conversion unit 1032-5, a receiving ICS address, the DLCI of the PVC fixed on the FR network (indicating the communication path between the FR exchange 10132-5 and the FR exchange 10132-6), and the channel type indicating that the DLCI is PVC, are registered in the FR address conversion table 1432-5. This registration is different from the case of SVC, in that registration is made in the FR address conversion table 1432-5 at the same time that the PVC logic channel is set in the FR exchanges (10132-5, 10132-5, 10132-6) serving as the communication path, and is saved in a fixed manner while the communication path is necessary, i.e., until the setting of the PVC logic channel is canceled. Also, the registration is made to the DLC address conversion table 1432-6 in the same manner. Incidentally, the DLCI of PVC is appropriated to the respective FR exchanges at the time that PVC is fixedly connected between the FR exchanges.

The values set in the DLC address conversion table 1432-5 are as follows: value "7733" which is the transmitting ICS network address appropriated to the ICS logic terminal of the access control apparatus 1010-7 is set as the communication address of the corporation W, and value "9944" which is the receiving ICS network address appropriated to the ICS logic terminal of the access control apparatus 1010-8 is set as the communication address of the corporation Z. Further, PVC logic channel ID "18" which is appropriated to the FR exchange 10132-5 is set as the DLCI, and value "20" is set for the channel type, indicating PVC. Also, settings for registering to the DLC address conversion table 1432-5 are written to the DLC address administration server 1732-5, and stored. In the same way, similar settings are made in the DLC address conversion table 1432-6 in the conversion unit 1032-6 in the FR exchange 10132-6, with the transmitting ICS network address and the receiving ICS network address reversed. In this case, even if the same PVC is being implied, the DLCI may be of a different value to the DLC address conversion table 1432-5.

The values set in the DLC address conversion table 1432-6 are as follows: value "9944" which is the transmitting ICS network address appropriated to the ICS logic terminal of the access control apparatus 1010-8 is set as the communication address of the corporation Z, and value "7733" which is the receiving ICS network address appropriated to the ICS logic terminal of the access control apparatus 1010-7 is set as the communication address of the corporation W. Further, PVC logic channel ID "28" which is appropriated to the FR exchange 10132-6 is set as the DLCI, and value "20" is set as the channel type, indicating PVC. Also, settings registered to the DLC address conversion table 1432-6 are also written to and stored in the DLC address administration server 1732-6.

<<Transferring ICS Network Packets from the Access Control Device>>

As described in Embodiment-1, the ICS user packet sent toward the terminal of the corporation Z connected to the access control apparatus 1010-8 via the access control apparatus 1010-7 is ICS-encapsulated upon passing through the access control apparatus 1010-7, and becomes an ICS network packet F5 having the transmitting ICS network address "7733" and the receiving ICS network address "9944" as an ICS packet header. The ICS network packet F5 is sent from the access control apparatus 1010-7 to the FR exchange 10132-5, and reaches the conversion unit 1032-5.

<<Obtaining a DLCI>>

The processing device 1232-5 refers to the DLC address conversion table 1432-5 using the transmitting ICS network address "7733" and the receiving ICS network address "9944" in the header of the received network packet F5, and obtains the fact that the DLCI identifying the logic channel set as a communication path for this ICS network address pair is "18". At the same time, it can be found that this logic channel is PVC, from the value "20" of the channel type obtained.

<<Transfer of Packet>>

Figure 43:
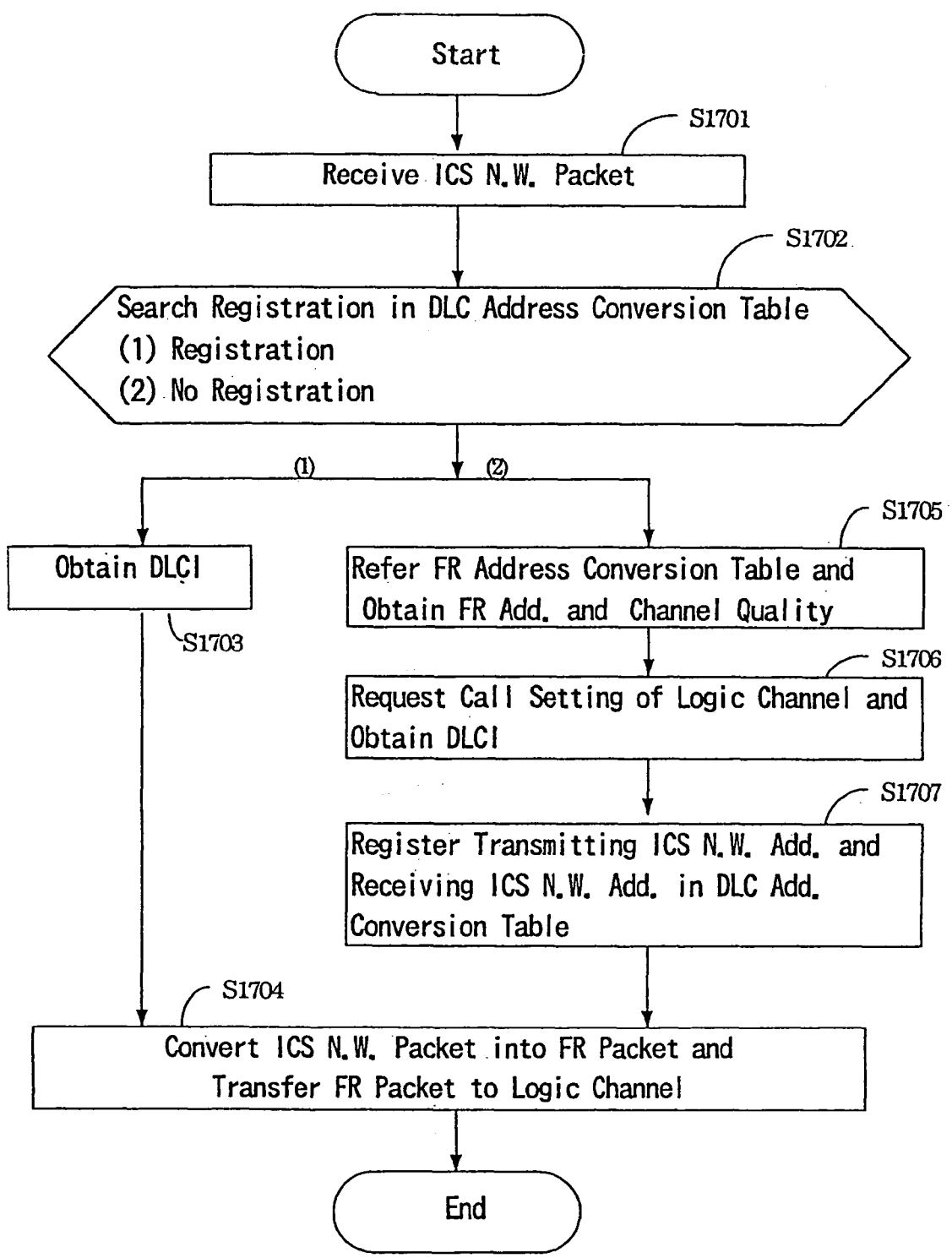
FIG. 43 is a flowchart to show a flow of packet using SVC and PVC.

The processing device 1232-5 converts the ICS network packet F5 received from the access control apparatus 1010-7 into an FR frame, and transfers it to FR exchange 10132-7, with regard to the PVC logic channel "18" obtained as described above. The method of FR packet conversion is the same as that described above in the embodiment of SVC. The above processing procedures of the conversion unit 1032-5 are as shown in FIG. 43, and PVC always follows the flow (1).

<<Transfer of FR Packet>>

The FR packet S1 comprised of a plurality of cells obtained by converting the ICS network packet F5 is transferred from the FR exchange 10132-5 to the relay FR exchange 10132-7, and further is transferred to the FR exchange 10132-6 as FR packet S2. This operation is the same as with SVC.

<<Operation Following Arrival of Packet>>

Figure 44:
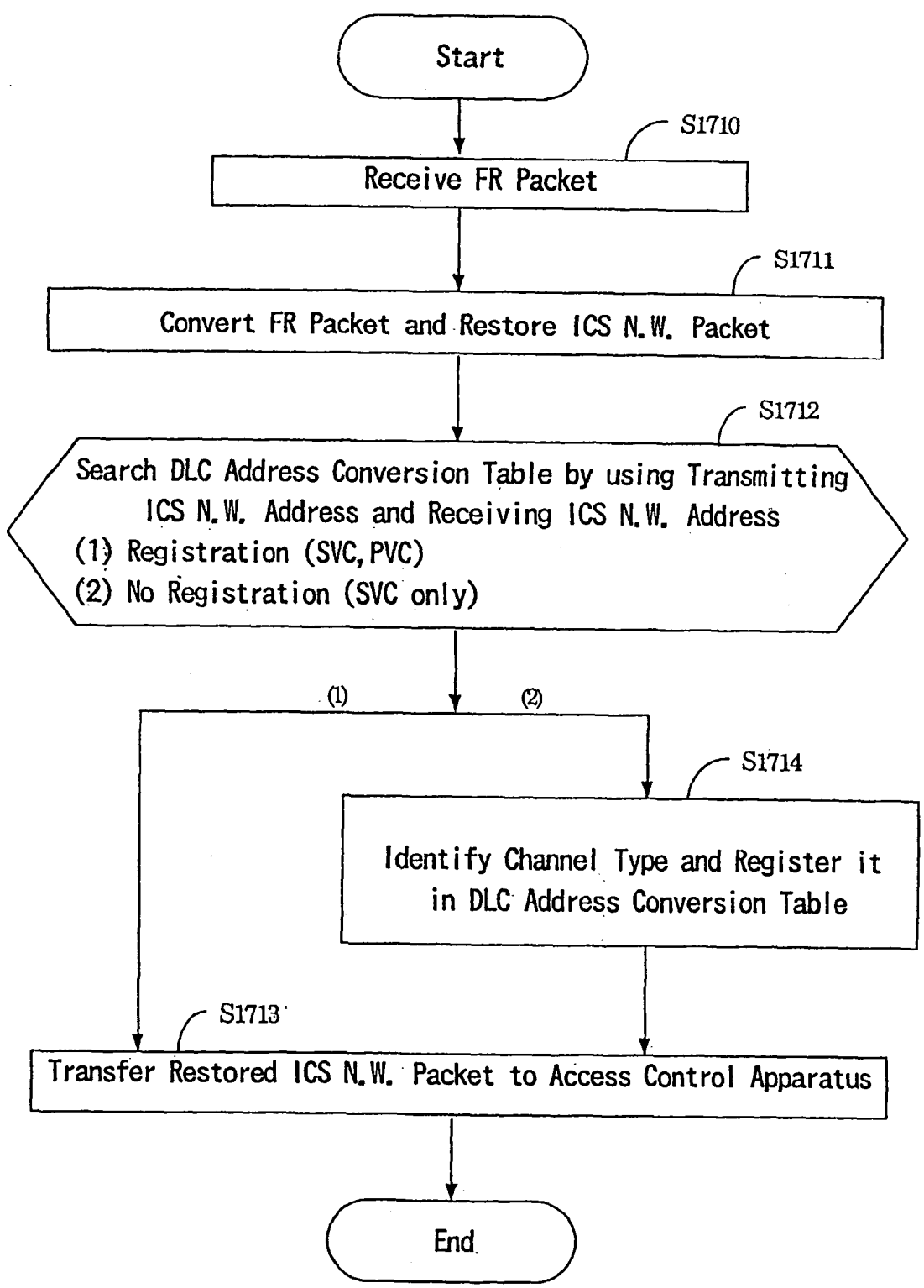
FIG. 44 is a flowchart to show a flow of using SVC and PVC.

Once the FR packet S2 reaches the FR exchange 10132-6, this FR packet S2 is transferred from the FR exchange 10132-6 to the conversion unit 1032-6 within the FR exchange 10132-6. The conversion unit 1032-6 restores the received FR packet into an ICS network packet, which is the same as with SVC. In FIG. 40, the restored ICS network packet is shown as ICS network packet F6, but the contents thereof are identical to that of the ICS network packet F5. The ICS network packet F6 is transferred to an access control apparatus determined by the receiving ICS network address "9944" in the header thereof, i.e., to access control apparatus 1010-8 which has an ICS logic terminal appropriated with the ICS network address "9944". The above processing procedures of the conversion unit 1032-6 are as shown in FIG. 44, and PVC always follows the flow (1).

<<Reverse Packet Flow>>

Next, description of the case of reverse flow of the ICS packet, i.e., flow from the corporation Z to the corporation W, will be made, with a PVC logic channel as the communication path. An ICS user packet sent out from the corporation Z to the corporation W is ICS-encapsulated into an ICS network packet F7 having the transmitting ICS network address "9944" and the receiving ICS network address "7733" in the header portion thereof when passing through the access control apparatus 1010-8, and is transferred to the conversion unit 1032-6 within the FR exchange 10132-6. The processing following the flow shown in FIG. 43 is performed by the processing device 1232-6 of the conversion unit 1032-6. In this case, the DLC address conversion table 1432-6 in the conversion unit 1032-6 has registered therein a DLCI "28" corresponding with the transmitting ICS network address "9944" and the receiving ICS network address "7733", so the system converts the ICS network packets F7 into an FR packet and transfers, with regard to DLCI "28".

The FR packet transferred through the FR network reaches the conversion unit 1032-5 of the FR exchange 10132-5, is received via the logic channel having DLCI "18", and restored into an ICS network packet F8 having identical contents with the ICS network packet F7. However, in the conversion unit 1032-5, the pair of the transmitting ICS network address "9944" and the receiving ICS network address "7733" in the header of the ICS network packet F8 is already registered in the DLC address conversion table 1432-5 in reverse fashion, and an information that the DLCI "18" as to this transmitting/receiving address pair is channel type "20" is obtained, so the registration to the FR address conversion table is not performed, and the ICS network packet F8 is transferred to the access control apparatus 1010-7.

<<Example of Application to Half-Duplex Communication>>

The above description has been made with reference to an embodiment of transferring an ICS packet using PVC with a network within ICS 925 having been configured of an FR network, but the difference between PVC and the earlier-described SVC is whether the logic channel is fixed or called and set as necessary, so there is no difference in the operation itself of transferring packets over the set logic channel. Accordingly, regarding the ICS according to the present invention, an example of application to half-duplex communication using an FR network with a PVC logic channel is the same as an example of application to half-duplex communication using a SVC logic channel.

<<Example of Application to Full-Duplex Communication>>

Due to the same reason as that regarding the example of application to full-duplex communication, an example of application to PVC full-duplex communication is the same as an example of application to SVC full-duplex communication.

(5) One-on-N or N-on-One Communication Using PVC:

In the above example, an embodiment was described wherein one logic channel was described as a communication path connecting one corporation (location) with one corporation (location), i.e., a communication path connecting one ICS logic terminal with one ICS logic terminal, but one PVC logic channel can be used as a communication path connecting one ICS logic terminal with a plurality of ICS logic terminals. Such One-on-N or N-on-One communication will be described with reference to FIGS. 45 and 46.

<<Description of Components>>

The corporation X is connected with an ICS logic terminal within the access control apparatus 1010-12 provided with the ICS network address "7711", and the access control apparatus 1010-12 is connected to the FR exchange 10132-12. With the parties to be reached from the corporation X as the corporations A through D, the corporation A is connected to an ICS logic terminal within the access control apparatus 1010-22 provided with the ICS network address "9922", and the corporation B is connected to an ICS logic terminal within the access control apparatus 1010-22 provided with the ICS network address "9933". In the same manner, the corporation C is connected to an ICS logic terminal within the access control apparatus 1010-42 provided with the ICS network address "9944", and the corporation D is connected to an ICS logic terminal within the access control apparatus 1010-42 provided with the ICS network address "9955". The access control apparatuses 1010-22 and 1010-42 are connected to the FR exchange 10132-22, and the FR exchange 10132-52 and FR exchange 10132-62 are connected via a relay network.

<<Preparation>>

Figure 45:
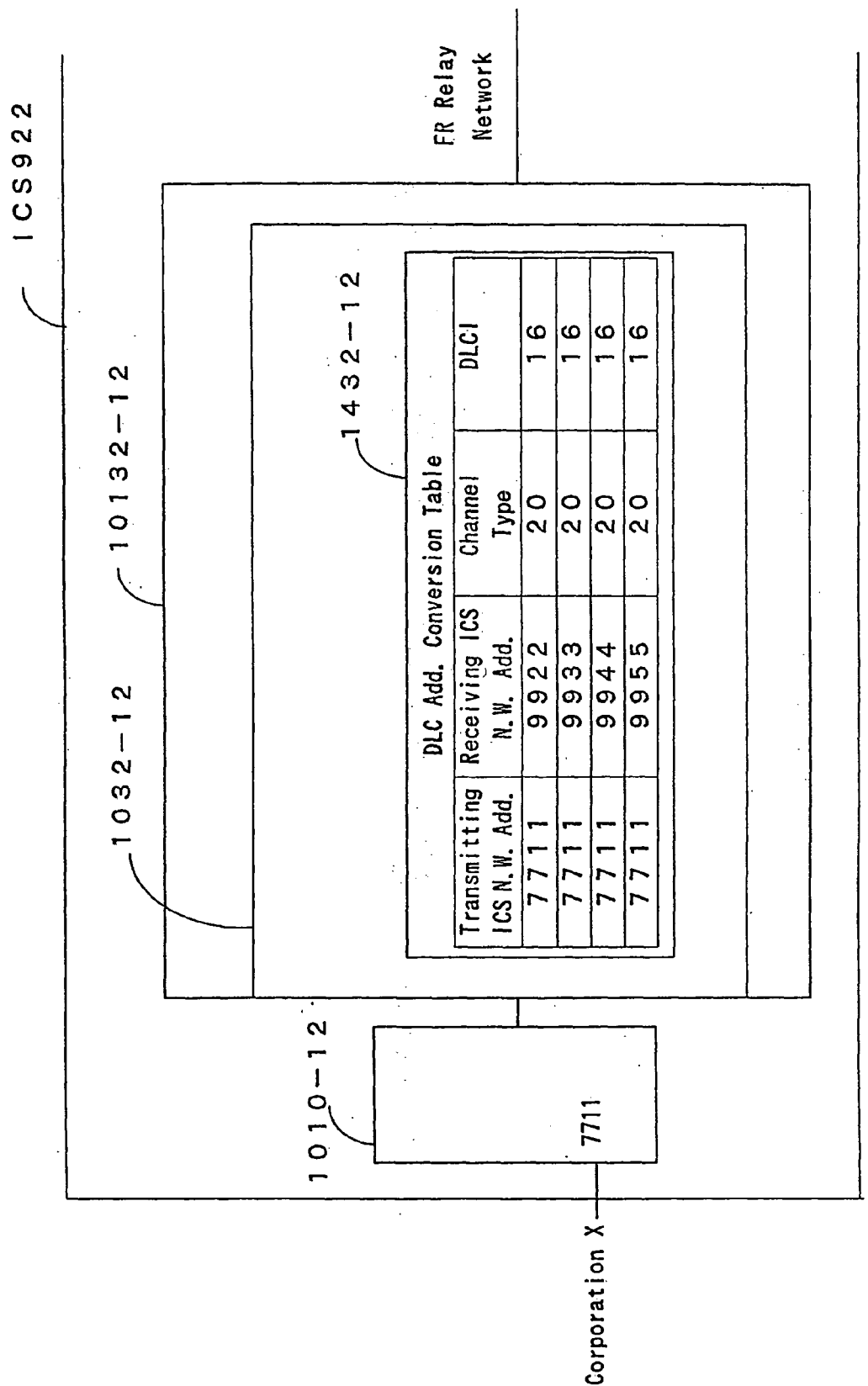
FIGS. 45 and 46 are block diagrams to show 1:N communication or N:1 communication using PVC.
Figure 46:
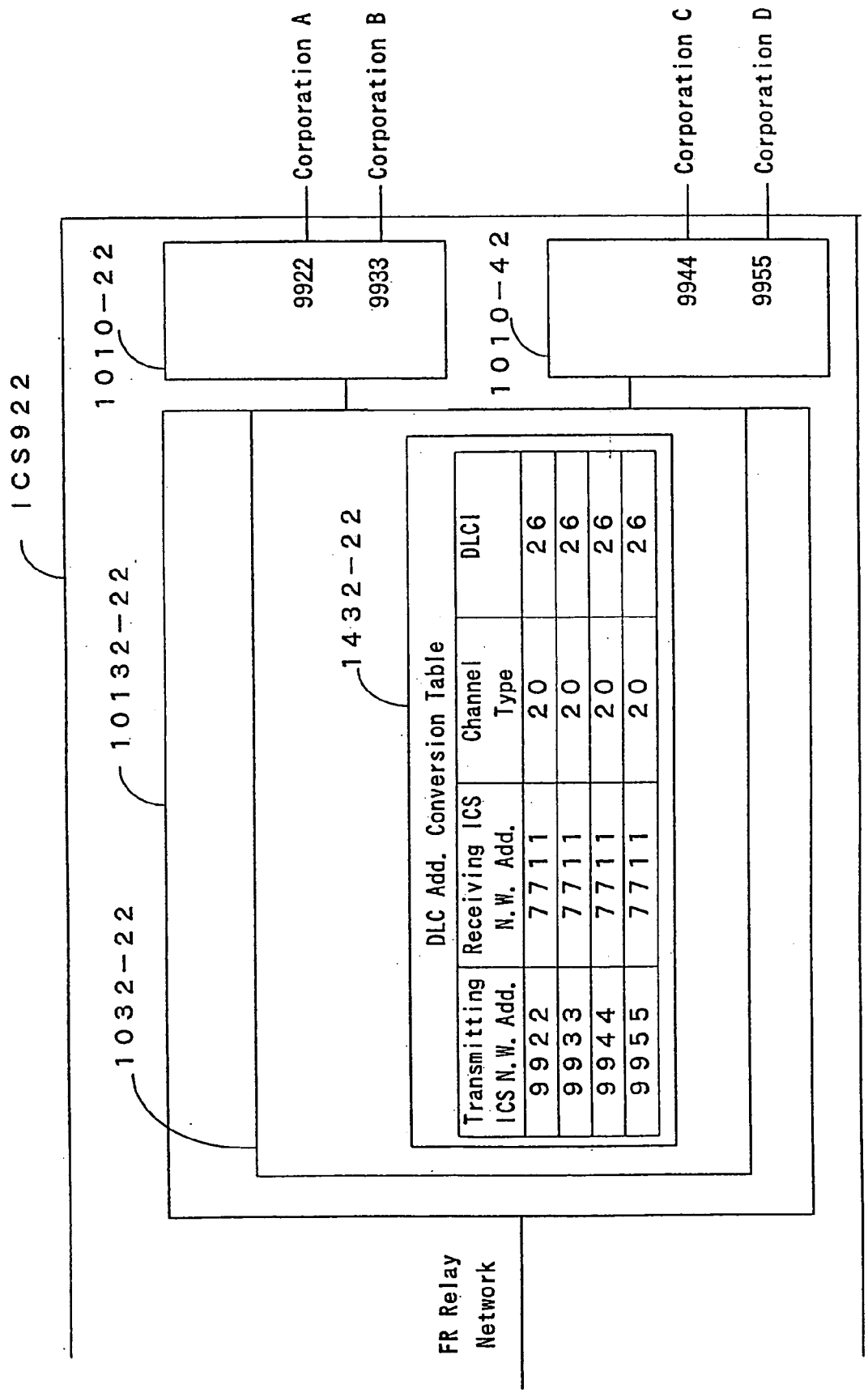

With regard to the FR exchanges 10132-12 and 10132-22, a single PVC logic channel connecting the conversion unit 1032-12 within the FR exchange 10132-12 and the conversion unit 1032-22 within the FR exchange 10132-22, setting "16" as the DLCI provided to the conversion unit 1032-12 of the logic channel, and "26" as the DLCI provided to the conversion unit 1032-22 of the logic channel. Registration such as shown in FIGS. 45 and 46 is performed regarding the DLC address conversion table 1432-12 within the conversion unit 1032-12 and the DLC address conversion table 1432-22 within the conversion unit 1032-22.

<<Frame Flow for One-On-N Communication>>

The flow of packet for one-on-N communication will be described concerning packet sent from the corporation X to each of the corporations A through D. An ICS network packet sent from the corporation X toward the corporation A, having a transmitting ICS network address "7711" and a receiving network address "9922", is transferred to the PVC logic channel with a DLCI "16", by means of making reference to the DLC address conversion table 1432-12 in the conversion unit 1032-12. An ICS network packet sent from the corporation X toward the corporation B, having a transmitting ICS network address "7711" and a receiving network address "9933", is also transferred to the PVC logic channel with a DLCI "16". An ICS network packet sent from the corporation X toward the corporation C, having a transmitting ICS network address "7711" and a receiving network address "9944", and an ICS network packet sent from the corporation X toward the corporation D, having a transmitting ICS network address "7711" and a receiving network address "9955" are transferred to the PVC logic channel with a DLCI "16" in the same manner. This indicates that one-on-N (the corporation X to the corporations A through D) communication is being performed while sharing a single PVC logic channel. Reverse packet flow, i.e., transfer from the corporations A through D to the corporation X, will be described next.

<<Packet flow for N-On-One Communication>>

The flow of packet for N-on-one communication will be described concerning packet sent to the corporation X from each of the corporations A through D. An ICS network packet sent toward the corporation X from the corporation A, having a transmitting ICS network address "9922" and a receiving network address "7711", is transferred to the PVC logic channel with a DLCI "26", by means of making reference to the DLC address conversion table 1432-22 in the conversion unit 1032-22. An ICS network packet sent toward the corporation X from the corporation B, having a transmitting ICS network address "9933" and a receiving network address "7711", is also transferred to the PVC logic channel with a DLCI "26". An ICS network packet sent toward the corporation X from the corporation C, having a transmitting ICS network address "9944" and a receiving network address "7711", and an ICS network packet sent toward the corporation X from the corporation D, having a transmitting ICS network address "9955" and a receiving network address "7711" are transferred to the PVC logic channel with a DLCI "26" in the same manner. This indicates that N-on-one (the corporations A through D to the corporation X) communication is being performed while sharing a single PVC logic channel.

(6) N-on-N Communication Using PVC:

Using the same method as one-on-N communication, one PVC logic channel can be used as a communication path connecting a plurality of ICS logic terminals with a plurality of ICS logic terminals. Such N-on-N communication will be described with reference to FIGS. 47 and 48.

<<Description of Components>>

The corporation X has ICS logic terminal address "7711" of the access control apparatus 1010-13 as the contact point thereof, the corporation Y has ICS logic terminal address "7722" of the access control apparatus 1010-13 as the contact point thereof, and the access control apparatus 1010-13 is connected to the FR exchange 10132-13. With the other party which the corporation X or corporation Y is attempting to reach as the corporation A or corporation C, the corporation A has ICS logic terminal address "9922" of the access control apparatus 1010-23 as the contact point thereof, the corporation Y has ICS logic terminal address "9944" of the access control apparatus 1010-43 as the contact point thereof. The access control apparatuses 1010-23 and 1010-43 are connected to the FR exchange 10132-23, and the FR exchanges 10132-13 and 10132-23 are connected via a relay network.

<<Preparation>>

Figure 47:
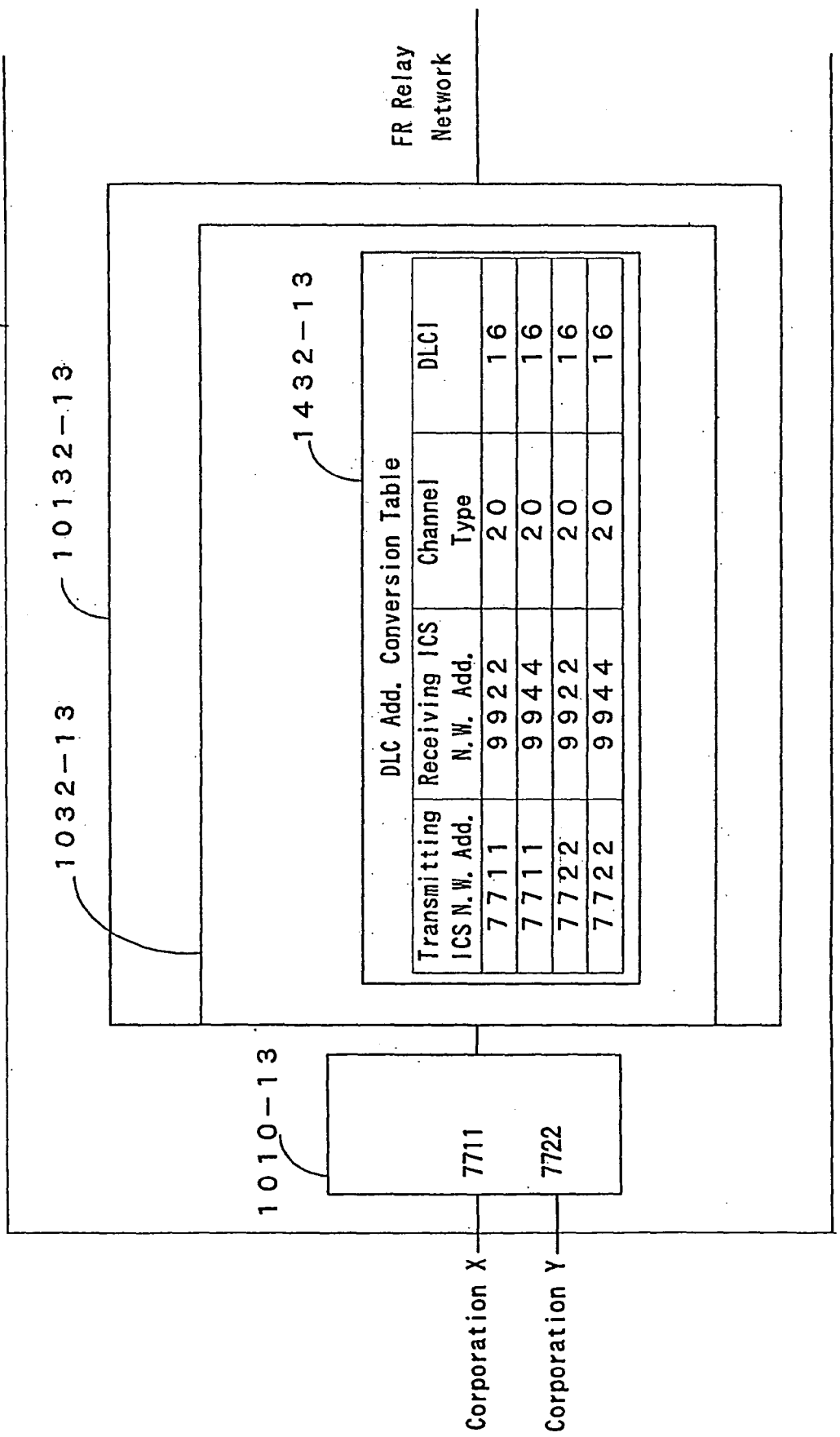
FIGS. 47 and 48 are block diagrams to show N:N communication using PVC.
Figure 48:
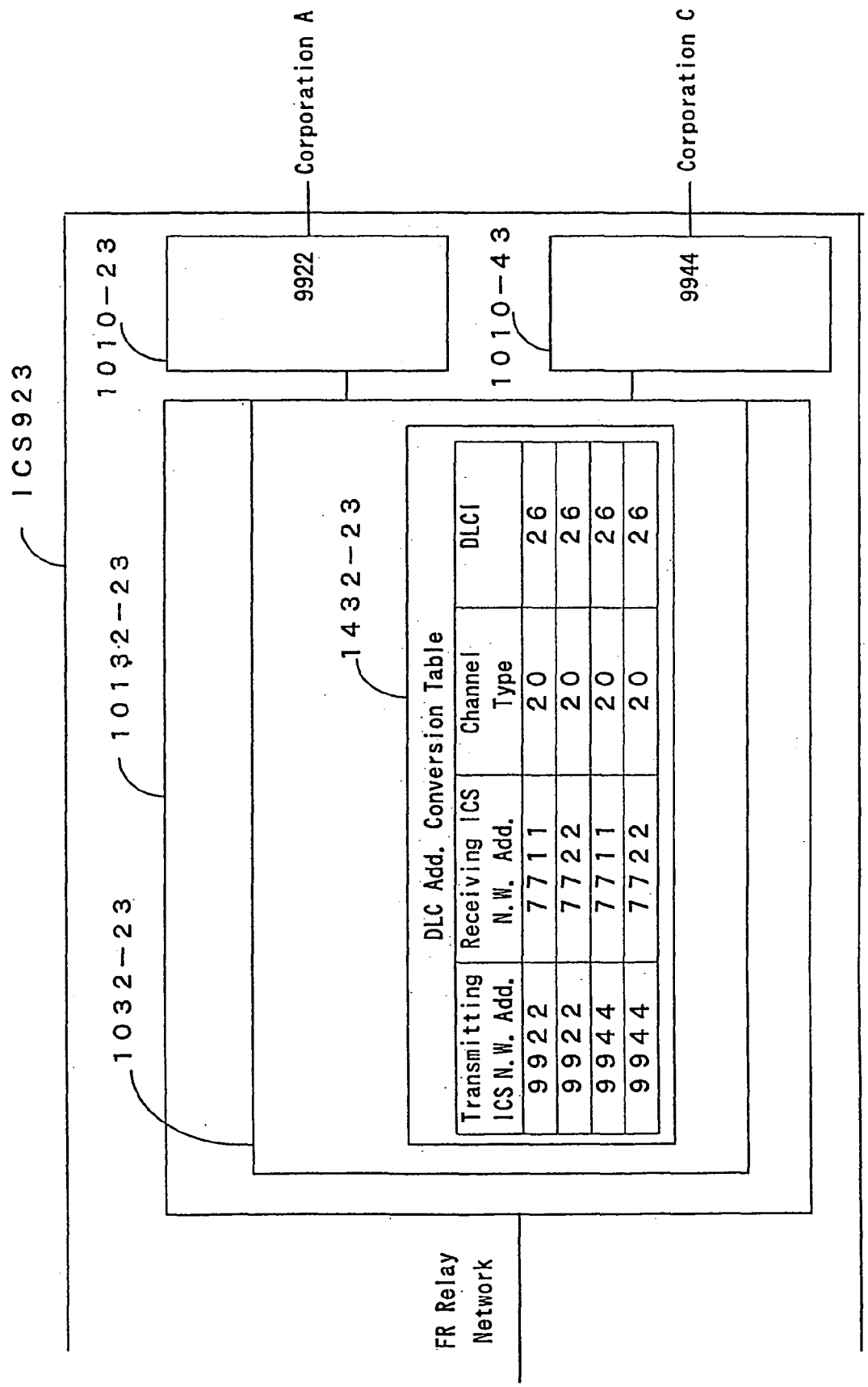
Figure 49:
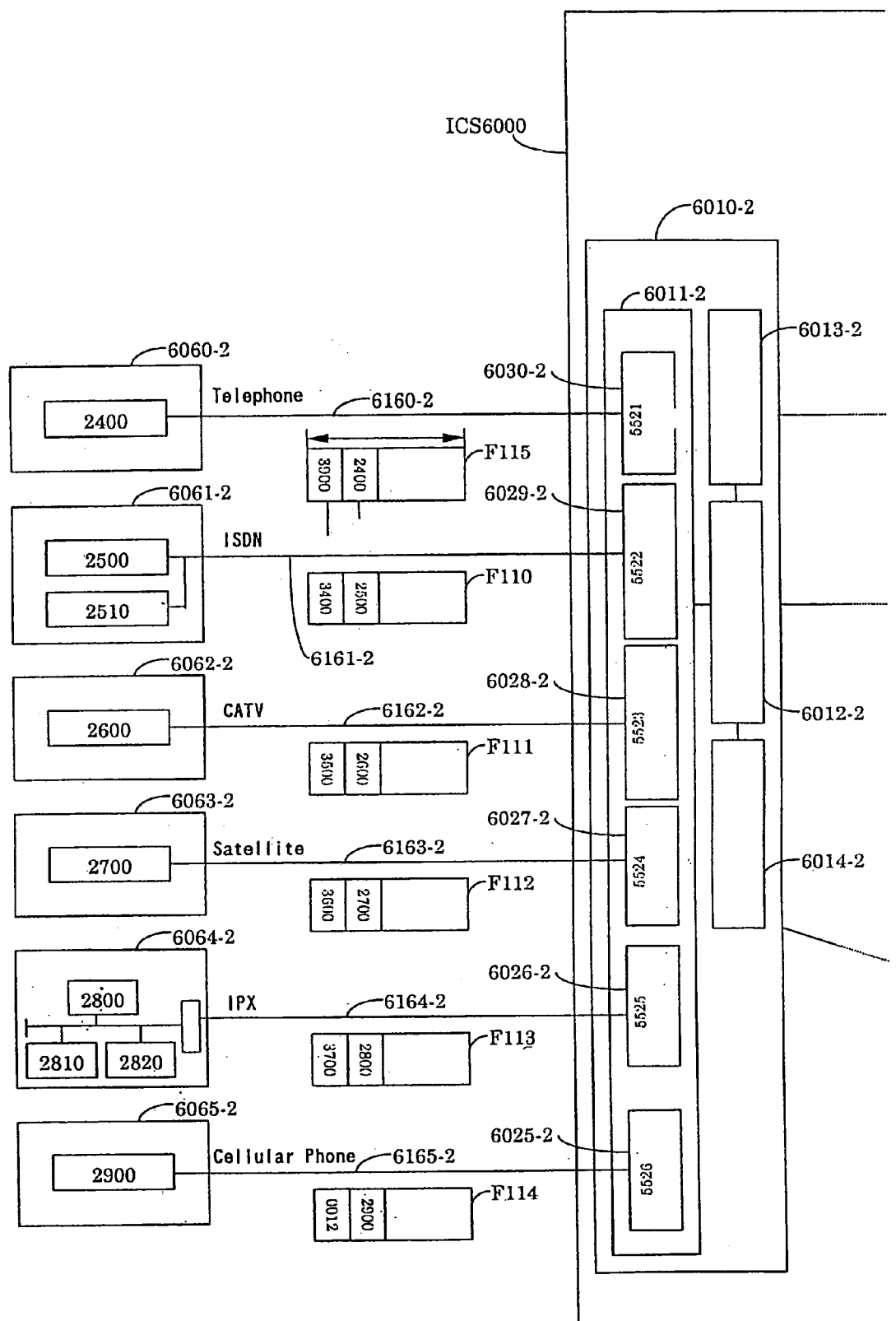
FIG. 49 is a portion of a constructional block showing a fifth embodiment (accommodation of telephone line, ISDN line, CATV line, satellite line, IPX line, cellular phone line) according to the present invention.
Figure 50:
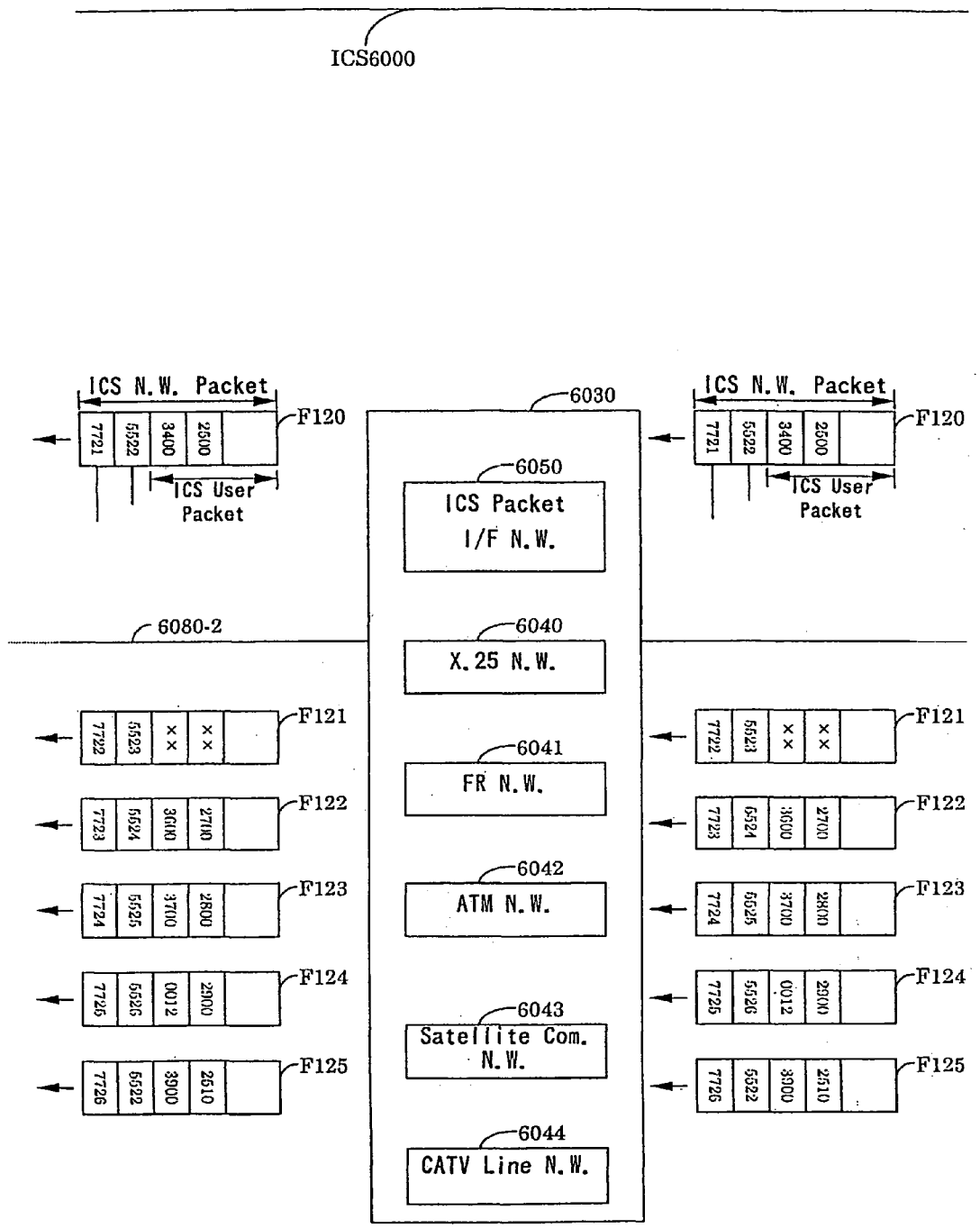
FIG. 50 is a portion of a constructional block showing a fifth embodiment according to the present invention.
Figure 51:
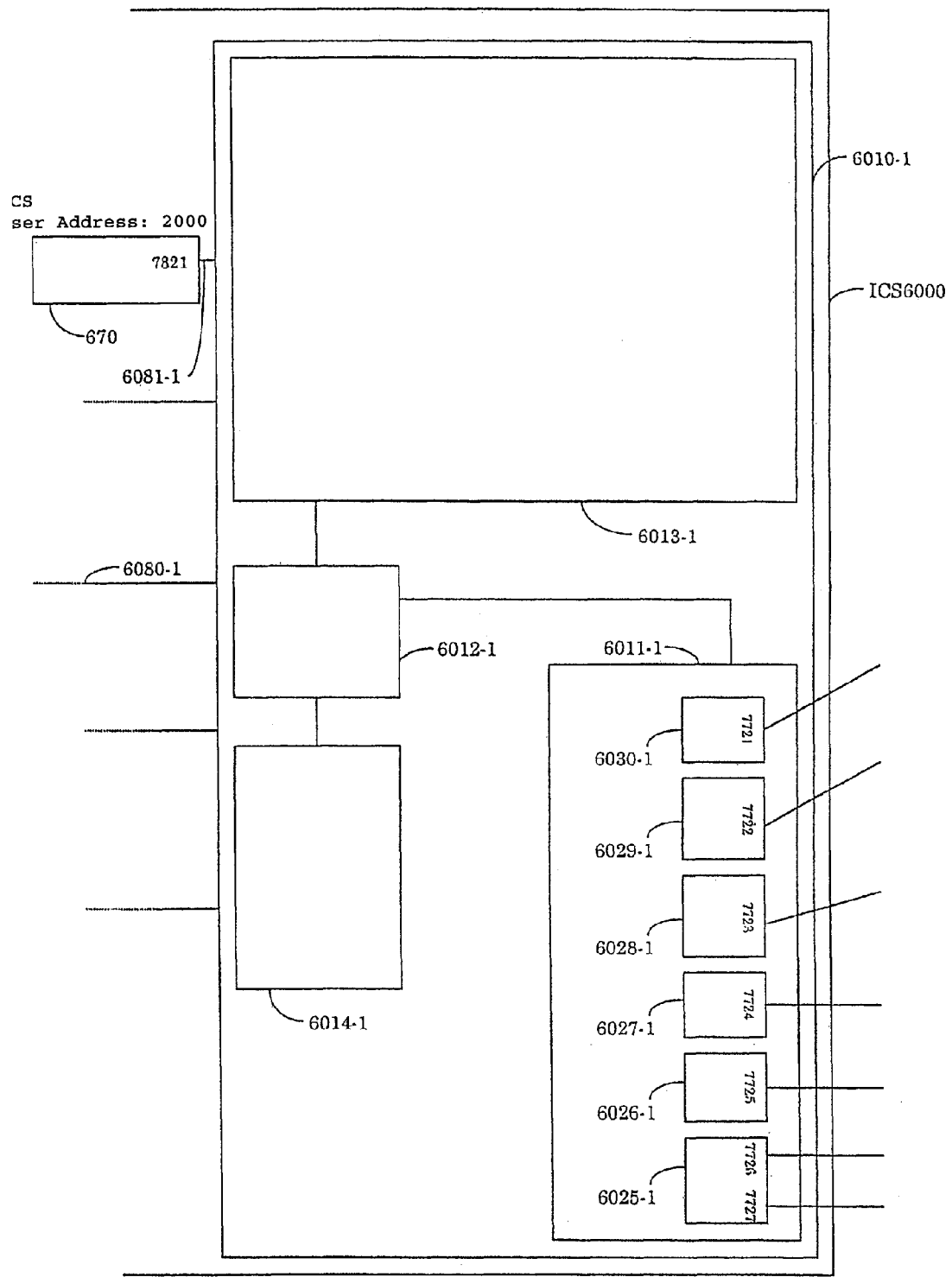
FIG. 51 is a portion of a constructional block showing a fifth embodiment according to the present invention.
Figure 52:
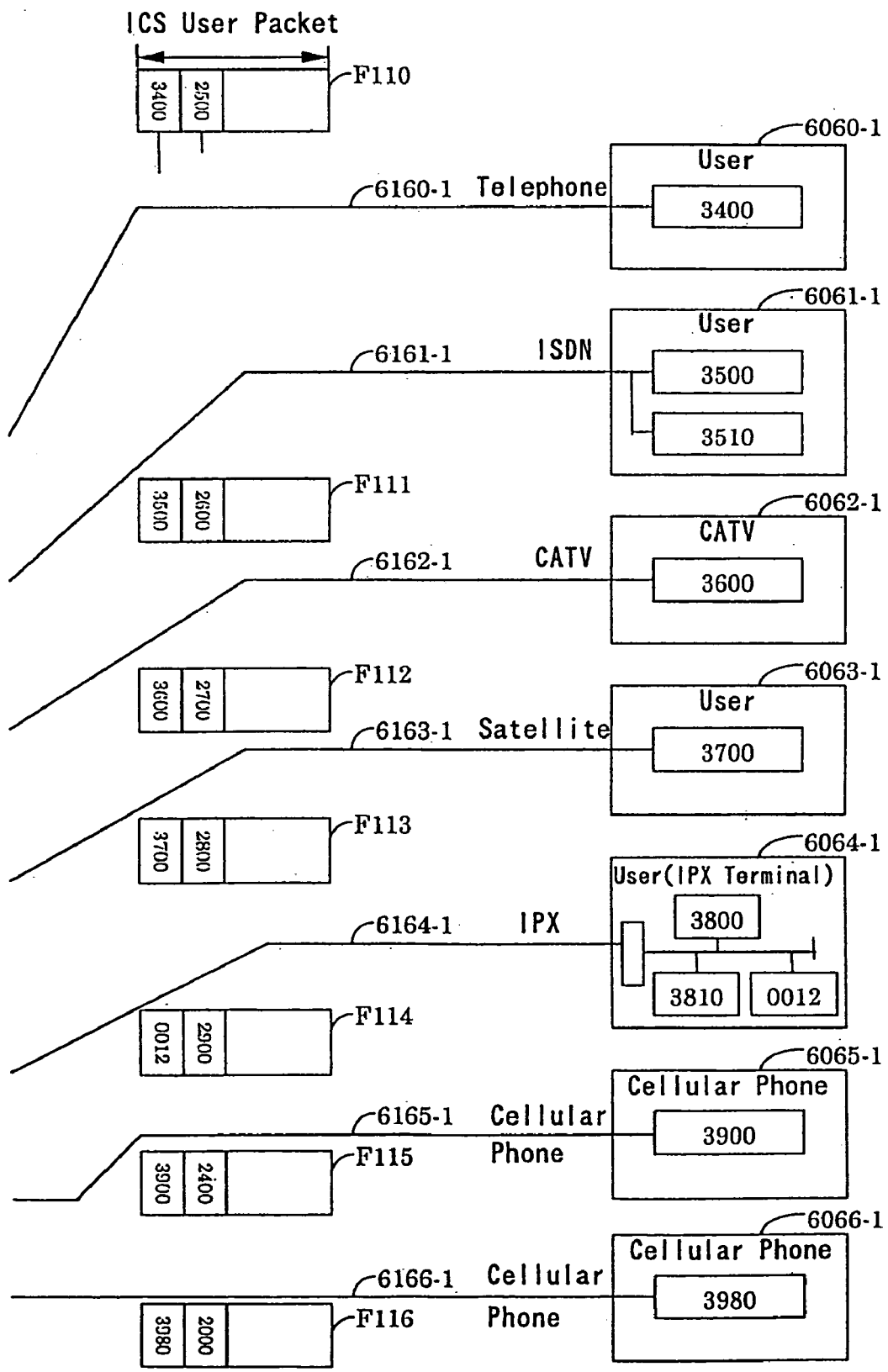
FIG. 52 is a portion of a constructional block showing a fifth embodiment according to the present invention.

With regard to the FR exchanges 10132-13 and 10132-23, a single PVC logic channel connects the conversion unit 1032-13 within the FR exchange 10132-13 and the conversion unit 1032-23 within the FR exchange 10132-23, setting "16" as the DLCI provided to the conversion unit 1032-13 of the logic channel, and "26" as the DLCI provided to the conversion unit 1032-23 of the logic channel. The registration such as shown in FIGS. 47 and 48 is performed regarding the DLC address conversion table 1432-13 within the conversion unit 1032-13 and the DLC address conversion table 1432-23 within the conversion unit 1032-23.

<<Packet flow for N-On-N Communication>>

The flow of packets for N-on-N communication will first be described concerning packets sent from the corporation X to each of the corporations A and C. An ICS network packet sent from the corporation X toward the corporation A, having a transmitting ICS network address "7711" and a receiving network address "9922", is transferred to the PVC logic channel with a DLCI "16", by means of making reference to the DLC address conversion table 1432-13 in the conversion unit 1032-13. An ICS network packet sent from the corporation X toward the corporation C, having a transmitting ICS network address "7711" and a receiving network address "9944", is also transferred to the PVC logic channel with a DLCI "16". Next, the flow of packet will be described concerning packets sent from the corporation Y to each of the corporations A and C. An ICS network packet sent from the corporation Y toward the corporation A, having a transmitting ICS network address "7722" and a receiving network address "9922", is transferred to the PVC logic channel with a DLCI "16", by means of making reference to the DLC address conversion table 1432-13 in the conversion unit 1032-13. An ICS network packet sent from the corporation Y toward the corporation C, having a transmitting ICS network address "7722" and a receiving network address "9944", is also transferred to the PVC logic channel with a DLCI "16".

Next, reverse packet flow will be described concerning packets sent to each of the corporations X and Y from the corporation A. An ICS network packet sent toward the corporation X from the corporation A, having a transmitting ICS network address "9922" and a receiving network address "7711", is transferred to the PVC logic channel with a DLCI "26", by means of making reference to the DLC address conversion table 1432-23 in the conversion unit 1032-23. An ICS network packet sent toward the corporation Y from the corporation A, having a transmitting ICS network address "9922" and a receiving network address "7722", is also transferred to the PVC logic channel with a DLCI "26". An ICS network packet sent toward the corporation X from the corporation C, having a transmitting ICS network address "9944" and a receiving network address "7711", is transferred to the PVC logic channel with a DLCI "26". An ICS network packet sent toward the corporation Y from the corporation C, having a transmitting ICS network address "9944" and a receiving network address "7722", is also transferred to the PVC logic channel with a DLCI "26". Thus, N-on-N communication is performed while sharing a single PVC logic channel.

Embodiment-5

Containment of Telephone Line, ISDN Line, CATV Line, Satellite Line, IPX Line, Cellular Phone Line As described in Embodiment-1 and Embodiment-2, connection to access control apparatuses which serve as access points is not limited to communication lines to LANs (dedicated lines, etc.), but rather, telephone lines, ISDN lines, CATV lines, satellite lines, IPX lines and cellular phone lines may also be contained. The following is a description of an embodiment.

FIG. 49 through FIG. 52 illustrate an example of a system containing telephone lines, ISDN lines, CATV lines, satellite lines, IPX lines and cellular phone lines, according to the ICS 6000. The line portions 6011-1 and 6011-2 are made up of telephone line conversion units 6030-1 and 6030-2, ISDN line conversion units 6029-1 and 6029-2, CATV line conversion units 6028-1 and 6028-2, satellite line conversion units 6027-1 and 6027-2, IPX line conversion units 6026-1 and 6026-2, and cellular phone line conversion units 6025-1 and 6025-2. The telephone line conversion units 6030-1 and 6030-2 have capabilities for conversion and reverse-conversion equivalent to physical layers and data link layers (first layer and second layer of OSI (Open Systems Interconnection) communication protocol) between the telephone lines 6160-1 and 6160-2 and the access control apparatuses 6010-1 and 6010-2. Also, the ISDN line conversion units 6029-1 and 6029-2 have capabilities for conversion and reverse-conversion equivalent to physical layers and data link layers between the ISDN lines 6161-1 and 6161-2 and the access control apparatuses 6010-1 and 6010-2, and the CATV line conversion units 6028-1 and 6028-2 have capabilities for conversion and reverse-conversion equivalent to physical layers and data link layers between the CATV lines 6162-1 and 6162-2 and the access control apparatuses 6010-1 and 6010-2. Further, the satellite line conversion units 6027-1 and 6027-2 have capabilities for conversion and reverse-conversion equivalent to physical layers and data link layers between the satellite lines 6163-1 and 6163-2 and the access control apparatuses 6010-1 and 6010-2, and the IPX conversion units 6026-1 and 6026-2 have capabilities for conversion and reverse-conversion equivalent to physical layers and data link layers between the IPX lines 6164-1 and 6164-2 and the access control apparatuses 6010-1 and 6010-2. The cellular phone conversion units 6025-1 and 6025-2 have capabilities for conversion and reverse-conversion equivalent to physical layers and data link layers between the cellular phone wireless lines 6165-1 and 6165-2 and the access control apparatuses 6010-1 and 6010-2. An example of the conversion table 6013-1 is shown in FIG. 53.

The ICS packet interface network 6050 transfers ICS network packets following the RFC791 or RFC1883 stipulations, without change in the ICS network packet format. The X.25 network 6040 accepts ICS network packets and converts these to X.25 format and transfers, and at the end reverse-converts these into ICS network packet format and outputs. The FR network 6041 accepts ICS network packets and converts these to FR format and transfers, and at the end reverse-converts these into ICS network packet format and outputs. The ATM network 6042 accepts ICS network packets and converts these to ATM format and transfers, and at the end reverse-converts these into ICS network packet format and outputs. The satellite communication network 6043 accepts ICS network packets and transfers the information using the satellite, and at the end reverse-converts these into ICS network packet format and outputs. Also, the CATV line network 6044 accepts ICS network packets and converts into CATV format packets and transfers the contents thereof, and at the end reverse-converts these into ICS network packet format and outputs.

<<Common Preparation>>

The conversion table 6013-1 within the access control apparatus 6010-1 contains the transmitting ICS network address, the sender ICS user address, the receiver ICS user address, the receiving ICS network address, the request identification and the speed as shown in FIG. 53. The request identification represents services and connections, e.g., as follows: value "1" indicates intra-corporation service, value "2" indicates inter-corporation service, value "3" indicates virtual dedicated line connection, and value "4" indicates ICS server connection. The conversion table 6013-1 contains addresses registered therein with the same method as that described in Embodiment-1 and Embodiment-2. The ICS network server 670 has an ICS user address of "2000" and an ICS network address of "7821", and is connected to the access control apparatus 6010-1 via ICS communications line 6081-1. The conversion table 6013-1 contains the receiver ICS user address "2000" of the ICS network server 670, receiving ICS network address of "7821" and request identification of "4".

Figure 54:
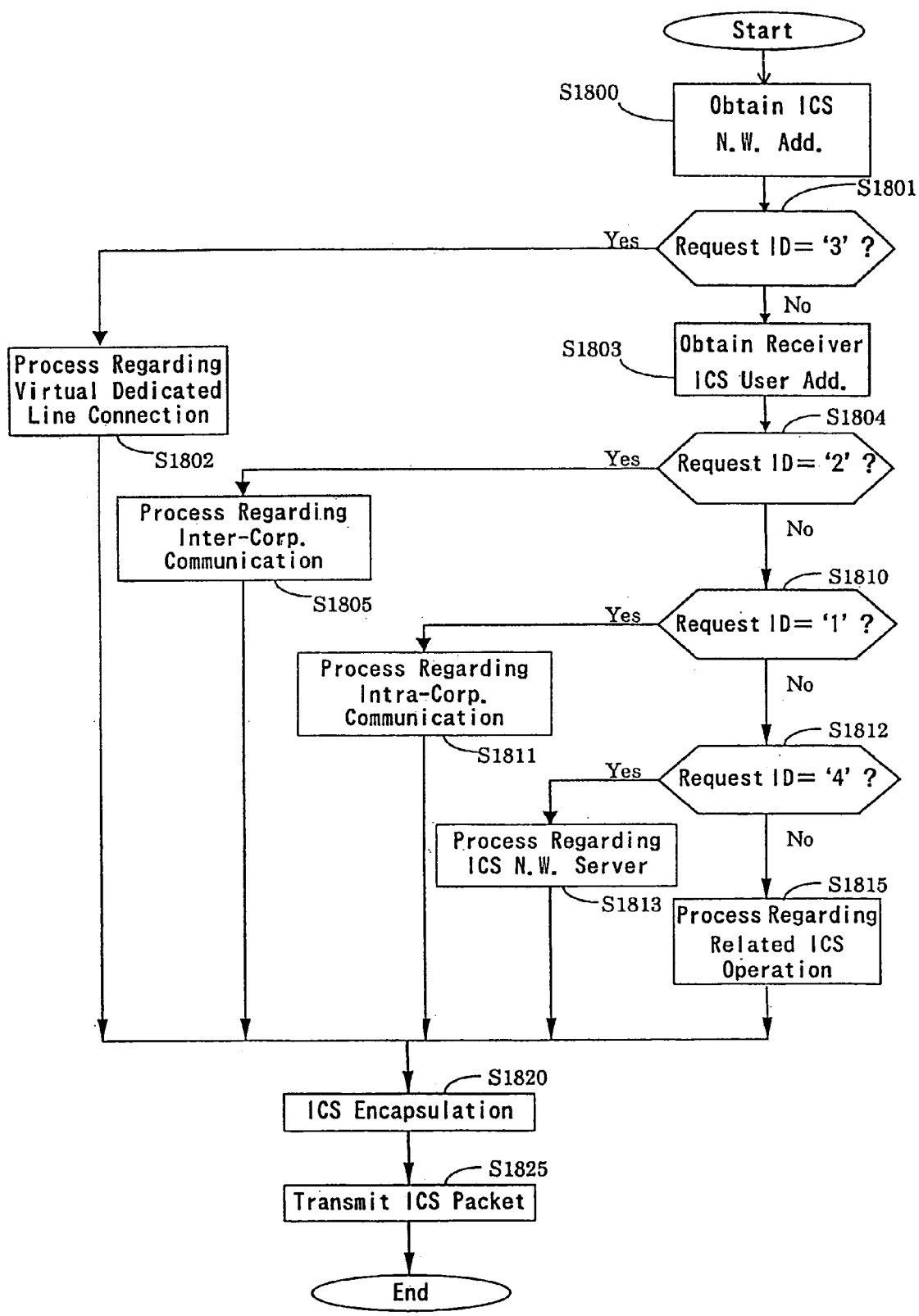
FIG. 54 is a flowchart to show an operation of a fifth embodiment.

The operation thereof is described with reference to FIG. 54.

<<Communication from a Telephone Line to an ISDN Line>>

The user 6060-1 sends out the ICS user frame F110 with a sender ICS user address "3400" and a receiver ICS user address "2500" to the access control apparatus 6010-1 via the telephone line 6160-1. The access control apparatus 6010-1 receives the ICS user packet F110 from the telephone line conversion unit 6030-1 with the ICS network address "7721" (Step S1800), and checks whether or not the ICS network address "7721" is registered on the conversion table 6013-1 with the request identification as virtual dedicated line connection "3" (Step S1801). In this case, the registration has not been made, so next, the access control apparatus 6010-1 checks that the receiver ICS user address "2500" is registered on the conversion table 6013-1 (Step S1803) and that the request identification has been registered as inter-corporation communication "2" (Step S1804). In this case, the registration has been made, so the receiving ICS network address "5522" is obtained from the conversion table 6013-1, processing such as billing related to the inter-corporation communication is performed (Step S1805), the ICS user packet F110 is ICS-encapsulated (Step S1820), converted into an ICS network packet F120, and sent to the ICS packet transfer network 6030 via ICS network communication line 6080-1 (Step S1825).

<<Communication from an ISDN Line to a CATV Line>>

The user 6061-1 sends out the ICS user packet F110 with a sender ICS user address "3500" and a receiver ICS user address "2600" to the access control apparatus 6010-1 via the ISDN line 6161-1. The access control apparatus 6010-1 receives the ICS user packet F111 from the ISDN line conversion unit 6029-1 with the ICS network address "7722" (Step S1800), and checks whether or not the ICS network address "7722" is registered on the conversion table 6013-1 with the request identification as virtual dedicated line connection "3" (Step S1801). In this case, the registration has been made, so the receiving ICS network address "5523" is obtained from the conversion table 6013-1, processing such as billing related to dedicated line connection is performed (Step S1802), the ICS user packet F111 is ICS-encapsulated (Step S1820), converted into an ICS network packet F121, and sent to the ICS packet transfer network 6030 via ICS network communication line 6080-1 (Step S1825).

Incidentally, regarding the virtual dedicated line connection, the sender ICS user address and receiver ICS user address written within the ICS network packet F111 do not have to be used in the access control apparatus. Next, the ICS network packet F121 reaches the access control apparatus 6010-2 via the FR network 6041 and the ICS network communication line 6080-2 for example, is reversely ICS-encapsulated and restored into the ICS user packet F111, and reaches the user 6062-2 connected to the CATV line 6162-2 via the CATV line unit 6028-2 which is provided with the transmitting ICS network address "5523".

<<Communication from a CATV Line to a Satellite Line>>

The user 6062-1 sends out the ICS user packet F112 with a sender ICS user address "3600" and a receiver ICS user address "2700" to the access control apparatus 6010-1 via the CATV line 6162-1. The access control apparatus 6010-1 receives the ICS user packet F112 from the CATV line conversion unit 6028-1 with the ICS network address "7723" (Step S1800), and checks whether or not the ICS network address "7723" is registered on the conversion table 6013-1 with the request identification as virtual dedicated line connection "3" (Step S1801). In this case, the registration has not been made, so next, the access control apparatus 6010-1 checks that the receiver ICS user address "2700" is registered on the conversion table 6013-1 (Step S1803) and that the request identification has been registered as inter-corporation communication "2" (Step S1804). In this case, the registration has been made as inter-corporation communication "2", so the receiving ICS network address "5524" is obtained from the conversion table 6013-1, processing such as billing related to inter-corporation communication is performed (Step S1805), the ICS user packet F112 is ICS-encapsulated (Step S1820), converted into an ICS network packet F122, and sent to the ICS packet transfer network 630 via ICS network communication line 6080-1 (Step S1825). The ICS network packet F122 reaches the access control apparatus 6010-2 via the ATM network 6042 and the ICS network communication line 6080-2 for example, is reversely ICS-encapsulated and restored into the ICS user packet F112, and reaches the user 6063-2 with the receiving ICS network address "2700".

<<Communication from a Satellite Line to an IPX Line>>

The user 6063-1 sends out the ICS user packet F113 with a sender ICS user address "3700" and a receiver ICS user address "2800" to the access control apparatus 6010-1 via the telephone line 6163-1. The access control apparatus 6010-1 receives the ICS user packet F113 from the satellite line conversion unit 6027-1 with the ICS network address "7724" (Step S1800), and checks whether or not the ICS network address "7724" is registered on the conversion table 6013-1 with the request identification as virtual dedicated line connection "3" (Step S1801). In this case, the registration has not been made, so next, the access control apparatus 6010-1 checks that the receiver ICS user address "2800" is registered on the conversion table 6013-1 (Step S1803) and that the request identification has been registered as inter-corporation communication "2" (Step S1804). In this case, the registration has been made as inter-corporation communication "2", so the receiving ICS network address "5525" is obtained from the conversion table 6013-1, processing such as billing related to inter-corporation communication is performed (Step S1805), the ICS user packet F113 is ICS-encapsulated (Step S1820), converted into an ICS network packet F123, and sent to the ICS frame transfer network 6030 via ICS network communication line 6080-1 (Step S1825). The ICS network packet F123 reaches the access control apparatus 6010-2 via the ICS packet interface 6050 and ICS network communication line 6080-2 for example, is reversely ICS-encapsulated and restored into the ICS user packet F113, and reaches the user 6064-2 with the receiving ICS network address "2800".

<<Communication from an IPX Line to a Cellular Telephone Line>>

The user 6064-1 sends out the ICS user packet F114 with a sender ICS user address "0012" and a receiver ICS user address "2900" to the access control apparatus 6010-1 via the IPX line 6164-1. The access control apparatus 6010-1 receives the ICS user packet F114 from the IPX line conversion unit 6026-1 with the ICS network address "7725" (Step S1800), and checks whether or not the ICS network address "7725" is registered on the conversion table 6013-1 with the request identification as virtual dedicated line connection "3" (Step S1801). In this case, the registration has not been made, so next, the access control apparatus 6010-1 checks that the receiver ICS user address "2900" written in the ICS user packet F114 is registered on the conversion table 6013-1 (Step S1803) and that the request identification has been registered as inter-corporation communication "2" (Step S1804). In this case, the registration has not been made as inter-corporation communication "2", so the access control apparatus 6010-1 checks whether the registration has been made as intra-corporation communication "1" (Step S1810). In this case, the registration has been made as intra-corporation communication "1", so the receiving ICS network address "5526" is obtained from the conversion table 6013-1, processing such as billing related to intra-corporation communication is performed (Step S1811), the ICS user packet F114 is ICS-encapsulated (Step S1820), converted into an ICS network packet F124, and sent to the ICS packet transfer network 6030 via ICS network communication line 6080-1 (Step S1825). The ICS network packet F124 reaches the access control apparatus 6010-2 via the CATV line network 6044 and ICS network communication line 6080-2 for example, is reversely ICS-encapsulated and restored into the ICS user packet F114, and reaches the user 6065-2 with the receiving ICS network address "2900".

<<Communication from a Cellular Telephone Line to a Telephone Line>>

The user 6065-1 sends out the ICS user packet F115 with a sender ICS user address "3900" and a receiver ICS user address "2400" to the access control apparatus 6010-1 via the cellular telephone line 6165-1. The access control apparatus 6010-1 receives the ICS user packet F115 from the cellular telephone line conversion unit 6025-1 with the ICS network address "7726" (Step S1800), and checks whether or not the ICS network address "7726" is registered on the conversion table 6013-1 with the request identification as virtual dedicated line connection "3" (Step S1801). In this case, the registration has not been made, so next, the access control apparatus 6010-1 checks that the receiver ICS user address "2400" written in the ICS user packet F115 is registered on the conversion table 6013-1 (Step S1803) and that the request identification has been registered as inter-corporation communication "2" (Step S1804). In this case, the registration has been made as inter-corporation communication "2", so the receiving ICS network address "5521" is obtained from the conversion table 6013-1, processing such as billing related to intra-corporation communication is performed (Step S1811), the ICS user packet F115 is ICS-encapsulated (Step S1820), converted into an ICS network packet F125, and sent to the ICS packet transfer network 6030 via ICS network communication line 6080-1 (Step S1825). The ICS network packet F124 reaches the access control apparatus 6010-2 via the satellite line network 6043 and ICS network communication line 6080-2 for example, is reversely ICS-encapsulated and restored into the ICS user packet F115, and reaches the user 6060-2 with the receiving ICS network address "2400".

<<Communication from a Cellular Telephone Line to an ICS Network Server>>

The user 6066-1 sends out the ICS user packet F116 with a sender ICS user address "3980" and a receiver ICS user address "2000" to the access control apparatus 6010-1 via the cellular telephone line 6166-1. The access control apparatus 6010-1 receives the ICS user packet F116 from the cellular telephone line conversion unit 6025-1 with the ICS network address "7727" (Step S1800), and checks whether or not the ICS network address "7726" is registered on the conversion table 6013-1 with the request identification as virtual dedicated line connection "3" (Step S1801). In this case, the registration has not been made, so next, the access control apparatus 6010-1 checks that the receiver ICS user address "2000" written in the ICS user packet F116 is registered on the conversion table 6013-1 (Step S1803) and that the request identification has been registered as inter-corporation communication "2" (Step S1804). In this case, the registration has not been made so the access control apparatus 6010-1 checks whether or not the request identification is registered as intra-corporation communication "1" (Step S1810). In this case, the registration has not been made, so the access control apparatus 6010-1 checks whether or not the request identification is registered as ICS network server "4" (Step S1812). In this case, the registration has been made as ICS network server communication "4", so the receiving ICS network address "7821" is obtained from the conversion table 6013-1, processing such as billing related to ICS network server communication is performed (Step S1813), the ICS user packet F115 is ICS-encapsulated (Step S1820), converted into an ICS network packet, and sent to the ICS network server 670 (Step S1825).

According to the above-described transferring methods, changing the ICS user address written into the ICS user packet allows for the sending side to select any of the following on the receiving side: telephone line, ISDN line, CATV line, satellite line, IPX line, or cellular phone line; regardless of whether the sending side is any of the following: telephone line, ISDN line, CATV line, satellite line, IPX line, or cellular phone line.

Embodiment-6

Dial-Up Router

Figure 55:
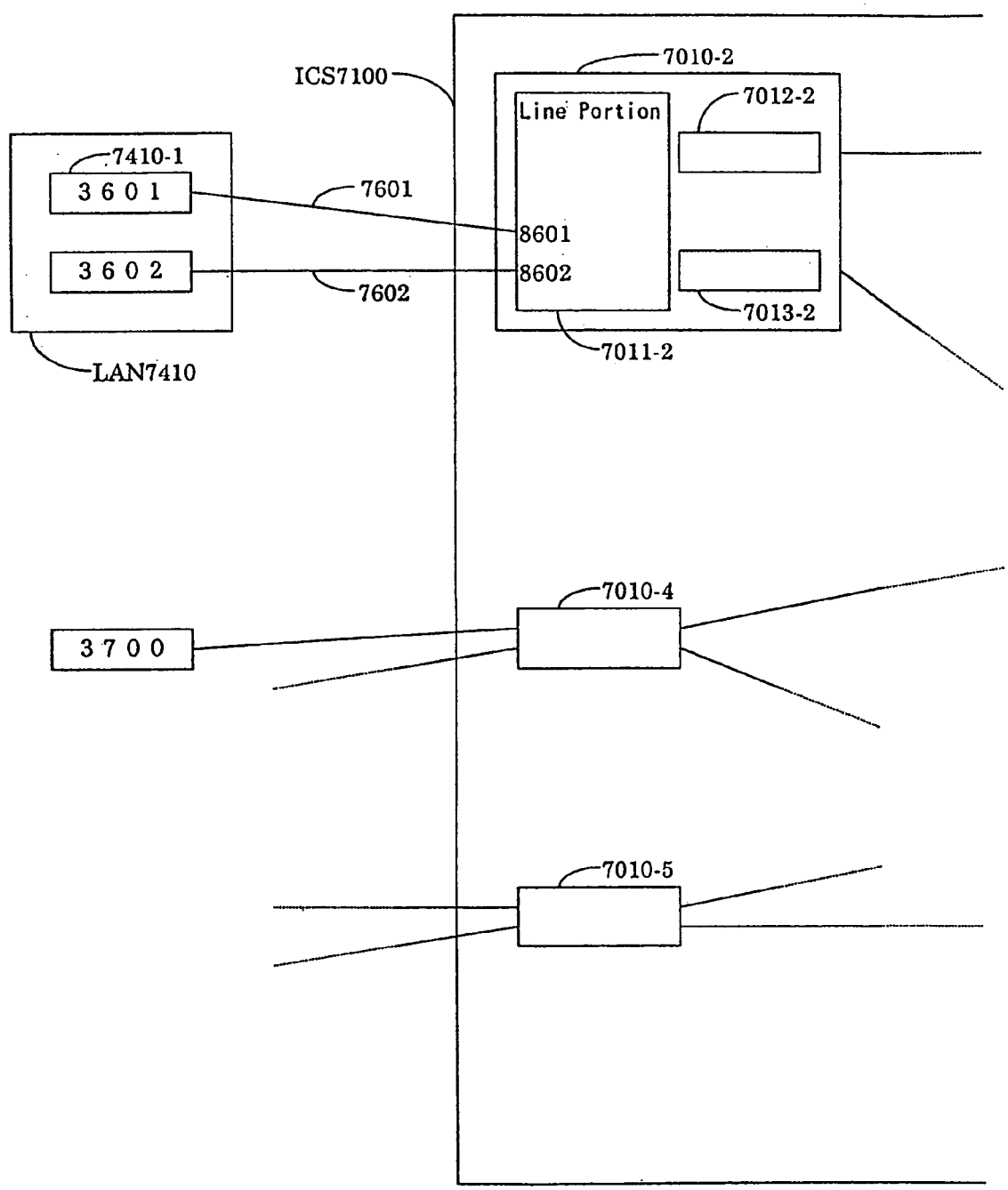
FIG. 55 is a portion of a constructional block showing a sixth embodiment according to the present invention.
Figure 56:
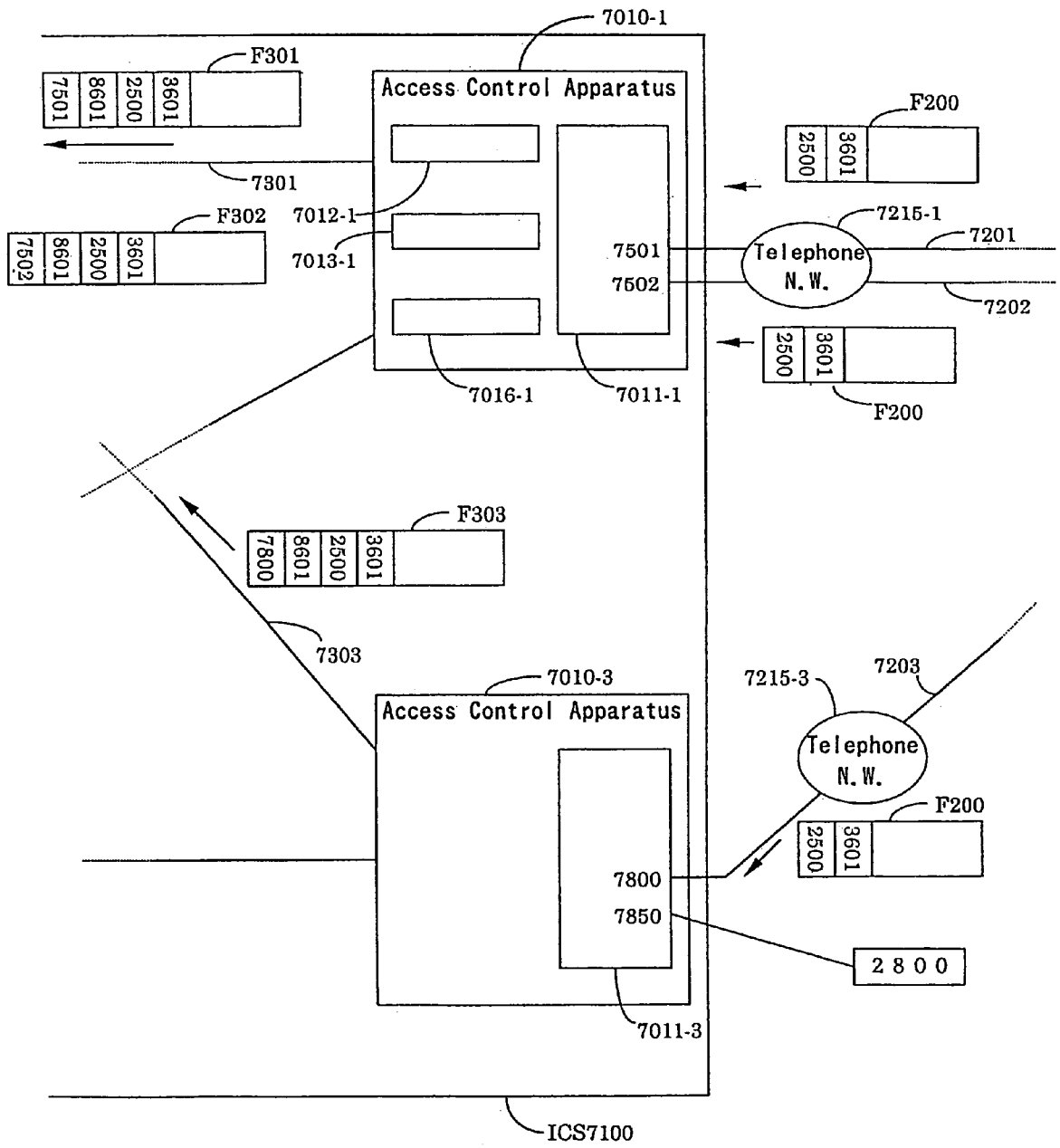
FIG. 56 is a portion of a constructional block showing a sixth embodiment according to the present invention.
Figure 57:
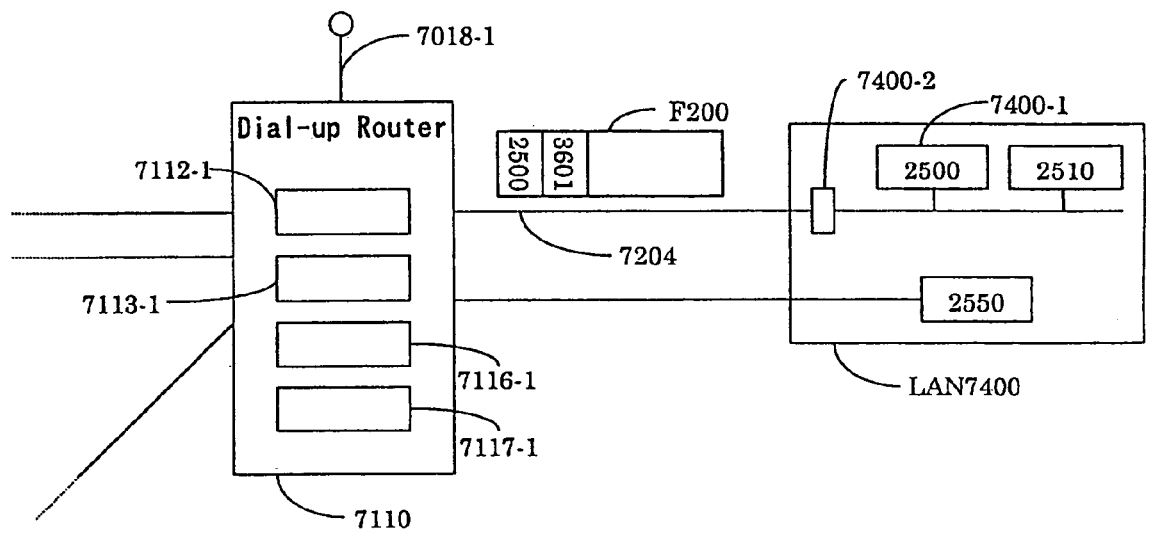
FIG. 57 is a portion of a constructional block showing a sixth embodiment according to the present invention.

An example of using a dial-up router will be described with reference to FIG. 55 through FIG. 57. A user 7400-1 within a LAN 7400 has an ICS user address "2500", and similarly, a user 7410-1 within a LAN 7410 has an ICS user address "3601". The administrator of the dial-up router 7110 enters in the router table 7113-1 of the dial-up router 7110 the telephone number specified from the receiver ICS user address and the order or priority thereof from the router table input unit 7018-1.

Figure 59:
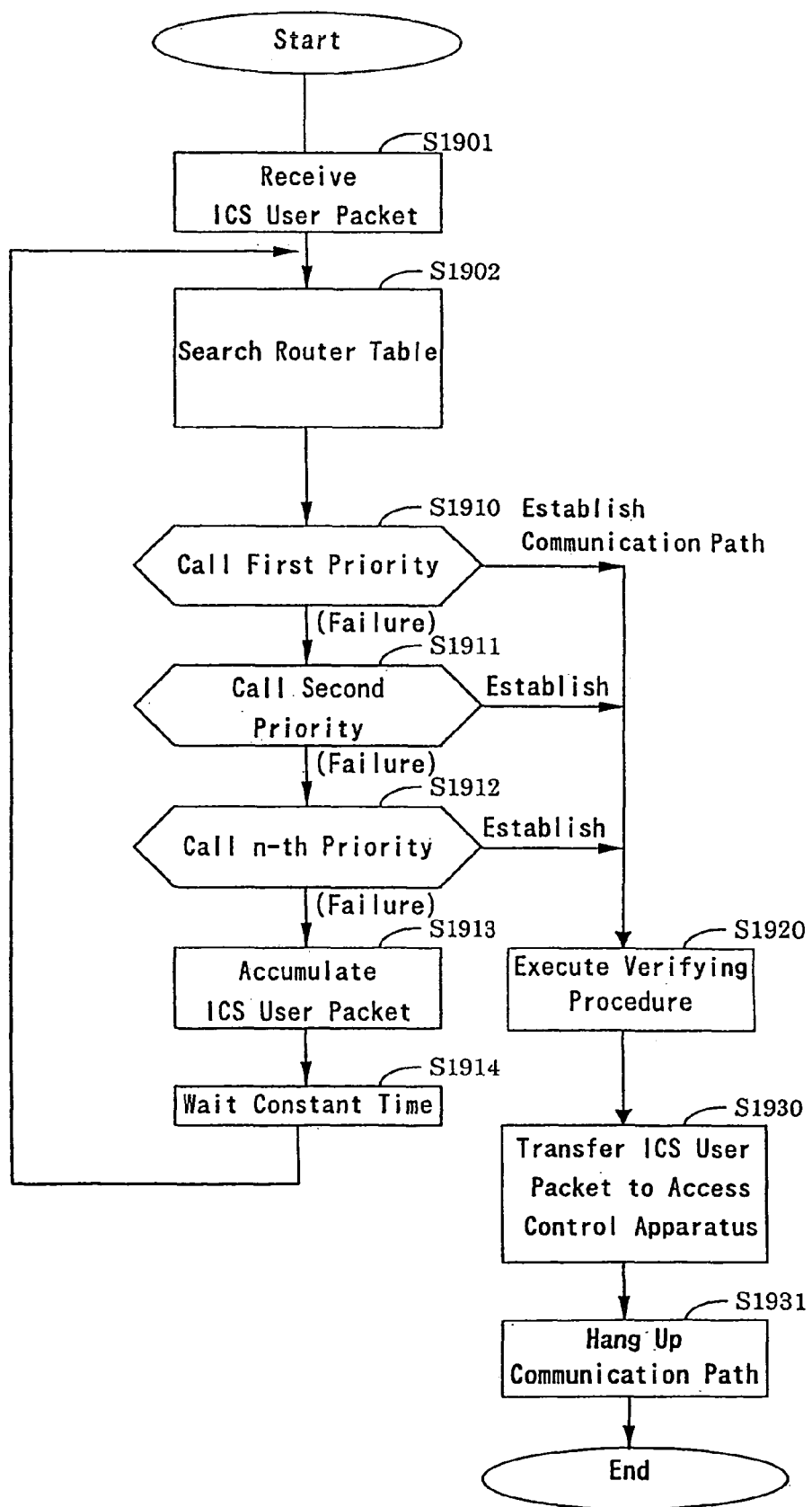
FIG. 59 is a flowchart to show an operation of a sixth embodiment.

Now, registration to the router table 7113-1 will be described with reference to FIG. 58. In the event that the receiver ICS user address "3601" has been specified, the highest on the priority list is telephone number "03-1111-1111", No. 2 on the priority list is telephone number "03-2222-2222", and No. 3 on the priority list is telephone number "03-3333-3333". The receiver ICS user addresses "3602" and "3700" are also registered in the same manner. Here, reference will be made to the flowchart shown in FIG. 59 as an example of communication from the sender ICS user address "2500" to the receiver ICS user address "3601".

The user 7400-1 sends the ICS user packet F200 to the dial-up router 7110 via the gateway 7400-2 and the user logic communication line 7204. The dial-up router 7110 operates under the processing device 7112-1, and receives the ICS user packet F200 (Step S1901), reads the receiver ICS user address "3601" included in the ICS user packet F200, searches the router table 7113-1 with the address "3601" included in the ICS user packet F200 as the search keyword (Step S1902), and finds the telephone number with high priority. In this case, the telephone number highest on the priority list is "03-1111-1111", as shown in the router table in FIG. 58, so the dial-up router 7110 dials the telephone number "03-1111-1111" via the telephone network as the first attempt (Step S1910). As a result, a telephone communication path 7201 with the line portion 7011-1 of the access control apparatus 7010-1 which is called by the telephone number "03-1111-1111" is established, i.e., the dial-up router 7110 and the line portion 7011-1 are connected by a telephone line. In the event that the dial-up router 7110 and the line portion 7011-1 are not connected by a telephone line, dial-up router 7110 finds the telephone number "03-2222-2222" that is second in priority, and dials the telephone number "03-2222-2222" via the telephone network as the second attempt (Step S1911). As a result, a telephone communication path 7202 with the line portion 7011-1 of the access control apparatus 7010-1 which is called by the telephone number "03-2222-2222" is established. Also, in the event that the dial-up router 7110 and the line unit 7011-1 are not connected by a telephone line, the dial-up router 7110 finds the telephone number "03-3333-3333" that is third in priority, and dials the telephone number "03-3333-3333" via the telephone network as the third attempt (Step S1911). As a result, a telephone communication path 7203 with the line portion 7011-3 of the access control apparatus 7010-3 which is called by the telephone number "03-3333-3333" is established. In the event that the dial-up router and the access control apparatus are not connected by a telephone line regardless of the above multiple attempts, the dial-up router 7110 stores the received ICS packet F200 in a memory 7117-1 (Step S1913), makes reference again to the router table (Step S1902) after a certain amount of time (Step S1914), and attempts establishment of telephone communication path 7201, 7202 or 7203.

Next, description will be made regarding the operations following the connection of the aforementioned dial-up router 7110 and the line portion 7011-1. The dial-up router 7110 enters verification procedures for determining whether this is an authorized user registered in the access control apparatus 7010-1 as a user (Step S1920). Any arrangement which achieves the object of verification is agreeable for the verification procedures, but for example, an ID and password for identifying the dial-up router are sent from the dial-up router 7110 to the line portion 7011-1 via the telephone line 7201 the verifying unit 7016-1 of the access control apparatus 7010-1 checks whether or not the received ID and password are correct, and in the event that the user is correct, the fact that the user is correct, i.e., communication data notifying "affirmative confirmation" is sent to the dial-up router 7110 via the telephone communication path 7201, thus completing the verification procedures. In the event that either one of the ID or password is incorrect, communication via the telephone communication path 7201 is terminated.

Upon receiving notification of "affirmative confirmation" from the telephone line 7201 in user verification, the dial-up router 7110 sends the ICS user packet F200 to the telephone communication path 7201 (Step S1930), and when the confirmation has been made that the access control apparatus 7010-1 has received the ICS user packet F200, releases the telephone communication path 7201 and hangs up (Step S1931), thus completing the above-described series of processes for the dial-up router.

Upon receiving the ICS user packet F200, the access control apparatus 7010-1 uses the conversion table 7013-1 under administration of the processing device 7012-1, generating an ICS network packet F301, which is sent out into the ICS network communication line 7301 within the ICS 7100. In the present embodiment, the transmitting ICS network address for the ICS network packet F301 is "7501" which is a network address appropriated to the ICS logic terminal within the line portion 7011-1, and the receiving ICS network address is "8601" appropriated to the ICS logic terminal within the access control apparatus 7010-2. The ICS network packet F301 is transferred across the ICS 7100 and reaches the access control apparatus 7010-2, where it is reversely ICS-encapsulated and reaches the user 7410-1 with the ICS user address "3601" via the user logic communication line 7601.

In the above description, in the event that a telephone communication path 7202 called by the telephone number "03-2222-2222" is established between the dial-up router 7110 and the line portion 7011-1 of the access control apparatus 7010-1, the ICS user packet F200 is transferred from the dial-up router 7110 to the line portion 7011-1 via the telephone communication path 7202. In this case also, upon receiving the ICS user packet F200, the access control apparatus 7010-1 performs the ICS encapsulation to generate an ICS network packet F302, which is sent out into the ICS network communication line 7301 within the ICS 7100. Now, the transmitting user address for the ICS user packet F302 is "7502", and the receiving ICS user address, "8601".

Also, in the event that a telephone communication path 7203 called by the telephone number "03-3333-3333" is established between the dial-up router 7110 and the line portion 7011-3 of the access control apparatus 7010-3, the ICS user packet F200 is transferred from the dial-up router 7110 to the line portion 7011-3 via the telephone communication path 7203. In this case, upon receiving the ICS user packet F200, the access control apparatus 7010-3 performs the ICS encapsulation to generate an ICS network packet F303, which is sent out into the ICS network communication line 7303 within the ICS 7100. In this case, the transmitting user address for the ICS user packet F303 is "7800" which is a network address provided to an ICS logic terminal within the line portion 7011-3, and the receiving ICS user address is "8601", which is a network address provided to an ICS logic terminal within the line portion 7010-2. The ICS network packet F303 is transferred across the ICS 7100 and reaches the access control apparatus 7010-2, where it is reversely ICS-encapsulated and reaches the user 7410-1 with the ICS user address "3601" via the user logic communication line 7601.

Embodiment-7

ICS Address Name Administration Server

Figure 60:
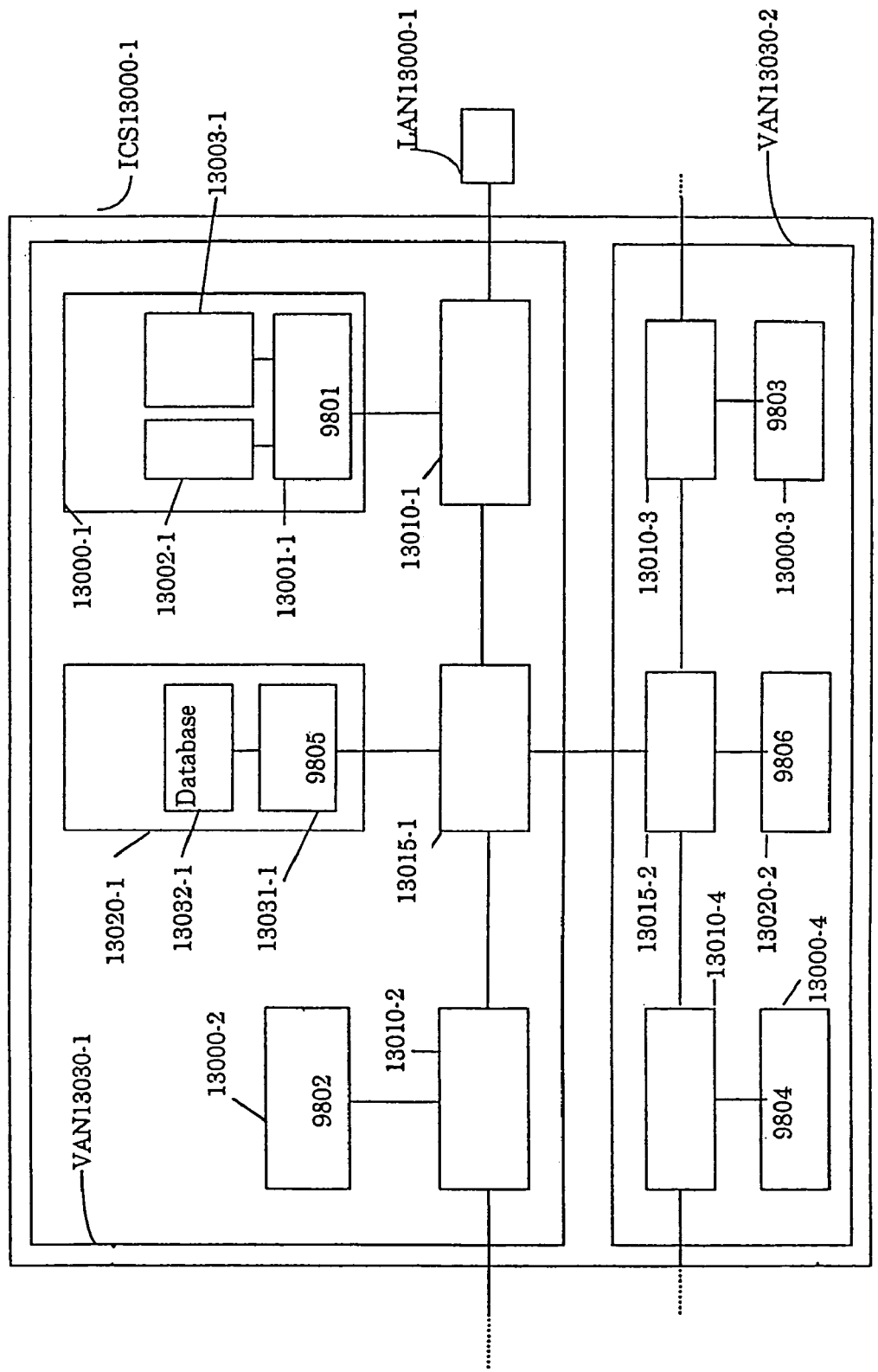
FIG. 60 is a constructional block showing a seventh embodiment (ICS address administration server) according to the present invention.

In the present embodiment shown in FIG. 60, ICS address name administration servers 13000-1, 13000-2, 13000-3 and 13000-4 within the ICS 13000-1 are respectively connected to access control apparatuses 13010-1, 13010-2, 13010-3 and 13010-4. The ICS address name administration server 13000-1 has a processing device 130001-1, a correlation table 13002-1 and an ICS name converting table 13003-1, and further is appropriated an ICS network address "9801" which can be uniquely distinguished within the ICS.

The other ICS address name administration servers 13000-2, 13000-3 and 13000-4 also have the same capabilities as the ICS address name administration server 13000-1, each containing a processing device, a correlation table and an ICS name conversion table, each having the respective ICS network addresses "9802", "9803" and "9804", each communicating one with another using ICS network communication functions, and each capable of exchanging the information that another ICS address name administration server has. The ICS address name VAN representative administration server 13020-1 has an ICS network address "9805", and another ICS address name VAN representative administration server 13020-2 has an ICS network address "9806", these communicating with a great many ICS address name administration servers and other ICS address name VAN representative administration servers using ICS network communication functions, and each capable of exchanging the information that each other has. The ICS address name VAN representative administration server 13020-1 has a processing device 13031-1 and a database 13032-1, performs exchange of the information such as ICS addresses and ICS names with all ICS address name administration servers within the VAN 13000-1, the collected data relating to the ICS addresses and ICS names is stored in the database 13032-1. Hence the ICS address name VAN representative administration server 13020-1 represents the VAN 13030-1 by means of performing the above procedures.

The above ICS address name VAN administration server 13020-1 includes a processing device, a correlation table and an ICS name conversion table, and another embodiment may be formed by grouping the correlation table and the ICS name conversion table into a single table, in which case one of the ICS user addresses contained in both of these two types of tables is used.

Embodiment-8

Full-Duplex Communication Including Satellite Communication Path: Part 1

<<Configuration of User, Data Providing Corporation, Communication Satellite, Etc.>>

The present embodiment performs a type of full-duplex communication by combining a satellite's transmitting functions and IP communication functions. In the present embodiment, "IP terminal" indicates a terminal or computer which has functions of sending and receiving IP packets.

Description will be made with reference to FIG. 61. The present embodiment is comprised of: ICS 16000-1; access control apparatuses 16100-1, 16110-1 and 16120-1; data providing corporation 16200-1; IP terminal 16210-1 of the data providing corporation; satellite transmission corporation 16300-1; IP terminal 16310-1 of the satellite transmission corporation; database 16320-1 of the satellite transmission corporation; satellite transmission equipment 16330-1 of the satellite transmission corporation; communication satellite 16400-1; users 16500-1, 16510-1 and 16520-1; IP terminals 16501-1, 16511-1 and 16521-1 of each user; satellite receivers 16502-1, 16512-1 and 16522-1 of each user; satellite electric wave communication lines 16600-1, 16610-1, 16620-1 and 16630-1; and user logic communication lines 16710-1, 16720-1, 16730-1 and 16740-1. The IP terminals 16210-1, 16501-1, 16511-1 and 16521-1 each have ICS user addresses "3000", "2300", "2400" and "2500", respectively, and are respectively connected to the access control apparatuses 16100-1, 16120-1, 16120-1 and 16110-1, via user logic communication lines. The IP terminal 16310-1 can be classified as an ICS network server, having an ICS special number "4300", and connected to the access control apparatus 16100-1 via the ICS network communication line within the ICS 16000-1. Electric wave transmitted from the satellite transmitter 16330-1 transfer information via the satellite electric wave communication path 16600-1, the electric wave is received by satellite receivers 16502-1, 16512-1 and 16522-1, the received data being delivered to the IP terminals 16501-1, 16511-1 and 16521-1. The present embodiment is characterized by the satellite transmission corporation 16300-1 having satellite communication functions.

<<Preparation: Description of Conventional Art>>

Figure 62:
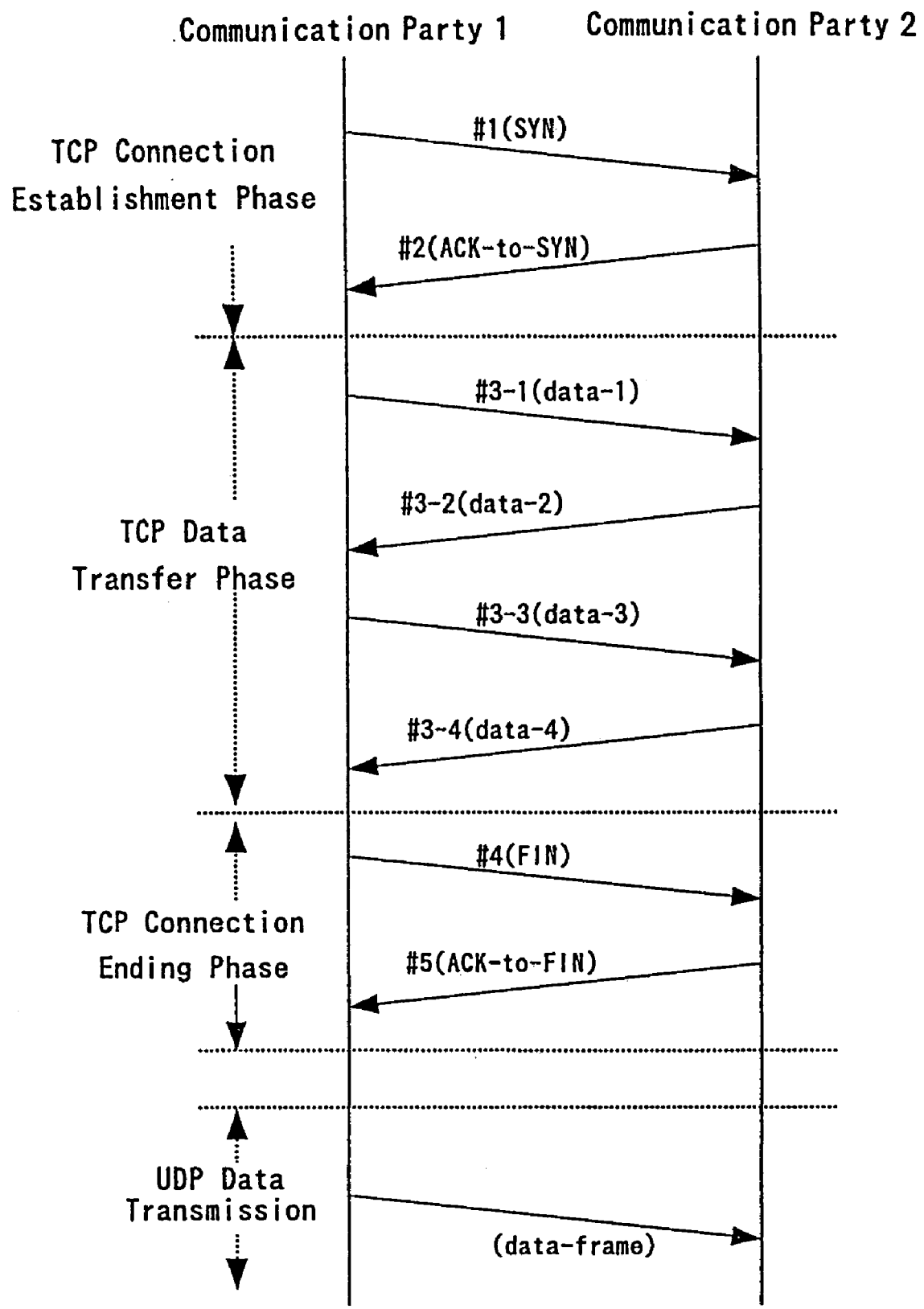
FIG. 62 is a timing chart to show an example of operation of a full-duplex communication by TCP.

In order to describe the present embodiment, first, known TCP and UDP communication technology will be explained. FIG. 62 is an example of full-duplex communication using TCP, wherein a communicating party 1 sends a synchronous packet #1, and a communicating party 2 returns a confirming packet #2 upon receiving the first packet. Communication procedures wherein such packets #1 and #2 are sent and received is referred to as TCP connection establishment phase. Next, both communicating parties send or receive packets #3-1, #3-2, #3-3 and #34, and communication procedures wherein such sending and receiving of packets is performed is referred to as TCP data transfer phase. Finally, a final packet #4 is sent and a confirming packet #5 is returned to confirm the reception of the packet. Communication procedures wherein such packets #4 and #5 are sent and received is referred to as TCP connection ending phase. Besides the above TCP communication procedures, there are communication procedures called UDP, comprised of data transfer alone. An example is shown in FIG. 62, UDP is characterized in comparison with TCP by the absence of the TCP connection establishment and connection ending phases.

The communication procedures according to the present embodiment will be made with reference to FIGS. 61 and 63. In the following procedures, the aforementioned TCP technology full-duplex communication is employed except for the cases of transmission instruction to satellite transmission equipment (#6 and #14 in FIG. 63) and "data transmission" using electric wave from the satellite transmission equipment (#7 and #15 in FIG. 63), however, only the TCP data transfer phase is shown in FIG. 63, and the TCP connection establishment phase and TCP connection ending phase are omitted from the drawing and from description thereof.

Figure 63:
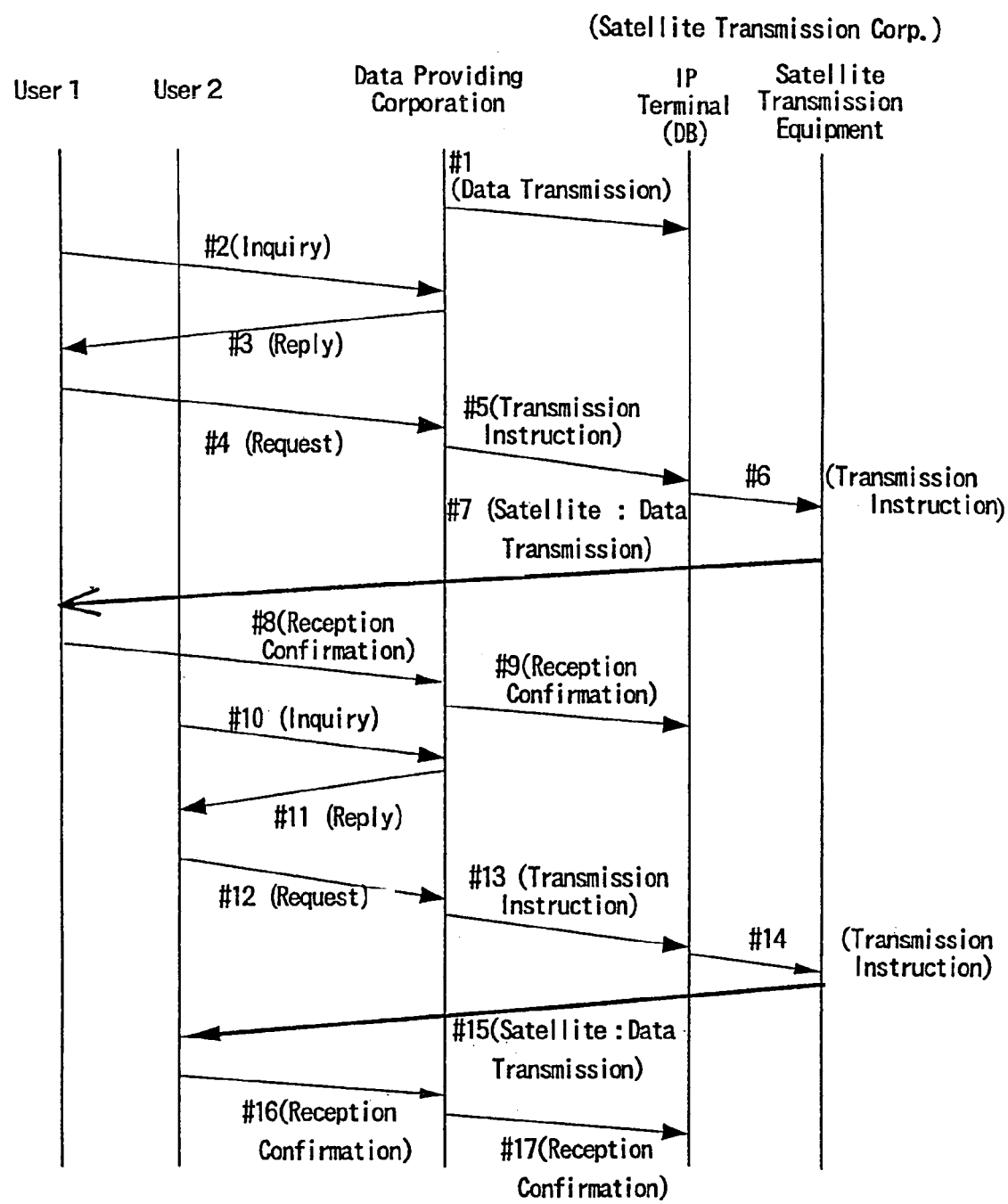
FIG. 63 is a timing chart to explain an eighth embodiment.

The IP terminal 16210-1 of the data providing corporation 16200-1 obtains "data to be provided" from the database 16220-1 thereof and sends it to the IP terminal 16310-1 of the satellite transmission corporation 16300-1 which can be identified by the ICS special number "4300", using the IP frame transmission functions of the ICS (#1 in FIG. 63, the same hereafter). The satellite transmission corporation 16300-1 stores the received "data to be provided" in its database 16320-1. The IP terminal 16501-1 of the user 16500-1 sends an "inquiry packet" to the IP terminal 16210-1 which can be identified with the ICS user address "3000" (#2). The IP terminal 16210-1 returns a "reply packet" (#3), the IP terminal 16501-1 receives this "reply packet", and then sends a "request packet" to the IP terminal 16210-1 (#4). When the IP terminal 16210-1 receives the "request packet", it sends a "transmission instruction packet" to the IP terminal 16310-1 (#5). When the IP terminal 16310-1 receives the "instruction packet", it instructs transmission of the "data to be provided" saved in the database 16220-1 (#6). The satellite transmission equipment 16330-1 emits the "data to be provided" as electric wave toward the communication satellite 16400-1 (first half of #7), the communication satellite 16400-1 amplifies the received "data to be provided" and emits it (latter half of #7), the satellite receiving equipment 16502-1 receives the "data to be provided" as electric wave, and hands it to the IP terminal 16501-1. Thus, the IP terminal 16501-1 obtains the "data to be provided" via the communication satellite 16400-1, and sends a "reception confirmation packet" to the IP terminal 16210-1 of the corporation 16200-1 providing the "data to be provided" (#8). Next, the IP terminal 16210-1 sends a "reception confirmation packet" to the IP terminal 16310-1 of the satellite transmission corporation 16300-1 (#9). In the above procedures, #1, #2, #3, #4, #5, #8 and #9 use the above-described TCP communication technology, and the TCP data transfer phase alone is shown and described.

Next, the procedures #10, #11, #12, #13, #14, #15, #16 and #17 shown in FIG. 63 are almost the same as the above procedures, the difference in this example being that instead of the user 16500-1, the IP terminal 16501-1 and the satellite receiving equipment 16502-1, another user 16510-1, IP terminal 16511-1 and satellite receiving equipment 16512-1 are used, and the present embodiment is capable of transferring "data to be provided" to a plurality of users.

Figure 64:
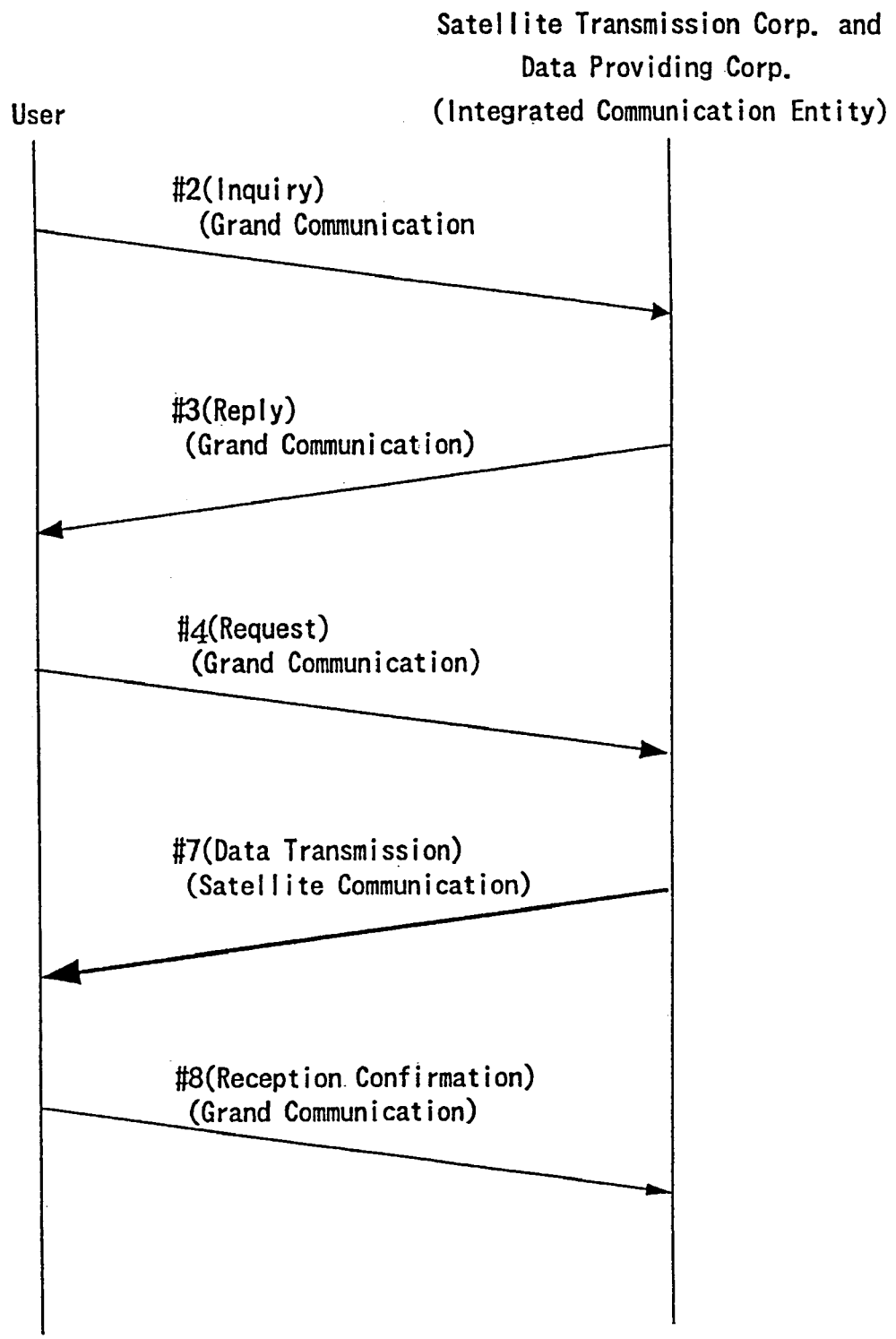
FIG. 64 is a timing chart to explain an eighth embodiment.

The above-described communication procedures shall be described with reference to FIG. 64. The sending of an "inquiry packet" (#2), returning a "reply packet" (#3), sending of a "request packet" (#4), "data transmission" by satellite communication (#7), and sending "reception confirmation packet" (#8) in FIG. 64 corresponds with the sending of an "inquiry packet" (#2), returning a "reply packet" (#3), sending of a "request packet" (#4), "data transmission" by satellite communication (#7), and sending "reception confirmation packet" (#8) in FIG. 63. From the above description, in the event that the satellite communication corporation 16300-1 and the data providing corporation 16200-1 are viewed as an integrated communication function unit (hereafter referred to as an "integrated communication entity"). The user in FIG. 64 can be considered to be performing full-duplex communication with the aforementioned integrated communication entity.

<<Variation on Above Embodiment>>

Next, a variation of the above embodiment wherein only a portion of the communication procedures has been changed shall be described with reference to FIGS. 61 and 65.

Figure 65:
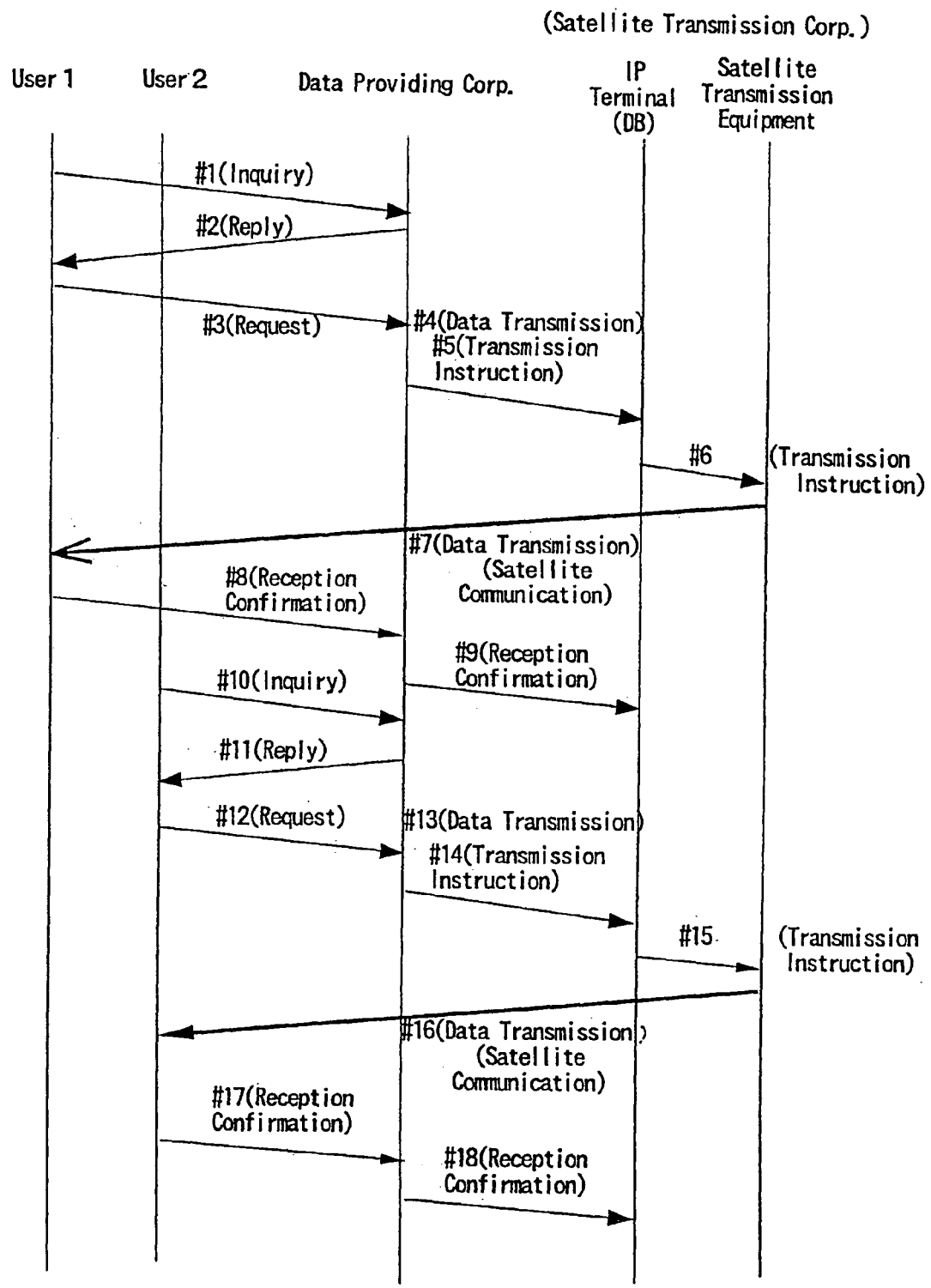
FIG. 65 is a timing chart to explain an eighth embodiment.

First, the IP terminal 16501-1 of the user 16500-1 sends an "inquiry packet" to the IP terminal 16210-1 which can be identified with the ICS user address "3000" (#1 in FIG. 65: the same hereafter). The IP terminal 16210-1 returns a "reply packet" (#2), the IP terminal 16510-1 receives the "reply packet", and then sends a "request packet" to the IP terminal 16210-1 (#3). When the IP terminal 16210-1 receives the "request packet", it sends "data to be provided" from the database 16220-1 thereof to the IP terminal 16310-1 which can be identified by the ICS special number "4300" (#4), and also sends a "transmission instruction packet" to the IP terminal 16310-1 (#5).

The satellite transmission corporation 16300-1 stores the received "data to be provided" in its database 16320-1, and instructs transmission of the saved "data to be provided" (#6). The satellite transmission equipment 16330-1 emits the "data to be provided" as electric wave toward the communication satellite 16400-1 (first half of #7), the communication satellite 16400-1 amplifies the received "data to be provided" and emits it (latter half of #7), the satellite receiving equipment 16502-1 receives the "data to be provided" as electric wave, and hands it to the IP terminal 16501-1. Thus, the IP terminal 16501-1 obtains the "data to be provided" via the communication satellite 16400-1, and sends a "reception confirmation packet" to the IP terminal 16210-1 of the corporation 16200-1 providing the "data to be provided" (#8). Next, the IP terminal 16210-1 sends a "reception confirmation packet" to the IP terminal 16310-1 of the satellite transmission corporation 16300-1 (#9). Next, the procedures #10, #11, #12, #13, #14, #15, #16, #17 and #18 are almost the same as the above procedures, the difference in this example being that instead of the user 16500-1, the IP terminal 16501-1 and satellite receiving equipment 16502-1, another user 16510-1, IP terminal 16511-1 and satellite receiving equipment 16512-1 are used.

<<Another Variation on Above Embodiment>>

In the above two embodiments, TCP technology full-duplex communication is employed, and only the TCP data transfer phase is shown in the figures, with the TCP connection establishment phase and TCP connection ending phase being omitted from the drawings and from description thereof In the embodiment to be described now, UDP communication technology described in FIG. 62 is applied to a part or to all, and part or all of the packet sending and receiving using the TCP data transfer phase technique is replaced with packet sending and receiving using the UDP data transfer phase technique.

<<Another Variation on Above Embodiment>>

Another version will be described with reference to FIG. 66. In FIG. 61, the satellite transmission corporation 16300-1, the IP terminal 16310-1 of the satellite transmission corporation, the database 16320-1 of the satellite transmission corporation, and satellite transmission equipment 16330-1 of the satellite transmission corporation are each within the ICS 16000-1, the IP terminal 16310-1 being provided with an ICS special number "4300". As compared to this, in the example shown in FIG. 66, the satellite transmission corporation 16300-2, the IP terminal 16310-2 of the satellite transmission corporation, the database 16320-2 of the satellite transmission corporation, and the satellite transmission equipment 16330-2 of the satellite transmission corporation are each outside of the ICS 16000-2, the IP terminal 16310-2 being provided with an ICS user address "3900". The data providing corporation 16200-1 and users 16500-1, 16510-1, 16520-1 are capable of sending and receiving of IP packets completely regardless of whether the other party has an ICS user address or an ICS special number, so sending and receiving of IP frames can be performed in combination with satellite communication with the example in FIG. 66 just as with that in FIG. 61.

Embodiment-9

Full-Duplex Communication Including Satellite Communication Path: Part 2

Figure 61:
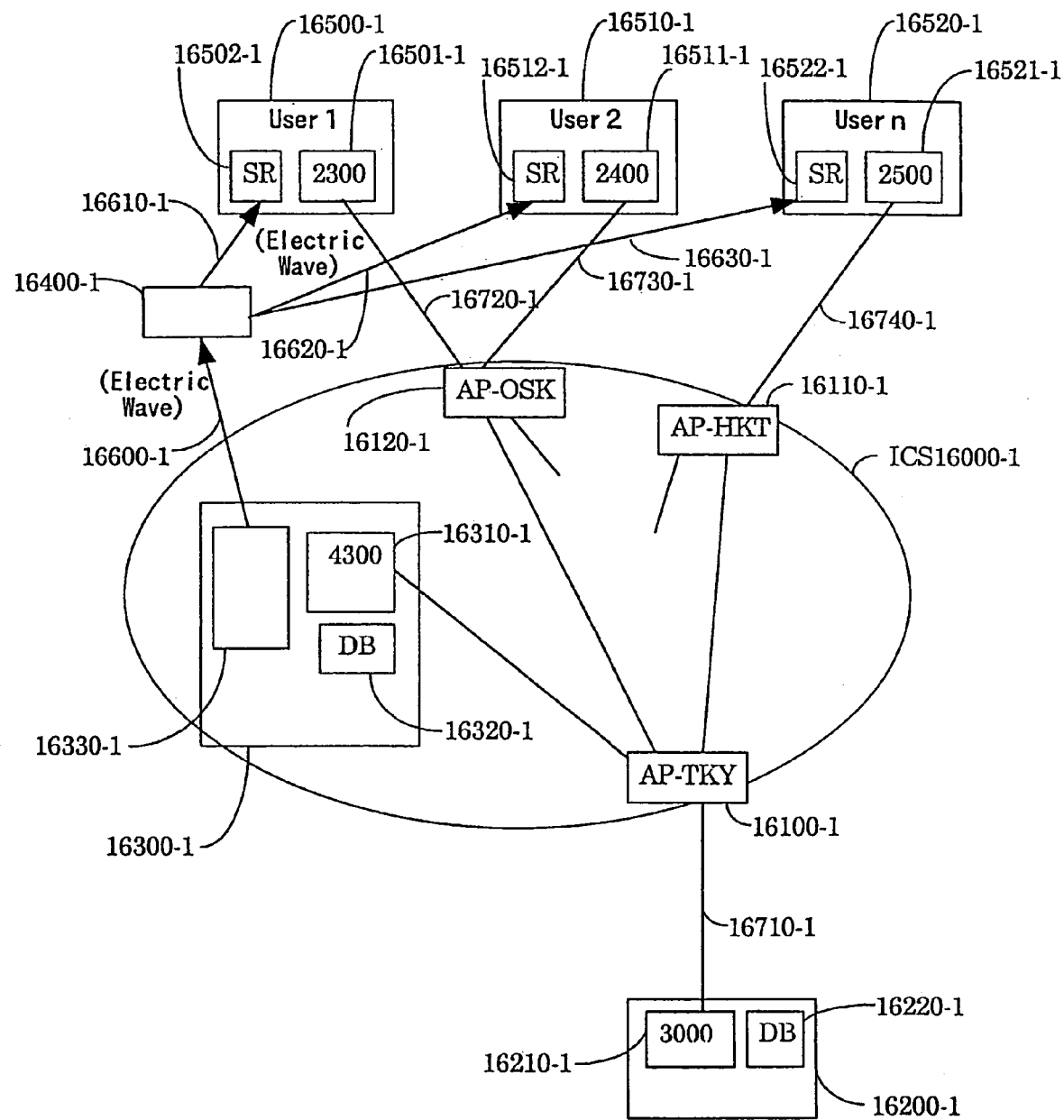
FIG. 61 is constructional block showing an eighth embodiment (full-duplex communication including a satellite communication path) according to the present invention.
Figure 66:
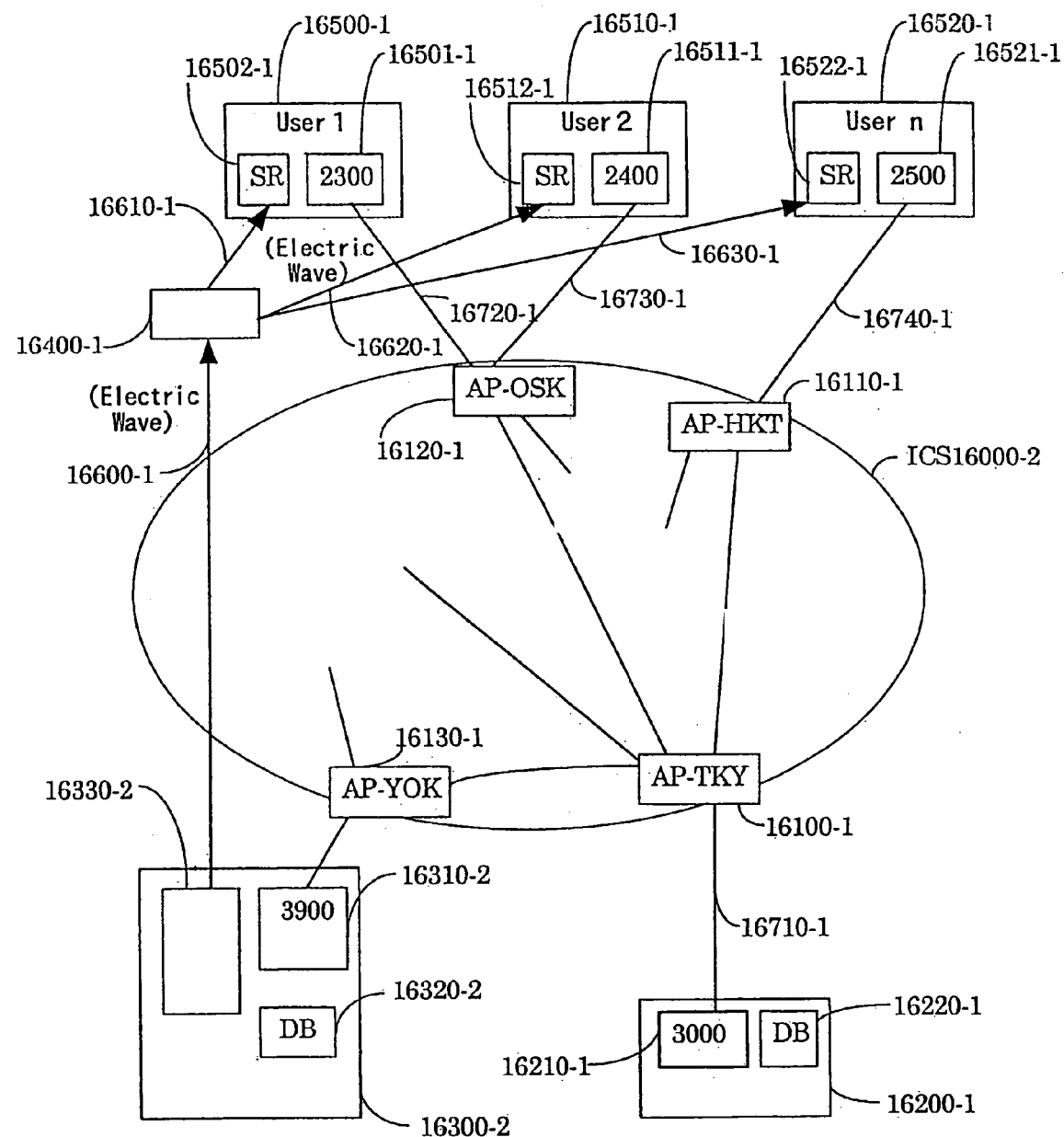
FIG. 66 is a constructional block showing a variation of an eighth embodiment.

The present embodiment is another variation of Embodiment-8, with description being made with reference to FIGS. 61 and 66. The data providing corporation 16200-1, the satellite transmission corporation 16300-1, the user 16500-1, etc. are the same; only the communication procedures are different. Also, TCP technology full-duplex communication will be employed, but FIG. 67 only illustrates the TCP data transfer phase.

Figure 67:
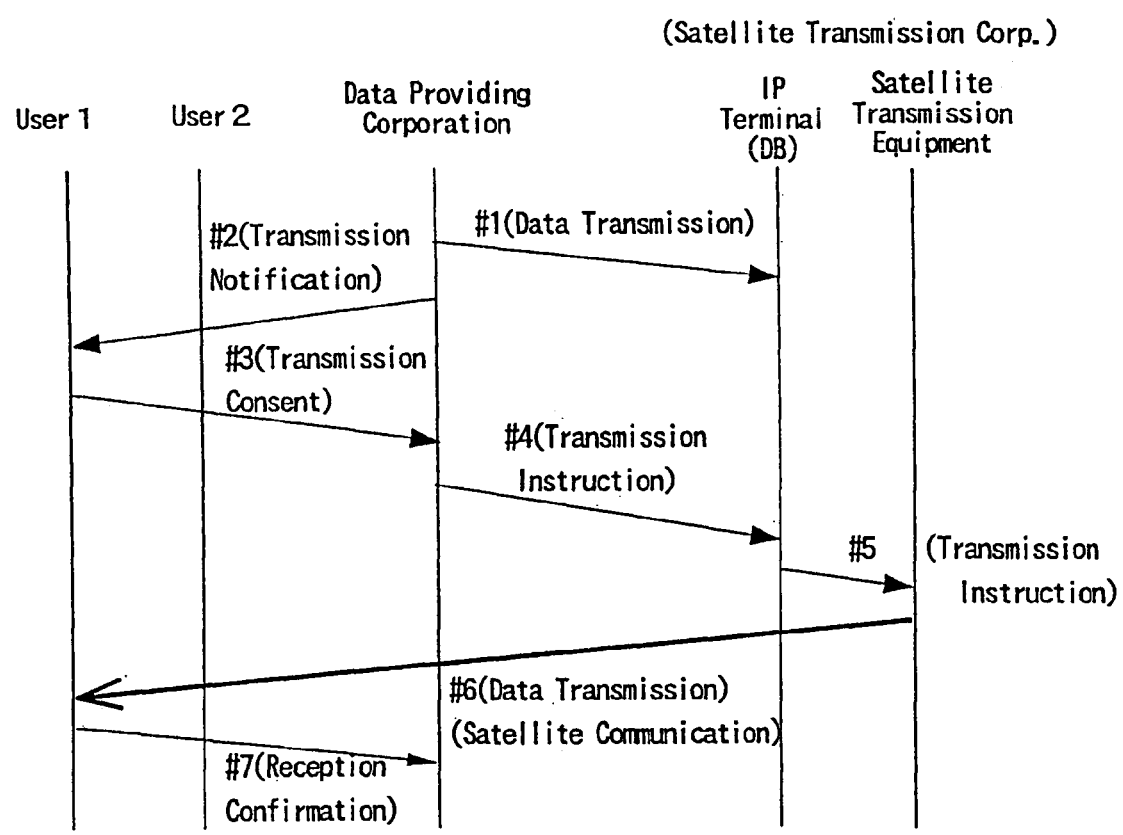
FIG. 67 is a timing chart to show an operation of a ninth embodiment (full-duplex communication including a satellite communication path) according to the present invention.

The IP terminal 16210-1 of the data providing corporation 16200-1 obtains "data to be provided" from the database 16220-1 thereof and sends this to the IP terminal 16310-1 of the satellite transmission corporation 16300-1 which can be identified by the ICS special number "4300", using the IP frame transmission functions of the ICS (#1 in FIG. 67, the same hereafter). The satellite transmission corporation 16300-1 stores the received "data to be provided" in its database 16320-1. Next, the IP terminal 16210-1 of the data providing corporation 16200-1 sends a "transmission notification frame" to the IP terminal 16501-1 of the user 16500-1 (#2). Upon receiving the "transmission notification packet", the IP terminal 16501-1 returns a "transmission consent packet" to the IP terminal 16210-1 (#3). When the IP terminal 16210-1 receives the "transmission consent packet", it sends a "transmission instruction packet" to the IP terminal 16310-1 (#4). When the IP terminal 16310-1 of the satellite transmission corporation 16300-1 receives the "transmission instruction packet", it instructs transmission of the "data to be provided" saved in the database 16220-1 (#5). The satellite transmission equipment 16330-1 emits the "data to be provided" as electric wave toward the communication satellite 16400-1 (first half of #6), the communication satellite 16400-1 amplifies the received "data to be provided" and emits it (latter half of #6), the satellite receiving equipment 16502-1 receives the "data to be provided" as electric wave, and hands it to the IP terminal 16501-1. Thus, the IP terminal 16501-1 obtains the "data to be provided" via the communication satellite 16400-1, and sends a "reception confirmation packet" to the IP terminal 16210-1 of the data providing corporation 16200-1 providing the "data to be provided" (#7).

Figure 68:
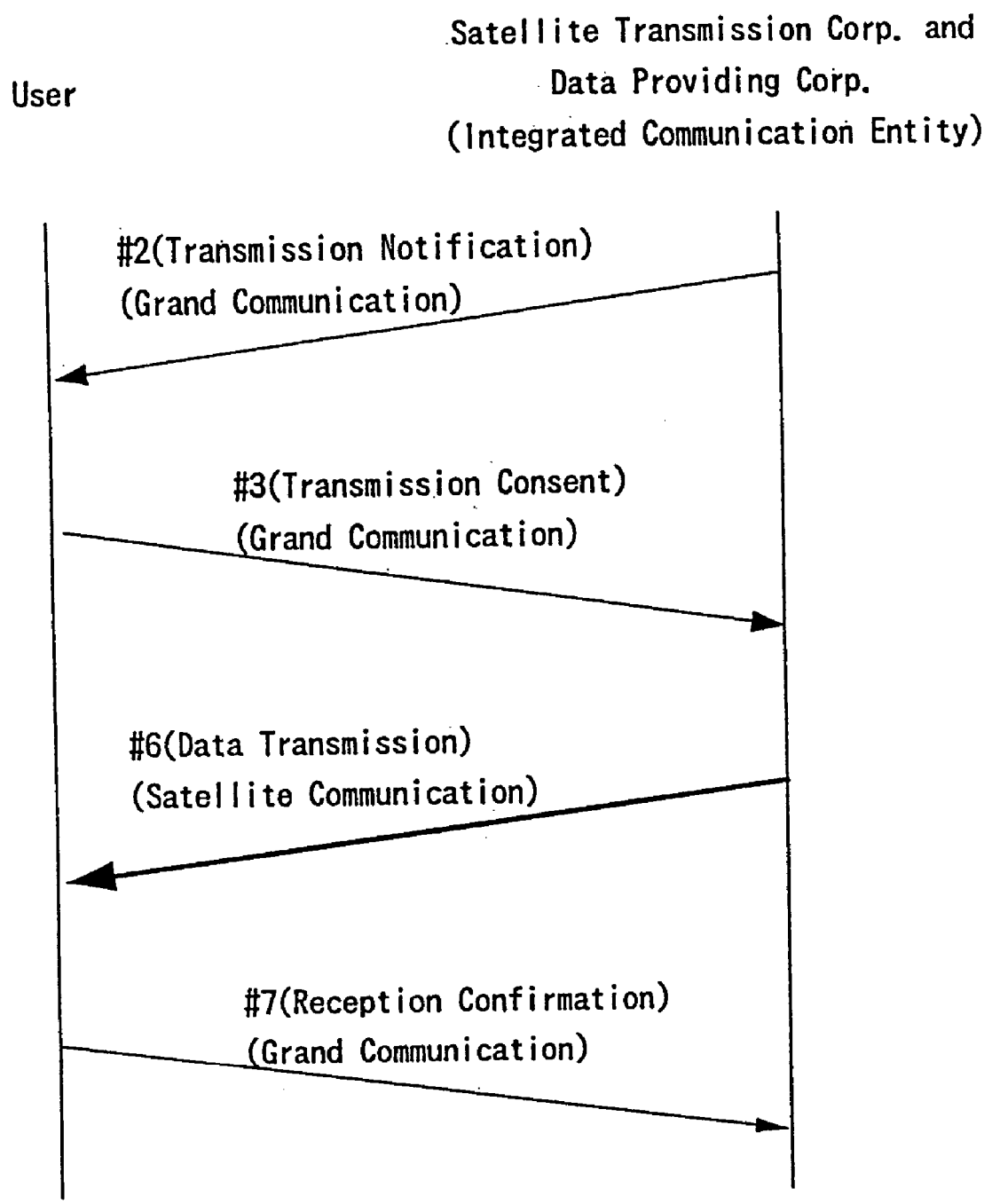
FIG. 68 is a timing chart to explain a ninth embodiment.

The above-described communication procedures shall be described with reference to FIG. 68. The sending of a "transmission notification packet" (#2), the returning of a "transmission consent packet" (#3), "data transmission" by satellite communication (#6), and the sending of "reception confirmation packet" (#7) in FIG. 68 correspond with the sending of an "transmission notification frame" (#2), the returning of a "transmission consent packet" (#3), "data transmission" by satellite communication (#6), and the sending of "reception confirmation packet" (#7) in FIG. 67, respectively. From the above description, in the event that the satellite communication corporation 16300-1 and the data providing corporation 16200-1 are viewed as an integrated communication function unit (hereafter referred to as an "integrated communication entity"), the user 16500-1 in FIG. 68 can be considered to be performing full-duplex communication with the aforementioned integrated communication entity.

<<Another Variation on Above Embodiment>>

Figure 69:
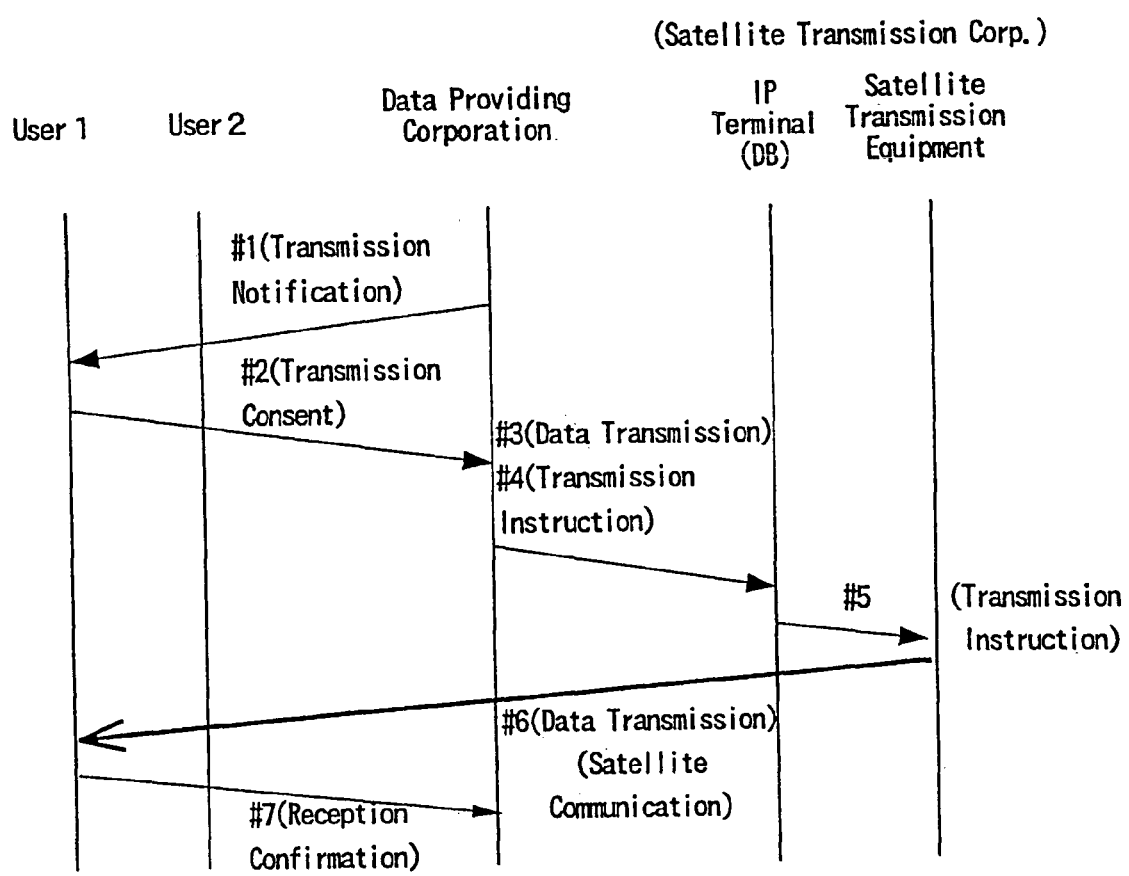
FIG. 69 is a timing chart to explain a ninth embodiment.

Next, a variation of the above embodiment wherein only a portion of the communication procedures has been changed shall be described with reference to FIGS. 61 and 69. The IP terminal 16210-1 of the data providing corporation 16200-1 sends a "transmission notification packet" to the IP terminal 16501-1 of the user 16500-1 (#1 in FIG. 69: the same hereafter). Upon receiving the "transmission notification packet", the IP terminal 16501-1 returns a "transmission consent packet" to the IP terminal 16210-1 (#2). When the IP terminal 16210-1 receives the "transmission consent packet", it obtains "data to be provided" from the database 16220-1 thereof and sends this to the IP terminal 16310-1 of the satellite transmission corporation 16300-1 which can be identified by the ICS special number "4300" (#3) and further sends a "transmission instruction packet" to the IP terminal 16310-1 (#4). When the IP terminal 16310-1 of the satellite transmission corporation 16300-1 receives the "transmission instruction packet", it instructs transmission of the "data to be provided" saved in the database 16220-1 (#5). The subsequent communication procedures are the same as those described above.

<<Another Variation on Above Embodiment>>

In the above two embodiments, TCP technology full-duplex communication is employed, and only the TCP data transfer phase is shown in the figures, with the TCP connection establishment phase and the TCP connection ending phase being omitted from the drawings and from the description thereof In the embodiment to be described now, UDP communication technology described in FIG. 62 is applied to a part or to all, and part or all of the packet sending and receiving using the TCP data transfer phase technique is replaced with packet sending and receiving using the UDP data transfer phase technique.

<<Another Variation on Above Embodiment>>

Another version will be described with reference to FIG. 66. In FIG. 61, the satellite transmission corporation 16300-1, the IP terminal 16310-1 of the satellite transmission corporation, the database 16320-1 of the satellite transmission corporation, and the satellite transmission equipment 16330-1 of the satellite transmission corporation are each within the ICS 16000-1, the IP terminal 16310-1 being provided with an ICS special number "4300". As compared to this, in the example shown in FIG. 66, the satellite transmission corporation 16300-2, the IP terminal 16310-2 of the satellite transmission corporation, the database 16320-2 of the satellite transmission corporation, and the satellite transmission equipment 16330-2 of the satellite transmission corporation are each outside of the ICS 16000-2, the IP terminal 16310-2 being provided with an ICS user address "3900".

Embodiment-10

Full-Duplex Communication Including Satellite Communication Path: Part 3

The present embodiment is another variation of Embodiment-8, and will be described with reference to FIGS. 61 and 70. The data providing corporation 16200-1, the satellite transmitting corporation 16300-1, the user 16500-1 are the same, with only the communication procedures being different. The present embodiment performs the full-duplex communication of TCP technology, but only the TCP data transfer phase is shown in FIG. 70.

Figure 70:
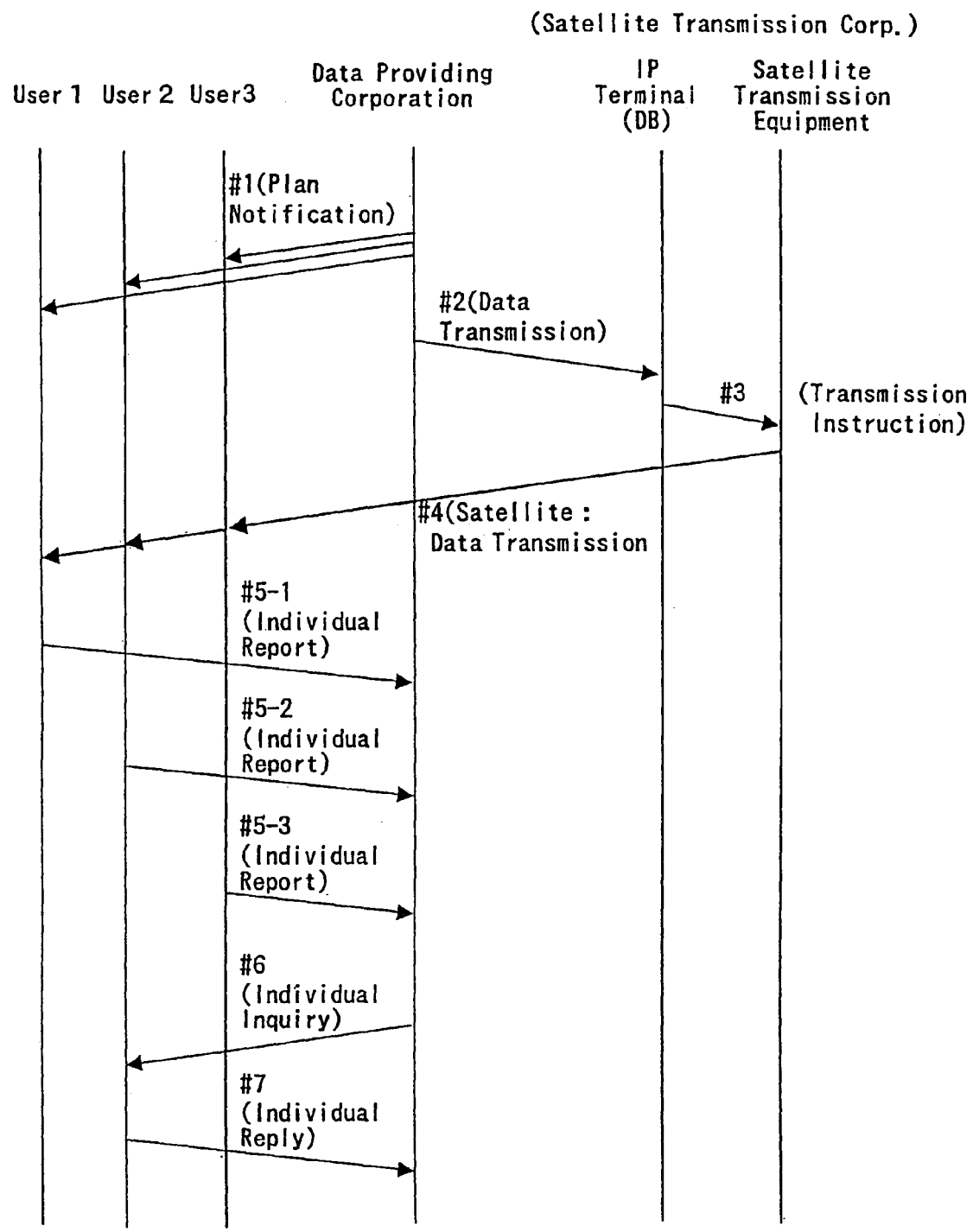
FIG. 70 is a timing chart to explain a tenth embodiment.

The IP terminal 16210-1 of the data providing corporation 16200-1 carries out a scheduled notification, i.e., sends a "plan notification packet" to each of the following: the IP terminal 16501-1 having an ICS user address "2300", ICS user address "2400" (16511-1), and ICS user address "2500" (16521-1) (#1 in FIG. 70: the same hereafter). Next, the IP terminal 16210-1 of the data providing corporation 16200-1 obtains "data to be provided" from the database 16220-1 thereof and sends this to the IP terminal 16310-1 of the satellite transmission corporation 16300-1 which can be identified by the ICS special number "4300", using the IP frame transfer functions of the ICS (#2). The satellite transmission corporation 16300-1 stores the received "data to be provided" in its database 16320-1, and also instructs transmission of the "data to be provided" (#3). The satellite transmission equipment 16330-1 emits the "data to be provided" as electric wave toward the communication satellite 16400-1 (first half of #4), the communication satellite 16400-1 amplifies the received "data to be provided" and emits it (latter half of #4), the satellite receiving equipment 16502-1 receives the "data to be provided" as electric wave, and hands it to the IP terminal 16501-1.

Thus, the IP terminal 16501-1 obtains the "data to be provided" via the communication satellite 16400-1, and sends an "individual report packet" to the IP terminal 16210-1 (#5-1). Using the same communication procedures, the IP terminal 16511-1 obtains the "data to be provided", and sends an "individual report packet" to the IP terminal 16210-1 (#5-2). The IP terminal 16521-1 also obtains the "data to be provided", and sends an "individual report packet" to the IP terminal 16210-1 (#5-3). The IP terminal 16210-1 sends an "individual inquiry packet" to the IP terminal 16511-1 of the use; 16510-1 (#6), and the IP terminal 16511-1 returns an "individual reply packet" to the IP terminal 16210-1 (#7).

Figure 71:
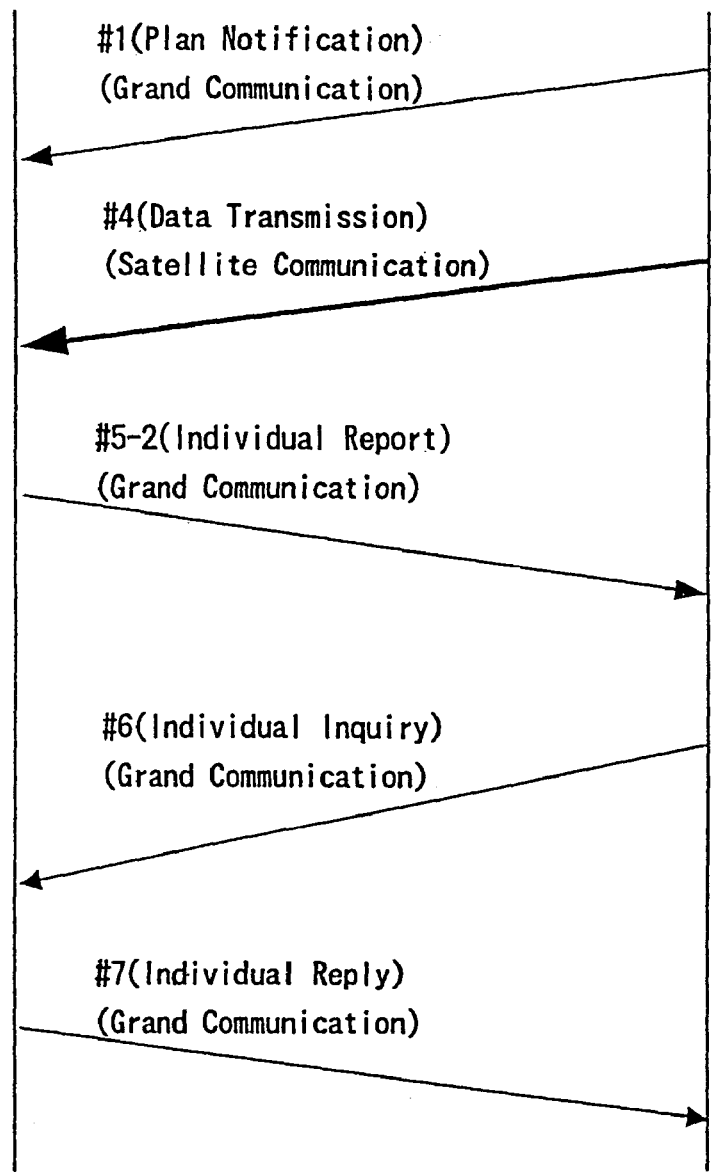
FIG. 71 is a timing chart to explain a tenth embodiment.

The above-described communication procedures will be described with reference to FIG. 71. The sending of the "plan notification frame" (#1), "data transmission" by satellite communication (#4), the sending of "individual report packet" (#5-2), the sending of "individual inquiry packet" (#6), and the returning of "individual reply packet" (#7) in FIG. 71 correspond with the sending of the "plan notification packet" (#1), "data transmission" by satellite communication (#4), the sending of "individual report frame" (#5-2), the sending of "individual inquiry frame" (#6), and the returning of "individual reply frame" (#7) in FIG. 70, respectively. From the above description, in the event that the satellite communication corporation 16300-1 and the data providing corporation 16200-1 are viewed as an integrated communication entity, the user 16500-1 in FIG. 67 can be considered to be performing full-duplex communication with the aforementioned integrated communication entity.

<<Another Variation on Above Embodiment>>

In each of the above embodiments, the full-duplex communication of TCP technology is employed, and only the TCP data transfer phase is shown in the figures, with the TCP connection establishment phase and TCP connection ending phase being omitted from the drawings and from the description thereof. In the embodiment to be described now, UDP communication technology described in FIG. 62 is applied to a part or to all, and part or all of the packet sending and receiving using the TCP data transfer phase technique is replaced with packet sending and receiving using the UDP data transfer phase technique.

<<Another Variation on Above Embodiment>>

Another version will be described with reference to FIG. 66. In FIG. 61, the satellite transmission corporation 16300-1, the IP terminal 16310-1 of the satellite transmission corporation, the database 16320-1 of the satellite transmission corporation, and the satellite transmission equipment 16330-1 of the satellite transmission corporation are each within the ICS 16000-1, the IP terminal 16310-1 being provided with an ICS special number "4300". As compared to this, in the example shown in FIG. 66, the satellite transmission corporation 16300-2, the IP terminal 16310-2 of the satellite transmission corporation, the database 16320-2 of the satellite transmission corporation, and the satellite transmission equipment 16330-2 of the satellite transmission corporation are each outside of the ICS 16000-2, the IP terminal 16310-2 being provided with an ICS user address "3900".

Embodiment-11

Full-Duplex Communication Including Satellite Communication Path: Part 4

The present embodiment is another variation of Embodiment-8, and will be described with reference to FIGS. 61 and 72. The data providing corporation 16200-1, the satellite transmission corporation 16300-1, the user 16500-1 are the same, with only the communication procedures being different. The present embodiment performs the full-duplex communication of TCP technology, but only the TCP data transfer phase is shown in FIG. 72.

Figure 72:
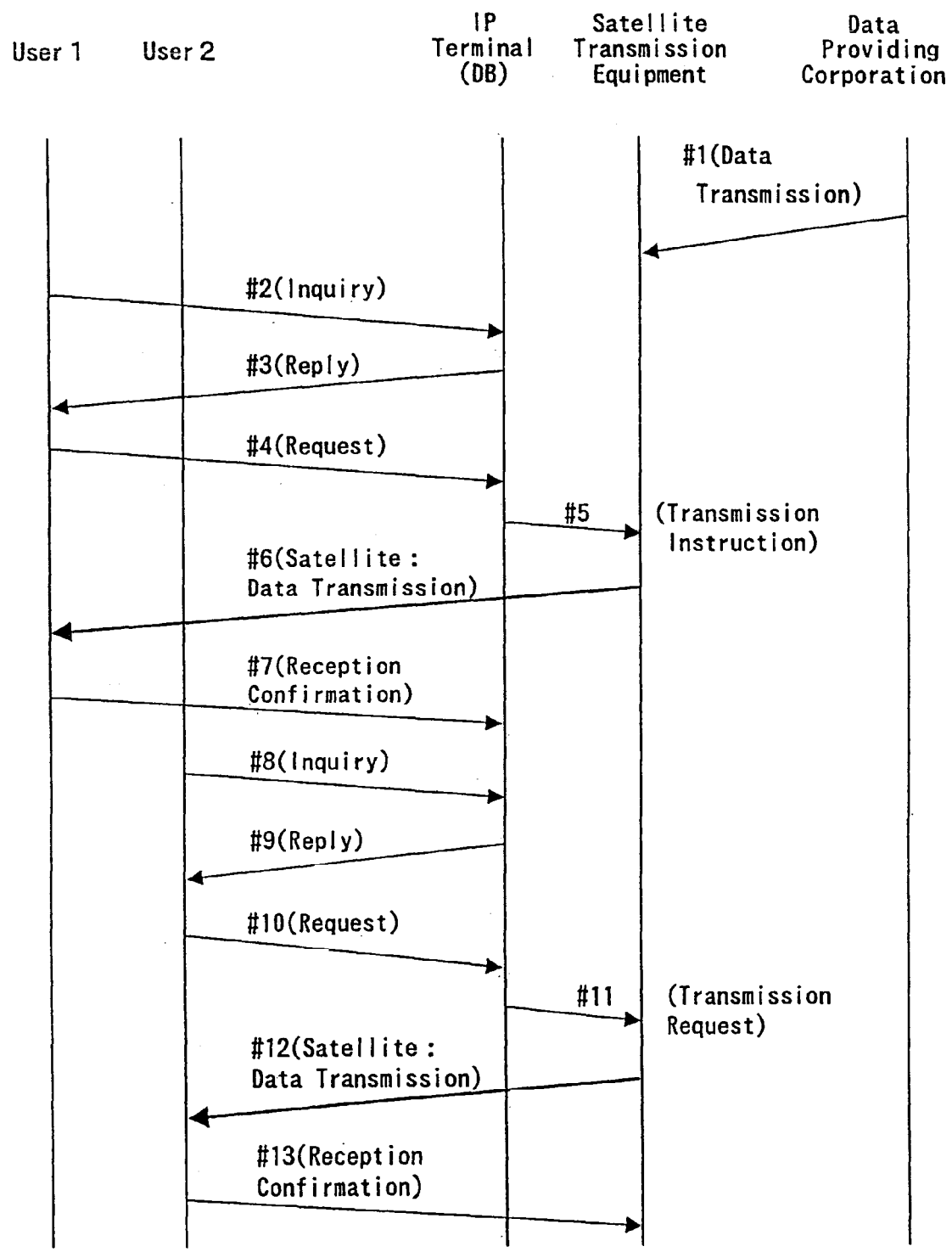
FIG. 72 is a timing chart to explain an eleventh embodiment.

The IP terminal 16210-1 of the data providing corporation 16200-1 obtains "data to be provided" from the database 16220-1 thereof and sends this to the IP terminal 16310-1 of the satellite transmission corporation 16300-1 which can be identified by the ICS special number "4300", using the IP frame transfer functions of the ICS (#1 in FIG. 72: the same hereafter). The satellite transmission corporation 16300-1 stores the received "data to be provided" in its database 16320-1.

Next, the IP terminal 16501-1 of the user 16500-1 sends an "inquiry packet" to the IP terminal 16310-1 which can be identified with the ICS user address "4300" (#2). The IP terminal 16310-1 returns a "reply packet" (#3), the IP terminal 16510-1 receives the "reply packet", and then sends a "request packet" to the IP terminal 16310-1 (#4). When the IP terminal 16310-1 receives the "request packet", it instructs satellite transmission equipment to transmit the "data to be provided" saved in the database 16300-1 (#5). The satellite transmission equipment 16330-1 emits the "data to be provided" as electric wave toward the communication satellite 16400-1 (first half of #6), the communication satellite 16400-1 amplifies the received "data to be provided" and emits it (latter half of #6), the satellite receiving equipment 16502-1 receives the "data to be provided" as electric wave, and hands it to the IP terminal 16501-1. Thus, the IP terminal 16501-1 obtains the "data to be provided" via the communication satellite 16400-1, and sends a "reception confirmation packet" to the IP terminal 16310-1 of the data providing corporation 16200-1 providing the "data to be provided" (#7). In the above procedures, #1, #2, #3, #4 and #7 use the above-described TCP communication technology, and the TCP data transfer phases alone are shown and described. Next, the procedures #8, #9, #10, #11, #12 and #13 shown in FIG. 72 are almost the same as the above procedures, the difference in this example being that instead of the user 16500-1, the IP terminal 16501-1, and the satellite receiving equipment 16502-1, another corporation 16510-1, IP terminal 16511-1, and satellite receiving equipment 16512-1 are used.

The above-described communication procedures shall be described with reference to FIG. 64. The sending of an "inquiry packet" (#2), the returning of a "reply packet" (#3), the sending of a "request packet" (#4), "data transmission" by satellite communication (#7), and the sending of "reception confirmation packet" (#8) in FIG. 64 correspond with the sending of an "inquiry packet" (#2), the returning of a "reply packet" (#3), the sending of a "request packet" (#4), "data transmission" by satellite communication (#7), and the sending "reception confirmation packet" (#8) in FIG. 72, respectively. From the above description, in the event that the satellite communication corporation 16300-1 and the data providing corporation 16200-1 are viewed as an integrated communication entity, the user 16500-1 in FIG. 64 can be considered to be performing full-duplex communication with the aforementioned integrated communication entity.

<<Another Variation on Above Embodiment>>

In the above two embodiments, the full-duplex communication of TCP technology is employed, and only the TCP data transfer phase is shown in the figures, with the TCP connection establishment phase and TCP connection ending phase being omitted from the drawings and from the description thereof In the embodiment to be described now, UDP communication technology described in FIG. 62 is applied to a part or to all, and part or all of the packet sending and receiving using the TCP data transfer phase technique is replaced with packet sending and receiving using the UDP data transfer phase technique.

<<Another Variation on Above Embodiment>>

Another version will be described with reference to FIG. 66. In FIG. 61, the satellite transmission corporation 16300-1, the IP terminal 16310-1 of the satellite transmission corporation, the database 16320-1 of the satellite transmission corporation, and the satellite transmission equipment 16330-1 of the satellite transmission corporation are each within the ICS 16000-1, the IP terminal 16310-1 being provided with an ICS special number "4300". As compared to this, in the example shown in FIG. 66, the satellite transmission corporation 16300-2, the IP terminal 16310-2 of the satellite transmission corporation, the database 16320-2 of the satellite transmission corporation, and the satellite transmission equipment 16330-2 of the satellite transmission corporation are each outside of the ICS 16000-2, the IP terminal 16310-2 being provided with an ICS user address "3900".

Embodiment-12

Full-Duplex Communication Including Satellite Communication Path: Part 5

The present embodiment performs a type of full-duplex communication by combining a satellite transmission function and an IP communication function. A major difference between the present embodiment and Embodiment-8 is the fact that the satellite receiving equipment is within the access control apparatus in the present embodiment.

Figure 73:
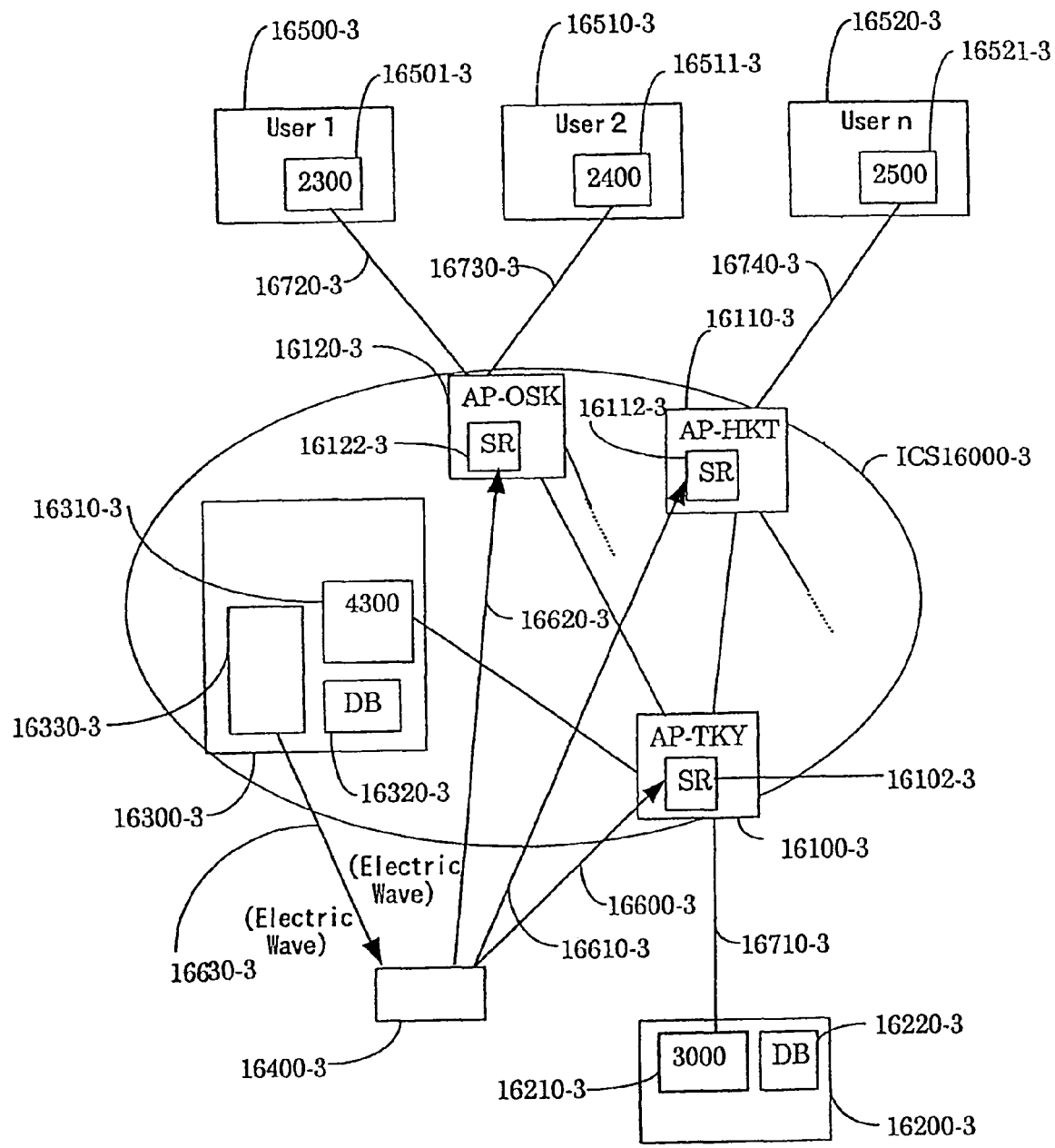
FIG. 73 s a constructional block showing a twelfth embodiment (full-duplex communication path) according to the present invention.

Description will be made with reference to FIG. 73. The present embodiment is comprised of: an ICS 16000-3; access control apparatuses 16100-3, 16110-3 and 16120-3; satellite reception equipments 16102-3, 16112-3 and 16122-3; a data providing corporation 16200-3; an IP terminal 16210-3 of the data providing corporation; a satellite transmission corporation 16300-3; an IP terminal 16310-3 of the satellite transmission corporation; a database 16320-3 of the satellite transmission corporation; a satellite transmission equipment 16330-3 of the satellite transmission corporation; a communication satellite 16400-3; users 16500-3, 16510-3 and 16520-3; IP terminals 16501-3, 16511-3 and 16521-3 of each user; satellite airwaves communication lines 16600-3, 16610-3, 16620-3 and 16630-3; and user logic communication lines 16710-3, 16720-3, 16730-3 and 16740-3. The IP terminals 16210-3, 16501-3, 16511-3 and 16521-3 each have ICS user addresses "3000", "2300", "2400" and "2500", respectively and are respectively connected to the access control apparatuses 16100-3, 16120-3, 16120-3 and 16110-3, via user logic communication lines. The IP terminal 16310-3 can be classified as an ICS network server, having an ICS special number "4300", and connected to the access control apparatus 16100-3 via the ICS network communications line within the ICS 16000-3. Electric wave transmitted from the satellite transmitter 16330-3 transfers information via the satellite electric wave communication path 16630-3, the electric wave is received by satellite receivers 16102-3, 16112-3 and 16122-3.

<<Example of Communication Procedures >>

Figure 74:
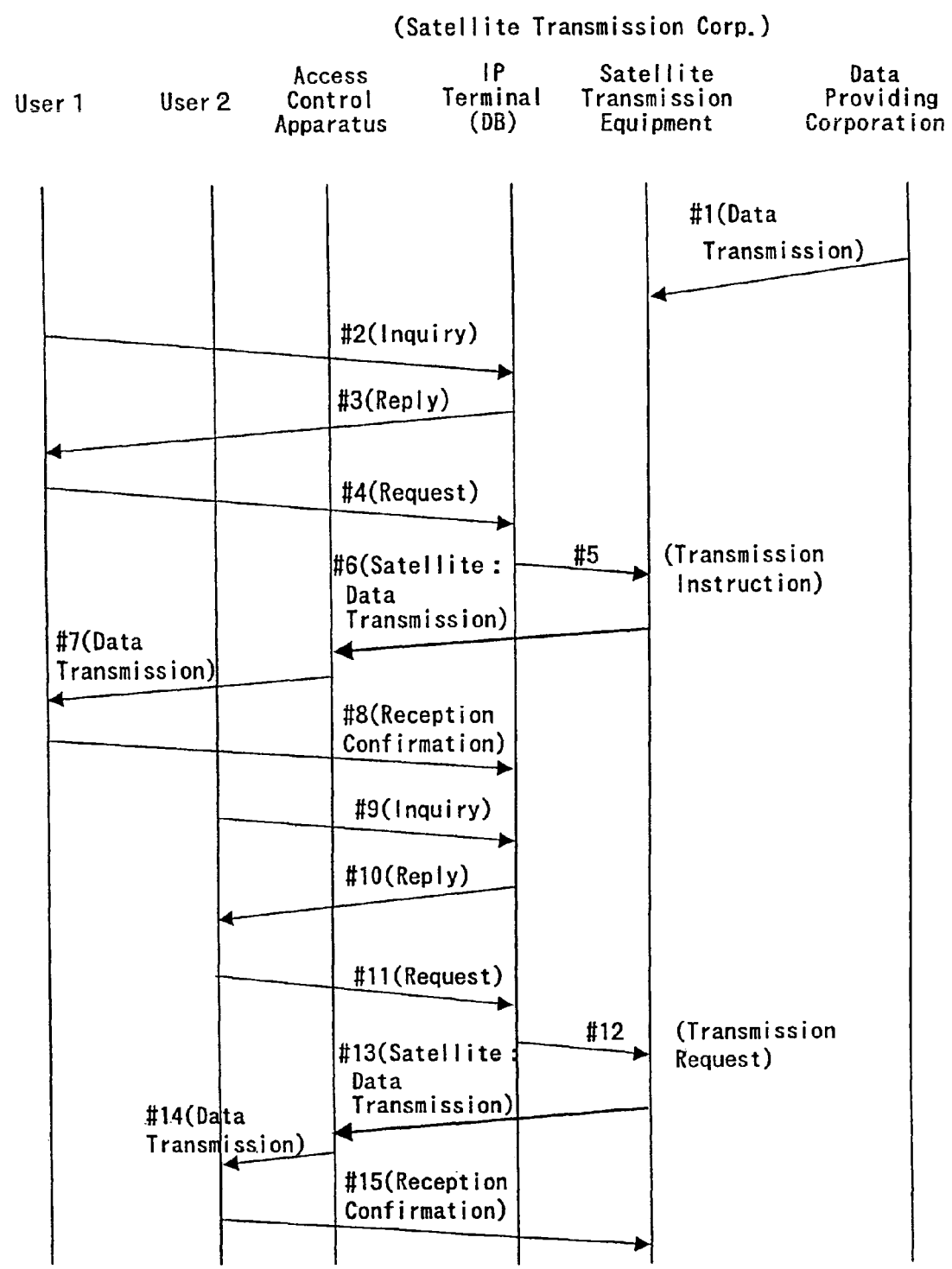
FIG. 74 is a timing chart to show an operation of a twelfth embodiment.

The communication procedures according to the present embodiment will be made with reference to FIG. 73 and 74. In the following procedures, the aforementioned full-duplex communication of TCP technology is employed except for the cases of transmission instruction to satellite transmission equipment (#5 and #12 in FIG. 74) and "data transmission"

using electric wave from the satellite transmission equipment (#6 and #13 in FIG. 74), however, only the TCP data transfer phase is shown in FIG. 74.

The IP terminal 16210-3 of the data providing corporation 16200-3 obtains "data to be provided" from the database 16220-3 thereof and sends this to the IP terminal 16310-3 of the satellite transmission corporation 16300-3 which can be identified by the ICS special number "4300", using the IP packet transfer function of the ICS (#1 in FIG. 74, the same hereafter). The satellite transmission corporation 16300-3 stores the received "data to be provided" in its database 16320-3. The IP terminal 16501-3 of the user 16500-3 sends an "inquiry packet" to the IP terminal 16310-3 which can be identified with the ICS user address "4300" (#2). The IP terminal 16310-3 returns a "reply packet" (#3), the IP terminal 16501-3 receives the "reply packet", and then sends a "request packet" to the IP terminal 16310-3 (#4). When the IP terminal 16310-3 receives the "request packet", it converts the "data to be provided" saved in the database 16320-3 into ICS packet format and instructs transmission thereof (#5). Here, the data portion of the ICS packet is the "data to be provided", and the destination ICS user address is address "2300" of the IP terminal 16501-3. The satellite transmission equipment 16330-3 emits the ICS packet including "data to be provided" as electric wave toward the communication satellite 16400-3 (first half of #6), the communication satellite 16400-3 amplifies the received "data to be provided" and emits it (latter half of #6), the satellite receiving equipments 16102-3, 16112-3 and 16122-3 each receive the ICS frame including the "data to be provided" as electric wave, each check the destination of the "data to be provided", and since the destination of the "data to be provided" is IP terminal 16501-3, the access control apparatus 16122-3 returns the "data to be provided", to the ICS user frame format, and sends it to the IP terminal 16501-3 (#7). Upon receiving the "data to be provided", the IP terminal 16501-3 sends a "reception confirmation packet" to the IP terminal 16310-3 (#8). In the above procedures, #1, #2, #3, #4, #7 and #8 use the above-described TCP communication technology, and the TCP data transfer phase alone is shown and described.

Next, the procedures #9, #10, #11, #12, #13, #14 and #15 shown in FIG. 74 are almost the same as the above procedures, the difference in this example being that instead of the user 16500-3, and the IP terminal 16501-3, another company 16510-3, and IP terminal 16511-3, and the present embodiment is capable of transferring "data to be provided" to a plurality of users.

The above-described communication procedures shall be described with reference to FIG. 64. The sending of an "inquiry packet" (#2), the returning of a "reply packet" (#3), the sending of a "request packet" (#4), "data transmission" by satellite communication (#7), and the sending of "reception confirmation packet" in FIG. 64 correspond with the sending of an "inquiry packet" (#2), the returning of a "reply packet" (#3), the sending of a "request packet" (#4), "data transmission" by satellite communication (#7), and the sending of "reception confirmation packet" (#8) in FIG. 74, respectively. From the above description, in the event that the satellite communication corporation 16300-3 and the data providing corporation 16200-3 are viewed as an "integrated communication entity, the user in FIG. 64 can be considered to be performing full-duplex communication with the aforementioned integrated communication entity.

<<Another Variation on Above Embodiment>>

In the above two embodiments, the full-duplex communication of TCP technology is employed, and only the TCP data transfer phase is shown in the figures, with the TCP connection establishment phase and TCP connection ending phase being omitted from the drawings and from the description thereof In the embodiment to be described now, UDP communication technology described in FIG. 62 is applied to a part or to all, and part or all of the packet sending and receiving using the TCP data transfer phase technique is replaced with packet sending and receiving using the UDP data transfer phase technique.

<<Another Variation on Above Embodiment>>

Figure 75:
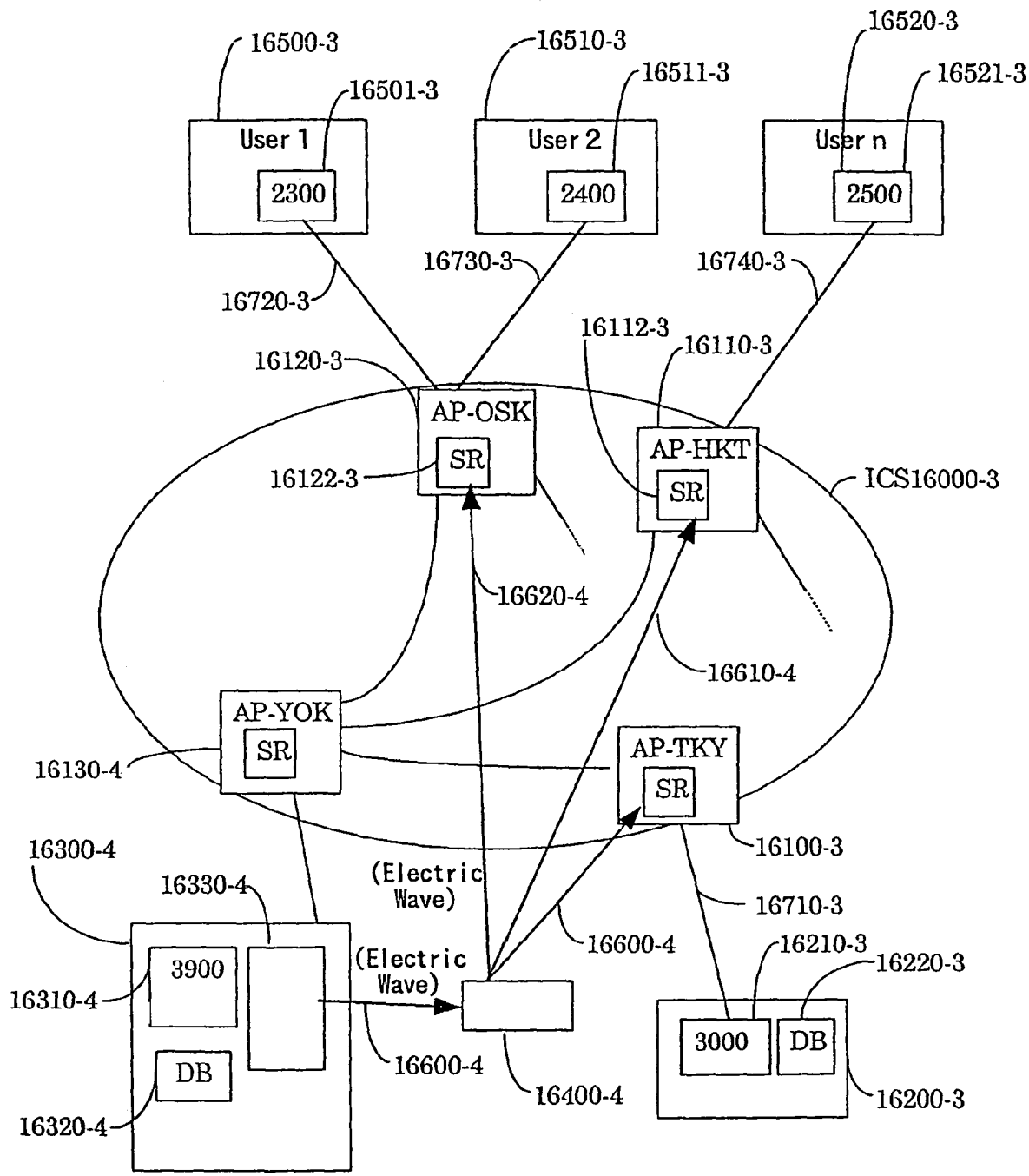
FIG. 75 is a constructional block to show a variation of a twelfth embodiment.

Another version will be described with reference to FIG. 75. In FIG. 73, the satellite transmission corporation 16300-3, the IP terminal 16310-3 of the satellite transmission corporation, the database 16320-1 of the satellite transmission corporation, and the satellite transmission equipment 16330-3 of the satellite transmission corporation are each inside the ICS 16000-3, the IP terminal 16310-3 being provided with an ICS special number "4300". As compared to this, in the example shown in FIG. 75, the satellite transmission corporation 16300-4, the IP terminal 16310-4 of the satellite transmission corporation, the database 16320-2 of the satellite transmission corporation, and the satellite transmission equipment 16330-4 of the satellite transmission corporation are each outside of the ICS 16000-3, the IP terminal 16310-4 being provided with an ICS user address "3900".

Embodiment-13

Control of Receiving Priority Degree

Figure 3:
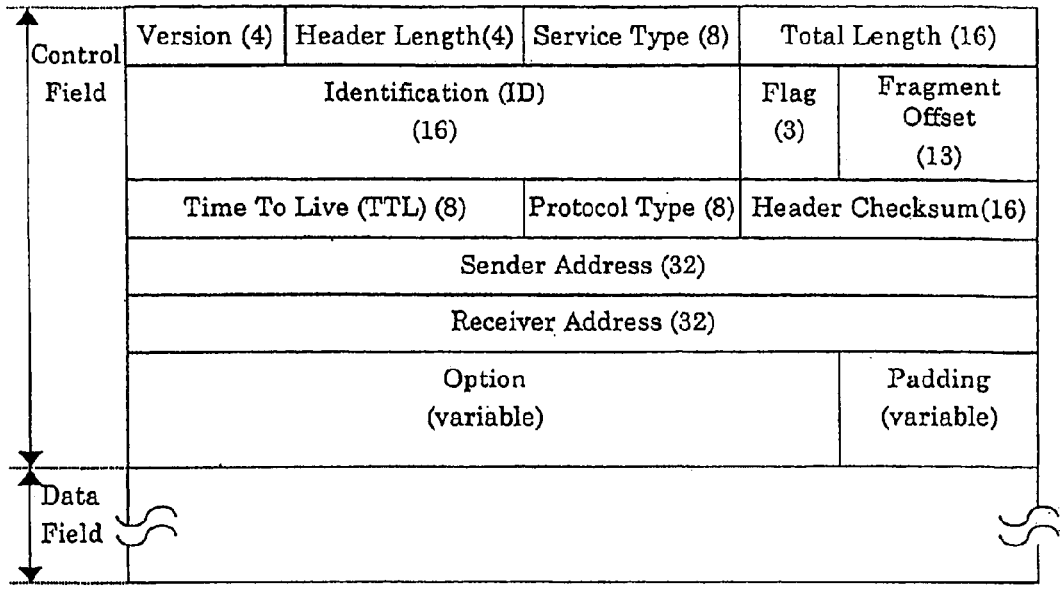
FIG. 3 is a diagram illustrating an IP packet according to RFC791 stipulation.
Figure 76:
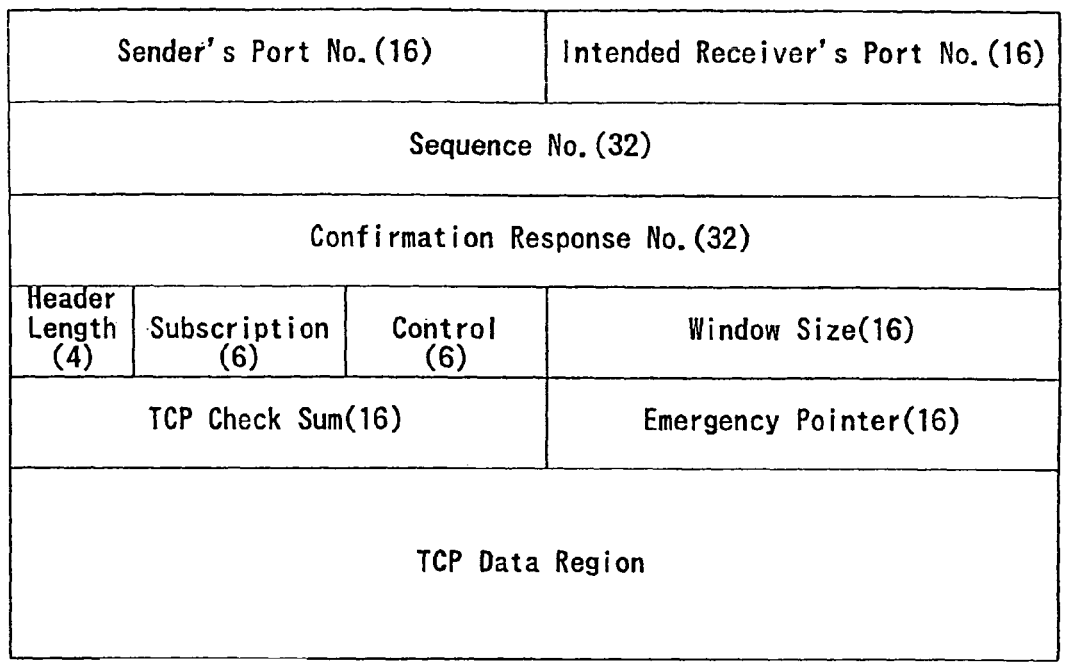
FIG. 76 is a diagram to show an example of TCP frame.
Figure 77:
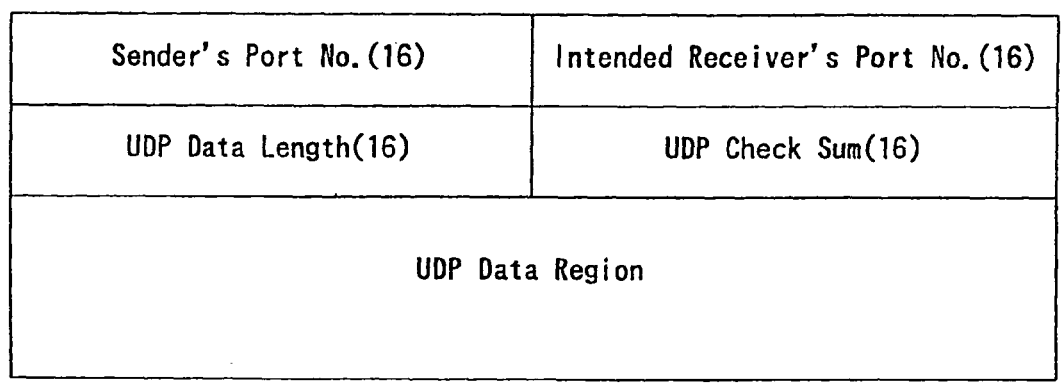
FIG. 77 is a diagram to show an example of UDP frame.

In the control field of the IP packet shown in FIG. 3, there is a transmitting IP address and a destination IP address in addition to the "protocol type", and in the TCP packet shown in FIG. 76 and the UDP frame shown in FIG. 77 there are defined a sender's port number and an intended receiver's port number, respectively. The 48 bits of data consisting of the IP address (32 bits) and the port number (16 bits) laid out is called a socket number. That is, socket number=IP address| port number. In the present embodiment, the following terms shall be used: sender's socket number=sender's IP address sender's port number; intended receiver's socket number=intended receiver's IP address| intended receiver's port number. The present embodiment is an example of controlling the degree of priority of the ICS user frame which is obtained by reaching the access control apparatus from the ICS network communication line and being reversely ICS-encapsulated here, this controlling the degree of priority being performed using the "protocol type" which is displayed in the ICS user frame, and the socket number thereof.

Figure 78:
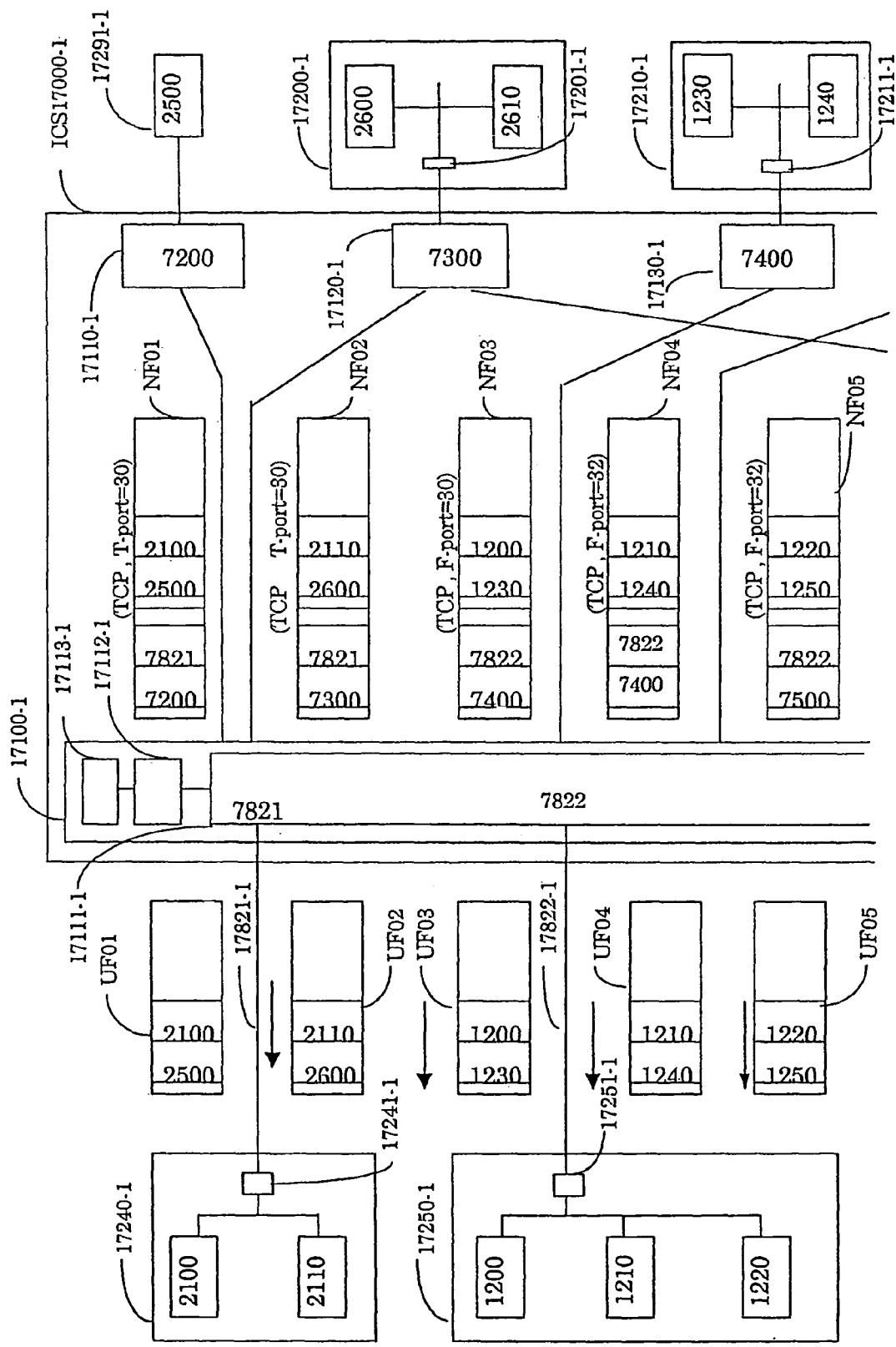
FIG. 78 is a portion of a constructional block showing a thirteenth embodiment (control of receiving priority degree) according to the present invention.
Figure 79:
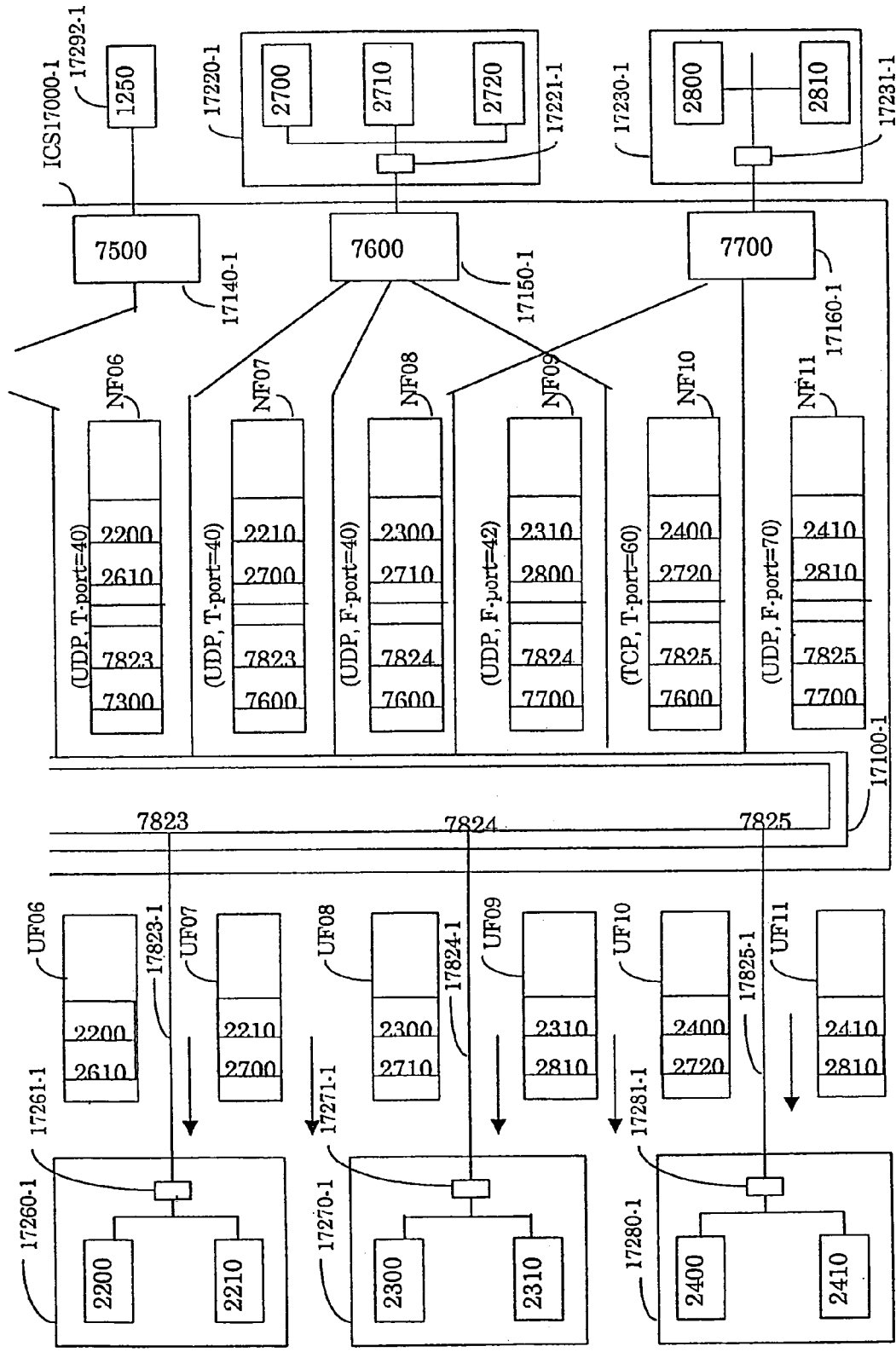
FIG. 79 is a portion of a constructional block showing a thirteenth embodiment according to the present invention.

As shown in FIGS. 78 and 79, an ICS 17000-1 includes access control apparatuses 17100-1, 17110-1, 17120-1, 17130-1, 17140-1, 17150-1 and 17160-1, and the access control apparatus 17100-1 includes a line unit 17111-1, a processing device 17112-1 and a conversion table 17113-1. Blocks 17200-1, 17210-1, 17220-1, 17230-1, 17240-1, 17250-1, 17260-1, 17270-1 and 17280-1 are each corporation LANs, and are each connected to the ICS 17000-1 via the respective gateways 17201-1, 17211-1, 17221-1, 17231-1, 17241-1, 17251-1, 17261-1, 17271-1 and 17281-1. Each LAN has 2 to 3 terminals having functions for sending IP user packet, wherein the ICS user addresses are: for within LAN 17200-1, "2600" and "2610"; for within LAN 17200-1, "2600" and "2610"; for within LAN 17210-1, "1230" and "1240"; for within LAN 17220-1, "2700", "2710", and "2720"; for within LAN 17230-1, "2800" and "2810"; for within LAN 17240-1, "2100" and "2110"; for within LAN 17250-1, "1200", "1210", and "1220"; for within LAN 17260-1, "2200" and "2210"; for within LAN 17270-1, "2300" and "2310"; and for within LAN 17280-1, "2400" and "2410". Further, blocks 17291-1 and 17292-1 are each terminals which have functions of sending and receiving IP user packets, respectively having ICS user addresses "2500" and "1250", being connected to ICS 17000-1.

<<Conversion Table>>

The conversion table 17113-1 within the access control apparatus 17100-1 shall be described with reference to FIGS. 80 and 81. The function of the conversion table is the same as those in the other embodiments, and the present invention is characterized in that the portion table, named "degree of priority of reception" code (Code of Receiving Priority Degree), degree of priority of protocol (Priority Degree of Protocol), degree of priority of TCP socket (Priority Degree of TCP Socket), and degree of priority of UDP socket (Priority Degree of UDP Socket), which are components of the conversion table 17113-1 are used for controlling the degree of priority. In the event that the transmitting ICS network address of the conversion table is "7821", the "degree of priority of reception" code is stipulated to be "pr-7821". That is, the "degree of priority of reception" code is made to be a parameter which is dependent on the ICS network address provided to the ICS user logic terminal sent from the access control apparatus after the ICS reverse encapsulation. Looking at the other portion table of the conversion table 17113-1, e.g., in regard to "pr-7821", the degree of priority of protocol is described as being "p-1", the degree of priority of TCP socket as "t-1", and the degree of priority of UDP socket as "NULL". Here, "NULL" indicates "unspecified". The degree of priority of protocol "p-1" dictates that the degree of priority is, in descending order, "TCP", "UDP", "ICPM" and "IGPM".

Looking at even other portion table with regard to the degree of priority of TCP socket "t-1", the dictated order of degree of priority is, in descending order, "sk-1" and "sk-7". Looking at even other portion table with regard to the degree of priority of UDP socket "u-1", the dictated order of degree of priority is, in descending order, "sk-3" and "sk-8". Further, in the contents of the socket code "sk-1" which is written in another portion table, "To" indicates the intended receiver's socket number, and indicates that the intended receiver's IP address is "2100" and that the intended receiver's port number is "30", and in the same manner, in the contents of the socket code "sk-2", "From" indicates the sender's socket number, and indicates that the sender's IP address is "1240" and that the sender's port number is "32".

<<Individual Description of ICS Packet>>

The ICS network frame NF01 is sent out from the terminal 17291-1 with the ICS user address "2500", and then is ICS-encapsulated at the access control apparatus 17110-1 with a transmitting ICS network address "7200" and a receiving ICS network address "7821", then is transferred within the ICS 17000-1 and reaches the access control apparatus 17100-1, where it is reversely ICS-encapsulated to become an ICS user frame UF01, and reaches the terminal with the ICS user address "2100" via the user logic communication line 17821-1. The "protocol type" of the control field of the user packet UF01 which is within the ICS network packet NF01 is TCP, and the "intended receiver's port number" of the TCP packet is "30" in the example.

In the following, beginning with a packet NF02, brief description will be made in the order of NF03, NF04, NF05, NF06, NF07, NF08, NF09, NF10 and NF11, as shown in FIG. 78.

A frame NF02 is sent out from a terminal with the ICS user address "2600", and then is ICS-encapsulated at access control apparatus 17120-1 with a transmitting ICS network address "7300" and a receiving ICS network address "7821", then is transferred within the ICS and is reversely ICS-encapsulated to become a frame UF02, and reaches the terminal with the ICS user address "2110" via the user logic communication line 17821-1. The "protocol type" of the packet UF02 is TCP, and the "intended receiver's port number" of the TCP packet is "30", in this example.

A frame NF03 is sent out from a terminal with the ICS user address "1230", and then is ICS-encapsulated at access control apparatus 17130-1 with a transmitting ICS network address "7400" and a receiving ICS network address "7822", then is transferred within the ICS and is reversely ICS-encapsulated to become a packet UF03, and reaches the terminal with the ICS user address "1200" via the user logic communication line 17822-1. The "protocol type" of the packet UF03 is TCP, and the "intended receiver's port number" of the TCP packet is "30", in this example.

A frame NF04 is sent out from a terminal with the ICS user address "1240", and then is ICS-encapsulated at access control apparatus 17130-1 with a transmitting ICS network address "7400" and a receiving ICS network address "7822", then is transferred within the ICS and is reversely ICS-encapsulated to become a packet UF04, and reaches the terminal with the ICS user address "1210" via the user logic communication line 17822-1. The "protocol type" of the packet UF04 is TCP, and the "intended receiver's port number" of the TCP packet is "32", in this example.

A frame NF05 is sent out from a terminal with the ICS user address "1250", and then is ICS-encapsulated at access control apparatus 17140-1 with a transmitting ICS network address "7500" and a receiving ICS network address "7822", then is transferred within the ICS and is reversely ICS-encapsulated to become a packet UF05, and reaches the terminal with the ICS user address "1220" via the user logic communication line 17822-1. The "protocol type" of the packet UF05 is TCP, and the "intended receiver's port number" thereof is "32", in this example.

A frame NF06 is sent out from a terminal with the ICS user address "2610", and then is ICS-encapsulated at access control apparatus 17120-1 with a transmitting ICS network address "7300" and a receiving ICS network address "7823", then is transferred within the ICS and is reversely ICS-encapsulated to become a packet UF06, and reaches the terminal with the ICS user address "2200" via the user logic communication line 17823-1. The "protocol type" of the packet UF06 is UDP, and the "intended receiver's port number" of the TCP packet is "40", in this example.

A frame NF07 is sent out from a terminal with the ICS user address "2700", and then is ICS-encapsulated at access control apparatus 17150-1 with a transmitting ICS network address "7600" and a receiving ICS network address "7823", then is transferred within the ICS and is reversely ICS-encapsulated to become a packet UF07, and reaches the terminal with the ICS user address "2210" via the user logic communication line 17823-1. The "protocol type" of the packet UF07 is UDP, and the "intended receiver's port number" thereof is "40", in this example.

A packet NF08 is sent out from a terminal with the ICS user address "2710", and then is ICS-encapsulated at access control apparatus 17150-1 with a transmitting ICS network address "7600" and a receiving ICS network address "7824", then is transferred within the ICS and is reversely ICS-encapsulated to become a packet UF08, and reaches the terminal with the ICS user address "2300" via the user logic communication line 17824-1. The "protocol type" of the packet UF08 is UDP, and the "intended receiver's port number" thereof is "40", in this example.

A packet NF09 is sent out from a terminal with the ICS user address "2800", and then is ICS-encapsulated at access control apparatus 17160-1 with a transmitting ICS network address "7700" and a receiving ICS network address "7824", then is transferred within the ICS and is reversely ICS-encapsulated to become a-packet UF09, and reaches the terminal with the ICS user address "2310" via the user logic communication line 17824-1. The "protocol type" of the packet UF09 is UDP, and the "intended receiver's port number" thereof is "42", in this example.

A packet NF10 is sent out from a terminal with the ICS user address "2720", and then is ICS-encapsulated at access control apparatus 17150-1 with a transmitting ICS network address "7600" and a receiving ICS network address "7825", then is transferred within the ICS and is reversely ICS-encapsulated to become a packet UF10, and reaches the terminal with the ICS user address "2400" via the user logic communication line 17825-1. The "protocol type" of the packet UF10 is TCP, and the "intended receiver's port number" thereof is "60", in this example.

A frame NF11 is sent out from a terminal with the ICS user address "2810", and then is ICS-encapsulated at access control apparatus 17160-1 with a transmitting ICS network address "7700" and a receiving ICS network address "7825", then is transferred within the ICS and is reversely ICS-encapsulated to become a packet UF11, and reaches the terminal with the ICS user address "2410" via the user logic communication line 17825-1. The "protocol type" of the packet UF11 is UDP, and the "intended receiver's port number" thereof is "70", in this example.

Example 1

For Determining the Degree of Priority

Figure 82:
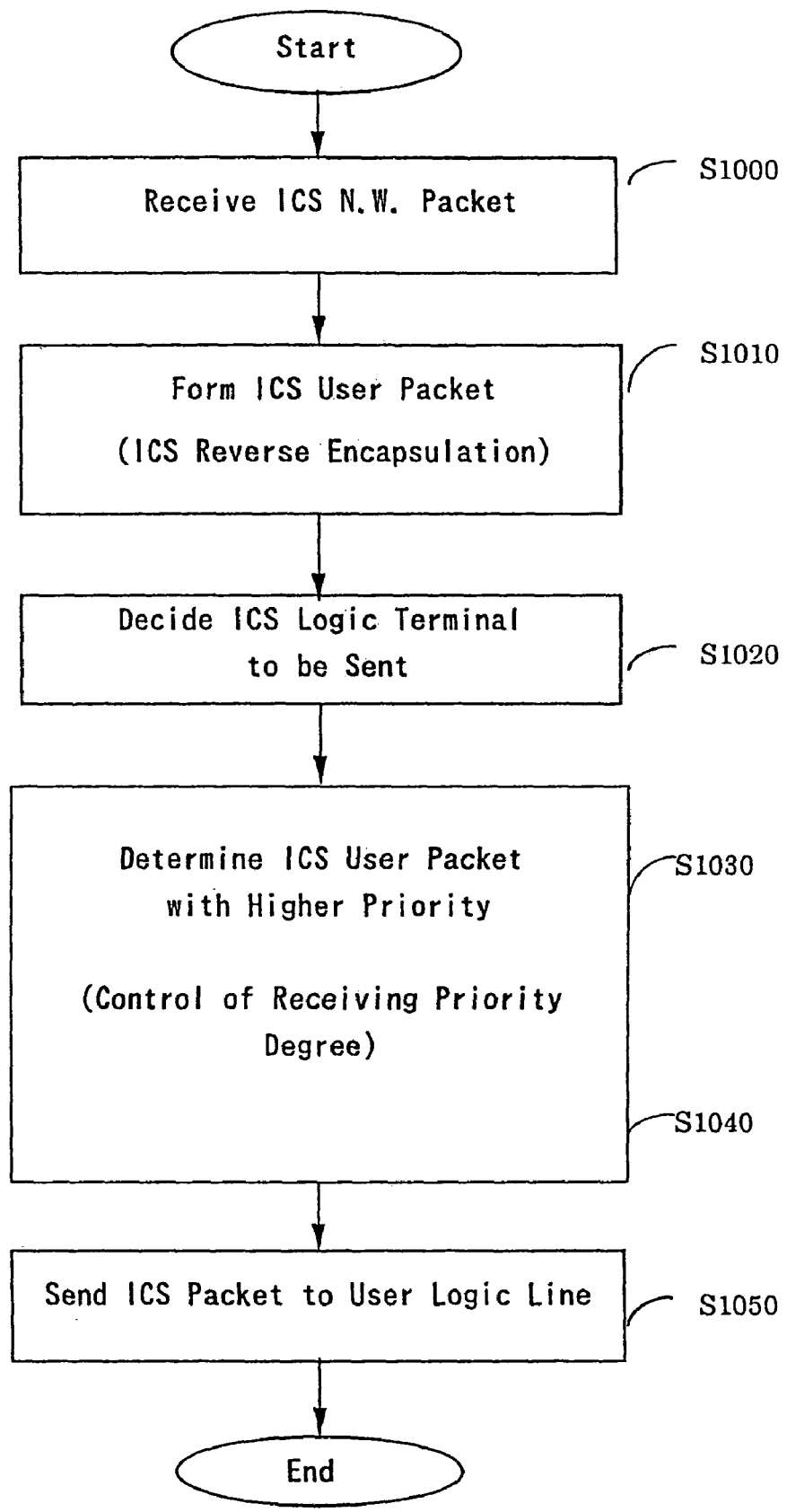
FIG. 82 is a flowchart to show an operation to decide a degree of priority.

The manner in which the degree of priority is determined will be described with reference to the flowchart in FIG. 82. The access control apparatus 17100-1 receives the ICS network packets NF01 and NF02 from the ICS network communication line almost at the same time (Step S1000), and reversely ICS-encapsulates each to obtain ICS user packets UF01 and UF02 (Step S1010). From the conversion table 17113-1 it can be known that the receiving ICS network address of the ICS logic terminal sending these ICS user packets is "7821" for both, i.e., that there is a match (Step S1020). The "degree of priority of reception" code for both ICS network packets NF01 and NF02 is "pr-7821", and then according to portion table of the conversion table 17113-1, the degree of priority of protocol for "pr-7821" is specified as being "p-1", the degree of priority of TCP socket as "t-1", and the degree of priority of UDP socket as "NULL". Further, looking at even other portion table comprising the conversion table 17113-1, the degree of priority of protocol "p-1" dictates that the degree of priority of is, in descending order, TCP, UDP, ICPM and IGPM, and with regard to the degree of priority of TCP socket "t-1", the dictated order of degree of priority of is, in descending order, "sk-1" and "sk-7", and the contents of the socket code "sk-1" indicate that the IP address comprising the intended receiver's socket number is "2100" and that the intended receiver's port number thereof is "30". The protocol type indicated within the ICS network packet NF01 is "TCP", the intended receiver's ID address is "2100", and the intended receiver's port number is "30". On the other hand, the protocol type indicated within the ICS network packet NF02 is "TCP", the intended receiver's ID address is "2110", and the intended receiver's port number is "30". In the present embodiment, it can be understood that it is the ICS network packet NF01 that has the protocol type and intended receiver's socket number that matches with the specifications of the aforementioned socket code "sk-1". Based on the above procedures, it is determined that the ICS network packet to be sent out with higher priority is NF01 (Step S1030). Next, this ICS network packet NF01 is sent out to the user logic terminal via the ICS logic terminal (Step S1040).

Example 2

For Determining the Degree of Priority

The access control apparatus 17100-1 receives the ICS network frames NF03, NF04 and NF05 from the ICS network communication line almost at the same time (Step S1000), and reversely ICS-encapsulates each to obtain ICS user packets UF03, UF04 and UF05 (Step S1010). From the conversion table 17113-1 it can be known that the receiving ICS network address of the ICS logic terminal sending these ICS user packets is "7822" for all, i.e., that there is a match (Step S1020). The "degree of priority of reception" code for all of the ICS network packets NF03, NF04 and NF05 is "pr-7822", the degree of priority of protocol thereof is specified as being IP-1", the degree of priority of TCP socket as "t-2", and the degree of priority of UDP socket as "NULL". The contents of the degree of priority of protocol "p-1" dictates that TCP has the highest degree of priority, and with regard to the degree of priority of TCP socket "t-2", "sk-2" has the highest degree of priority, and the contents of the socket code "sk-2" indicate that the IP address comprising the sender's socket number is "2100" and that the sender's port number thereof is "30". The protocol type indicated within the ICS network packet NF03 is "TCP", the sender's ID address is "1230", and the sender's port number is "30". The protocol type indicated within the ICS network packet NF04 is "TCP", the sender's ID address is "1240", and the sender's port number is "32". Also, the protocol type indicated within the ICS network packet NF05 is "TCP", the sender's ID address is "1250", and the sender's port number is "32". In the present embodiment, it can be understood that it is the ICS network packet NF04 that has the protocol type and the intended receiver's socket number that matches with the specifications of the aforementioned socket code "sk-2". Based on the above procedures, it is determined that the ICS network packet to be sent out with higher priority is NF04 (Step S1030). Next, this ICS network packet NF04 is sent out to the user logic terminal via the ICS logic terminal (Step S1040).

Example 3

For Determining the Degree of Priority

The access control apparatus 17100-1 receives the ICS network packets NF06 and NF07 from the ICS network communication line almost at the same time (Step S1000), and reversely ICS-encapsulates each to obtain ICS user packets UF06 and UF07 (Step S1010). From the conversion table 17113-1 it can be known that the receiving ICS network address of the ICS logic terminal sending these ICS user packets is "7823" for both, i.e., that there is a match (Step S1020). The "degree of priority of reception" code for both ICS network packets NF06 and NF07 is "pr-7823", and the degree of priority of protocol is specified as being "p-2", the degree of priority of TCP socket as "NULL", and the degree of priority of UDP socket as "u-1". Further, looking at even other portion table comprising the conversion table 17113-1, the degree of priority of protocol "p-2" dictates that the degree of priority is, in descending order, UDP, TCP, ICPM and IGPM, and with regard to the degree of priority of UDP socket "u-1", the dictated order of degree of priority is, in descending order, "sk-3" and "sk-8", and the contents of the socket code "sk-3" indicate that the IP address comprising the intended receiver's socket number is "2200" and that the intended receiver's port number thereof is "40". The protocol type indicated within the ICS network packet NF06 is "UDP", the intended receiver's ID address is "2200", and the intended receiver's port number is "40". On the other hand, the protocol type indicated within the ICS network packet NF07 is "UDP", the intended receiver's ID address is "2110", and the intended receiver's port number is "40". In the present embodiment, it can be understood that it is the ICS network packet NF06 that has the protocol type and the intended receiver's socket number that matches with the specifications of the aforementioned socket code "sk-3". Based on the above procedures, it is determined that the ICS network packet to be sent out with higher priority is NF06 (Step S1030). Next, this ICS network packet NF06 is sent out to the user logic terminal via the ICS logic terminal (Step S1040).

Example 4

For Determining the Degree of Priority

The access control apparatus 17100-1 receives the ICS network packets NF08 and NF09 from the ICS network communication line almost at the same time (Step S1000), and reversely ICS-encapsulates each to obtain ICS user packets UF08 and UF09 (Step S1010). From the conversion table 17113-1 it can be known that the receiving ICS network address of the ICS logic terminal sending these ICS user packets is "7824" for both, i.e., that there is a match (Step S1020). The "degree of priority of reception" code for both ICS network packets NF08 and NF09 is "pr-7824", and the degree of priority of protocol is specified as being "p-2", the degree of priority of TCP socket as "NULL", and the degree of priority of UDP socket as "u-2" The degree of priority of UDP socket "u-2" dictates that socket code "sk-4" has the highest priority, and the contents of the socket signal "sk4" indicate that the IP address comprising the sender's socket number is "2710" and that the sender's port number thereof is "40". The protocol type indicated within the ICS network packet NF08 is "UDP", the sender's ID address is "2710", and the sender's port number is "40". On the other hand, the protocol type indicated within the ICS network packet NF09 is "UDP", the sender's ID address is "2800", and the sender's port number is "42". In the present embodiment, it can be understood that it is the ICS network packet NF08 that has the protocol type and the sender's socket number that matches with the specifications of the aforementioned socket code "sk-4". Based on the above procedures, it is determined that the ICS network packet to be sent out with higher priority is NF08 (Step S1030). Next, this ICS network packet NF08 is sent out to the user logic terminal via the ICS logic terminal (Step S1040).

Example 5

For Determining the Degree of Priority

The access control apparatus 17100-1 receives the ICS network frames NF10 and NF11 from the ICS network communication line almost at the same time (Step S1000), and reversely ICS-encapsulates each to obtain ICS user packets UF10 and UF11 (Step S1010). From the conversion table 17113-1 it can be known that the receiving ICS network address of the ICS logic terminal sending these ICS user packets is "7825" for both, i.e., that there is a match (Step S1020). The "degree of priority of reception" code for both ICS network packets NF10 and NF11 is "pr-7825", and the degree of priority of protocol is specified as being "p-1", the degree of priority of TCP socket as "t-3", and the degree of priority of UDP socket as "u-3". The degree of priority of protocol "p-1" dictates that the degree of priority of TCP is higher than that of UDP. The protocol type indicated in the ICS network packet NF10 is "TCP", and the protocol type indicated in the ICS network packet NF10 is "UDP". Based on the above procedures, it is determined that the ICS network packet to be sent out with higher priority is NF10 (Step S1030). Next, this ICS network packet NF10 is sent out to the user logic terminal via the ICS logic terminal (Step S1040).

Embodiment-14

Control of Transmitting Priority Degree

Description will now be made regarding and embodiment wherein user IP packets arriving from outside the ICS are ICS-encapsulated with the access control apparatus, and then the order of sending out onto the ICS network communication line is decided.

<<Configuration>>

Figure 83:
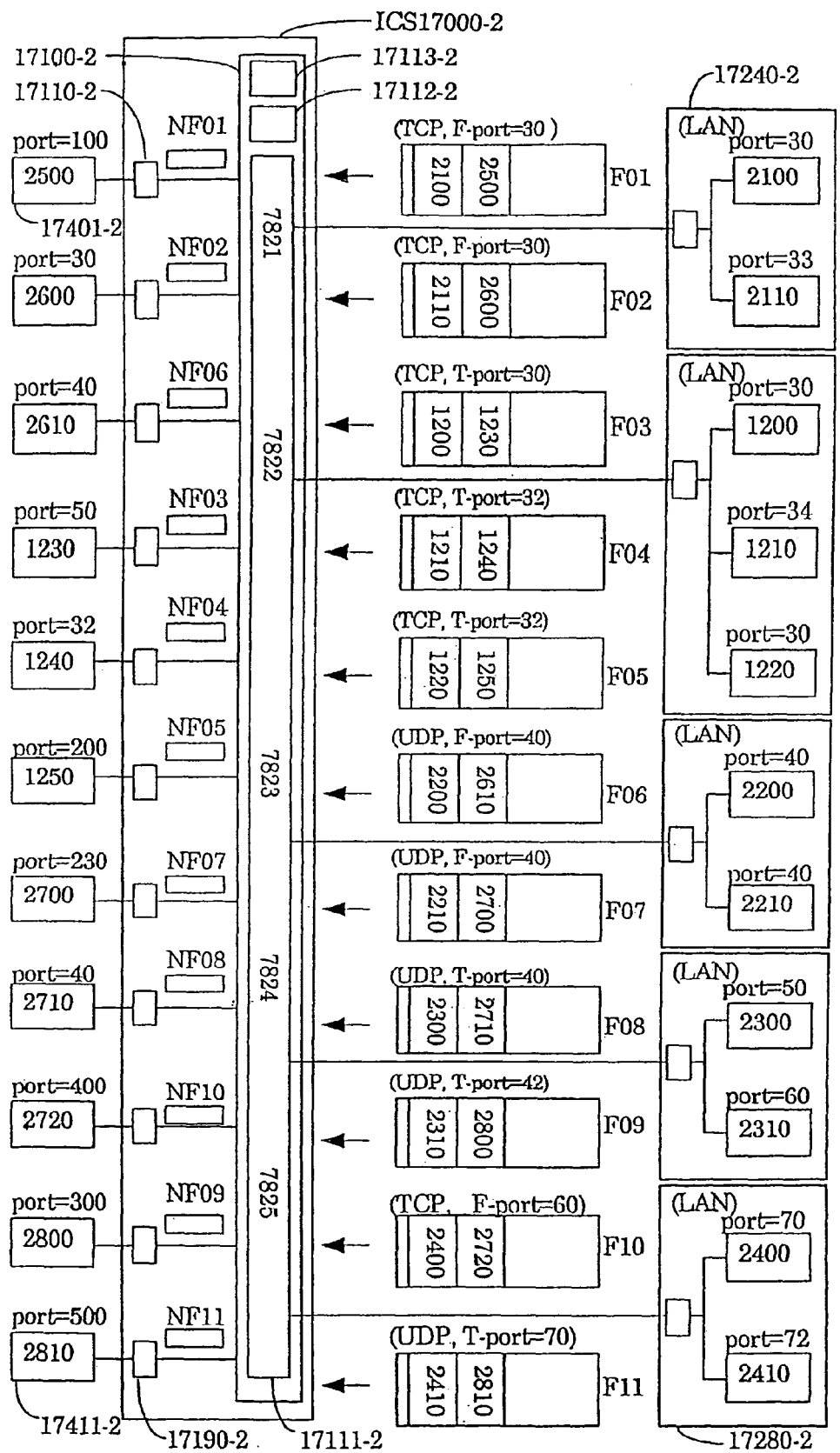
FIG. 83 is a constructional block showing a $14^{th}$ embodiment (control of transmitting priority degree) according to the present invention.

As shown in FIG. 83, an ICS 17000-2 includes access control apparatuses 17100-2 through 17190-2, and the access control apparatus 17100-2 includes a line unit 17111-2, a processing device 17112-2 and a conversion table 17113-2. Blocks 17240-2 through 17280-2 are corporate LANs which are each connected to the ICS 17000-2 via the ICS user logic communication line. Each of the LANs includes a plurality of IP terminals and blocks 17401-2 and 17411-2 are both IP terminals.

<<Conversion Table>>

The functions of the conversion table 17113-2 shown in FIGS. 84 and 85 are the same as those in the other embodiments, and the present invention is characterized in that the portion table, named "degree of priority of reception" code, degree of priority of protocol, degree of priority of TCP socket, and degree of priority of UDP socket, which are components of the conversion table 17113-2 are used for controlling the degree of priority. In the event that the transmitting ICS network address of the conversion table is "7821", the "transmitting priority degree" code is stipulated to be "ps-7821". That is, the "receiving priority degree" code is made to be a parameter which is dependent on the ICS network address provided to the ICS user logic terminal sent from the access control apparatus after the ICS reverse encapsulation. Looking at the other portion table of the conversion table 17113-2, e.g., in regard to "ps-7821", the degree of priority of protocol is described as being "p-21", the degree of priority of TCP socket as "t-21", and the degree of priority of UDP socket as "NULL". The method of describing the degree of priority of protocol, the degree of priority of TCP socket, and the degree of priority of UDP socket, etc. is the same as that of Embodiment-13.

Example 1

For Determining the Degree of Priority

Figure 86:
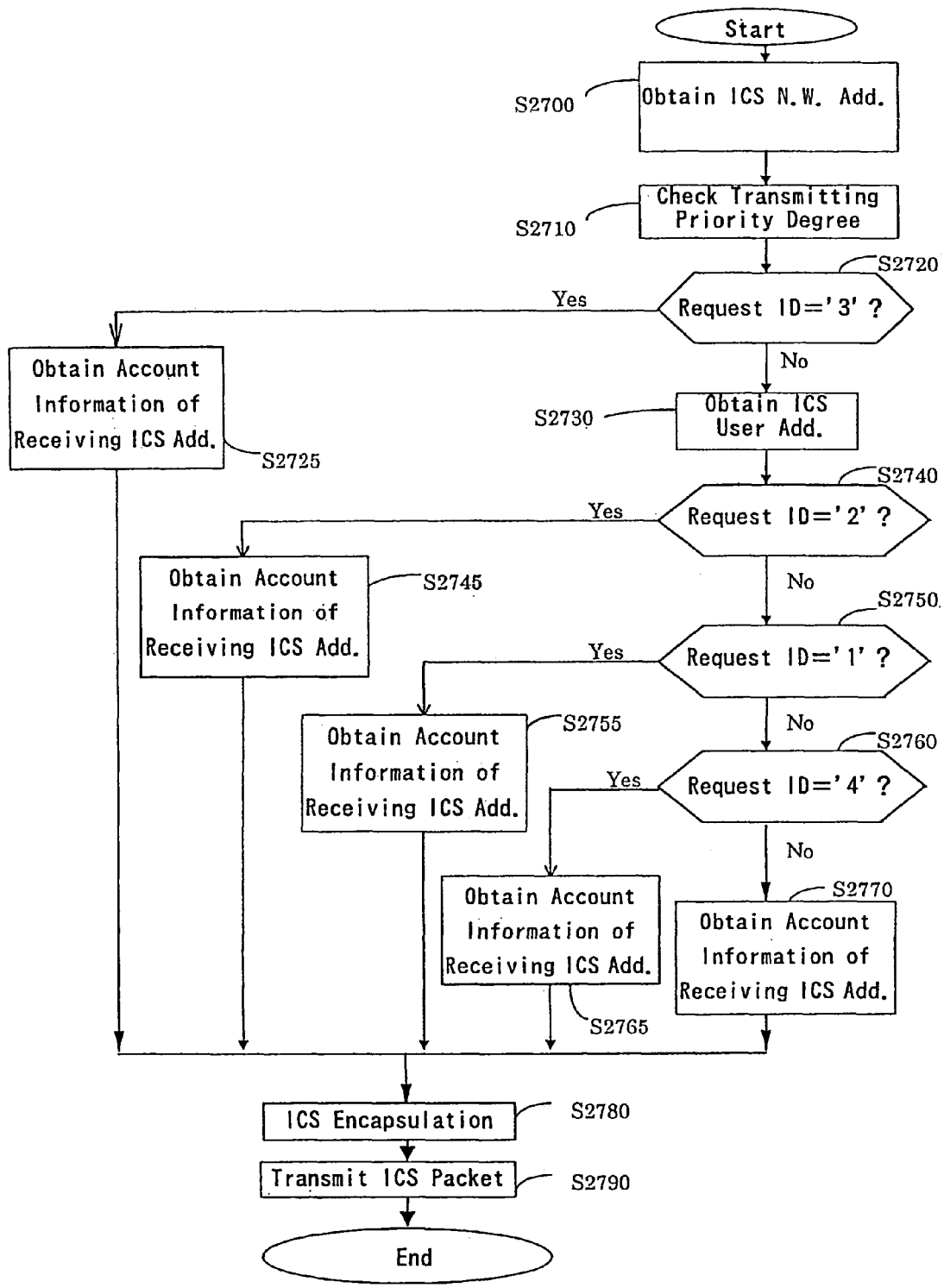
FIG. 86 is a flowchart to show an operation of priority decision in a $14^{th}$ embodiment.

The manner in which the degree of priority is determined will be described with reference to the flowchart in FIG. 86. The access control apparatus 17100-2 receives the ICS user packets F01 and F02 from the ICS network communication line almost at the same time, and obtains the ICS network address appropriated to the ICS logic terminal (Step S2700). Next, the procedures for control of transmitting priority degree are as follows. The "transmitting priority degree" code for both ICS user packets F01 and F02 is "ps-7821", and then according to portion table of the conversion table 17113-2, the degree of priority of protocol for "ps-7821" is specified as being "p-21", the degree of priority of TCP socket as "t-21", and the degree of priority of UDP socket as "NULL". Further, looking at other portion table comprising the conversion table 17113-2, the degree of priority of protocol "p-21" dictates that the degree of priority is, in descending order, TCP, UDP, ICPM, and IGPM, and with regard to the degree of priority of TCP socket "t-211", the dictated order of degree of priority of is, in descending order, "sk-21" and "sk-27", and the contents of the socket signal "sk-21" indicate that the IP address comprising the sender's socket number is "2100" and that the sender's port number thereof is "30". The protocol type indicated within the ICS user packet F01 is "TCP", the sender's ID address is "2100", and the sender's port number is "30". On the other hand, the protocol type indicated within the ICS network packet F02 is "TCP", the sender's ID address is "2110", and the sender's port number is "30". In the present embodiment, it can be understood that it is the ICS network packet F01 that has the protocol type and the intended receiver's socket number that matches with the specifications of the aforementioned socket code "sk-21". Based on the above procedures, it is determined that the ICS user packet to be sent out with higher priority is F01 (Step S2710).

Next, the system checks whether or not the ICS network address "7821" provided to the logic terminal which received the ICS user packet F01 is registered on the conversion table 17113-2 with the request identification as virtual dedicated line connection "3" (Step S2720). The subsequent steps are the same as the steps S2730 through S2770 described with the other embodiments, and at the end ICS encapsulation is performed (Step S2780), and the ICS network packet NF01 is sent into the ICS 17000-2 with priority (Step S2790).

<<Another Example for Determining the Degree of Priority>>

Regarding example 2 for determining the degree of priority wherein the access control apparatus 17100-2 receives the ICS user packets F03, F04 and F05 from the ICS logic terminal of the line portion 17111-2 provided with ICS network address "7822" almost at the same time; example 3 for determining the degree of priority wherein the access control apparatus 17100-2 receives the ICS user packets F06 and F07 from the ICS logic terminal of the line portion 17111-2 provided with ICS network address "7823" almost at the same time; example 4 for determining the degree of priority wherein the access control apparatus 17100-2 receives the ICS user packets F08 and F09 from the ICS logic terminal of the line portion 17111-2 provided with ICS network address "7824" almost at the same time; and example 5 for determining the degree of priority wherein the access control apparatus 17100-2 receives the ICS user packets F10 and F11 from the ICS logic terminal of the line portion 17111-2 provided with ICS network address "7825" almost at the same time: the method for determining the degree of priority is the same as example 1 for determining the degree of priority, as shown in the portion table comprising the conversion table 17113-2, and description thereof will be omitted.

Embodiment-15

Multiple Communication

Figure 87:
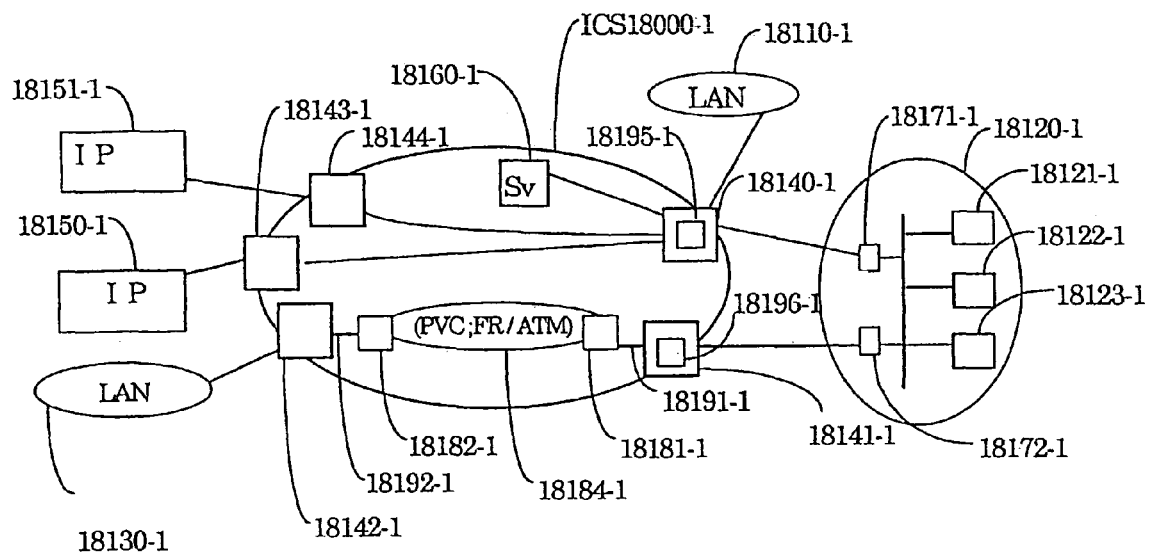
FIG. 87 is a constructional block showing a $15^{th}$ embodiment (multiplex communication) according to the present invention.

The description of the present embodiment will be made with reference to FIG. 87 through FIG. 89. An ICS 18000-1 includes access control apparatuses 18140-1, 18141-1, 18142-1, 18143-1 and 18144-1, a conversion table within the access control apparatus 18140-1 being 18195-1 and the conversion table within the access control apparatus 18141-1 being 18196-1. The conversion table 18195-1, as with the conversion table 6013-1, contains specified values "1", "2", "3" and "4" for request identification, and correspondingly, intra-corporation communication, inter-corporation communication, virtual dedicated line connection, and ICS network server connection can be made within a single access control apparatus. The conversion table 18196-1, contains only the specified value "3" for request identification, enabling virtual dedicated line connection. The ICS network server 18160-1 is connected to the access control apparatus 18140-1 via an ICS network communication line. A block 18184-1 is an FR network or an ATM network; in the event that 18184-1 is an FR network.

LANs 18110-1 and 18130-1 are each connected with access control apparatuses 18140-1 and 18142-1, respectively, via an ICS user logic communication line. The gateways 18171-1 and 18172-1 are connected to the access control apparatus 18140-1 or 18141-1, via an ICS user logic communication line. LAN 18120-1 includes a plurality of IP terminals, 18121-1, 18122-1 and 18123-1. Now, the term "IP terminal" refers to a terminal which has the functions of sending and receiving IP user packets. The IP terminals 18150-1 and 18151-1 are each connected to ICS 18000-1 via access control apparatuses 18143-1, 18144-1, and an ICS user logic communication line. The ICS network communication line 18191-1 connects the conversion unit 18181-1 with the access control apparatus 18141-1, and the ICS network communication line 18192-1 connects the conversion unit 18182-1 with the access control apparatus 18142-1.

ICS user packet sent from the LAN 18120-1 or LAN 18110-1 is, upon arrival to the access control apparatus 18140-1, ICS-encapsulated in order to receive one of the communication services of intra-corporation communication, inter-corporation communication, virtual dedicated line connection, or ICS network server connection, following control of the request identification values "1", "2", "3" or "4" listed in the conversion table 18195-1. Also, an ICS user packet sent from the gateway 18172-1, upon arrival to the access control apparatus 18141-1, is ICS-encapsulated in order to receive virtual dedicated line communication service filling the control of the request identification "3" listed on the conversion table 18196-1, passes through the conversion unit 18181-1 via the ICS network communication line 18191-1, further passes through the FR network or ATM network 18184-1, passes through the conversion unit 18182-1, passes through the ICS network communication line 18192-1, and is delivered to the access control apparatus 18142-1. For the FR network or ATM network 18184-1 here, fixed connection with the other party (PVC) which is a known art is used as the function of the FR network or ATM network. Thus, according to the above-described procedures, transfer of ICS user packets is realized.

<<Partial Change to Above Embodiment: Variation>>

Figure 90:
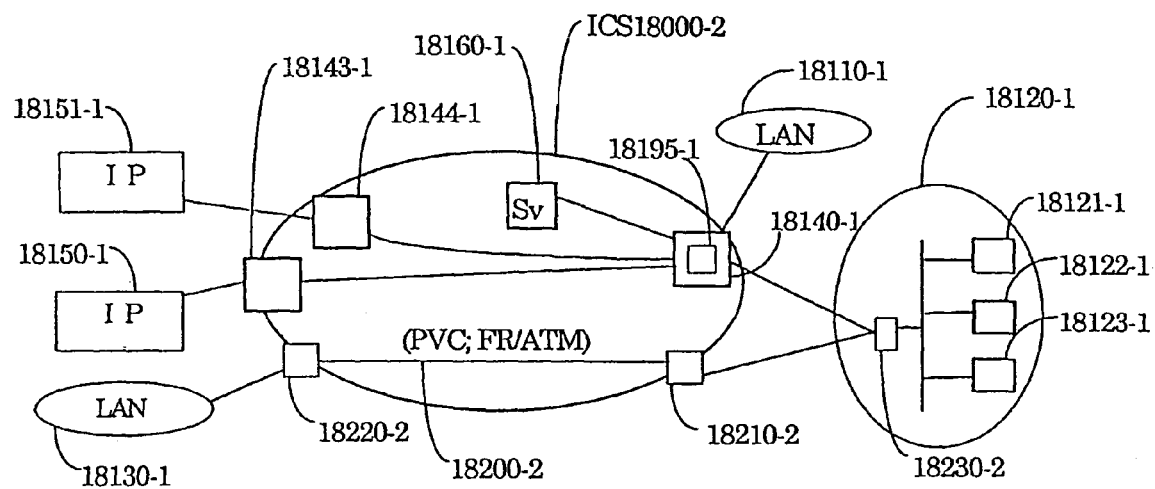
FIG. 90 is a constructional block to show a variation of a $15^{th}$ embodiment.

Description will be made with reference to FIG. 90. As with ICS 18000-1, ICS 18000-2 also includes multiple access control apparatuses, and is connected with LANs and IP terminals through the access control apparatuses. The FR network or ATM network 18184-1 in FIG. 87 is replaced with FR network or ATM network 18200-1; the access control apparatus 18141-1, the conversion unit 18181-1, and the ICS network communication line 18191-1 are replaced with PVC interface conversion unit 18210-2; the access control apparatus 18142-1, the conversion unit 18182-1, and the ICS network communication line 18192-1 are replaced with PVC interface conversion unit 18220-2; and further, the gateways 18171-1 and 18172-1 are replaced with a gateway 18230-2. Now, in the event that a block 18200-2 is an FR network, the PVC interface conversion units 18210-2 and 18220-2 are functions for converting the ICS user packet into the FR packet format, and reverse-converting thereof In the event that 18200-2 is an ATM network, the PVC interface conversion units 18210-2 and 18220-2 are functions for converting the ICS user packet into the ATM frame format, and reverse-converting thereof. Transfer of ICS user packet according to this variation is realized by using the functions of fixed connection with the other party (PVC) by the FR network or ATM network.

Embodiment-16

Operation of ICS

Figure 91:
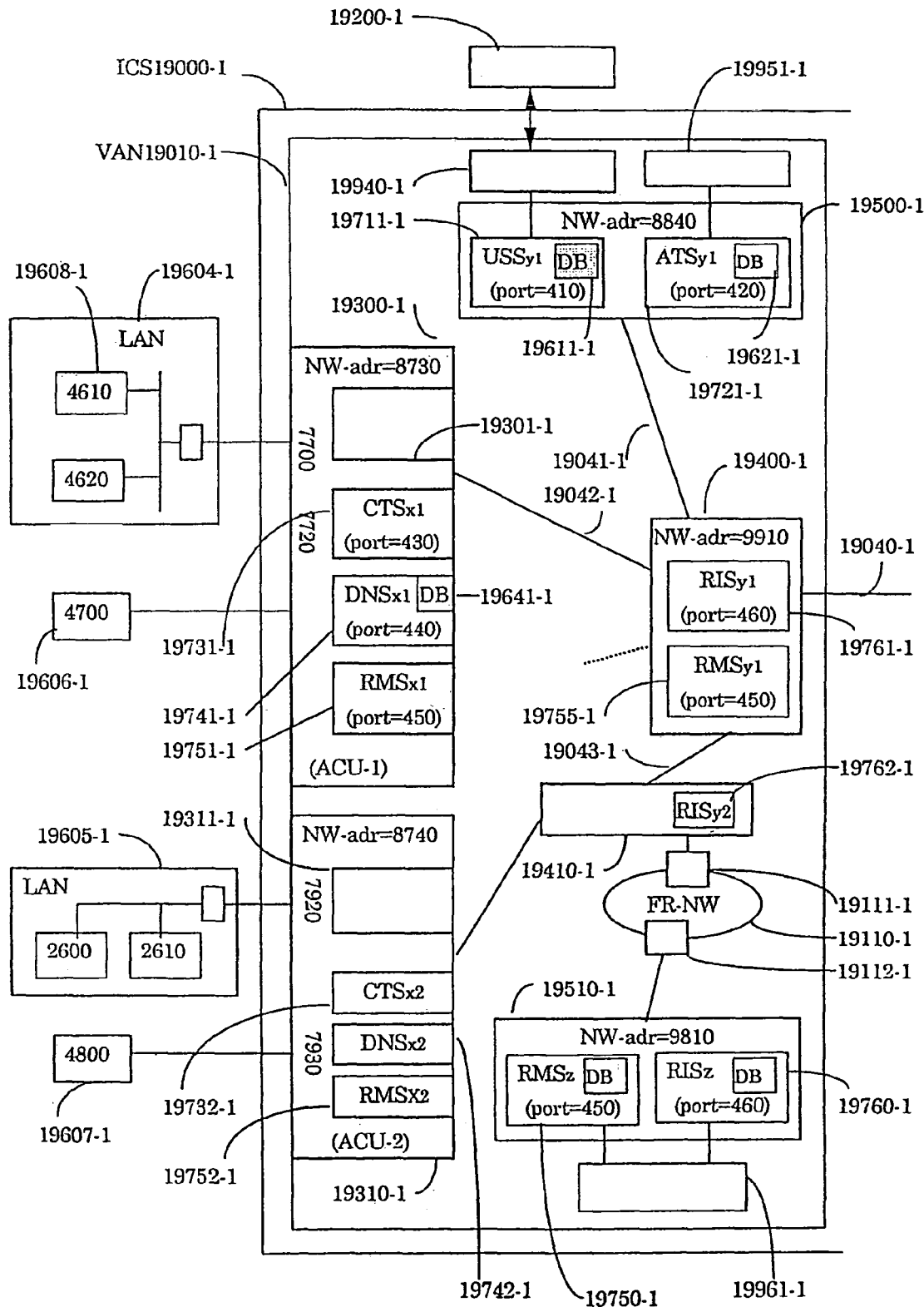
FIG. 91 is a portion of a constructional block showing a $16^{th}$ embodiment (operation of ICS) according to the present invention.
Figure 92:
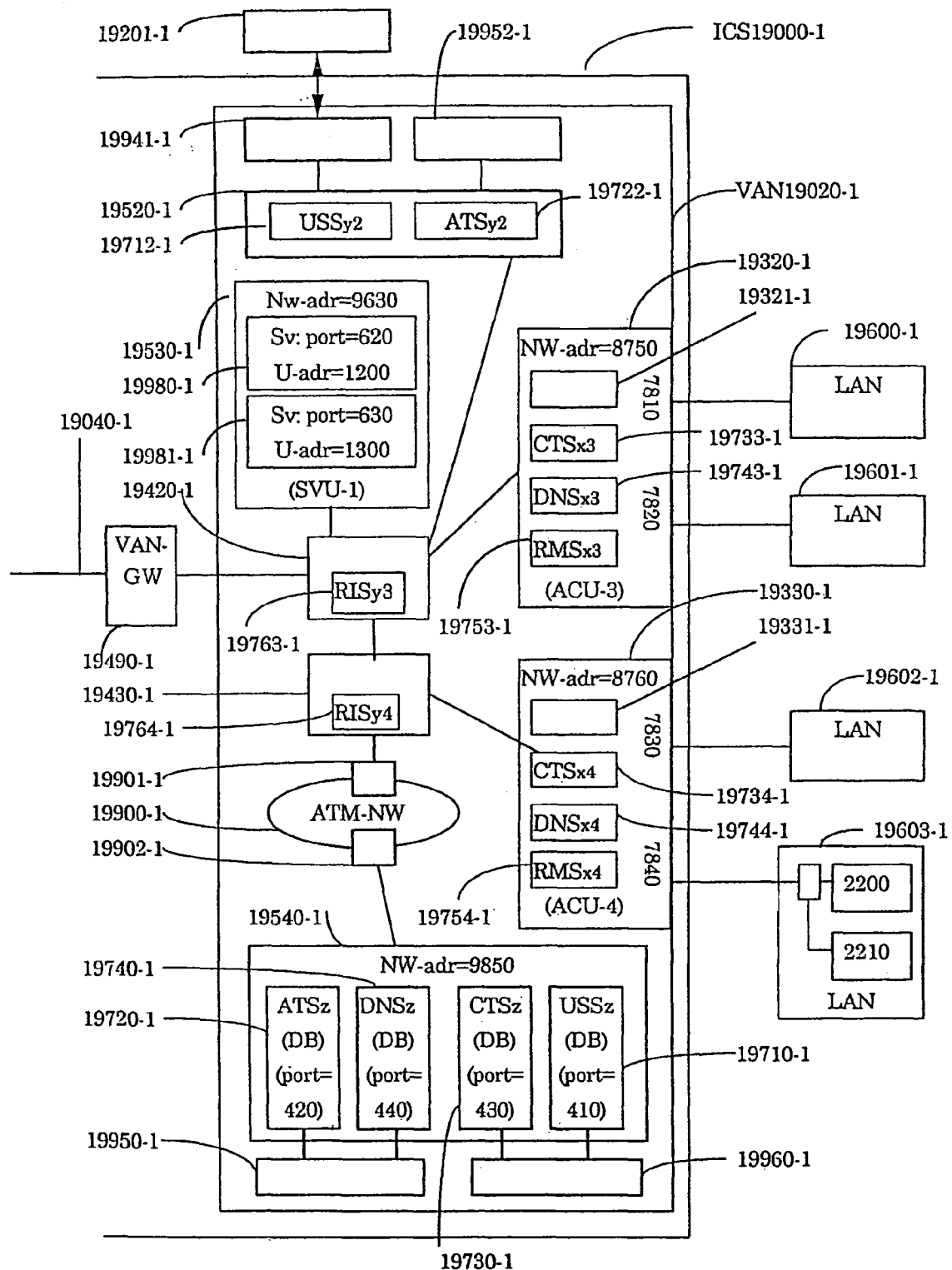
FIG. 92 is a portion of a constructional block showing a $16^{th}$ embodiment according to the present invention.
Figure 93:
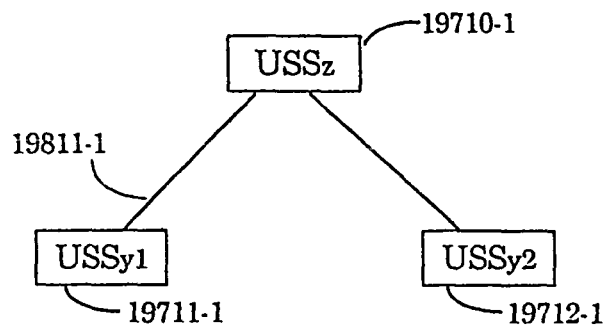
FIG. 93 is a diagram to explain a $16^{th}$ embodiment.
Figure 94:
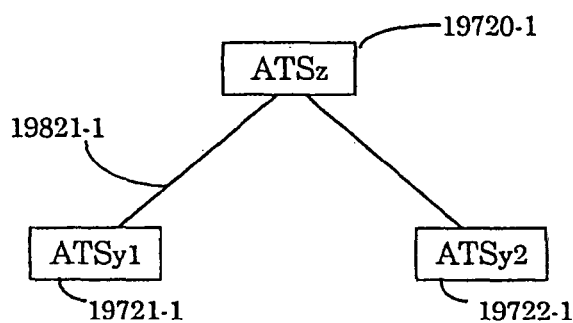
FIG. 94 is a diagram to explain a $16^{th}$ embodiment.
Figure 95:
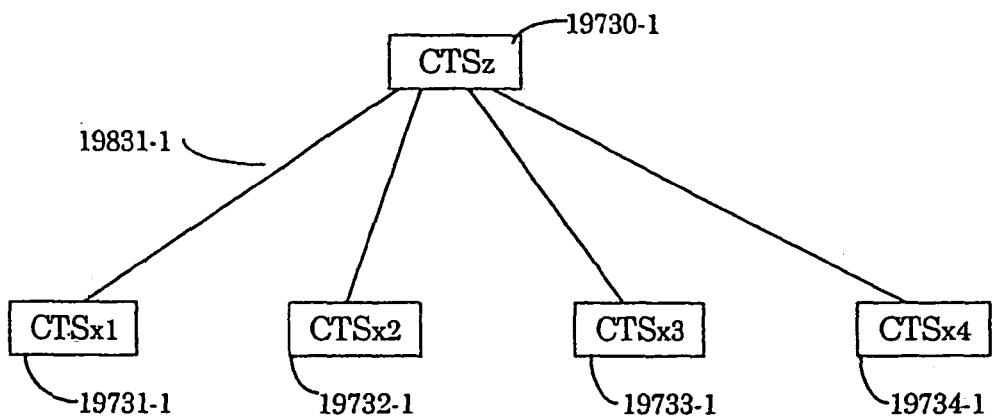
FIG. 95 is a diagram to explain a $16^{th}$ embodiment.
Figure 96:
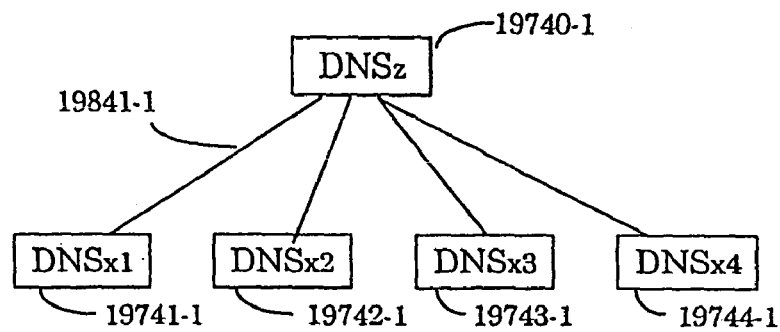
FIG. 96 is a diagram to explain a $16^{th}$ embodiment.
Figure 97:
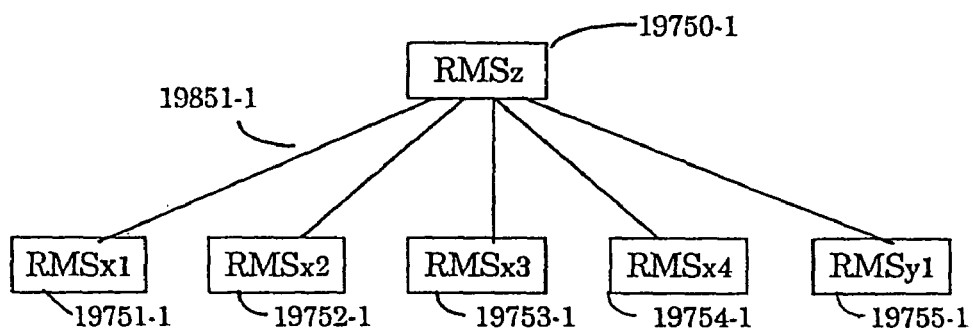
FIG. 97 is a diagram to explain a $16^{th}$ embodiment.
Figure 98:
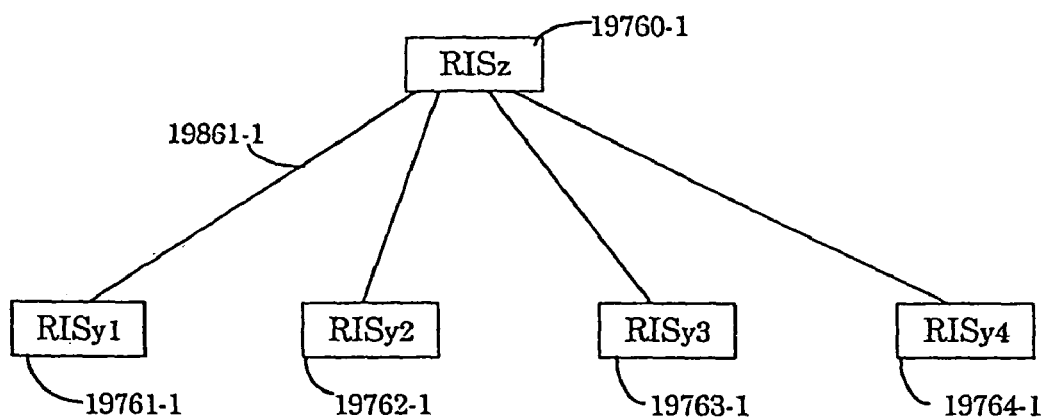
FIG. 98 is a diagram to explain a $16^{th}$ embodiment.

Description will be made with reference to FIGS. 91 and 92. The ICS 19000-1 includes: VAN 19010-1, VAN 19020-1, access control apparatuses 19300-1, 19310-1, 19320-1 and 19330-1, relay devices 19400-1, 19410-1, 19420-1 and 19430-1, inter-VAN gateway 19490-1, and server devices 19500-1, 19510-1, 19520-1, 19530-1 and 19540-1. Each server is provided with an ICS network address, and has a plurality of ICS network servers therein. These plurality of ICS network servers are distinguished by port numbers used with TCP communication protocol or UDP communication protocol. The access control apparatuses 19300-1, 19310-1, 19320-1 and 19330-1 each include conversion tables 19301-1, 19311-1, 19321-1 and 19331-1, each includes conversion table servers 19731-1, 19732-1, 19733-1 and 19734-1, and also includes domain name servers 19741-1, 19742-1, 19743-1 and 19744-1, and also includes resource administration servers 19751-1, 19752-1, 19753-1 and 19754-1, the relay device 19400-1 includes a path information server 19761-1 and resource administration server 19755-1, the relay device 19410-1 includes a path information server 19762-1, the relay device 19420-1 includes a path information server 19763-1, the relay device 19430-1 includes a path information server 19764-1, the server device 19500-1 includes a user service server 19711-1 and ICS authority server 19721-1, the server device 19510-1 includes a governing resource administration server 19750-1 and governing resource administration server 19760-1, the server device 19520-1 includes a user service server 19712-1 and ICS authority server 19722-1, the server device 19530-1 includes an ICS network server 19980-1 which has an ICS user address "1200" and performs electronic library services, and an ICS network server 19981-1 which has an ICS user address "1300" and performs travel information services, the server device 19540-1 includes a governing resource administration server 19720-1, governing domain name server 19740-1, governing conversion table server 19730-1, and governing user service server 19710-1.

The above-described access control apparatuses, relay device, server devices, and VAN gateways are connected by the ICS network communication lines 19040-1, 19041-1, 19042-1 and 19043-1, so as to be able to exchange information one with another using ICS network communication functions. The server devices are formed by, e.g., giving the ICS network communication function to a computer, with programs running therein for realizing server functions.

A block 19110-1 is an FR network, and the conversion units 19111-1 and 19112-1 are for performing interface conversion with the communication lines of the FR exchange network and the ICS communication lines transferring ICS network packets. Also, a block 19900-1 is an ATM network, and the conversion units 19901-1 and 19902-1 are for performing interface conversion with the communication lines of the ATM exchange network and the ICS communication lines transferring ICS network packets.

In the embodiment, connected outside of the ICS 19000-1 are LANs 19600-1, 19601-1, 19602-1, 19603-1, 19604-1 and 19605-1, and IP terminals 19606-1 and 19607-1 having functions for sending and receiving ICS network packets.

<<Hierarchical Structure of the ICS Network Server>>

Description will be made with FIGS. 93 through 98. The governing user server 19710-1 has superior controlling authority in instructing the user service servers 19711-1 and 19712-1 or requesting individual information reports, the meaning of superior controlling authority being illustrated in a tree-structure diagram in FIG. 93. A block 19811-1 is a communication path for information exchange between the governing user service server 19710-1 and the user service server 19711-1, and is comprised of ICS communication lines and relay device, among others. The governing resource administration server 19720-1, the governing conversion table server 19730-1, the governing domain name server 19740-1, the governing resource administration server 19750-1, and the governing resource administration server 19760-1 are also the same, each being shown in FIGS. 94 through 98. Now, in the present embodiment, there are two layers in the tree-structure hierarchy, but this can be increased to three or more layers by increasing the name of access control apparatuses, relay devices, servers devices, etc., places within the ICS. The path information service is provided with the functions of sending and receiving inside the ICS, a path table used by the relay devices and access control apparatuses. The resource administration server is provided with administration functions of keeping up on mounting information or obstruction information of the relay devices, access control apparatuses and server devices.

<<Operation of ICS 19000-1 by ICS Operator>>

The ICS operators 19960-1 and 19961-1 provide instructions such as operation start-up to, or request reports of individual information from, the governing user service server 19710-1, the governing conversion table server 19730-1, the governing resource administration server 19750-1, and the governing resource administration server 19760-1, thereby facilitating operation of the ICS 19000-1.

<<Operation of ICS 19000-1 by ICS Authority>>

The ICS authority 19950-1 provides instructions such as the operation start-up to, or request reports of individual information from, the governing resource administration server 19720-1 and the governing domain name server 19740-1, thereby facilitating administration of addresses and the like used in the ICS 19000-1.

<<Socket Number and Server>>

The ICS servers each have ICS user addresses and ICS network addresses, but an addition to the other embodiments is that the above servers have, in addition to ICS network addresses, port numbers stipulated by TCP or UDP communication protocol. That is, each of the aforementioned servers is identified by a 32-bit ICS network address and a 16-bit port number, making for a value with a total of 48 bits (this being referred to as "socket number"). Each server includes programs which have peculiar functions operating within the ICS 19000-1, and further, there are servers among these which have "operating interface", as described later. Now, the "operating interface" is a function which performs exchange of information, and sends and receives instructions such as operation of the various server functions or start-up or operation, with the operator via a keyboard or the like. Each server provides access control apparatuses or relay devices, for example, with ICS network addresses, applies differing port numbers to the plurality of programs within these devices (i.e., servers), distinguishing by the socket number. As described in the embodiments, each server has ICS network communication functions, and can exchange information one with another using the ICS network address and the port numbers.

<<Registration 1 to ICS of User: Inter-Corporation Communication and ICS Network Server>>

Figure 99:
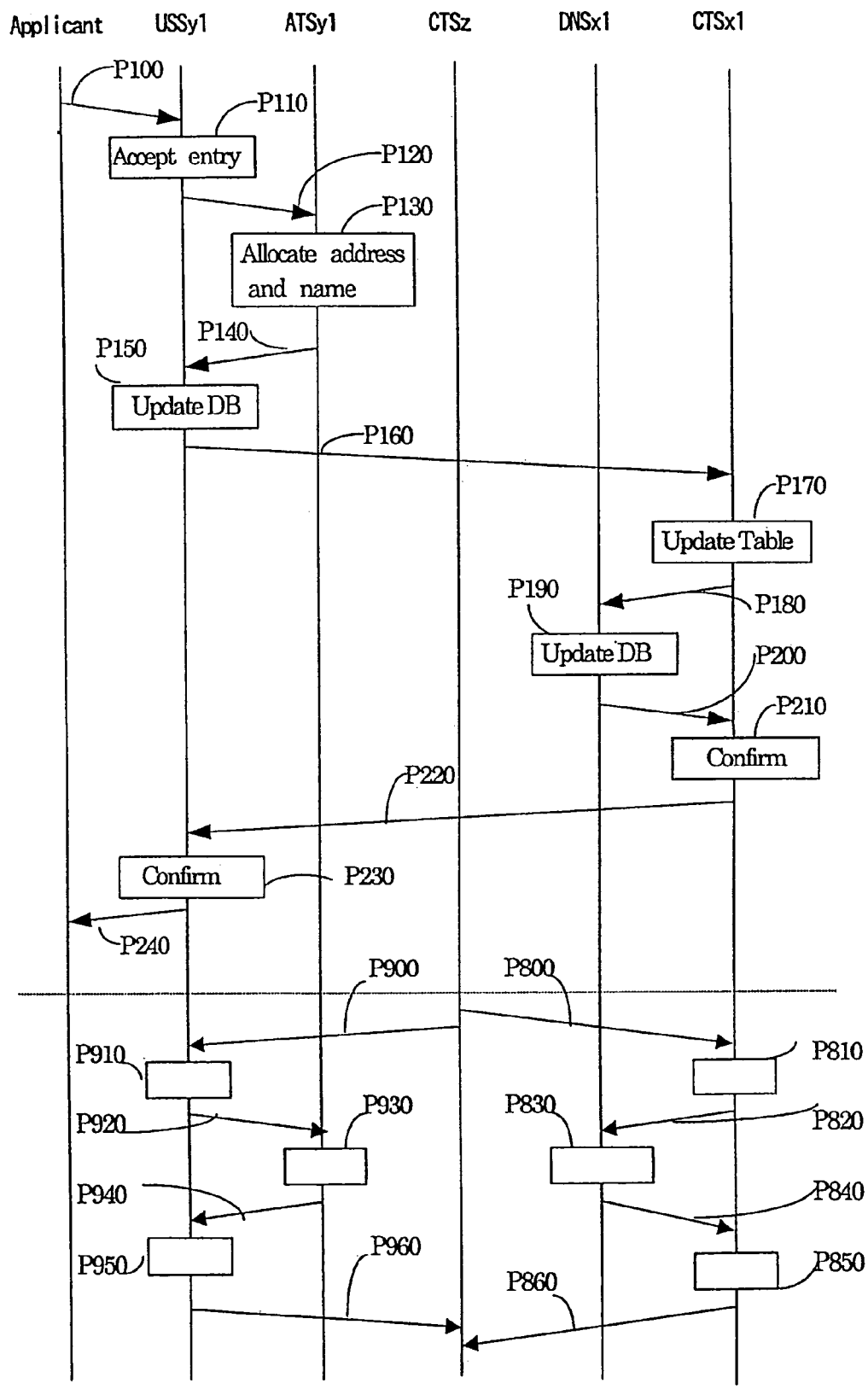
FIG. 99 is a diagram to explain a $16^{th}$ embodiment.

Description will be made with reference to FIG. 91, FIG. 92 and FIG. 99. An applicant 19200-1 to the ICS 19000-1 applies to the ICS receptionist 19940-1 for ICS membership (procedure P100). The "Application reception data" is a usage item of ICS wherein the ICS user address, the ICS network address, and the ICS name has been deleted, and is comprised of, e.g., request identification (classification of intra-corporation communication, inter-corporation communication, virtual dedicated line connection, or ICS network server connection), communication band conditions such as speed class and priority, billing conditions, open-zone connection conditions, payment method, name and address of user (personal ID data), signing conditions, encryption conditions and so on.

The ICS receptionist 19940-1 enters the above "application reception data" to the user service server 19711-1 via the "operating interface", and stores the "application reception data" in the user database 19611-1 (procedure P110). Next, the user service server 19711-1 requests of the ICS authority server 19721-1 the ICS user address, ICS network address and ICS name, using the ICS network communication functions (procedures P120). The ICS authority server 19721-1 appropriates the requested aforementioned ICS address and ICS name using the ICS network address appropriation record table 19622-1 (FIG. 100) and the ICS user address appropriation record table 19623-1 (FIG. 101) stored within the database 19621-1 (procedure P130), stores the appropriation results in the aforementioned appropriation tables, and further returns the appropriation results to the user service server 19711-1 (procedure P140). The user service server 19711-1 stores the appropriation results obtained from the ICS authority server 19721-1 in the user database 19611-1 (procedure P150).

FIG. 100 is an example of the ICS network address appropriation record table 19622-1, and in the first line of this table there is an example which states beforehand that an ICS network address "7700" has been appropriated to ICS logic terminal identifying code LT-001 of the node identifying code ACU-1 that the appropriate identifying code is user-1, that the date of appropriation is Apr. 1, 1998, and that the node identifying code ACU-1 points to the access control apparatus 19300-1. Also, in the third line of this table there is an example which states beforehand that an ICS network address "6930" has been appropriated to port number "620" of the node identifying code SVU-1, that the appropriate identifying code is Sc-001, that the date of appropriation is Feb. 1, 1998, and that the node identifying code SVU-1 points to the server device 19530-1.

FIG. 101 is an example of an ICS user address appropriation record table, and in the first line of this table there is an example which states that the ICS name address "4610" has been appropriated with an ICS name (also called an ICS domain name) of "dd1.cc1.bb1.aa1.jp", that the request identification value is "2", that the appropriate identifying code is user-1, and that the date of appropriation is Apr. 1, 1998. Further, in the fourth line of this table there is an example which states that the ICS name address "1200" has been appropriated with an ICS name of "rrl.qq.ppjp", that the request identification value is "4", that the appropriate identifying code is Sv-001, and that the date of appropriation is Feb. 1, 1998.

The user service server 19711-1 provides information to the conversion table server 19731-1 via the ICS network communication function so as to write the application contents of the usage applicant 19200-1 and the obtained ICS network address into the conversion table 19301-1 in the access control apparatus 19300-1 (procedure P160). The contents to be provided are: transmitting ICS network address, sender ICS user address, request identification, speed class, priority, signing conditions, encryption conditions, open-zone class and so on. Also, in the event that the aforementioned ICS network address and ICS user address have a request value of "2", i.e., inter-corporation communication, registration is made as transmitting ICS network address and sender ICS user address. In the event that the request value is "4", i.e., ICS network server, registration is made as receiving ICS network address and receiver ICS user address. The conversion table server 19731-1 adds the above contents to the conversion table 19301-1 (procedures P170). The receiving ICS network address and the receiver ICS user address are not registered in the conversion table 19301-1 at this time, but are registered in the conversion table 19301-1 at the time of "registration of other party of communication", later described in the present embodiment.

Next, the conversion table server 19731-1 notifies the ICS domain name server 19641-1 of the ICS network address, the ICS user address and the ICS name (procedure P180). The ICS domain name server 19641-1 writes the above received ICS network address, ICS user address and ICS name in the database therein and stores them (procedure P190), and reports completion of writing to the conversion table server 19731-1 (procedure P200). The conversion table server 19731-1 confirms this report (procedure P210), reports completion of the series of procedures to the user service server 19711-1 (procedure P220), the user service server 19711-1 confirms this report (procedure P230), and informs the usage applicant of the appropriation results, namely, the ICS user address and ICS name (procedure P240). Incidentally, the ICS network address is used only within the ICS, so the usage applicant is not notified of this. In the event that the request value is "4", i.e., ICS network server, the user service server 19711-1 notifies all conversion table servers within the ICS 19000-1 at the time of the procedure P160, and requests registration to the conversion table of all access control apparatuses.

<<Re-Writing Administration of Conversion Table by Governing Conversion Table Server>>

Description will be made with reference to procedures 800 through 960 to the bottom of FIG. 99 and FIG. 91, FIG. 92, FIG. 95. The governing conversion table server 19730-1 instructs the conversion table server 19731-1 to re-write the contents of the conversion table 19301-1, e.g., speed class priority, transmitting ICS network address, a part or all of other items in the conversion table (procedure P800), and the conversion table server 19731-1 changes the contents of the conversion table 19301-1 according to the instructions (procedure P810). Also, the domain name server 19741-1 is instructed to re-write the ICS network address and the like (procedure P820), the domain name server 19741-1 follows the instructions and updates the internal table (procedure P830), reports the results to the conversion table server 19731-1 (procedure P840), the conversion table server 19731-1 confirms (procedure P850), and reports to the governing conversion table server 19730-1 (procedure P860). Also, the governing conversion table server 19730-1 instructs the user service server 19711-1 to re-write the contents of the user database 19611-1, such as speed class, ICS network address, etc. (procedure P900), and the user service server 19711-1 follows the instructions and updates the contents of the user database 19611-1 (procedure P910). Also, the ICS network addresses, ICS user address, and ICS names which have become unnecessary to the ICS authority server 19721-1 are returned, or new requests are made (procedure P920), the ICS authority server 19721-1 follows these instructions and updates the ICS network address appropriation record table 19622-1 and the ICS user address appropriation record table 19623-1 (procedure P930), reports the results thereof to the user service server 19711-1 (procedure P940), the user service server 19711-1 confirms the report (procedure P950), and reports to the governing conversion table server (procedure P960).

In the above description, an arrangement may be used wherein first, the governing conversion table server 19730-1 calls up the user service server 19711-1 and performs the aforementioned procedures P900 through P960, and then secondly calls up the conversion table server 19731-1 and performs the aforementioned procedures P800 through P860. With such an arrangement, the ICS operator 19960-1 instructing re-writing of the contents of the access control table to the governing conversion table server 19730-1 enables exchanging of the conversion table within the access control apparatus and the address information related thereto with domain name servers and ICS authority servers which have administration, thereby facilitating ease of re-writing management of the contents of a conversion table with consistency, i.e., ease of updating management of all conversion tables within the access control apparatuses within the ICS 19000-1.

<<Registration of Other Party of Communication>>

Figure 105:
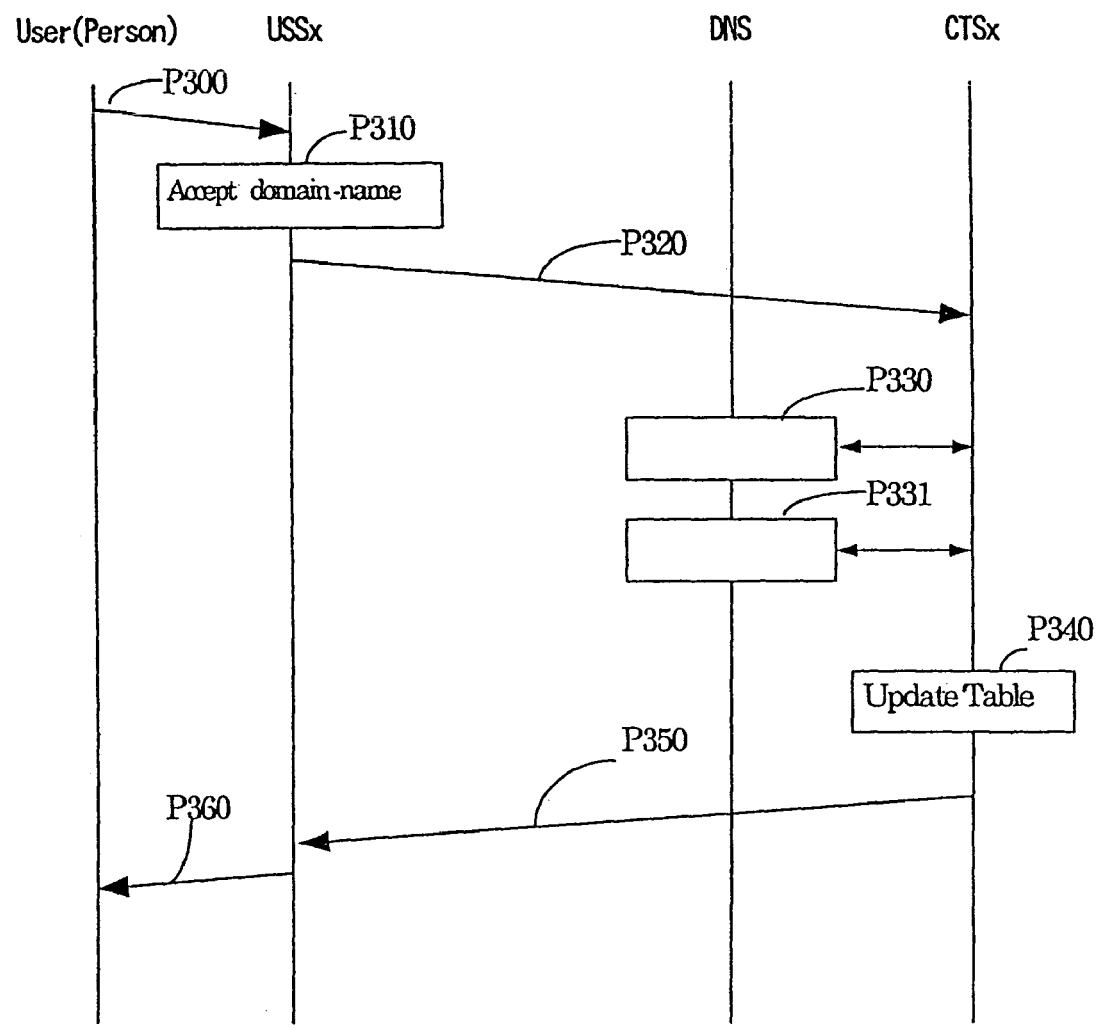
FIG. 105 is a procedure chart to explain a $16^{th}$ embodiment.

FIG. 105 will be described. A usage applicant for the ICS 19000-1 applies for registration of other party of communication to the ICS receptionist 19940-1 along with the domain name of the other party of communication (procedure P300). The ICS receptionist 19940-1 receives the domain name of the other party of communication (procedure P310), and sends it to the conversion table server 19731-1 (procedure P320). The conversion table server 19731-1 exchanges information with the domain name servers 19740-1, 19742-1, etc. (procedures P330 and P331), obtains the ICS network address and the ICS user address corresponding with the domain name of the other party of communication regarding which there was inquiry, updates the contents of the conversion table 19301-1 (procedure P340), and reports the results (procedures P350 and P360). The updated results are shown to the conversion table 19301-2. The ICS network address obtained here is registered in a conversion table such as shown in FIG. 106 as a receiving ICS network address, and the ICS user address obtained here is registered as a receiver ICS user address. Incidentally, in the case of an ICS network server, the spaces for the ICS network address and the ICS user address remain blank.

<<Registration 2 to ICS of User: Intra-Corporation Communication and Virtual Dedicated Line>>

Figure 107:
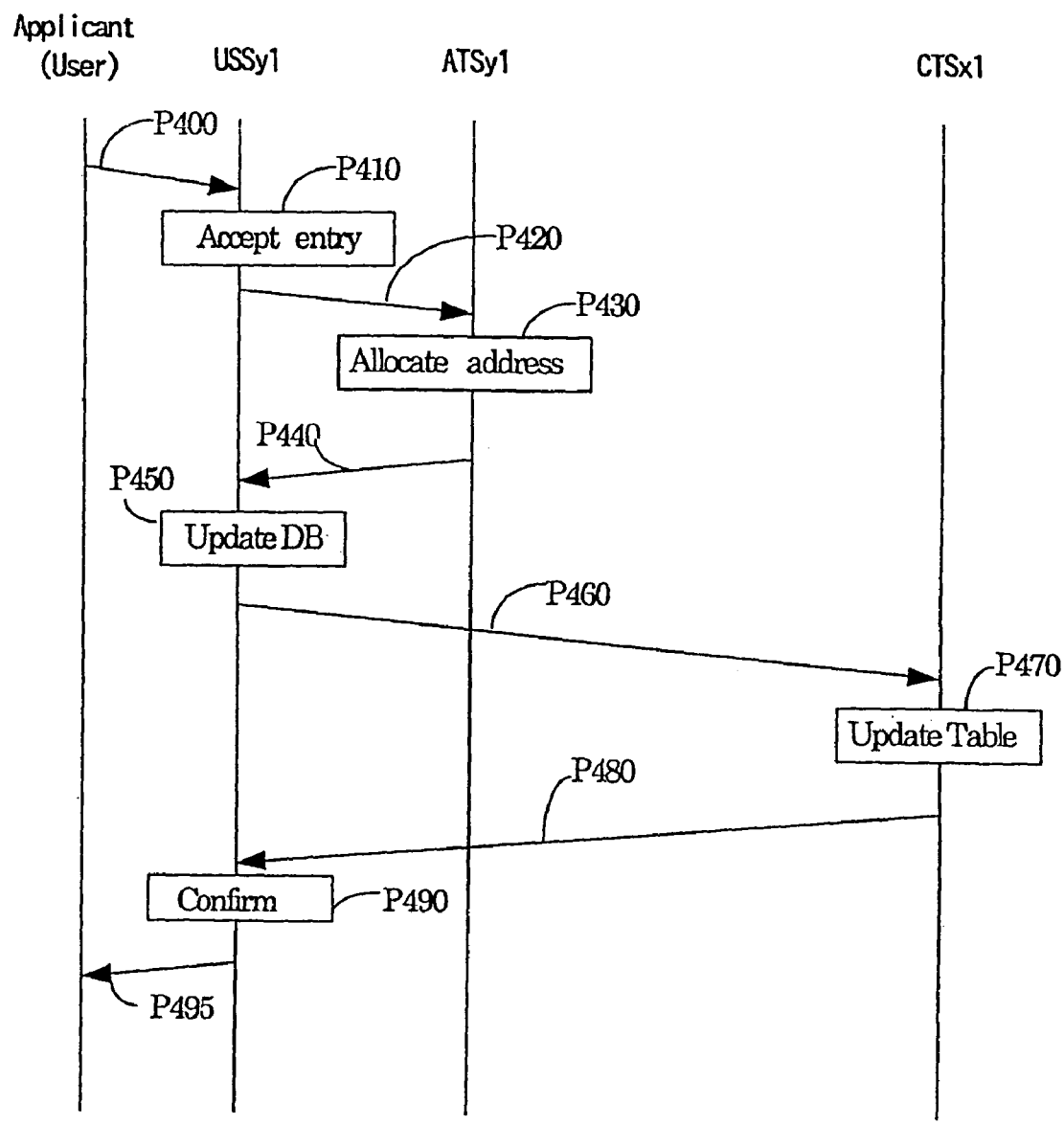
FIG. 107 is a procedure chart to explain a $16^{th}$ embodiment.
Figures 109, 110, 111, 112:
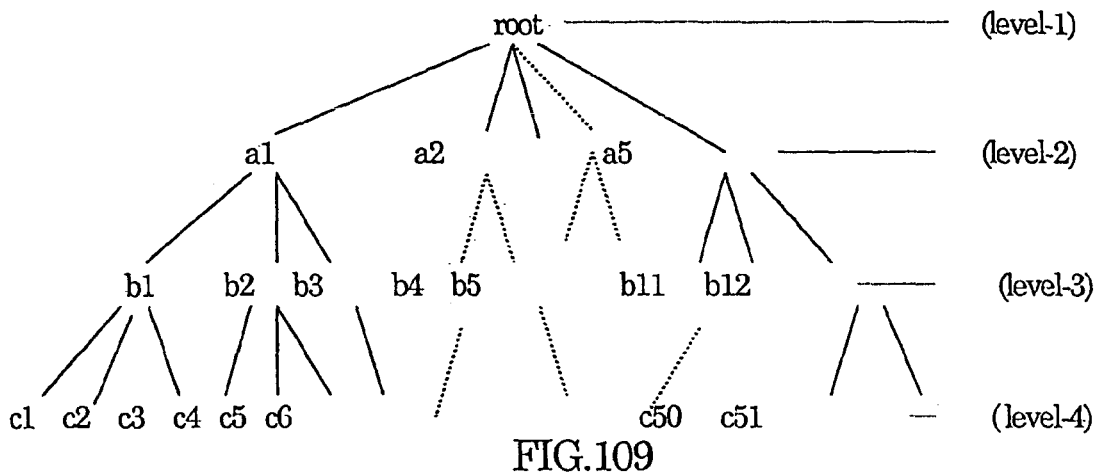
FIG. 109 is a diagram to explain a domain name server.
FIG. 110 is a diagram to explain a domain name server.
FIG. 111 is a diagram to explain a domain name server.
FIG. 112 is a diagram to explain a domain name server.

Description will be made with reference to FIG. 107. The difference with intra-corporation communication as compared to the above inter-corporation communication is that an ICS user address is handed in and an ICS name cannot be used, accordingly, there is no appropriation of the ICS names, and there are no procedures for using ICS names (procedures P180, P190 and P200). First, an applicant 19200-1 to the ICS 19000-1 applies to the ICS receptionist 19940-1 for ICS membership (procedure P400). The "Application reception data" is a usage item of ICS wherein the ICS network address and the ICS name has been deleted, and is comprised of, e.g., ICS user address, request identification (classification of intra-corporation communication, inter-corporation communication, virtual dedicated line connection, or ICS network server connection), speed class and priority, etc., the same as with the previous inter-corporation communication. The ICS user address further shows a plurality of pairs for both sender ICS user address and receiver ICS user address. Also, in the case of a virtual dedicated line connection, the sender ICS user address and the receiver ICS user address are not shown; this is what is different as compared to the intra-corporation communication.

The ICS applicant 19940-1 enters the above "application reception data" to the user service server 19711-1 via the "operating interface", and stores the "application reception data" in the user database 19611-1 (procedure P410). Next, the user service server 19711-1 requests of the ICS authority server 19721-1 the ICS user address, the ICS network address and the ICS name, using the ICS network communication function (procedures P420). The ICS authority server 19721-1 appropriates only the ICS network address as with the above procedure P130 (procedure P430), records the appropriation results in the aforementioned appropriation tables, and further returns the appropriation results to the user service server 19711-1 (procedure P440). The user service server 19711-1 stores the appropriation results obtained from the ICS authority server 19721-1 in the user database 19611-1 (procedure P450).

The user service server 19711-1 notifies the conversion table server 19731-1 of the application contents and the obtained ICS network address (procedure P460), the conversion table server 19731-1 adds the above contents to the conversion table 19301-1 (procedure P370), and reports completion of registration (procedures P480 and P495). FIG. 108 shows and example of registration to the conversion table 19301 of the intra-corporation communication and the virtual dedicated line.

<<Description of Domain Name Server>>

An example of 4-layer hierarchy will be described with reference to FIG. 109 and FIGS. 110 to 112, regarding the procedures P330 and P331 regarding the domain name server in the description of FIG. 105. The ICS network address of the internal table 19600-1 of the domain name server which is the object of the domain name "root" is "9500", and domain names "a1", "a2", "a3" and so forth exist below, indicating, e.g., that the ICS network address of the domain name server which handles the domain name "a1" is "9610", and the port number is "440". The ICS network address of the internal table 19610-1 of the domain name server which is the object of the domain name "a1" is "9610", and domain names "b1", "b2", "b3" and so forth exist below, indicating, e.g., that the ICS network address of the domain name server which handles the domain name "b2" is "9720", and the port number is "440".

The ICS network address of the internal table 19620-1 of the domain name server which is the object of the domain name "b2" is "9720", and domain names "c4", "c5", "c6" and so forth exist below, indicating, e.g., that the terminal space for the domain name "c5" is YES, meaning that there are no more domain names below, and that in this example, the ICS network address of the ICS name "c5.b2.a1." is "9720", and that the ICS user address is "4510". Also, the record of the internal table 19620-1 of the domain name server, i.e., the ICS name (ICS domain name), the ICS network address and the ICS user address "4610" are considered to be one group of data and referred to particularly as a "resource record" of the domain name server.

<<Calling Domain Name Servers>>

Figure 113:
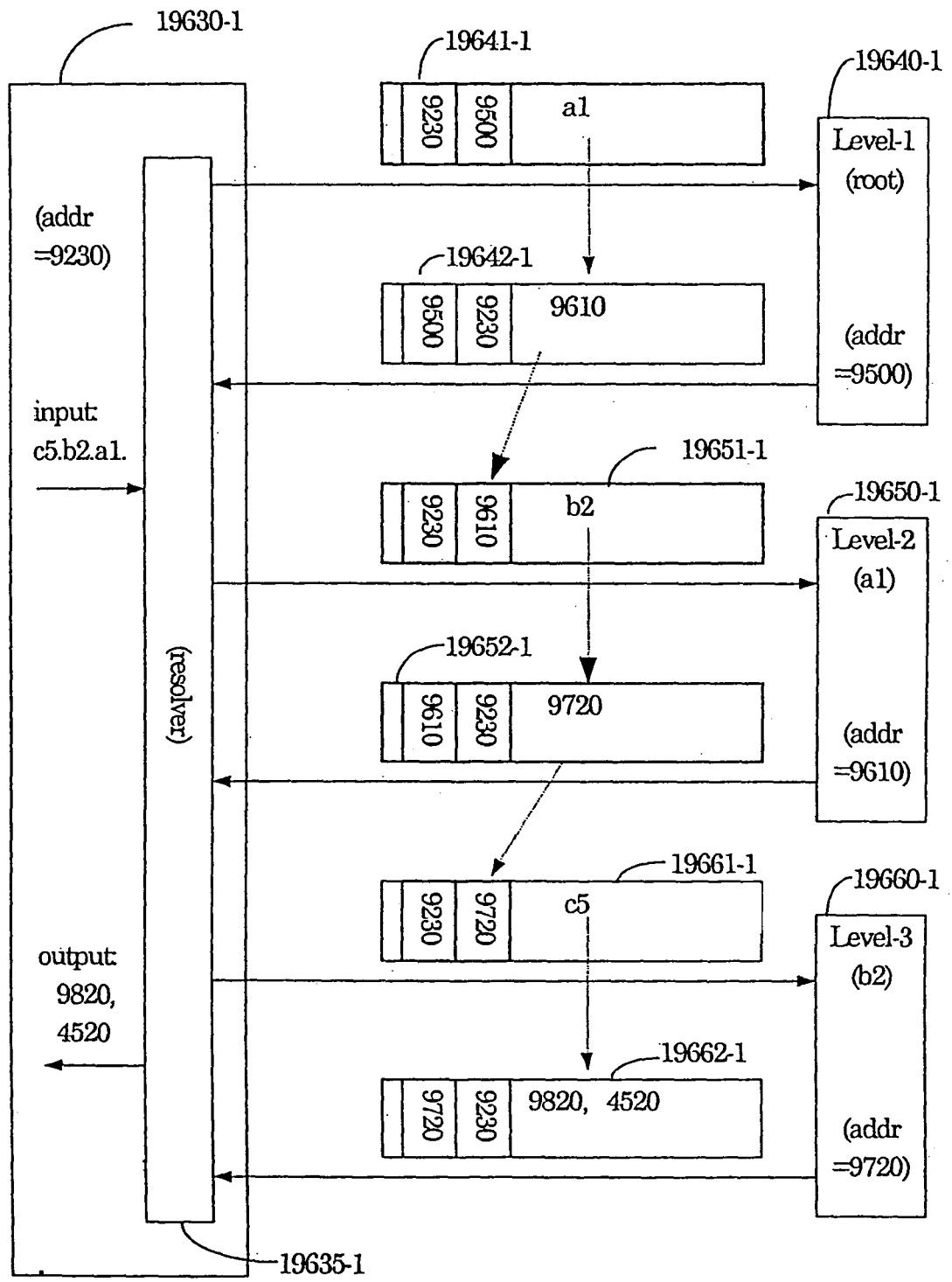
FIG. 113 is a diagram to explain a call of a domain name server.

With reference to FIG. 113, description will be made regarding the procedures in which the conversion table server 19630-1 calls the domain name servers 19640-1, 19650-1 and 19660-1, and searches for the ICS network address and the ICS user address corresponding with the domain name "c5.b2.a1.". The conversion table server 19630-1 enters the domain name "c5.b2.a1." in the resolver 19635-1 in the conversion table. The resolver 19635-1 sends the ICS packet 19641-1 including "a1" to the ICS domain name server 19640-1, and an ICS packet 19642-1 including an ICS network address "9610" of the ICS domain name server for "a1" is returned. Next, The resolver 19635-1 sends an ICS packet 19651-1 including "b2" to the ICS domain name server 19650-1, and an ICS packet 19652-1 including an ICS network address "9720" of the ICS domain name server for "b2" is returned.

Next, the resolver 19635-1 sends an ICS packet 19661-1 including "c5" to the ICS domain name server 19660-1, and an ICS packet 19662-1 including an ICS network address "9820" for "c5" and an ICS user address "4520" is returned. According to the above procedures, the conversion table server 19630-1 obtains an ICS network address "9820" and an ICS user address "4520" corresponding with the domain name "c5.b2.a1.".

<<Re-Writing of Conversion Table from an IP Terminal>>

Figure 114:
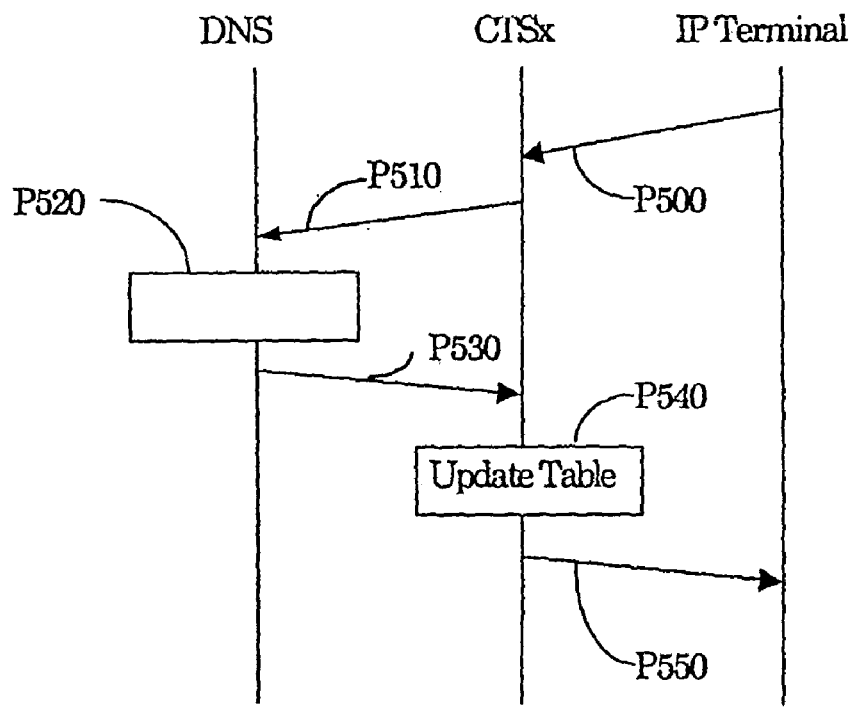
FIG. 114 is a diagram to explain re-writing of a conversion table from an IP terminal.
Figure 115:
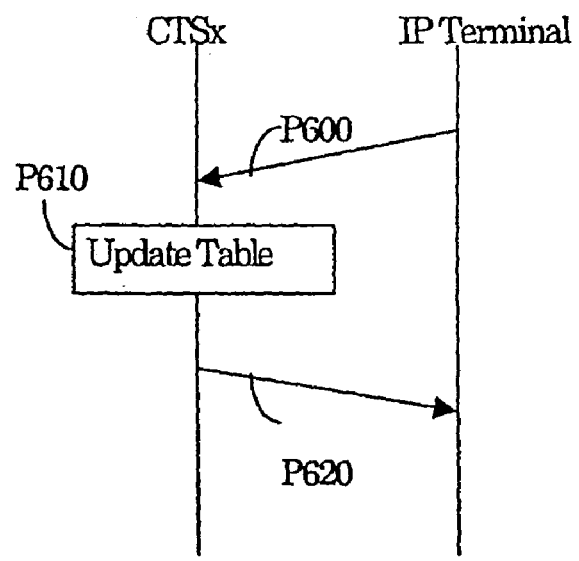
FIG. 115 is a diagram to explain re-writing of a conversion table from an IP terminal.

Description will be made with reference to FIGS. 114 and 115. An ICS user packet including the domain name "c5.b2.a1." is sent from the IP terminal 19608-1 to the conversion table server 19731-1 (procedure P500). The conversion table server 19731-1 makes inquiry to the domain name server (procedure P510), the domain name server searches and obtains the ICS network address "9820" and the ICS user address "4520" corresponding with the domain name "c5.b2.a1." (procedure P520), and returns this to the conversion table server 19731-1 (procedure P530), the conversion table server writes this to the conversion table 19301-1 (procedure P540), and reports to the IP terminal 19608-1 (procedure P550). In these procedures, the ICS network address "9820" is written into the conversion table as a receiving network address, and the ICS user address "4520" as a receiver ICS user address, the re-written conversion table being shown in FIG. 103. Incidentally, FIG. 103 omits the items listed in the conversion table corresponding with the request identification included in FIG. 102.

Next, the IP terminal 19608-1 sends an ICS user packet to the conversion table server 19731-1, including specification for changing the speed class to "2", with regard to the registered contents of the conversion table 19301-1X (procedure P600). The conversion table server 19731-1 re-writes the registration contents of the conversion table 19301-1X so that the speed class is "2", according to the specification (procedure P610), and reports to the IP terminal 19608-1 (procedure P620). The conversion table re-written by these procedures is shown as 19301-Y (FIG. 104).

<<Moving a Terminal Between Access Control Apparatuses>>

As can be seen in FIG. 101 from the embodiment of the ICS user address appropriation record table 19623-1, the first line of this table appropriates ICS name "dd1.cc1.bb1.aa1.jp" to the ICS user address "4610", and holds the ICS user address and the ICS name. For example, in the event that a terminal 19608-1 (FIG. 91) having an ICS user address "4610" is moved from the access control apparatus 19300-1 to the access control apparatus 19320-1 (FIG. 92), and in the event that this terminal is appropriated a new ICS network address "7821" for example, the conversion table has registered therein a transmitting ICS network address "7821" and a sender ICS user address "4610" as a pair. In this case, the ICS name "dd1.cc1.bb1.aa1.jp" is paired with the ICS user address "4610" as stipulated by the ICS user address appropriation record table 19623-1, and the ICS name is not changed. The resource record comprised of the ICS name "dd1.cc1.bb1.aa1.jp" within the domain name server, the ICS network address "7700", and the ICS user address "4610", is changed to that having the ICS name "dd1.cc1.bb1.aa1.jp", the ICS network address "7821" and the ICS user address "4610". That is, the ICS network address "7700" is re-written to another address "7821", but the ICS name "dd1.cc1.bb1.aa1.jp" and the ICS user address "4610" are not re-written. Summarizing this, the resource record of the domain name server and ICS user address appropriation record table of the ICS authority server hold the ICS user address and the ICS name, and there is no case in which only one is changed. Accordingly, in the event that a terminal is moved between access control apparatuses, there is no need to change the ICS user address and ICS name of the terminal.

Other Embodiment

Determination of ICS User Address by the User

This is an arrangement wherein the above embodiment has been changed so that the user determines the ICS user address. That is, when the user (usage applicant 19200-1) applies to the ICS 19000-1, an ICS user address is added. The ICS receptionist 19940-1 includes the ICS user address in the application reception data. Also, the ICS authority server 19711-1 stores the ICS user address that the user has applied for in the ICS user address appropriation record table 19623-1. According to the above method, the user can determine his/her own ICS user address, thus increasing freedom of usage.

Embodiment-17

Calling Other Party of Communication by Telephone Number

The present embodiment shows an example wherein using the telephone number as the ICS domain name allows sending and receiving of ICS user IP packet with the other party of communication, in which digitized voice is stored within the user IP packet, thereby facilitating public communication using a telephone. In the present embodiment, description will be made with reference to the example wherein the telephone number 81-3-1234-5678 in Tokyo, Japan, is viewed as being domain name "5678.34.12.3.81." Here, "3" indicates Tokyo, and "81" indicates Japan.

Figure 116:
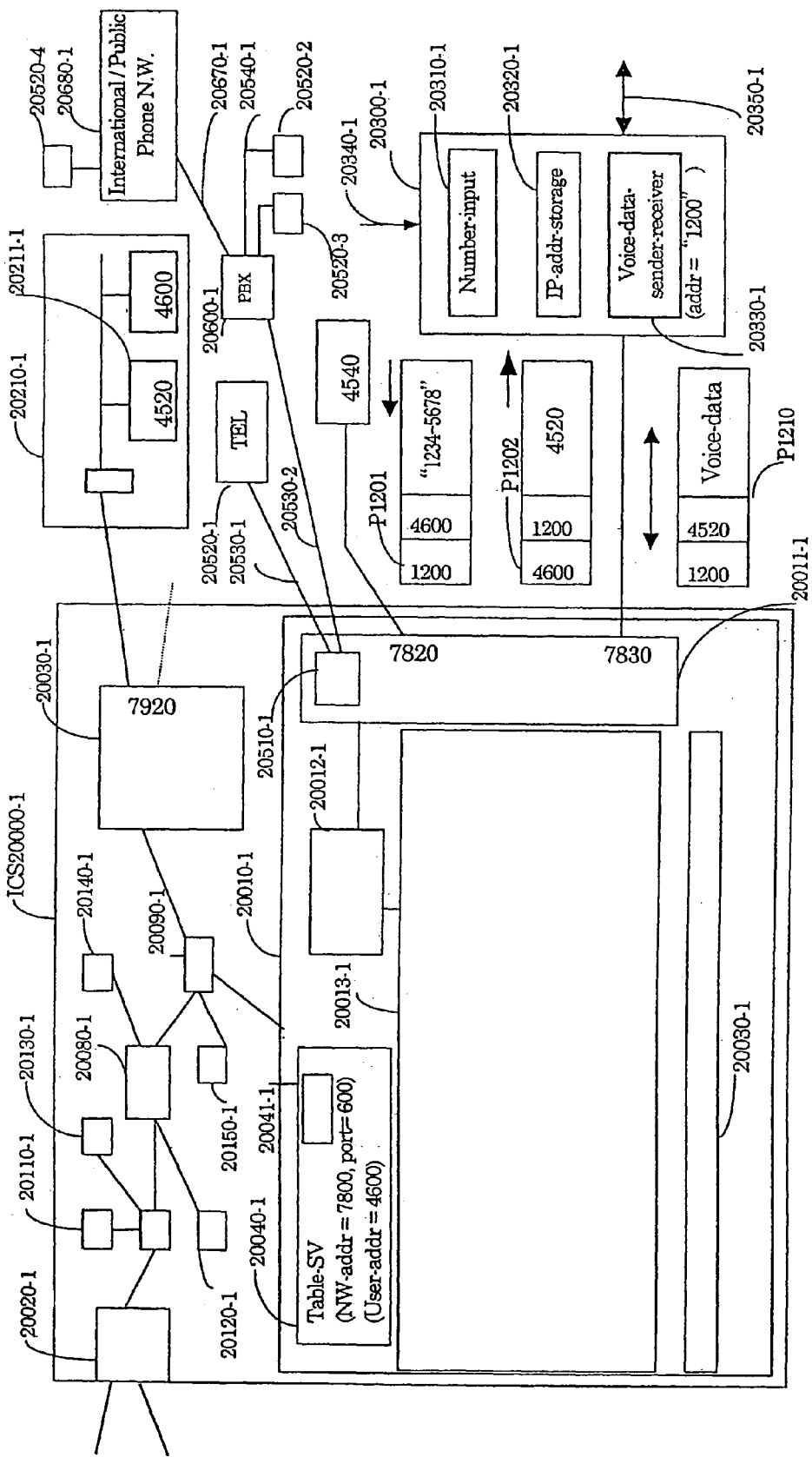
FIG. 116 is a constructional block showing a 17$^{th}$ embodiment (calling of a communicator by telephone number) according to the present invention.

Description will be made with reference to FIG. 116. An ICS 20000-1 includes access control apparatuses 20010-1, 20020-1 and 20030-1, relay devices 20080-1 and 20090-1, domain name servers 20110-1, 20120-1, 20130-1, 20140-1 and 20150-1, and the access control apparatus 20010-1 includes line portion 20011-1, a processing device 20012-1, a conversion table 20013-1 and a conversion table server 20040-1. The conversion table server 20040-1 is within the access control apparatus 20010-1, and an ICS network address of "7800" and port number of "600" are appropriated. The conversion table server 20040-1 is provided with an ICS user address "4600" from outside of the ICS 20000-1, and appears to be an ICS server having the functions of converting an entered domain name into an ICS user address and returning, and also registering the ICS network address in the conversion table 20013-1 within the access control apparatus 20010-1.

A block 20210-1 is a LAN, blocks 20211-1 and 20300-1 are both IP terminals having the functions of sending and receiving ICS user frames, each having ICS user addresses "4520" and "1200", and are connected to the ICS 20000-1 via the ICS user logic communication line. IP terminal 20300-1 can be used as a telephone and thus is referred to as an "IP telephone". The IP telephone 20300-1 includes a telephone number input unit 20310-1, IP address accumulating unit 20320-1, voice data sending/receiving unit 20330-1, input buttons 20340-1, and voice input/output unit 20350-1.

<<Obtaining ICS User Address by Telephone Number>>

The telephone number "1234-5678" is entered into the telephone number input unit 20310-1 by the input buttons 20340-1. The telephone number input unit 20310-1 generates the ICS user packet P1201, and delivers this to the access control apparatus 20010-1 via the ICS user logic communication line. Here, the ICS user packet is the sender ICS user address "1200" and the receiver ICS user address "4600", and the telephone number "1234-5678" entered by the input buttons 20340-1 is included in the data. The processing device 20010-1 looks at the conversion table 20013-1, and sends the ICS user packet P1201 to the conversion table server 20040-1 indicated by the ICS user address "4600". Also, in the present embodiment, the conversion table server 20040-1 is within the access control apparatus 20010-1, so there is no need to use ICS network communication functions. Based on the telephone number "1234-5678" included in the data field of the ICS user packet, the conversion table server 20040-1 sequentially contacts domain name servers 20130-1, 20140-1 and 20150-1, and obtains the ICS network address "7920" and the ICS user address "4520" of the terminal 20211-1 of the other party of communication in the event that the telephone number "1234-5678" is viewed as a domain name.

Next, the conversion table server 20040-1 creates a conversion table new item 20030-1 using the two addresses "7920" and "4520" obtained here, generates an ICS user packet P1202 for the ICS user address "4520" and writes the ICS user address "4520" therein and sends it to the IP telephone 20300-1. The IP telephone 20300-1 combines the ICS user address "4520" contained in the received ICS user packet P1202 with the telephone number "1234-5678" regarding which inquiry has already been made, and stores these in the IP address storage unit 20320-1, and uses it at a later day at the point that the ICS user address "4520" corresponding with the telephone number "1234-5678" becomes necessary. The aforementioned conversion table new item 20030-1 correlates the IP telephone 20300-1 having the ICS network address "7820" and the ICS user address "1200" with the destination terminal 20211-1 specified by the telephone number "1234-5678". The conversion table new item 20030-1 is used as a new component of the conversion table 20013-1.

<<Communication Using ICS User Address>>

Voice is inputted from the voice input/output unit 20350-1, the voice is converted into digital data at the voice data sending/receiving unit 20330-1, stored in the ICS user packet P1210, and sent to the destination specified by the telephone number "1234-5678", i.e., to the terminal 20211-1 determined by the ICS user address "4520". After this, telephone communication is performed by sending and receiving ICS user packet between the two terminals 20211-1 and 20300-1.

<<Detailed Description of Domain Name Server>>

Regarding the above description, the method of the conversion table server presenting the telephone number "1234-5678" to the domain name server and obtaining the ICS network address "7920" and the ICS user address "4520" will be described in detail.

Figures 118, 119, 120, 121:
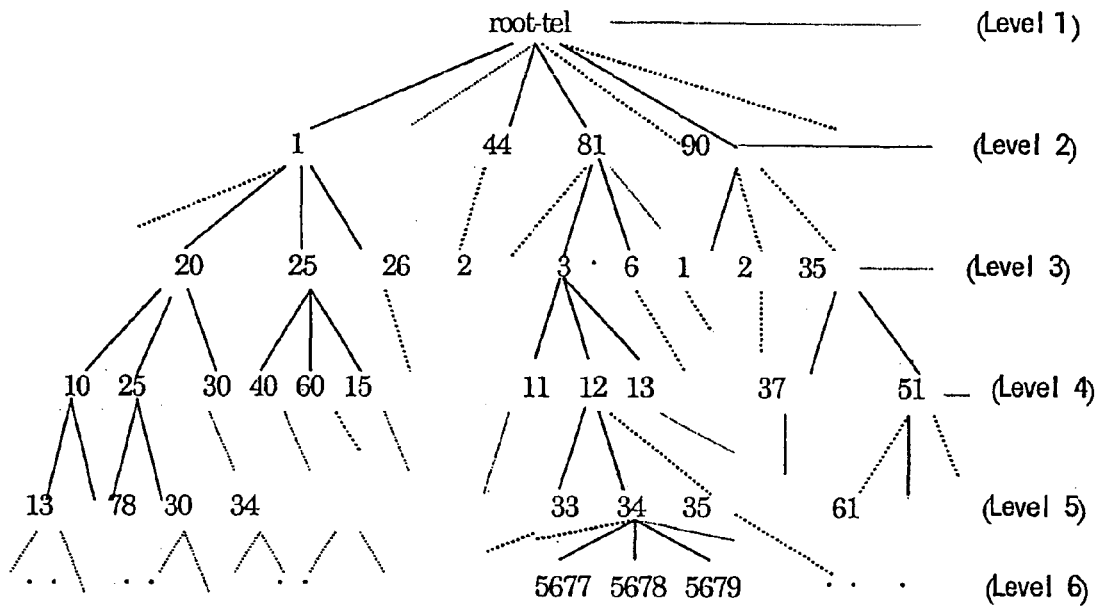
FIG. 118 is a diagram to show an example of an inner table used in a 17$^{th}$ embodiment.
FIG. 119 is a diagram to show an example of an inner table used in a 17$^{th}$ embodiment.
FIG. 120 is a diagram to show an example of an inner table used in a 17$^{th}$ embodiment.
FIG. 121 is a diagram to explain a call of a domain name server.

FIG. 118 is diagram illustrating an embodiment of a 6-layer hierarchy "domain name tree", with root domain name "root-tel" being provided on Level 1 of the tree, domain names "1" . . . "44" . . . "81" . . . "90" . . . existing on Level 2 which is lower on the tree, and domain names . . . "3" . . . "6" . . . for example existing on Level 3 beneath domain name "81", and domain names . . . "11", "12", "13", . . . for example existing on Level 4 beneath domain name "3", and further domain names . . . "33", "34", "35", . . . for example existing on Level 5 beneath domain name "12", and domain names . . . "5677", "5678", "5679" . . . existing on Level 6 beneath domain name "34".

FIG. 119 illustrates the internal table 20131-1 of the domain name server 20130-1 handling the domain name "3", and indicates that, e.g., under domain name "3" the domain server 20140-1 which handles domain name "12" has an ICS network address of "8720" and a port number of "440". FIG. 120 illustrates the internal table 20141-1 of the domain name server 20140-1 handling the domain name "12", and indicates that, e.g., under domain name "12" the domain server 20150-1 which handles domain name "34" has an ICS network address of "8820" and a port number of "440". Also, FIG. 121 illustrates the internal table 20151-1 of the domain name server 20150-1 handling the domain name "34", and indicates that the endpoint for the domain name "5678" in the internal table 20151-1 is YES, meaning that there are no more domain names below, and in this example, the ICS network address corresponding to the domain name "5678.34.12.3.18." is "7920", and the ICS user address thereof is "4520".

<<Calling Domain Name Server>>

Figure 122:
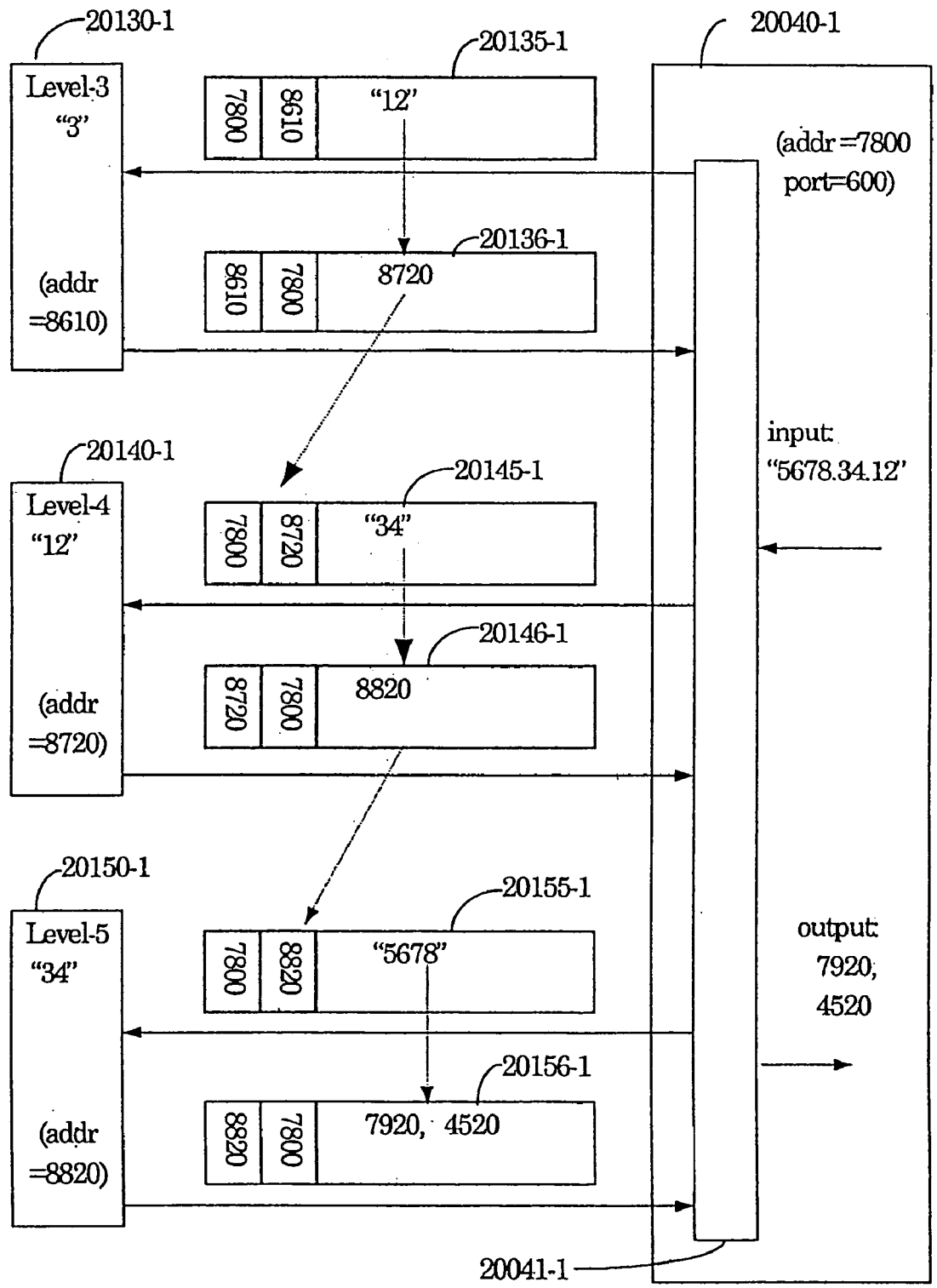
FIG. 122 is a diagram to show the steps for searching ICS network address and ICS user address by calling domain name servers.

With reference to FIG. 122, description will be made of the procedures for the conversion table server 20040-1 calling the domain name servers 20130-1, 20140-1 and 20150-1, and searching for the ICS network address and the ICS user address corresponding with the domain name "5678.34.12.3.81.". Now, the resolver 20041-1 has therein the ICS network address of a domain name server handling the Level 1 domain "root-tel" shown in FIG. 119. Also, in the event that there is a great deal of communication with the domain name server which handles the Level 2 and Level 3 domains, the ICS network addresses of the upper domain name servers thereof are stored in the resolver 20041-1.

The conversion table server 20040-1 inputs domain name "5678.34.12." into the internal resolver 20041-1. The resolver 20041-1 has the ICS network address "8610" of the server handling the domain name "3.81." which indicates "81" for Japan and "3" for Tokyo, and sends an ICS packet 20135-1 including the domain name "12" which is under the domain name "3" to the ICS domain name server 20130-1 using the ICS network communication function, in response to which an ICS frame 20136-1 including the ICS network address "8720" of the ICS domain name server 20140-1 which handles the domain name "12" is returned. Next, the resolver 20041-1 sends an ICS packet 20145-1 including the domain name "34" to the ICS domain name server 20140-1, in response to which an ICS packet 20146-1 including the ICS network address "8820" of the ICS domain name server 20150-1 which handles the domain name "34" is returned.

Next, the resolver 20041-1 sends an ICS packet 20155-1 including the domain name "5678" to the ICS domain name server 20150-1, in response to which an ICS packet 20156-1 including the ICS network address "7920" and "ICS user address 4520" of the ICS domain name server 20150-1 corresponding with the domain name "5678" is returned. According to the above procedures, the conversion table 20040-1 obtains the ICS network address "7920" and the ICS user address "4520" corresponding to the domain name "5678.34.12.3.81.".

<<Telephone Line Connection >>

Referring back to FIG. 116, there is a telephone line conversion unit 20510-1 within the line portion 200011-1, and the telephone 20520-1 is connected to the telephone line conversion unit 20510-1 via the telephone line 20530-1. The telephone line conversion unit 20510-1 has the same function as those described in the other embodiments, and generates an ICS user packet sorted in the data field, as well as converting voice sent from the telephone line 20530-1 into digitized voice. Also, ICS user packet which is sent in reverse, i.e., from the ICS network to pass through the access control line portion, have the digitized voice stored therein converted into analog voice in the telephone line conversion unit 20510-1, or in the event of an ISDN line, converted into digitized voice. According to such an arrangement, the IP terminal 20300-1 provided with an ICS domain name and the telephone 20520-1 can perform communication by telephone voice.

(Connecting to a Public Telephone Network)

Further, the telephone line conversion unit 20510-1 and the private exchange 20600-1 are connected by a telephone line 20530-2. Telephones 20520-2 and 20520-3 are connected with a private telephone line 20540-1 extending from the private exchange 20600-1, and a telephone communication can be carried out between the telephone 20520-2 and the telephone 20300-1. Also, connection can be made via the private exchange 20600-1 to public telephone networks/international telephone network 20680-1. Such an arrangement enables the telephone communication between the telephones 20520-4 and 20300-1.

Embodiment-18

IP Terminal Capable of Connecting to Plural Access Control Apparatuses

The present embodiment does not fix the IP terminal having the functions for sending and receiving ICS user IP packets to a specific access control apparatus; rather, it realizes an IP terminal which can be moved and connected to other access control apparatuses and used, i.e., capable of roaming. Roaming is realized based on the ICS domain name provided to the IP terminal.

<<Password Transmission Technique Using Cipher>>

The present embodiment includes procedures for ciphering a secret password PW and sending it from the sender (encoding (ciphering) side) to the receiver (decoding side). First, a ciphering function Ei and a decoding function Di will be described. The ciphering function Ei is represented by y=Ei (k1, x), and the decoding function Di is represented by x=Di (k2, y). Here, "y" denotes the ciphertext, "x" denotes plain-text, "k1" and "k2" are keys, and "i" represents cipher numbers (i=1, 2, . . . ) determining the secret key code and the public key code, including how the value of the cipher key is to be used. In the above, an arrangement may be used wherein plain-text x' is ciphered instead of plain-text x with x'=x∥r (wherein "r" is a random number), and discarding the random number r from the plain-text x' upon decoding, thus obtaining the plain-text x. Such an arrangement generates a different ciphertext each time the same plain-text is ciphered, owing to the random number, and it is said that such is less susceptible to code cracking.

(Example of Cipher Number i=1)

<<Preparation>>

The sender m discloses the domain name thereof (DNm) to the public including the receiver. The receiver calculates Km=Hash-1 (DNm) using the secret data compression function Hash-1, and hands over only the cipher key Km using a safe method so as to be unnoticed by a third party. This example is an example of using DES ciphering, and the sender holds a "ciphering module DES-e" for realizing the ciphering function Ei, and a cipher key Km. The cipher key Km is a secret value which the sender and receiver share. The receiver has the "decoding module DES-d" for realizing the decoding function Di, and the data compression function Hash-1. What is used for the data compression function Hash-1 is determined separately for each cipher number. A data compression function is also referred to as a "hash function".

<<Ciphering by Sender>>

The sender sets the secret password PW as x=PW, and ciphers as y=DES-e(Km, x) with the ciphering module DES-e and the cipher key Km being held, thereby sending the ciphertext y and domain name DNm.

<<Decoding by Receiver>>

The receiver receives the ciphertext y and the domain name DNm, calculates the secret cipher key Km as Km=Hash-1 (DNm) using the receiver's secret data compression function Hash-1, and the obtains the plaintext x as x=DES-d(Km, y) using the decoding module. The plain-text x is password PW, and the receiver can obtain the secret password PW. A third party does not know the data compression function Hash-1 and thus cannot calculate the cipher key Km, and accordingly, cannot calculate the secret password PW. In the above embodiment, as stipulation of the cipher number i=3, the ciphering functions and the decoding functions can be replaced with ciphering functions and decoding functions other than DES code. (Example of cipher number i=2)

<<Preparation>>

The present example is an example of employing RSA encoding, wherein the sender generates ciphering function $y=x^e$ mod n and decoding function $y=x^d$ mod n. Here, e≠d holds, the key d being a secret value. The sender hands to the receiver the disclosable ciphering keys e and n, and ciphering module RSA-e for realizing $y=x^e$ mod n. The sender holds the ciphering keys and the ciphering module RSA-e. The sender holds neither the secret ciphering module nor secret data On the other hand, the receiver holds n and the secret key d, and the ciphering module RSA-e for realizing $y=x^e$ mod n.

<<Ciphering by Sender>>

The sender encodes the secret password PW, own domain name DNm, and time of sending (year/month/day/hour/minute/second) as x=PW||x1||x2 (wherein x1: domain name DNm, and x2: year/month/day/hour/minute/second) and ciphers as $y=x^e$ mod n using the ciphering module RSA-e, thus sending the ciphertext y.

<<Decoding by Receiver>>

The receiver receives the ciphertext y and calculates $x=y^d$ mod n using the decoding module RSA-d held beforehand and the decoding key. The result is x=PW||x1||x2, so the data which is at a certain position from the head of x is used as the password PW. In the above ciphering, domain name x1 and year/month/day/hour/minute/second x2 are used as random numbers. A third party does not know the secret key d and thus cannot calculate the secret password PW. In the above embodiment, as stipulations of the cipher number i=4, the values of the cipher keys e, d and n can be changed. Also, as stipulations of the cipher number i=5, the RSA ciphering technique can be replaced with a different public key ciphering technique.

<<Terminal Verification Technique Using Password and Random Number>>

Description will be made regarding verification technique for determining whether or not the password PW used by a roaming terminal agrees with the password registered in the verifying server. As prerequisite conditions, the verifying server of the verifying entity and the terminal of the user to receive verification have a password PW that is secret to a third party, with a ciphering function E (wherein y=E(k, x), y represents ciphertext, k represents ciphering key, and x represents plain-text). Specific procedures for terminal verification will now be described. The terminal of the user to receive verification decides upon a random number R using appropriate means, calculates Y1=F(PW, R) using the password PW and function y=F(PW, R) and sends both the random number R and the function Y1 to the verifying entity. The verifying entity receives the random number R and the function Y1, and calculates Y2=F(FW, R) using the received random number R, the password PW held within, and the function F, and checks whether or not Y1=Y2 holds. In the event that there is a match, verification can be made that the owner of the terminal which is being verified is using the correct password PW, i.e., verification of the terminal can be made. In the above technique, an arrangement in which the user to be verified cannot freely select the random number R but rather the random number R is restricted to depending on time (called a time random number) further increases difficulty of a third party calculating the password. Instead of the ciphering function used above, the secret data compression function Hj may be used instead, for Y1, Y2=(PW, R).

<<Overall Configuration>>

Figure 123:
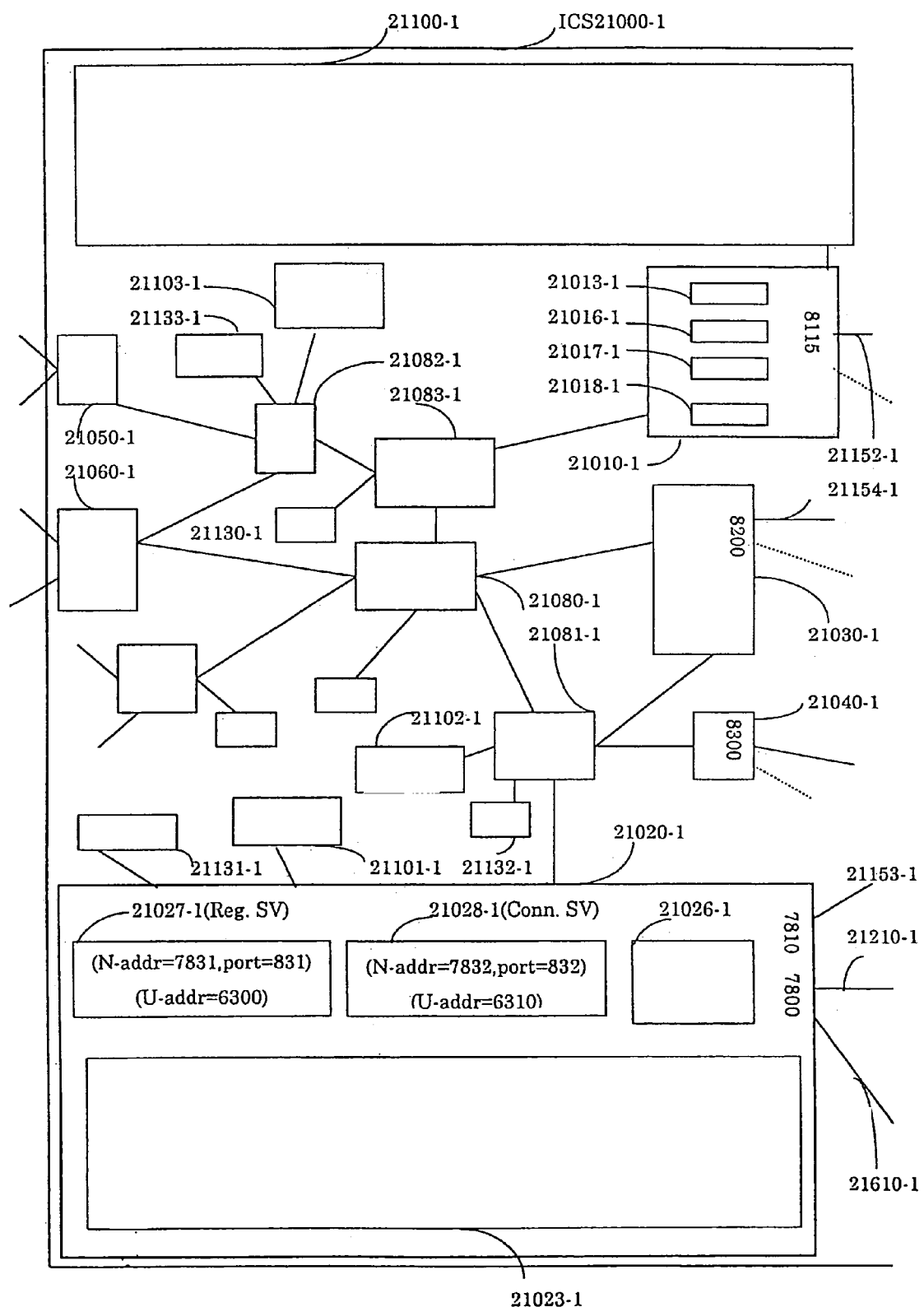
FIG. 123 is a portion of a constructional block showing an 18$^{th}$ embodiment (IP terminal to be connected with plural access control apparatuses) according to the present invention.
Figure 124:
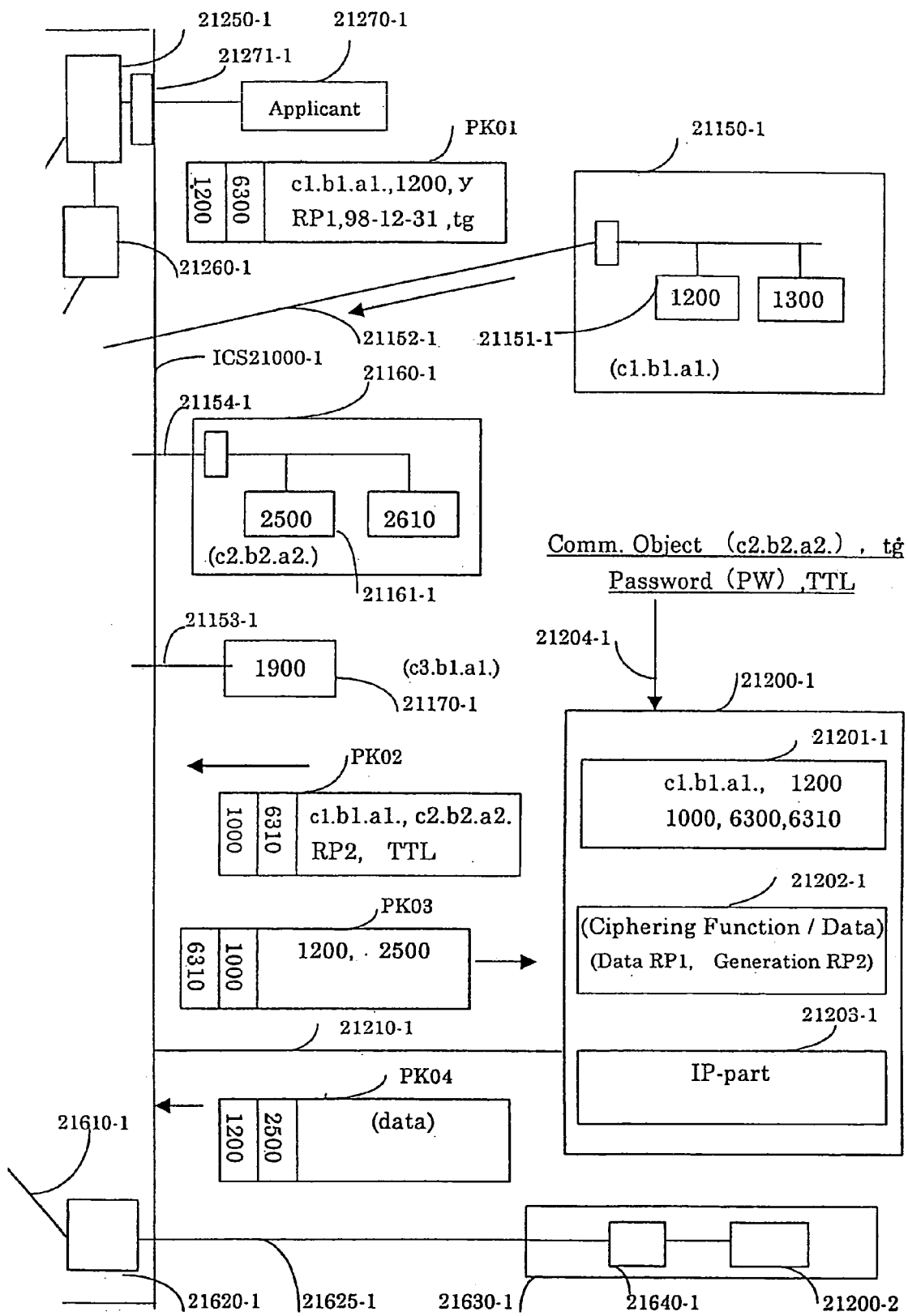
FIG. 124 is a portion of a constructional block showing an 18$^{th}$ embodiment according to the present invention.

FIGS. 123 and 124 illustrate an overview of the roaming technique according to the present embodiment, wherein the ICS 21000-1 includes access control apparatuses 21010-1, 21020-1, 21030-1, 21040-1, 21050-1 and 21060-1, relay devices 21080-1, 21081-1, 21082-1, and 21083-1, verifying servers 21100-1, 21101-1, 21102-1 and 21103-1, domain name servers 21130-1, 21131-1, 21132-1 and 21133-1, a user service server 21250-1 and an ICS authority server 21260-1. The access control apparatus 21010-1 is provided with a conversion table 21013-1, a conversion table server 21016-1, a registration server 21017-1 and a connection server 21018-1. The access control apparatus 21020-1 is provided with a conversion table 21023-1, a conversion table server 21026-1, a registration server 21027-1 and a connection server 21028-1. The connection servers 21018-1 and 21028-1 are provided with an ICS user address "6310", and have the function to register access control apparatuses determined as necessary to the IP terminal, or to connect thereto.

The conversion table server 21016-1 has a function for re-writing the contents of the conversion table 21013-1, and the conversion table server 21026-1 has a function for re-writing the contents of the conversion table 21023-1. Also, the LAN 21150-1 has an IP terminal 21151-1, the LAN 21160-1 has an IP terminal 21161-1, and a block 21170-1 is an IP terminal. A block 21200-1 is a portable roaming terminal, and is identified by ICS domain name "c1.b1.a1." provided uniquely within the ICS 21000-1.

<<Application for use of Roaming Terminal>>

The owner of a roaming terminal 21200-1 indicates as an ICS usage applicant 21270-1 a payment method for the roaming terminal 21200-1, and applies to the ICS authority server 21260-1 via user service server 21250-1 for an ICS domain name and an ICS user address. The payment method represented by billing class "MNY", e.g., in the event that MNY=1, the charges are billed to the home IP (i.e., an IP terminal which is connected to the access control apparatus in a fixed manner), in the event that MNY=2, the charges are paid according to the record of the verifying server. The ICS authority server 21260-1 sets an ICS domain name "c1.b1.a1." for using the roaming terminal 21200-1, and an ICS user address "1200". Further, in order to be connected to the access control apparatus 21010-1 in a fixed manner and use it, the owner of the IP terminal 21200-1 applies for an ICS network address to the ICS authority server 21260-1 via the user service server 21250-1. The user service server 21250-1, upon obtaining the ICS network address, makes a request to the conversion table server 21016-1 to set the ICS network address "8115" and the ICS user address "1200" in the conversion table 21013-1.

The ICS receptionist 21271-1 embeds inside the interior 21201-1 of the roaming terminal 21200-1 the following: ICS domain name "c1.b1.a1.", ICS user address "1200", special ICS address for roaming terminals (called "roaming special number") "1000", ICS user address "6300" for registration server, and ICS user address "6310" for connecting server, and further embeds inside the interior 21202-1 of the roaming terminal 21200-1 the ciphering function Ei and decoding related data RP1. Now, RP1=Hj (domain name 11 RP0) 11 RP0 (wherein RP0=NMY||i||j) holds, and the domain name is "c1.b1.a1.". MNY is the above-described billing class, "i" is a cipher number for typifying the cipher Ei, and "j" determines the type of Hash function Hj. Data compression function Hj is a secret dedicated function used only by the verifying server and the user service server. The user does not hold the data compression function Hj, and does not even know Hj, and thus is incapable of generating code related data RP1.

<<Registration Procedure from Home IP Terminal>>

Figure 127:
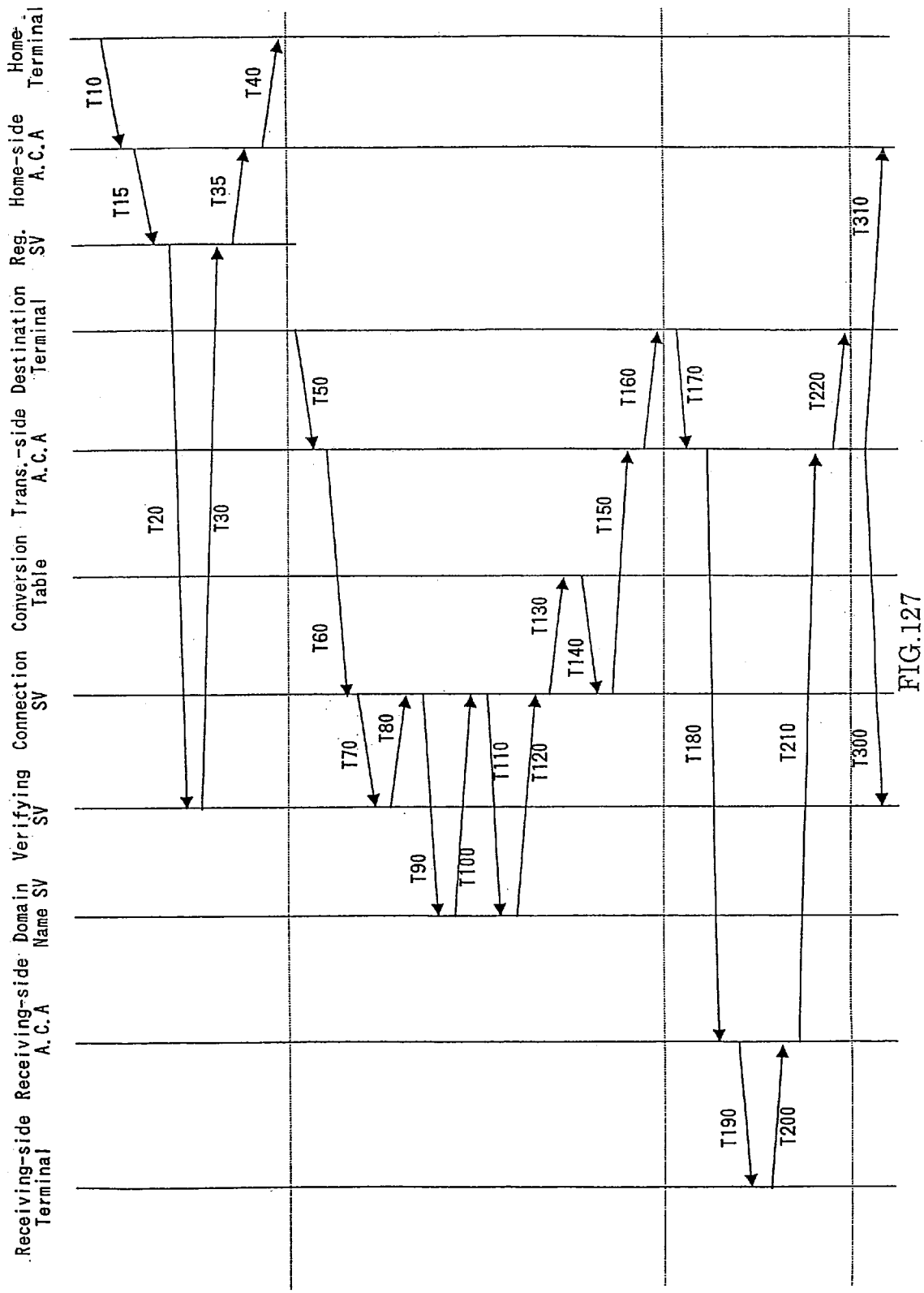

Description will be made with reference to FIG. 127. The roaming terminal user connects the roaming terminal 21200-1 to the position of the home IP terminal 21151-1. Next, the roaming terminal user decides on a password (PW) and enters this from the input unit 21204-1, and also generates an ICS user packet PK01 using the ciphering function and the coding-related data stored within the inner portion 21202-1, and sends it to the access control apparatus 21010-1 via the ICS user logic communication line 21152-1 (procedures T10). The destination of the ICS user packet PK01 is "6300" which points to the roaming registration server, and includes own ICS domain name "c1.b1.a1.", cipher parameter PR1, ICS user address "1200", expiration data "98-12-31", ciphertext "y" which is the password that has been ciphered, "tg" (wherein tg=1 in order to display registration procedures), and "Yes" or "No" for roaming connection specification. The generation method employed for the ciphertext "y" is the coding technique described earlier. For example, in the event that the cipher number=2, ciphertext "y" is generated with $y = x^e \bmod n$ (wherein x=PW∥c1.b1.a1.∥year/month/day/hour/minute/second). The access control apparatus 21010-1 looks at the conversion table 21013-1 and transfers the ICS user packet PK01 to the registration server 21017-1 with the destination "6300" (procedure T15). The registration server 21017-1 uses the domain name "c1.b1.a1." to call the verifying server 21100-1 (procedure T20). Also, the method by which the registration server 21017-1 calls the verifying server 21100-1 using the domain name is the same as the method by which the connection server 21028-1 calls the verifying server 21100-1 using the domain name, the details thereof being described in detail later. The verifying server 21100-1 checks the contents of the received ICS user packet PK01, and decodes the ciphertext "y" using the earlier-described technique, thereby calculating the password PW. For example, in the event that the cipher number=2, the ciphertext "y" is decoded with $x = y^d \bmod n$. This yields x=PW∥c1.b1.a1.∥year/month/day/hour/minute/second, so the password PW can be obtained.

Next, the contents of the cipher parameter PP1 is RP1=Hj (domain name∥RP0)∥RP0 (wherein RP0=MNY∥i∥j), so the verifying server 21100-1 uses the secret Hash function Hj held within the verifying server 21100-1 and the obtained domain name "c1.b1.a1." to calculate t=Hj (domain name∥RP0)∥RP0), and checks whether or not t=RP1 holds for the received RP1. If it holds, judgment is passed that the domain name "c1.b1.a1.", the billing class MNT, and the cipher numbers "i" and "j" have not been tampered with. The verifying server 21100-1 checks for excessive or insufficient registration contents, and in the event that the contents are normal, the registration results are registered in the verification table 21100-2, see FIG. 125; registration is not made in the event there are insufficient registration contents.

This is illustrated in the verifying table 21100-2 in the line with the administration number 1, with the domain name as "c1.b1.a1.", cipher (encryption) number "2", billing class (MNY) "1", value of calculated password PW "224691", expiration date "98-12-31", roaming connection of "Yes", i.e., acceptance of a roaming connection. At the time of generating the PK01 in procedure T10, the aforementioned value of tg may be set to tg=2 and roaming connection set to "No". The password will not leak to a third party, due to application of the above-described ciphering method. Roaming registration is reported by passing through the registration server 21017-1 (procedure T30), then the access control apparatus 21010-1 (procedure T35), and reported to the roaming IP terminal (procedure T40). Further, an ICS user packet for changing the value of the password PW with tg=3 or changing the date of expiration with tg=4 can be sent from the terminal 21200-1 via the ICS user logic communication line 21152-1, after the above procedure T40 has been completed. Incidentally, a method which can be employed for changing the password involves specifying the prior password.

<<Sending and Receiving User IP Packet While Traveling>>

An example will be described regarding connecting a roaming terminal 21200-1 to the access control apparatus 21020-1 and sending and receiving of user IP packet between domain name "c1.b1.a1." of the roaming terminal 21200-1 and the other party of communication with a domain name "c2.b2.a2.". The user inputs the following from the input unit 21204-1: the domain name "c2.b2.a2." of other party of communication, "tg" which has been set to tg=5 for specifying sending and receiving of user IP packet, own password PW, and "5" which specifies the roaming connection period in days (represented by TTL). The inside 21201-1 and 21202-1 of the roaming terminal 21200-1 is used to this end. Also, the IP frame field 21203-1 is used for generating, and sending and receiving ICS user IP packets PK01, PK02, PK03, PK04 and so forth.

Next, the roaming terminal 21200-1 generates a user IP packet PK02, and sends it to the access control apparatus 21020-1 via the ICS user logic communication line 21210-1 (procedure T50). The user IP packet PK02 includes the sender domain name "c1.b1.a1.", receiver domain name "c2.b2.a2.", cipher parameter RP2 and connection period (represented by TTL). The cipher parameter RP2 is data calculated with the password PW and the inside 21202-1. That is, year/month/day/second "yy-mm-dd-sssss" is generated and used as a time random number TR (TR=yy-mm-dd-sssss), and the clock of inside 21202-2 and the cipher function Ei is used to calculate RP2=Ei(PW, TR)∥TR.

The access control apparatus 21020-1 receives the user IP packet PK02, obtains the ICS network address "7800" provided to the ICS logic terminal, and since the request identification from the conversion table 21023-1 is "4" and further the sender ICS user address written to the user IP packet PK02 is "1000" (i.e., roaming special number), the above ICS network address "7800" is held, and is delivered with the ICS user packet PK02 to the connection server 21028-1 pointed to by the receiver ICS user address "6310" (procedure T60). The ICS network address "7800" obtained in this procedure will be used after the later-described process T130.

<<Function of Connection Server>>

Next, the connection server 21028-1 calls the verifying server 21100-1 using the domain name "c1.b1.a1.", and transfers the domain name "c1.b1.a1." and the cipher parameter RP2 to the verifying server (procedure T70). The verifying server 21100-1 reads the values of the password PW and cipher number written to the verifying table 21100-2, and selects cipher function Ei and reads the password PW. Next, the cipher parameter RP is RP2=Ei(PW, TR)∥TR, so the time random number which is to the latter half of the RP2 is used to calculate t=Ei(PW, TR). In the event that the value of this temporary variable t calculated here matches the first half Ei(PW, T) of the received RP2, confirmation can be made that the password PW entered into the terminal 21200-1 is correct. The time function TR includes the year/month/day (i.e., TR=yy-mm-dd-sssss), so unauthorized access can be discovered in the case that the received year/month/day does not match that time of processing.

Next, the verifying server 21100-1 reports the following items written in the verifying table 21100-2 to the connection server 21028-1 (procedure T80): completion of roaming registration, billing class, and verifying server calling information (procedure T80). In the present embodiment, the billing class is MNY=1, and the verifying server calling information is the ICS network address "7981" of the verifying server 21100-1, port number "710" and administration number "1" of the verifying administration table. The connection server 21028-1 presents the domain name "c1.b1.a1." to the domain name server, requests the ICS user address and the ICS network address associated with the domain name (procedure T90), and obtains the ICS user address "1200" and the ICS network address "8115" (procedure T100). In the same way, the connection server presents the domain name "c2.b2.a2." to the domain name server, requests the ICS user address and the ICS network address associated with the domain name (procedure T110), and obtains the ICS user address "2500" and the ICS network address "8200" (procedure T120).

Next, the connection server 21028-1 informs the conversion table server 21026-1 of the following (procedure T130): the ICS network address "7800" of the ICS logic terminal which has input the ICS user packet (held in procedure T60); the ICS user address "1200", ICS user address "2500", and ICS network address "8200", just obtained from the domain name server; and also the completion of roaming registration, billing class, and verifying server calling information received from the verifying server 21100-1.

The conversion table server 21026-1 writes the four addresses to the conversion table 21023-1 as received. The value of the request identification is "10", meaning inter-corporation communication by roaming. In the event that the billing class is MNY=1, the ICS network address "8115" and the ICS user address "1200" just obtained from the domain name server are forwarded to the billing notification destination of the conversion table 21023-1. Also, in the event that the billing class is MNY=2, verifying server calling information is forwarded to the billing notification destination of the conversion table 21013-1. Further, "5" which specifies the roaming connection period in days is also written to the conversion table 21013-1. When the writing to the conversion table 21023-1 is completed, the conversion table server 21026-1 reports the results to the connection server 21028-1 (procedure T140). This completion report is sent via the access control apparatus 21020-1 (procedure T150) to the roaming terminal 21200-1 with the ICS user packet PK03 (procedure T160).

Now, the ICS user packet PK03 includes the ICS user address "1200" associated with the domain name "c1.b1.a1." of the roaming terminal 21200-1, and the CS user address "2500" associated with the domain name "c2.b2.a2." of the other party of communication. The corporation operating the access control apparatus can charge the owner of the roaming terminal 21200-1 for the above usage of the connection server 21028-1, i.e., the procedures for receiving the ICS user packet PK02 up to returning the ICS user packet PK03, and "5" which specifies the roaming connection period in days.

<<Using the Roaming Terminal>>

The roaming terminal 21200-1 can use the conversion table 21023-1 created following the above-described procedures, to perform inter-corporation communication (procedures T170 through T220). In the event that "5" which specifies the roaming connection period in days elapses, the conversion table server 21026-1 can delete the above roaming connection written in the inside of conversion table 21023-1.

<<Notification of Billing>>

The access control apparatus 21020-1 notifies the billing notification destination registered in the conversion table 21023-1 of the communication charges (procedure T300 or T310).

<<Method for Accessing the Verifying Server>>

On the above description, detailed description will be made regarding the method for judging whether or not the verification request contained in the ICS network packet PK02 generated by the roaming terminal 21200-1 due to the connection server 21028-1 presenting the domain name "c1.b1.a1." to a plurality of verifying servers including verifying server 21100-1 is correct, i.e., whether or not the domain name "c1.b1.a1." of the roaming terminal 21200-1 is registered with the verifying server.

An example of 4-layer hierarchy will be described with reference to FIG. 128. A domain name "root" is provided on Level 1 of the tree, and domain names "a1", "a21", "a3" . . . and so forth exist on Level 2 below, domain names "b1", "b2", "b3", and so forth exist on Level 3 below "a1" for example, and domain names "c1", "c2", "c3" . . . and so forth exist on Level 4 below "b1" for example.

FIG. 129 illustrates the internal table 21102-2 of the verifying server 21102-1 handling the domain "root", indicating, e.g., that the ICS network address of the domain name server 21101-1 which handles the domain name "a1" below the domain name "root" is "7971", and the port number is "710". Also, FIG. 130 illustrates the internal table 21101-2 of the verifying server 21101-1 handling the domain "a1", indicating, e.g., that the ICS network address of the domain name server 21100-1 which handles the domain name "b1" below the domain name "a1" is "7981", and the port number is "710".

FIG. 131 illustrates the internal table 21100-2 of the verifying server 21100-1 handling the domain "b1", indicating, e.g., that the domain name "c1" below the domain name "b1" shows "YES" in the endpoint in the internal table 21100-2, meaning that there are no more domain names below, and that in this example, the domain name "c1.b1.a1" has been registered with the verifying server, and facts such that the password PW is "224691", that the date of expiration is "98-12-31", etc., are recorded therein.

<<Calling Verifying Server>>

Figure 132:
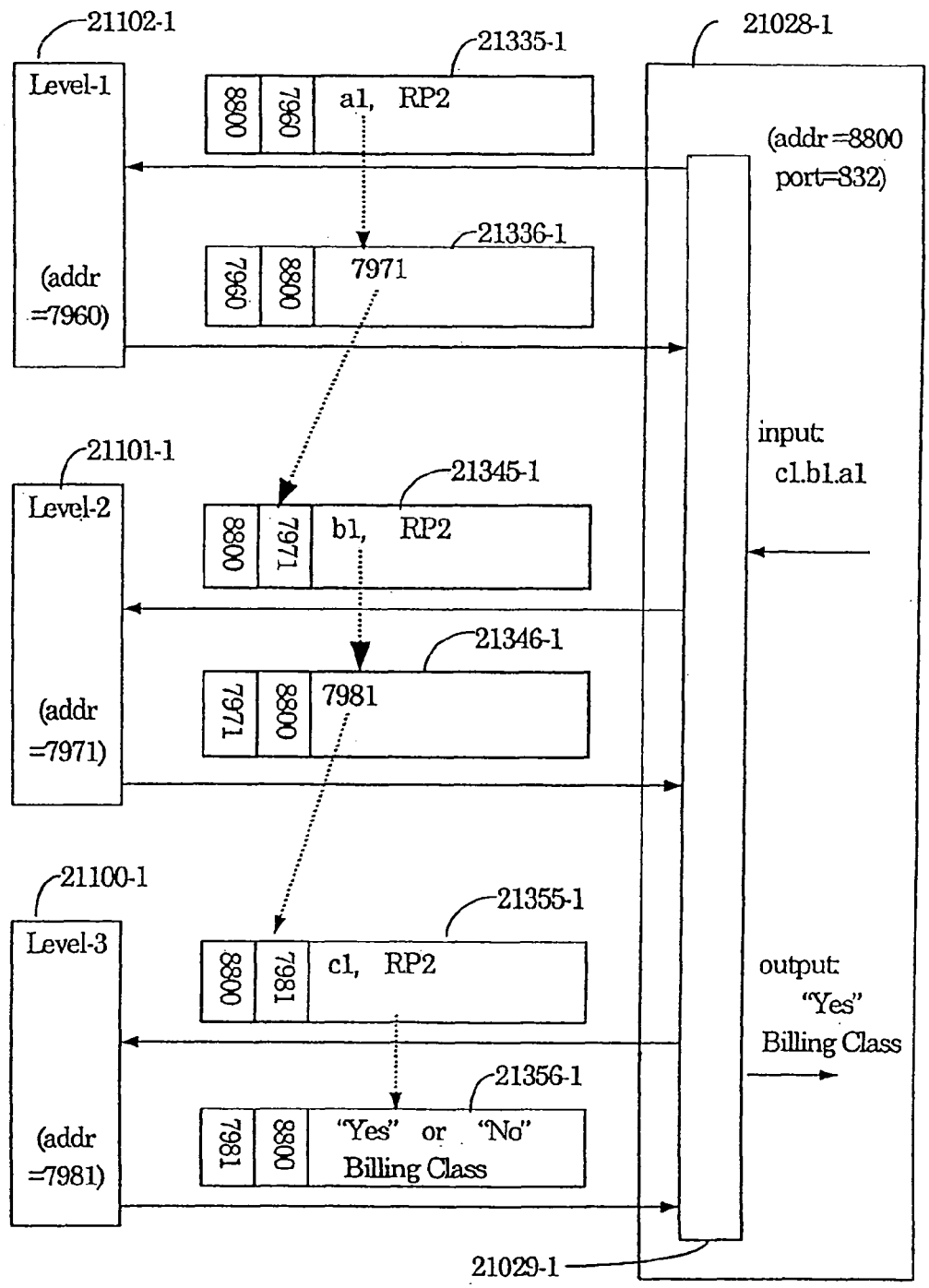
Figure 133:
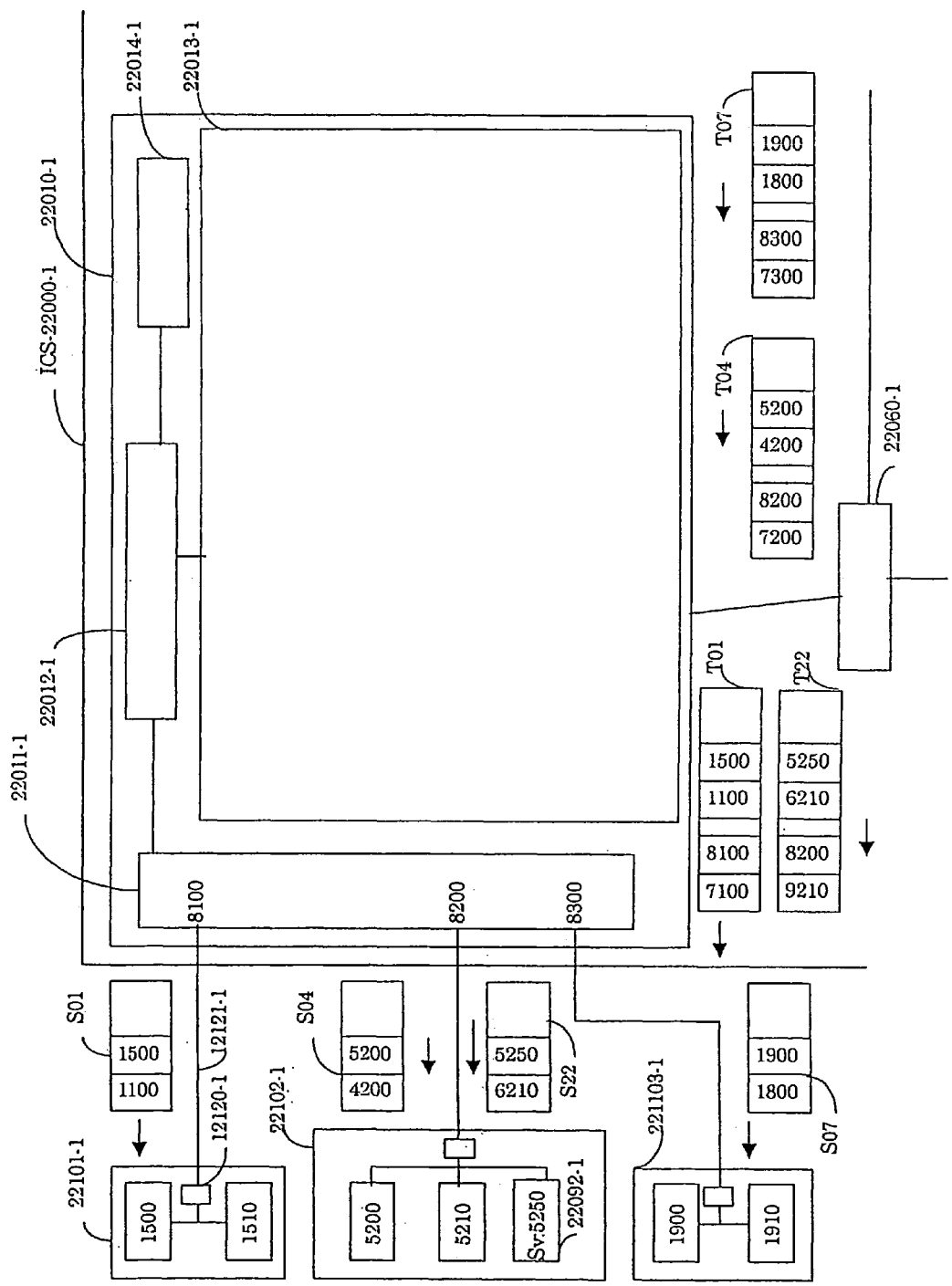
Figure 134:
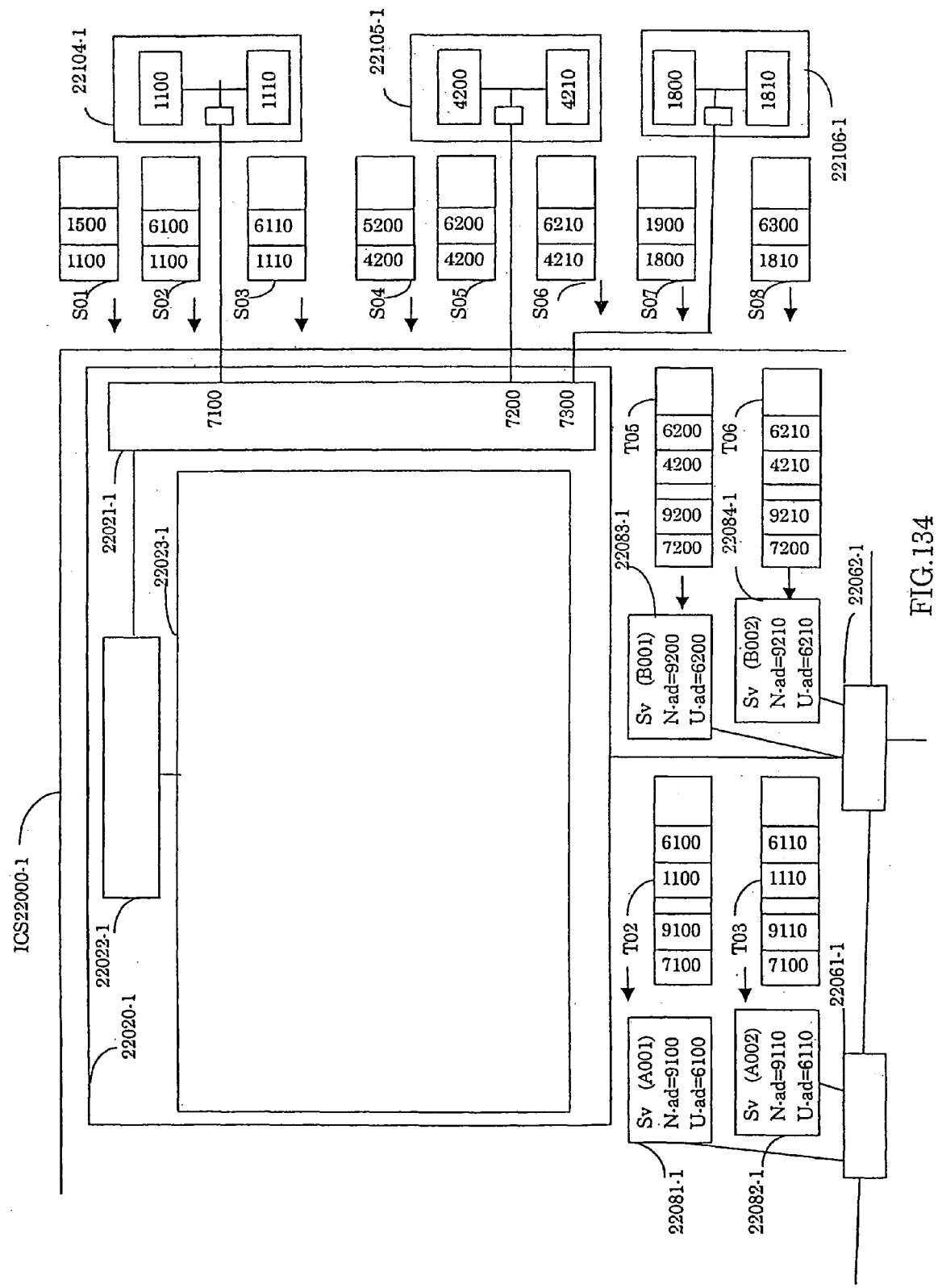
Figure 135:
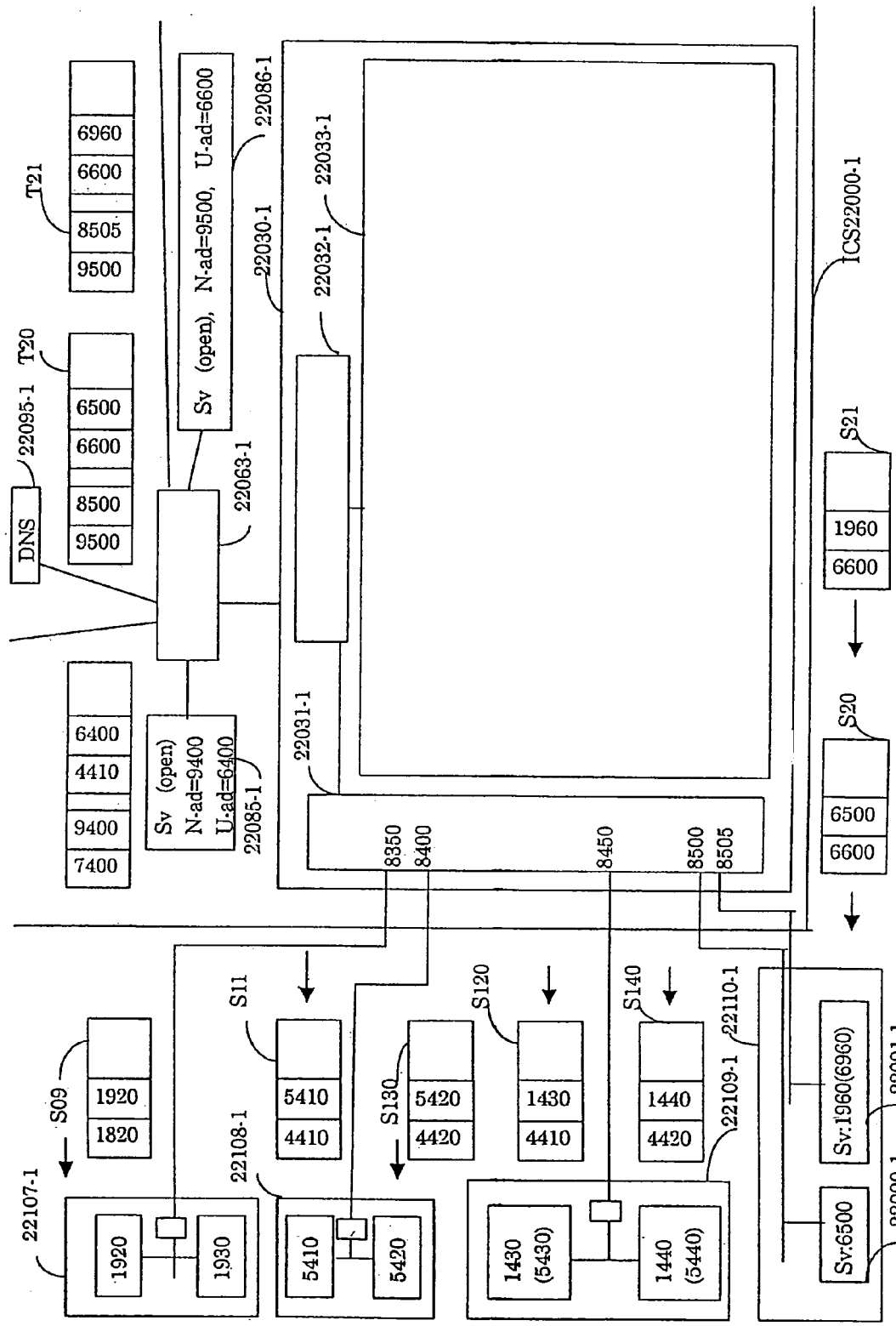
Figure 136:
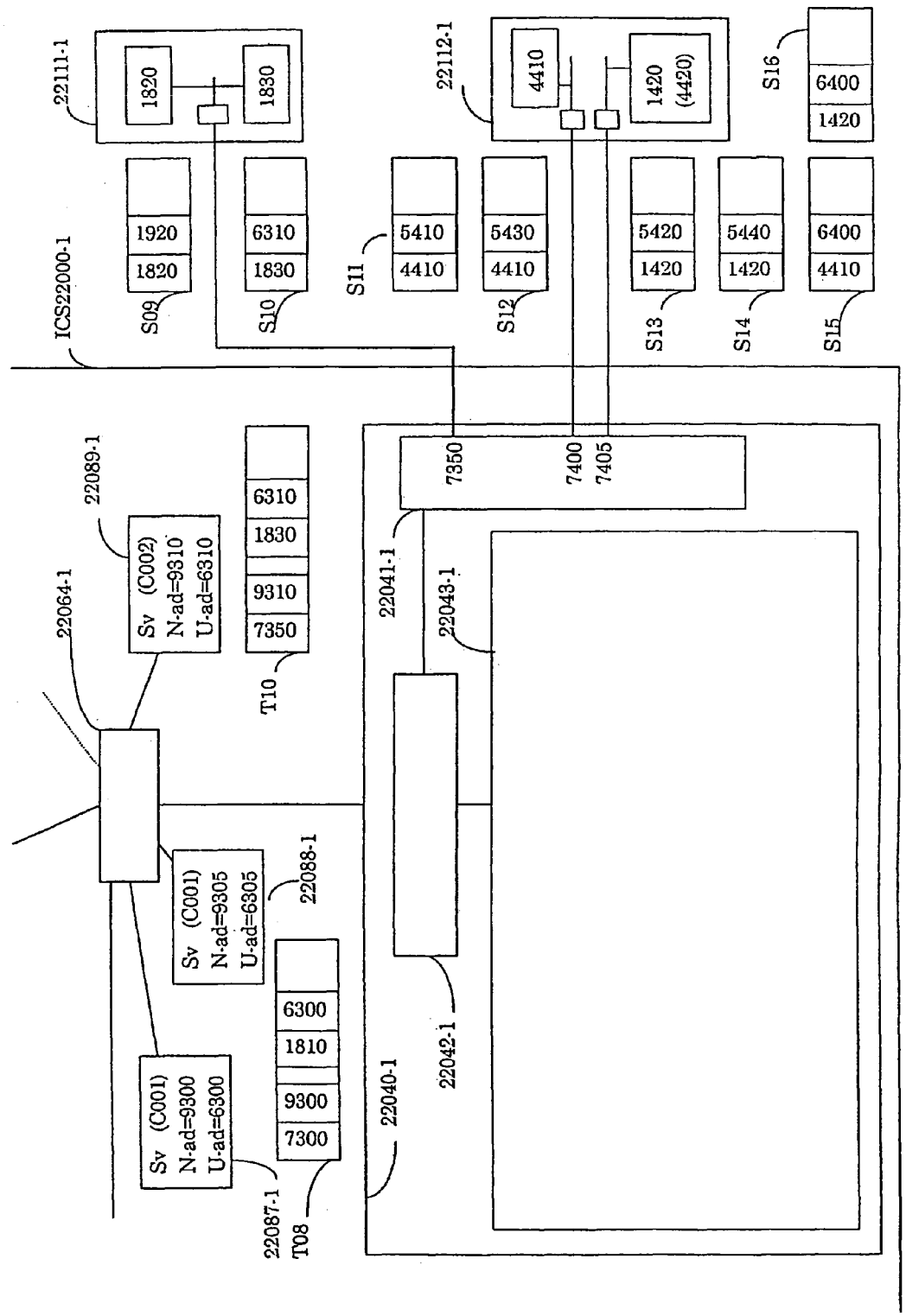

With reference to FIG. 132, description will be made regarding the procedures in which the connection server 21028-1 calls the verifying server 21100-1 using the domain name "c1.b1.a1.", and checks whether or not the domain name "c1.b1.a1." has been registered in the verifying server. Now, the connection server 21028-1 has therein the ICS network address of the verifying server handling the domain "root" on Level 1 shown in FIG. 128. Also, in the event that there is a great deal of communication with the verifying servers which handle the Level 2 and Level 3 domains, the ICS network addresses of the verifying servers thereof are held therein.

The connection server 21028-1 enters the domain name "c1.b1.a1." in the internal resolver 21029-1. The resolver 21029-1 sends the ICS frame 21335-1 including "a1" under the domain name "root" and the cipher parameter RP2 to the verifying server 21102-1, and an ICS packet 21336-1 including an ICS network address "7971" of the ICS domain name server for "a1" is returned. Next, the resolver 21029-1 sends an ICS packet 21345-1 including "b1" to the verifying server 21101-1, and an ICS packet 21346-1 including an ICS network address "7981" of the verifying server for "b1" is returned. Next, the resolver 21029-1 sends an ICS packet 21355-1 including "c1" to the verifying server 21100-1, and regarding the domain name "c1", the space for the endpoint of 21100-1 is "Yes" this time, so it can be judged that verification information has been registered. In this way, "root", "a1" and "b1" have been followed in order, so it can be understood that the verification information for the reversed domain name "c1.b1.a1." is registered in the internal table 21100-2.

The verifying server 21100-1 checks the received cipher parameter RP, and checks that the expiration date "98-12-31" has not expired. Next, the verifying server 21100-1 reads the password PW and the value of the cipher number written in the verifying table, and selects cipher function Ei. The cipher parameter RP is RR2=Ei(PW, TR)||TR, so the time random number TR to the latter half of RP2 is used to calculate t=Ei(PW, TR). In the event that the value of this temporary variable t calculated here matches the first half Ei(PW, TR) of the received RP2, confirmation can be made that the password PW entered into the terminal 21200-1 is correct. The above results are reported to the connection server 21028-1. Consequently, the connection server 21028-1 can know the verification results (authorized or denied) and the billing class MNY.

<<Other Embodiment of Roaming Without a Home IP Terminal>>

In the above embodiment, in the event that the ICS receptionist does not set a home IP terminal, the earlier-described "Registration procedures from home IP terminal" are performed via the user service server 21250-1. In this case, the billing record "120" within the verifying table 21100-2 within the verifying server 21100-1, and the information "7981-710-1" of the verifying server presented to the billing notification destination within the conversion table 21023-1, are used.

<<Another Embodiment of Roaming wherein the Verifying Server is Included in the Domain Name Server>>

The structure of the domain name tree shown in FIG. 128 that is the object of verifying server 21110-1 is the same as the domain name trees that are the object of domain name servers in other embodiments. Accordingly, each domain server is capable of storing the data of the verifying server described in the present embodiment, and include the function of a verifying server. That is, this other method of carrying out roaming is realized by integrating the verifying server described in the present embodiment with the domain name server described in other embodiments.

<<Access Control Apparatus and IP Terminal Connecting with Wireless Transceiver>>

With reference again to FIG. 124, a wireless transceiver 21620-1 is provided within the ICS 21000-1, and the wireless transceiver 21620-1 and a wireless transceiver 21640-1 can exchange information one with another via a wireless communication path 21625-1. The terminal 21630-1 includes the wireless transceiver 21640-1, and as with the case of the earlier-described IP terminal 21200-1, the terminal 21200-2 has functions for inter-corporation communication using an ICS domain name. There is an information communication path 21610-1 between the access control apparatus 21020-1 and the wireless transceiver 21620-1. The information communication path 21610-1 is like the ICS user logic communication line in that it has functions for sending and receiving ICS user packet, and these are different in that the information communication path 21610-1 is within the ICS 21000-1. The wireless transceiver 21620-1 and the wireless transceiver 21640-1 both have functions for receiving the ICS user packet, converting the information within the ICS user packet into ICS user packet information in waveform format and transmitting them, and also reverse function, i.e., receiving ICS user packet information in waveform format and reverse-converting into ICS packet format and transmitting these. Accordingly, the ICS user packet sent out from the IP terminal 21200-2 passes through the wireless transceiver 21640-1, wireless communication path 21625-1, wireless transceiver 21620-1, and information communication path 21610-1, and is provided to the access control apparatus. Also, an ICS packet sent out in the reverse direction, i.e., sent from the access control apparatus 21020-1 passes through the information communication path 21610-1, the wireless transceiver 21620-1, the wireless communication path 21625-1, the wireless transceiver 21640-1, and is delivered to the IP terminal 21200-2.

Embodiment-19

Closed-Zone Network Communication Using Network Identifier, and Open-Zone Communication A method for using a network identifier to restrict virtual dedicated line service, intra-corporation communication service and inter-corporation communication service to within the closed-zone, and a method for non-specifying the closed-zone specification of the network identifier, i.e., specifying open-zone, will be described. Here, the network identifier is appropriated corresponding with the ICS user address.

<<Configuration>>

As shown in FIGS. 133 to 136, an ICS 22000-1 includes access control apparatuses 22010-1, 22020-1, 22030-1 and 22040-1, and the access control apparatus 22010-1 includes a line portion 22011-1, a processing device 22012-1 and a conversion table 22013-1, the access control apparatus 22020-1 includes a line portion 22021-1, a processing device 22022-1 and a conversion table 22023-1, the access control appartus 22030-1 includes a line portion 22031-1, a processing device 22032-1 and a conversion table 22033-1, the access control apparatus 22040-1 includes a line portion 22041-1, a processing device 22042-1 and a conversion table 22043-1, and blocks 22060-1, 22061-1, 22062-1, 22063-1 and 22064-1 are each relay devices, and are interconnected and also connected to one of the access control apparatuses, via the ICS network communication line. Blocks 22101-1, 22102-1, 22103-1, 22104-1, 22105-1, 22106-1, 22107-1, 22108-1, 22109-1, 22110-1, 22111-1 and 22112-1 are each corporation LANs, and are each connected to the line portions of one of the access control apparatuses via the respective gateways and the ICS user logic communication line. Here, a block 22120-1 is a gateway for LAN 22101-1, a block 22121-1 is an ICS user logic communications line, and the other gateways and ICS user logic communication lines are also in similar positions, as shown in FIGS. 133 through 136.

Each LAN has 2 to 3 IP terminals having function for sending an IP user packet, wherein the ICS user addresses are: for within LAN 22101-1, "1500" and "1510"; for within LAN 22102-1, "5200", "5210", and "5250"; for within LAN 22103-1, "1900" and "1910"; for within LAN 22104-1, "1100" and "1110"; for within LAN-22105-1, "4200" and "4210"; for within LAN 22106-1, "1800" and "1810"; for within LAN 22107-1, "1920" and "1930"; for within LAN 22108-1, "5410" and "5420"; for within LAN 22109-1, "1430" and "1440"; for within LAN 22110-1, "6500" and "1960"; for within LAN 22111-1, "1820" and "1830"; and for within LAN 22112-1, "4410" and "1420".

In the above description, values "1000" through "1999" for the ICS user address indicate the ICS user addresses for the intra-corporation communication, values "2000" through "6999" for the ICS user address indicate the ICS user addresses for the inter-corporation communication, and values "7000" through "9999" for the ICS network address indicate the ICS network addresses. The ICS network server uses the ICS user address range ("1000" through "1999") when performing the intra-corporation communication, and the ICS user address range ("2000" through "6999") when performing the inter-corporation communication. Also, the ICS user addresses used for the intra-corporation communication can also be used for the inter-corporation communication.

<<Conversion Table Line and Network Identifier>>

Description will be made regarding "lines" in the conversion table. For example, in conversion table 22013-1, shown in FIG. 137 the example is that wherein: in the first line, the value of request identification is "1", the value of transmitting ICS network address is "8100", the value of sender ICS user address (intra-corporation) is "1500", sender ICS user address (inter-corporation) is blank, the value of receiver ICS user address is "1100", the value of receiving ICS network address is "7100", the value of the network identifier is "A001", and other items are unfilled. Here, a blank space may mean "Null". The "line" in the conversion table is also referred to as a "record" of the conversion table. The network identifier is a symbol provided for sectoring off a section of the ICS network and making that portion a net, and distinguishing the net, and may be a numeral or a code. The network identifiers are provided per line in the conversion table. Incidentally, in the event that the network is not to be a closed-zone network, this is indicated in each line in the conversion table with "Open", as shown in conversion table 22033-1 (FIG. 139).

The operation will be described with reference to the flowcharts in FIGS. 141 and 142.

<<Closed-Zone/Intra-Corporation Communication>>

An ICS user frame S01 is sent out from an IP terminal having an address "1100" within the LAN 22104-1, and reaches the access control apparatus 22020-1 via the ICS user logic communication line. At the time of receiving the ICS user packet S01 from the ICS logic terminal with the address "7100" of the line portion 22021-1, the access control apparatus 22020-1 obtains the transmitting ICS network address "7100", and further obtains the sender ICS user address "1100" and the receiver ICS user address "1500" from the ICS user packet S01 (Step SP100), and checks whether the transmitting ICS network address "7100" is registered on the conversion table 22023-1 with the request identification as "3" (Step SP110). In this case, it is not registered, so next the access control apparatus 22020-1 checks whether or not there is a record in the conversion table 22023-1 that contains all of the ICS network address "7100", the sender ICS user address "1100", and the receiver ICS user address "1500", these having been obtained as described above (Step SP120). In this case, the existence of such is confirmed (Step SP130), and next, the sender ICS user address (intra-corporation) of this record alone is recorded as "1100", confirmation is made that the space for the sender ICS user address (inter-corporation) is blank, following which receiving ICS network address "8100" is obtained (Step SP160).

Next, an ICS encapsulation is performed using the transmitting ICS network address "7100" thus obtained and the receiving ICS network address "8100" (Step SP180), and the ICS network packet T01 thus obtained is sent out onto the ICS network communication line (Step SP190). The ICS network packet T01 passes through the relay devices 22062-1, 22061-1 and 22060-1, and reaches the access control apparatus 22010-1. The access control apparatus 22010-1, upon receiving the ICS network packet T01 (Step ST100), confirms that the receiving ICS network address "8100" written within the network control field (ICS capsule) of the ICS network packet T01 is registered as the transmitting ICS network address "8100" within the conversion table 22013-1 (Step ST110), and then performs the ICS reverse encapsulation (Step ST120), and sends the obtained ICS user packet S01 to the ICS logic communication line 12121-1 connected to the address "8100" within the line portion 22011-1 (Step ST130). Incidentally, in the event that the receiving ICS network address "8100" is not registered within the conversion table 22013-1, the ICS network packet T01 is discarded (Step ST115).

<<Closed-Zone/Intra-Corporation Communication/Access to Network Server>>

An ICS user packet S02 is sent out from an IP terminal having an address "1100" within the LAN 22104-1. At the time of receiving the ICS user packet S02 from the ICS logic terminal with the address "7100" of the line portion 22021-1, the access control apparatus 22020-1 obtains the transmitting ICS network address "7100", and further obtains the sender ICS user address "1100" and the receiver ICS user address "6100" from the ICS user packet S02 (Step SP100), and checks whether the ICS network address "7100" is registered on the conversion table 22023-1 with the request identification as "3" (Step SP110). In this case, it is not registered, so next the access control apparatus 22020-1 checks whether or not there is a record in the conversion table 22023-1 that contains all of the ICS network address "7100", the sender ICS user address "1100" and the receiver ICS user address "6100", these having been obtained as described above (Step SP120). In this case, the non-existence of such is confirmed (Step SP130)

Next, search is made for a record identical to the above receiver ICS user address "6100" from one or more records in the conversion table with a network identifier the same as the network identifier "A001" having the request identification value "4" in the conversion table 22023-1 with the aforementioned ICS network address of "7100" and the sender ICS user address of "1100" (in this case, the third record from the top in the conversion table 22023-1), and the receiving network address "9100" written to the record is found (Step SP170). Next, the ICS encapsulation is performed using the transmitting ICS network address "7100" and the receiving ICS network address "9100" thus obtained (Step SP180), and the ICS network frame T02 thus obtained is sent out onto the network communication line (Step SP190). The ICS network packet T02 passes through the relay devices 22062-1 and 22061-1, and reaches the ICS network server 22081-1. The same is true for the ICS user packet S03 sent out from the IP terminal having the address "1110" within the LAN 22104-1, the network identifier is "A002", and is ICS-encapsulated to become the ICS network packet T03, and passes through the relay devices 22062-1 and 22061-1, and reaches the ICS network server 22082-1.

<<Closed-Zone/Inter-Corporation Communication>>

An ICS user packet S04 is sent out from an IP terminal having an address "4200" within the LAN 22105-1. At the time of receiving the ICS user frame S04 from the ICS logic terminal with the address "7200" of the line portion 22021-1, the access control apparatus 22020-1 obtains the transmitting ICS network address "7200", and further obtains the sender ICS user address "4200" and the receiver ICS user address "5200" from the ICS user packet S04 (Step SP100), and checks whether the address "7200" is registered on the conversion table 22023-1 with the request identification as "3" (Step SP110). In this case, it is not registered, so next the access control apparatus 22020-1 checks whether or not there is a record in the conversion table 22023-1 that contains all of the transmitting ICS network address "7200", the sender ICS user address "4200" and the receiver ICS user address "5200", these having been obtained as described above (Step SP120). In this case, the existence of such is confirmed (Step SP130), and next, the sender ICS user address (intra-corporation) of this record is blank, confirmation is made that the sender ICS user address (inter-corporation) alone is recorded as "4200" (Step SP160).

Next, the ICS encapsulation is performed using the transmitting ICS network address "7200" thus obtained and the receiving ICS network address "8200" (Step SP180), and the ICS network packet T04 thus obtained is sent out onto the network communication line (Step SP190). The ICS network packet T04 passes through the relay devices 22062-1, 22061-1 and 22060-1, and reaches the access control apparatus 22010-1. The access control apparatus 22010-1, upon receiving the ICS network packet T04 (Step ST100), confirms that the receiving ICS network address "8200" written within the network control field (ICS encapsule) of the ICS network frame T04 is registered as the transmitting ICS network address "8200" within the conversion table 22013-1 (Step ST110), and then performs the ICS reverse encapsulation (Step ST120), and sends the obtained ICS user packet S04 to the ICS logic communication line connected to the address "8200" (Step ST130).

<<Closed-Zone/Inter-Corporation Communication/Access to Network Server>>

An ICS user packet S05 is sent out from an IP terminal having an address "4200" within the LAN 22105-1. At the time of receiving the ICS user packet S05 from the ICS logic terminal with the address "7200" of the line portion 22021-1, the access control apparatus 22020-1 obtains the transmitting ICS network address "7200", and further obtains the sender ICS user address "4200" and the receiver ICS user address "6200" from the ICS user packet S05 (Step SP100), and checks whether the ICS network address "7200" is registered on the conversion table 22023-1 with the request identification as "3" (Step SP110). In this case, it is not registered, so next the access control apparatus 22020-1 checks whether or not there is a record in the conversion table 22023-1 that contains all of the transmitting ICS network address "7200", the sender ICS user address "4200" and the receiver ICS user address "6200", these having been obtained as described above (Step SP120). In this case, the non-existence of such is confirmed (Step SP130), and next, search is made for a record identical to the above receiver ICS user address "6200" from one or more records in the conversion table with a network identifier the same as the network identifier "B001" having the request identification value "4" (ICS network server specification) in the conversion table 22023-1 with the aforementioned receiver ICS network address of "7200" and the sender ICS user address of "4200" (in this case, the seventh record from the top in the conversion table 22023-1), and the receiving network address "9200" written to the record is found (Step SP170).

Next, the ICS encapsulation is performed using the transmitting ICS network address "7200" and the receiving ICS network address "9200" thus obtained (Step SP180), and the ICS network packet T05 thus obtained is sent out onto the ICS network communication line (Step SP190). The ICS network packet T05 passes through the relay device 22062-1 and reaches the ICS network server 22083-1. The same is true for the ICS user packet S06 sent out from the IP terminal having the address "4210" within the LAN 22105-1, the network identifier is "B002", and is ICS-encapsulated to become the ICS network frame T06, and passes through the relay device 22062-1 and reaches the ICS network server 22084-1.

<<Communication from Network Server within ICS to Network Server Outside of ICS>>

The IP terminal 22092-1 within the LAN 22102-1 is an "ICS external server", comprised of an IP terminal placed outside the ICS 22000-1 and so forth. The ICS external server 22092-1 has an ICS user address "5250", and is registered in the conversion table 22013-1 (ninth record from the top in the in the conversion table 22013-1). However, the receiver ICS user address and the receiving ICS network address spaces are blank, and are registered as being "Null". At the time that the ICS internal server 22084-1 sends out an ICS network packet T22, the ICS network packet T22 passes through the relay devices 22062-1, 22061-1 and 22060-1, and reaches the access control apparatus 22010-1 (Step SP100), confirmation is made that the transmitting IC network address is not registered within the conversion table 22013-1 as "8200", the ICS reverse encapsulation is performed (Step SP120) in order to form the ICS user packet S22, which is sent toward the ICS external server 22092-1 (Step SP130). For reverse direction communication, the ICS encapsulation is performed using the conversion table 22013-1, and delivery is made to the ICS internal server 22084-1.

<<Closed-Zone/Virtual Dedicated Line>>

An ICS user packet S07 is sent out from an IP terminal having an address "1800" within the LAN 22106-1. At the time of receiving the ICS user packet S07 from the ICS logic terminal with the address "7300" of the line portion 22021-1, the access control apparatus 22020-1 obtains the transmitting ICS network address "7300", and further obtains the sender ICS user address "1800" and the receiver ICS user address "1900" from the ICS user packet S07 (Step SP100), and checks whether the ICS network address "7300" is registered on the conversion table 22023-1 with the request identification as "3", i.e., as a virtual dedicated line connection (Step SP110). In this case, it is registered. Next the access control apparatus 22020-1 checks whether or not there is a record in the conversion table 22023-1 that contains the transmitting ICS network address "7300" and the receiver ICS user address "1900", these having been obtained as described above (Step SP140). In this case, such does not exist, so the receiver ICS network address "8300" of the record wherein the receiver ICS user address space is blank (or "Null") with the ICS network address "7300" in the conversion table 22023-1 is found (Step SP145), the ICS encapsulation is performed using the transmitting ICS network address "7300" thus obtained and the receiving ICS network address "8300" (Step SP180), and the ICS network packet T07 thus obtained is sent out onto the network communication line (Step SP190). The ICS network packet T07 passes through the relay devices 22062-1, 22061-1 and 22060-1, and reaches the access control apparatus 22010-1. The access control apparatus 22010-1, upon receiving the ICS network packet T07 (Step ST100), confirms that the receiving ICS network address "8300" written within the network control field (ICS capsule) of the ICS network packet T07 is registered as the transmitting ICS network address "8300" within the conversion table 22013-1 (Step ST110), and then performs the ICS reverse encapsulation (Step ST120), and sends the obtained ICS user packet S07 to the ICS logic communication line 12121-1 connected to the address "8300" within the line portion 22011-1 (Step ST130).

This is the same for ICS user packet S09 sent out from the IP terminal having the ICS user address "1820" within the LAN 22111-1, the network identifier is "C002", the ICS encapsulation is performed and transferred through the ICS 22000-1, the ICS reverse encapsulation is performed at the access control apparatus 22030-1 to form an ICS user packet S09, which reaches the IP terminal having the ICS user address "1920" within the LAN 22107-1.

<<Closed-Zone/Virtual Dedicated Line/Access to Network Server>>

An ICS user packet S08 is sent out from an IP terminal having an address "1810" within the LAN 22106-1. At the time of receiving the ICS user packet S08 from the ICS logic terminal with the address "7300" of the line portion 22021-1, the access control apparatus 22020-1 obtains the ICS network address "7300", and further obtains the sender ICS user address "1810" and the receiver ICS user address "6300" from the transmitting ICS user packet S08 (Step SP100), and checks whether "7300" is registered on the conversion table 22023-1 with the request identification as "3" (virtual dedicated line) (Step SP110). In this case, it is registered. Next the access control apparatus 22020-1 checks whether or not there is a record in the conversion table 22023-1 that contains the transmitting ICS network address "7300" and the receiver ICS user address "6300", these having been obtained as described above (Step SP140). In this case, such does exist, and the receiving network address "9300" written to the record is found (Step SP145). Next, the ICS encapsulation is performed using the transmitting ICS network address "7300" and the receiving ICS network address "9300" thus obtained (Step SP180), the transmitting ICS network address "7300" thus obtained and the receiving ICS network are used to perform the ICS encapsulation (Step SP180), and the ICS network packet T08 thus obtained is sent out onto the ICS network communication line (Step SP190). The ICS network packet T08 passes through the relay devices 22062-1 and 22064-1, and reaches the ICS network server 22087-1.

The same is true for the ICS user packet S10 sent out from the IP terminal having the address "1830" within the LAN 22111-1, the network identifier is "C002", and is ICS-encapsulated to become the ICS network packet T10, and passes through the relay device 22064-1 and reaches the ICS network server 22089-1.

<<Open-Zone/Inter-Corporation Communication>>

Open-zone/inter-corporation communication is almost the same as the aforementioned closed-zone/inter-corporation communication; the difference is that checking has been added for registration of both the sender ICS user address (intra-corporation) and the sender ICS user address (inter-corporation) in searching the records in conversion tables 22013-1 and 22043-1, as described below.

An ICS user packet S13 is sent out from an IP terminal having a user address "1420" within the LAN 22112-1. At the time of receiving the ICS user packet S13 from the ICS logic terminal with the address "7405" of the line portion 22041-1, the access control apparatus 22040-1 obtains the transmitting ICS network address "7405", and further obtains the sender ICS user address "1420" and the receiver ICS user address "5420" from the ICS user packet S13 (Step SP100), and checks whether the ICS network address "7405" is registered on the conversion table 22043-1 with the request identification as "3" (Step SP 110). In this case, it is not registered, so next the access control apparatus 22040-1 checks whether or not there is a record in the conversion table 22043-1 that contains all of the transmitting ICS network address "7405", the sender ICS network address "1420" and receiver ICS user address "5,420", these having been obtained as described above (Step SP120), the existence of such is confirmed (Step SP130), and next, a record is found recorded in the conversion table 22043-1 wherein the sender ICS user address (intra-corporation) is "1420" and the sender ICS user address (inter-corporation) is "5420" (in this case, the fifth record from the top on conversion table 22043-1). Next, the received sender ICS user address (intra-corporation) "1420" is re-written to a inter-corporation address "4420", and the receiving ICS network address "8400" registered to this record is obtained (Step SP160). Next, the ICS encapsulation is performed using the transmitting ICS network address "7405" and the receiving ICS network address "8400" thus obtained (Step SP180), and the ICS network packet thus obtained is sent out onto the ICS network communication line (Step SP190). The ICS network packet passes through the relay devices 22064-1 and 22063-1, and reaches the access control apparatus 22030-1. The access control apparatus 22030-1, upon receiving the ICS network packet (Step ST100), confirms that the receiving ICS network address "8400" written within the network control field (ICS capsule) of the ICS network packet is registered as the transmitting ICS network address "8400" within the conversion table 22033-1 (Step ST110), and then performs the ICS reverse encapsulation (Step ST120), and sends the obtained ICS user packet S130 to the ICS logic communication line connected to the address "8400" (Step ST130).

An ICS user packet S11 sent out from an IP terminal having an ICS user address "4410" within the LAN 22112-1 is ICS-encapsulated by the access control apparatus 22040-1 by the same procedures as described above with regard to closed-zone/inter-corporation communication, transferred through the ICS 22000-1, reversely ICS-encapsulated in the access control apparatus 22030-1, and delivered to an IP terminal having an ICS user address "5410" within the LAN 22108-1. As another example, an ICS user packet S12 sent out from an IP terminal having an ICS user address "4410" within the LAN 22112-1 is ICS-encapsulated by the access control apparatus 22040-1 by the same procedures as described above, transferred through the ICS 22000-1, delivered to the access control apparatus 22030-1, and at the time of the ICS reverse encapsulation, reference to the record in conversion table 22033-1 (in this case, the fifth record from the top on the conversion table) reveals that the address "5430" written within the ICS user packet S12 is an ICS user address (inter-corporation), the address value "5430" is re-written to an ICS user address (intra-corporation) "1430" (Step ST120), an ICS user packet S120 is generated, and delivered to the IP terminal having the ICS user address "1430" within the LAN 22109-1. As another example, an ICS user packet S14 sent out from an IP terminal having an ICS user address "1420" within the LAN 22112-1 has a sender ICS user address "1420" and a receiver ICS user address "5440", is transferred through the ICS 22000-1 and is delivered to the IP terminal within the LAN 22109 with an ICS user address of "1440" and a sender ICS user address "4420", having been converted to an ICS user packet S140 with a receiver ICS user address "1440".

<<Open-Zone/Inter-Corporation Communication/Access to Network Server>>

ICS user packets S15 and S16 sent out from within the LAN 22112-1 are delivered to the ICS network server 22085-1 that is the destination of each, following the same procedures as that described above.

<<Communication from Network Server within ICS to Network Server Outside of ICS>>

A block 22086-1 is an ICS network server within the ICS 22000-1, and is an "ICS external server", comprised of a database placed outside the ICS 22000-1, and so forth. The ICS external servers 22090-1 and 22091-1 have ICS user addresses "6500" and "1960", and are registered in the conversion table 22033-1 (in this case, the eighth and ninth records from the top in the in the conversion table 22033-1). However, the receiver ICS user address and the receiving ICS network address spaces are blank, and are registered as being "Null". The ICS external server 22091-1 has sender ICS user address (intra-corporation) "1960", and further, is provided with a sender ICS user address (inter-corporation) "6960". Also, the ICS internal server 22086-1 has ICS user address "6600", ICS network address "9500", these being registered in the conversion table 22033-1 (in this case, the tenth record from the top in the in the conversion table 22033-1).

At the time that the ICS internal server 22086-1 sends out the ICS network packet T20, the ICS network packet T20 passes through the relay devices 22063-1 and reaches the access control apparatus 22030-1, the ICS reverse encapsulation is performed using the conversion table 22033-1 in order to form the ICS user packet S20, which is delivered to the ICS external server 22090-1. For reverse direction communication, the ICS reverse encapsulation is performed in the access control apparatus 22030-1 to form the ICS user packet S21, and delivery is made to the ICS external server 22086-1. Summarizing the above, an ICS external server is placed outside of the ICS 22000-1, and communication between internal servers within the ICS 22000-1 and external servers outside the ICS 22000 is enabled.

An arrangement may be used wherein all or a plurality of records in the conversion table 22013-1 within the access control apparatus 22010-1 are selected as necessary, stored within a conversion table record file 22014-1, and extracting as necessary for performing the ICS encapsulation and the ICS reverse encapsulation. This also is true for the conversion table 22023-1 within the access control apparatus 22020-1 and so forth. In the access control apparatus, the portion of the conversion table 21033-1 in which specification of the network identifier is that for open-zone connection ("Open") is usually not held within the access control apparatus, and instead an arrangement may be used in which address information to be registered to the conversion table is obtained from the domain name server 22095-1 and temporarily used as a conversion table 22030-1. Also, the network server 22081-1 for closed-zone/intra-corporation communication may be used as a domain name server for closed-zone/intra-corporation communication which can be commanded by the network identifier "A001". Incidentally, the hierarchical structure of the domain name in the example is shown to be a single-layer structure specifying, e.g., domain name "a1", but this may be made to be 2- or 3-layer hierarchy such as "b1.a1." or "c1.b1.a1.". Further, the network server 22083-1 for closed-zone/inter-corporation communication may be used as a domain name server for closed-zone/inter-corporation communication which can be commanded by the network identifier "B001". The network server 22087-1 for closed-zone/virtual dedicated line may be used as a domain name server for closed-zone/virtual dedicated line which can be commanded by the network identifier "C001". Incidentally, in the present embodiment, the hierarchical structure of the domain name in the example is shown to be a single-layer structure specifying, e.g., domain name "a1", but this may be made to be 2- or 3-layer hierarchy such as "b1.a1." or "c1.b1.a1.".

Embodiment-20

IP Terminal Capable of Connecting to Plural Access Control Apparatuses with Identifiers The present embodiment does not fix the IP terminal having the functions for sending and receiving ICS user IP packet to a specific access control device; rather, it realizes usage of an IP terminal which can be moved and connected to other access control apparatuses and used, i.e., capable of roaming, using identifiers. Roaming is realized based on the ICS domain name provided to the IP terminal.

<<Password Transmission Technique Using Cipher>>

The present embodiment includes procedures for ciphering a secret password PW and sending this from the sender (ciphering side) to the receiver (decoding side). First, the ciphering function Ei and the decoding function Di will be described. The ciphering function Ei is represented by $y=Ei(k1, x)$, and the decoding function Di is represented by $x=Di(k2, y)$. Here, y denotes the ciphertext, x denotes plain-text, k1 and k2 are keys, and "i" represents cipher numbers (i=1, 2, ... ) determining the secret key code and public key code, including how the value of the cipher key is to be used. In the above, an arrangement may be used wherein plain-text x' is ciphered instead of the plain-text x with $x'=x\|r$ (wherein r is a random number), and discarding the random number r from the plain-text x' upon decoding, thus obtaining the plain-text x. Such an arrangement generates a different ciphertext each time the same plain-text is ciphered, owing to the random number, and it is said that such is less susceptible to cipher cracking.

(Example of Cipher Number i=1)

<<Preparation>>

The sender m discloses the domain name thereof (DNm) to the public including the receiver. The receiver calculates Km=Hash-1(DNm) using the secret data compression function Hash-1, and hands over only the cipher key Km using a safe method so as to be unnoticed by a third party. This example is an example of using DES ciphering, and the sender holds a "ciphering module DES-e" for realizing the ciphering function Ei, and a cipher key Km. The cipher key Km is a secret value which the sender and receiver share. The receiver has the "ciphering module DES-d" for realizing the decoding function Di and the data compression function Hash-1. What is used for the data compression function Hash-1 is determined separately for each cipher number. A data compression function is also referred to as a "hash function".

<<Ciphering by Sender>>

The sender sets the secret password PW as x=PW, and ciphers as y=DES-e(Km,x) with the ciphering module DES-e and the cipher key Km being held, thereby sending the ciphertext and domain name DNm.

<<Decoding by Receiver>>

The receiver receives the ciphertext y and the domain name DNm, calculates the secret cipher key Km as Km=Hash-1

(DNm) using the receiver's secret data compression function Hash-1, and the obtains the plain-text x as x=DES-d(Km,y) using the decoding module. The plain-text x is password PW, and the receiver can obtain the secret password PW. A third party does not know the data compression function Hash-1 and thus cannot calculate the cipher key Km, and accordingly, cannot calculate the secret password PW. In the above embodiment, as stipulation of the cipher number i=3, the ciphering function and the decoding function can be replaced with coding function and decoding function other than DES code.

(Example of Cipher Number i=2)

<<Preparation>>

The present example is an example of employing RSA ciphering, wherein the sender generates a ciphering function $y=x^e \bmod n$ and a decoding function $y=x^d \bmod n$. Here, $e \neq d$ holds, the key d being a secret value. The sender hands to the receiver the discloseable ciphering keys e and n, and the ciphering module RSA-e for realizing $y=x^e \bmod n$. The sender holds the ciphering keys and the ciphering module RSA-e. The sender holds neither the secret ciphering module nor secret data. On the other hand, the receiver holds n and the secret key d and the ciphering module RSA-e for realizing $y=x^e \bmod n$.

<<Ciphering by Sender>>

The sender ciphers the secret password PW, own domain name DNm, and time of sending (year/month/day/hour/minute/second) as x=PW∥x1∥x2 (wherein X1: domain name DNm, and x2: year/month/day/hour/minute/second) and encodes as $y=x^e \bmod n$ using the ciphering module RSA-e, thus sending the ciphertext y.

<<Decoding by Receiver>>

The receiver receives the ciphertext y and calculates $y=x^d \bmod n$ using the decoding module RSA-d held beforehand and the decoding key. The result is x=PW∥x1∥x2, so the data which is at a certain position from the head of x is used as PW. In the above ciphering, domain name x1 and year/month/day/hour/minute/second x2 are used as random numbers. A third party does not know the secret key d and thus cannot calculate the secret password PW. In the above embodiment, as stipulations of the cipher number i=4, the values of the cipher keys e, d and n can be changed. Also, as stipulations of the cipher number i=5, the RSA ciphering technique can be replaced with a different public key ciphering technique.

<<Terminal Verification Technique Using Password and Random Number>>

Description will be made regarding verification technique for determining whether or not the password PW used by a roaming terminal agrees with the password registered in the verifying server. As prerequisite conditions, the verifying server of the verifying entity and the terminal of the user to receive verification have a password PW that is secret to a third party, with a ciphering function E (wherein y=E(k,x), y represents ciphertext, k represents ciphering key, and x represents plain-text). Specific procedures for terminal verification will now be described. The terminal of the user to receive verification decides upon a random number R using appropriate means, calculates Y1=F(PW, R) using the password PW and the function y=F(PW, R) and sends both the random number R and Y1 to the verifying entity. The verifying entity receives the random numbers R and Y1, and calculates Y2=F (FW, R) using the received random number R, the password PW held within, and function F, and checks whether or not Y1=Y2 holds. In the event that there is a match, the verification can be made that the owner of the terminal which is being verified is using the correct password PW, i.e., verification of the terminal can be made. In the above technique, an arrangement in which the user to be verified cannot freely select the random number R but rather the random number R is restricted to depending on time (called a time random number) further increases difficulty of a third party calculating the password. Instead of the ciphering function used above, the secret data compression function Hj may be used instead, for Y1, Y2=Hj(PW, R).

<<Overall Configuration>>

FIGS. 143 and 144 illustrate an overview of the roaming technique according to the present embodiment, wherein an ICS 21000-1 includes access control apparatuses 21010-1, 21020-1, 21030-1, 21040-1, 21050-1 and 21060-1, relay devices 21080-1, 21081-1, 21082-1 and 21083-1, verification servers 21100-1, 21101-1, 21102-1 and 21103-1, domain name servers 21130-1, 21131-1, 21132-1 and 21133-1, user service server 21250-1 and an ICS authority server 21260-1. The access control apparatus 21010-1 is provided with a conversion table 21013-1, a conversion table server 21016-1, a registration server 21017-1 and a connection server 21018-1. The access control apparatus 21020-1 is provided with a conversion table 21023-1, a conversion table server 21026-1, a registration server 21027-1 and a connection server 21028-1. The connection servers 21018-1 and 21028-1 are provided with an ICS user address "6310", and have the function to register access control apparatuses determined as necessary to the IP terminal, or to connect thereto. The verifying server 21100-2 is shown in FIG. 145 and the conversion table 21023-1 is shown in FIG. 146.

The conversion table server 21016-1 has a function for re-writing the contents of the conversion table 21013-1, and the conversion table server 21026-1 has a function for re-writing the contents of the conversion table 21023-1, which is the same as described in other embodiments. Also, the LAN 21150-1 has an IP terminal 21151-1, the LAN 21160-1 has an IP terminal 21161-1, and a block 21170-1 is an IP terminal. A block 21200-1 is a portable roaming terminal, and is identified by the ICS domain name "c1.b1.a1." provided uniquely within the ICS 21000-1.

<<Application for use of Roaming Terminal>>

The owner of a roaming terminal. 21200-1 indicates as an ICS usage applicant 21270-1 the payment method for the roaming terminal 21200-1, and applies to the ICS authority server 21260-1 via user service server 21250-1 for an ICS domain name and an ICS user address. The payment method is represented by billing class "MNY", e.g., in the event that MNY=1, the charges are billed to the home IP (i.e., an IP terminal which is connected to the access control apparatus in a fixed manner), in the event that MNY=2, the charges are paid according to the record of the verifying server. The ICS authority server 21260-1 sets an ICS domain name: "c1.b1.a1." for using the roaming terminal 21200-1, and an ICS user address "1200". Further, in order to be connected to the access control apparatus in a fixed manner and use it, the owner of the IP terminal 21200-1 applies for an ICS network address to the ICS authority server 21260-1 via the user service server 21250-1. The user service server 21250-1, upon obtaining the ICS network address, makes a request to the conversion table server 21016-1 to set the ICS network address "8115" and the ICS user address "1200" in the conversion table 21013-1.

The ICS receptionist 21271-1 embeds inside the interior 21201-1 of the roaming terminal 21200-1 the following: ICS domain name "c1.b1.a1.", ICS user address "1200", special ICS address for roaming terminals (called "roaming special number") "1000", ICS user address "6300" for registration server, and ICS user address "6310" for connecting server, and further embeds inside the interior 21201-1 of the roaming terminal 21200-1 the ciphering function Ei and the decoding related data RP1. Now, RP1=Hj(domain∥name RP0)∥RP0 (wherein RP0=NMY∥i∥j∥NID) holds, and the domain name is "c1.b1.a1.". MNY is the above-described billing class, "i" is a cipher number for the cipher Ei, and "j" determines the type of Hash function Hj, and "NID" is a network identifier "B001". Network identifies are named to distinguish between closed-zone networks and open-zone networks. Data compression function Hj is a secret dedicated function used only by the verifying server and the user service server. The user does not hold the data compression function Hj, and does not even known Hj, and thus is incapable of generating cipher related data RP1.

<<Registration Procedures from Home IP Terminal>>

Description will be made with reference to FIG. 147. The roaming terminal user connects the roaming terminal 21200-1 to the position of the home IP terminal 21151-1. Next, the roaming terminal user decides on a password (PW) and enters this from the input unit 21204-1, and also generates an ICS user packet PK01 using the ciphering function and the coding-related data stored within 21202-1, and sends it to the access control apparatus 21010-1 via the ICS user logic communication line 21152-1 (procedures T10). The destination of the ICS user packet PK01 is "6300" which points to the roaming registration server, and includes own ICS domain name "c1.b1.a1.", cipher parameter PR1, ICS user address "1200", expiration data "98-12-31", ciphertext "y" which is the password that has been ciphered, "tg" (wherein tg=1 in order to display registration procedures), and "Yes" or "No" for roaming connection specification. The generation method employed for the ciphertext "y" is the ciphering technique described earlier. For example, in the event that the cipher number=2, ciphertext "y" is generated with $y=x^e$ mod n (wherein x=PW∥c1.b1.a1. ∥ year/month/day/hour/minute/second). The access control apparatus 21010-1 looks at the conversion table 21013-1 and transfers the ICS user packet PK01 to the registration server 21017-1 with the destination "6300" (procedure T15). The registration server 21017-1 uses the domain name "c1.b1.a1." to call the verifying server 21100-1 (procedure T20). Also, the method by which the registration server 21017-1 calls the verifying server 21100-1 using the domain name is the same as the method by which the connection server 21028-1 calls the verifying server 21100-1 using the domain name, the details thereof being described in detail later. The verifying server 21100-1 checks the contents of the received ICS user packet PK01, and decodes the ciphertext "y" using the earlier-described technique, thereby calculating the password PW. For example, in the event that the code number=2, the ciphertext "y" is decoded with $x=y^d$ Mod n. This yields x=PW∥1.b1.a1.∥year/month/day/hour/minute/second, so the password PW can be obtained.

Next, the contents of the cipher parameter PP1 is RP1=Hj(domain name∥RP0)∥RP0 (wherein RP0=MNY∥i∥j∥NID), so the verifying server 21100-1 uses the secret Hash function Hj held within the verifying server 21100-1 and the obtained domain name "c1.b1.a1." to calculate t=Hj (domain name∥RP0)∥RP0), and checks whether or not t=RP1 holds for the received RP1. If it holds, judgment is passed that the domain name "c1.b1.a1.", billing class MNT, cipher numbers "i" and "j", and the network identifier "NID" have not been tampered with. The verifying server 21100-1 checks for excessive or insufficient registration contents, and in the event that the contents are normal, the registration results are registered in the verifying table 21100-2; registration is not made in the event there are insufficient registration contents.

This is illustrated in the verifying table 21100-2 in the line with the administration number 1, with the domain name as "c1.b1.a1.", cipher number "2", billing class (MNY) "1", value of calculated password PW "224691", expiration date "98-12-31", roaming connection of "Yes", i.e., acceptance of a roaming connection. At the time of generating the PK01 in procedure T10, the aforementioned value of tg may be set to tg=2 and roaming connection set to "No". The password will not leak to a third party, due to application of the above-described ciphering method. Roaming registration is reported by passing through the registration server (procedure T30), then the access control apparatus 21010-1 (procedure T35), and reported to the roaming IP terminal (procedure T40). Further, an ICS user packet for changing the value of the password PW with tg=3 or changing the date of expiration with tg=4 can be sent from the terminal 21200-1 via the ICS user logic communication line 21152-1, after the above procedure T40 has been completed. Incidentally, a method which can be employed for changing the password involves specifying the prior password.

<<Sending and Receiving User IP Packet While Traveling>>

An example will be described regarding connecting a roaming terminal 21200-1 to the access control apparatus 21020-1 and sending and receiving of the user IP packet between domain name "c1.b1.a1." of the roaming terminal 21200-1 and the other party of communication with a domain name "c2.b2.a2." The user inputs the following from the input unit 21204-1: the domain name "c2.b2.a2." of other party of communication, "tg" which has been set to tg=5 for specifying sending and receiving of user IP packet, own password PW, and "5" which specifies the roaming connection period in days (represented by TTL). The cipher parameter RP2 is data calculated with the password PW and the inside 21202-2. That is, year/month/day/second "yy-mm-dd-sssss" is generated and used as a time random number TR (TR=yy-mm-dd-sssss), and the clock of inside 21202-2 and the cipher function Ei is used to calculate RP2=Ei(PW, TR)∥TR.

The access control apparatus 21020-1 receives the user IP packet PK02, obtains the ICS network address "7800" provided to the ICS logic terminal, and since the request identification from the conversion table is "4" and further the sender ICS user address written to the user IP packet PK02 is "1000" (i.e., roaming special number), the above ICS network address "7800" is held, and is delivered with the ICS user packet PK02 to the connection server 21028-1 pointed to by the receiver ICS user address "6310" (procedure T60). The ICS network address "7800" obtained in this procedure will be used after the later-described process T130.

<<Function of Connection Server>>

Next, the connection server 21028-1 calls the verifying server 21100-1 using the domain name "c1.b1.a1", and transfers the domain name "c1.b1.a1" and the parameter RP2 to the verifying server (procedure T70). The verifying server 21100-1 reads the values of the password PW and the cipher number written to the verifying table 21100-2, and selects cipher function Ei and reads the password PW. Next, the cipher parameter RP is RP2=Ei(PW, TR)∥TR, so the time random number which is to the latter half of the RP2 is used to calculate t=Ei(PW, TR). In the event that the value of this temporary variable t calculated here matches the first half Ei(PW, T) of the received RP2, confirmation can be made that the password PW entered into the terminal 21200-1 is correct.

The time function TR includes the year/month/day (i.e., TR=yy-mm-dd-sssss), so unauthorized access can be discovered in the case that the received year/month/day does not match that time of processing.

Next, the verifying server 21100-1 reports the following items written in the verifying table 21100-2 to the connection server 21028-1 (procedure T80): completion of roaming registration, billing class, and verifying server calling information (procedure T80). In the present embodiment, the billing class is MNY=1, and the verifying server calling information is the ICS network address "7981" of the verifying server 21100-1, port number "710" and administration number "1" of the verifying administration table. The connection server 21028-1 presents the domain name "c1.b1.a1." to the domain name server, requests the ICS user address and ICS network address associated with the domain name (procedure T90), and obtains the ICS user address "1200" and ICS network address "8115" (procedure T100). In the same way, the connection server presents the domain name "c2.b2.a2." to the domain name server, requests the ICS user address and the ICS network address associated with the domain name (procedure T110), and obtains the ICS user address "2500" and the ICS network address "8200" (procedure T120).

Next, the connection server 21028-1 informs the conversion table server 21026-1 of the following (procedure T130): the ICS network address "7800" of the ICS logic terminal which has input the ICS user packet (held in procedure T60); the ICS user address "1200", ICS user address "2500", and ICS network address "8200", just obtained from the domain name server; and also the completion of roaming registration, billing class, and verifying server calling information received from the verifying server 21100-1. The conversion table server 2120-6 writes the four addresses to the conversion table 21023-1 as received. The value of the request identification is "10", meaning the inter-corporation communication by roaming. The network identifier (NID) is "B001". In the event that the billing class is MNY=1, the ICS network address "8115" and the ICS user address "1200" just obtained from the domain name server are forwarded to the billing notification destination of the conversion table 21023-1. Also, in the event that the billing class is MNY=2, verifying server calling information is forwarded to the billing notification destination of the conversion table 21013-1. Further, "5" which specifies the roaming connection period in days is also written to the conversion table 21013-1. When the writing to the conversion table 21023-1 is completed, the conversion table server 21026-1 reports the results to the connection server 21028-1 (procedure T140). This completion report is sent via the access control apparatus 21020-1 (procedure T150) to the roaming terminal 21200-1 with the ICS user packet PK03 (procedure T160).

Now, the ICS user packet PK03 includes the ICS user address "1200" associated with the domain name "c1.b1.a1." of the roaming terminal 21200-1, and the CS user address "2500" associated with the domain name "c2.b2.a2." of the other party of communication. The corporation operating the access control apparatus can charge the owner of the roaming terminal 21200-1 for the above usage of the connection server 21028-1, i.e., the procedures for receiving the ICS user packet PK02 up to returning the ICS user packet PK03, and "5" which specifies the roaming connection period in days. The above embodiment is an example of the network identifier (NID) "B001", and is applied to closed-zone networks described in other embodiments. Also, as another embodiment, the network identifier (NID) may be set as "Open" and applied to an open-zone network. In this case, the roaming technique is the same as that of the aforementioned closed-zone network "B001".

<<Using the Roaming Terminal>>

The roaming terminal 21200-1 can use the conversion table 21023-1 created following the above-described procedures, to perform the inter-corporation communication the same as with that described in other embodiments (procedures T170 through T220). In the event that "5" which specifies the roaming connection period in days elapses, the conversion table server 21026-1 can delete the above roaming connection written in the inside of conversion table 21023-1.

<<Notification of Billing>>

The access control apparatus 21020-1 notifies the billing notification destination registered in the conversion table 21023-1 of the communication charges (procedure T300 or T310).

<<Method for Accessing the Verifying Server>>

Of the above description, detailed description will be made regarding the method for judging whether or not the verification request contained in the ICS network packet PK02 generated by the roaming terminal 21200-1 due to the connection server 21028-1 presenting the domain name "c1.b1.a1." to a plurality of verifying servers including verifying server 21100-1 is correct, i.e., whether or not the domain name "c1.b1.a1." of the roaming terminal 21200-1 is registered with the verifying server.

An example of 4-layer hierarchy will be described with reference to FIG. 148. A domain name "root" is provided on Level 1 of the tree, and domain names "a1", "a2", "a3" . . . and so forth exist on Level 2 below, domain names "b1", "b2", "b3" . . . and so forth exist on Level 3 below "a1" for example, and domain names "c1", "c2", "c3" . . . and so forth exist on Level 4 below "b1" for example.

FIG. 149 illustrates the internal table 21102-2 of the verifying server 21102-1 handling the domain "root", indicating, e.g., that the ICS network address of the domain name server 21101-1 which handles the domain name "a1" below the domain name "root" is "7971", and the port number is "710". Also, FIG. 150 illustrates the internal table 21101-2 of the verifying server 21101-1 handling the domain "a1", indicating, e.g., that the ICS network address of the domain name server 21100-1 which handles the domain name "b1" below the domain name "a1" is "7981", and the port number is "710". FIG. 151 illustrates the internal table 21100-2 of the verifying server 21100-1 handling the domain "b1", indicating, e.g., that the domain name "c1" below the domain name "b1" shows "YES" in the terminal space in the internal table 21100-2, meaning that there are no more domain names below, and that in this example, the domain name "c1.b1.a1" has been registered with the verifying server, and facts such that the password PW is "224691", that the date of expiration is "98-12-31", etc., are recorded therein <<Calling Verifying Server>>

With reference to FIG. 152, description will be made regarding the procedures in which the connection server 21028-1 calls the verifying server 21100-1 using the domain name "c1.b1.a1.", and checks whether or not the domain name "c1.b1.a1." has been registered in the verifying server. Now, the connection server 21028-1 has therein the ICS network address of the verifying server handling the domain "root" on Level 1 shown in FIG. 153. Also, in the event that there is a great deal of communication with the verifying servers which handle the Level 2 and Level 3 domains, the ICS network addresses of the verifying servers thereof are held therein.

The connection server 21028-1 enters the domain name "c1.b1.a1." in the internal resolver 21029-1. The resolver 21029-1 sends the ICS packet 21335-1 including "a1" under the domain name "root" and the cipher parameter RP2 to the verifying server 21102-1, and an ICS packet 21336-1 including an ICS network address "7971" of the ICS domain name server for "a1" is returned. Next, the resolver 21029-1 sends an ICS packet 21345-1 including "b1" to the verifying server 21101-1, and an ICS packet 21346-1 including an ICS network address "7981" of the verifying server for "b1" is returned. Next, the resolver 21029-1 sends an ICS packet 21355-1 including "c1" to the verifying server 21100-1, and regarding the domain name "c1", the space for the endpoint of 21100-1 is "Yes" this time, so it can be judged that verifying information has been registered. In this way, "root", "a1", and "b1" have been followed in order, so it can be understood that the verification information for the reversed domain name "c1.b1.a1." is registered in the internal table 21100-2.

The verifying server 21100-1 checks the received cipher parameter RP2, and checks that the expiration date "98-12-31" has not expired. Next, the verifying server 21100-1 reads the password PW and the value of the cipher number written in the verification table, and selects cipher function Ei. The cipher parameter RP is RR2=Ei(PW, TR)∥TR, so the time random number TR to the latter half of RP2 is used to calculate t=Ei(PW, TR). In the event that the value of this temporary variable t calculated here matches the first half Ei(PW, TR) of the received RP2, confirmation can be made that the password PW entered into the terminal 21200-1 is correct. The above results are reported to the connection server 21028-1. Consequently, the connection server 21028-1 can know the verification results (authorized or denied) and billing class MNY.

<<Other Embodiment of Roaming Without a Home IP Terminal>>

In the above embodiment, in the event that the ICS receptionist 21271-1 does not set a home IP terminal, the earlier-described "Registration procedures from home IP terminal" are performed via the user service server 21250-1. In this case, the billing record "120" within the verifying table 21100-2 within the verifying server 21100-1, and the information "7981-710-1" of the verifying server presented to the billing notification destination within the conversion table 21023-1, are used.

<<Another Embodiment of Roaming wherein the Verifying Server is Included in the Domain Name Server>>

The structure of the domain name tree shown in FIG. 153 that is the object of verifying server 21110-1 is the same as the domain name trees that are the object of domain name servers in other embodiments. Accordingly, each domain server is capable of storing the data of the verifying server described in the present embodiment, and include the functions of a verifying server. That is, this other method of carrying out roaming is realized by integrating the verifying server described in the present embodiment with the domain name server described in other embodiments.

<<Access Control Apparatus and IP Terminal Connecting with Wireless Transceiver>>

With reference again to FIG. 144, a wireless transceiver 21620-1 is provided within the ICS 21000-1, and the wireless transceiver 21620-1 and a wireless transceiver 21640-1 can exchange information one with another via a wireless communication path 21625-1. The terminal 21630-1 includes the wireless transceiver 21640-1, and as with the case of the earlier-described IP terminal 21200-1, the terminal 21200-2 has a function for the inter-corporation communication using an ICS domain name. There is an information communication path 21620-1 between the access control apparatus 21020-1 and the wireless transceiver 21620-1. The information communication path 21610-1 is like the ICS user logic communication line in that it has a function for sending and receiving ICS user packets, and these are different in that the information communication path 21610-1 is within the ICS 21000-1. The wireless transceiver 21620-1 and the wireless transceiver 21640-1 both have a function for receiving ICS user packets, converting the information within the ICS user frame into ICS user packet information in waveform format and transmitting them, and also reverse functions, i.e., receiving ICS user packet information in waveform format and reverse-converting into ICS packet format and transmitting these. Accordingly, the ICS user packet sent out from the IP terminal 21200-2 passes through the wireless transceiver 21640-1, wireless communication path 21625-1, wireless transceiver 21620-1, and information communication path 21610-1, and is provided to the access control apparatus. Also, ICS frame sent out in the reverse direction, i.e., sent from the access control apparatus 21020-1 passes through the information communication path 21610-1, wireless transceiver 21620-1, wireless communication path 21625-1, wireless transceiver 21640-1, and is delivered to the IP terminal 21200-2.

Thus, according to the present invention, administration of information communication is performed with a unified address system, and various services can be provided, without using dedicated lines or the Internet, thus enabling structuring a large-scale communication system with high security and with relatively low costs. Also, inter-corporation communication can be performed between individual corporations (including government organizations, universities, and so forth) which had conventionally been services separately with practically no change to the address system for computer communications. Further, since the network administrator holds the network control authority, the overall administration of the network becomes clear, increasing ease of securing reliability and also markedly improving security.

What is claimed is:

1. An integrated information communications system (ICS) comprising a communication network, said communication network comprising:

a domain name server; and a plurality of access control apparatuses respectively comprising a conversion table having a plurality of records and a plurality of logical terminals connected to logical communication lines, wherein a first terminal outside of said communication network is connected to a first logical terminal of a first access control apparatus via a first logical communication line and a second terminal outside of said communication network is connected to a second logical terminal of a second access control apparatus via a second logical communication line, (i) said first terminal is assigned a first user address, (ii) said second terminal is assigned a second user address, (iii) said first logical terminal of said first access control apparatus is assigned a first network address, and (iv) said second logical terminal of said second access control apparatus is assigned a second network address, a record of a conversion table in said first access control apparatus comprises said first network address, as a transmitting network address, said second user address, as a receiver user address, and said second network address, as a receiving network address, said first terminal sends a first user frame comprising both said first user address and said second user address, and said first user frame inputs to said first access control apparatus from said first logical terminal via said first logical communication line, said first access control apparatus obtains said record comprising said first network address assigned to said first logical terminal and said second user address and then obtains said second network address included in said record, said first access control apparatus converts said first user frame into a first network frame, said first network frame comprising said first user frame and said second network address, as a destination address, said first access control apparatus sends said first network frame, and said first network frame is transferred in said communication network and reaches said second access control apparatus, said second access control apparatus restores said first user frame from said first network frame, and said restored first user frame reaches said second terminal via said second logical terminal and said second logical communication line, said first terminal sends out a second user frame including a telephone number of said second terminal to said communication network, said communication network obtains said second user address determined by said telephone number with reference to said domain name server and sends a third user frame including said obtained second user address to said first terminal, said first terminal sends a fourth user frame including digitized telephone voice, said fourth user frame including said digitized telephone voice is converted into a second network frame, comprising said fourth user frame, by said first access control apparatus, and said second network frame is transferred in said communication network and then reaches said second access control apparatus, and said second access control apparatus restores said fourth user frame from said second network frame, and said restored fourth user frame reaches said second terminal via said second logical terminal and said second logical communication line.

2. An integrated information communications system (ICS) comprising a communication network, said communication network comprising:

a plurality of access control apparatuses respectively comprising a conversion table having a plurality of records and a plurality of logical terminals connected to logical communication lines, wherein a first terminal outside of said communication network is connected to a first logical terminal of a first access control apparatus via a first logical communication line and a second terminal outside of said communication network is connected to a second logical terminal of a second access control apparatus via a second logical communication line, (i) said first terminal is assigned a first user address, (ii) said second terminal is assigned a second user address, (iii) said first logical terminal of said first access control apparatus is assigned a first network address, and (iv) said second logical terminal of said second access control apparatus is assigned a second network address, a record of a conversion table in said first access control apparatus comprises said first network address, as a transmitting network address, said second user address, as a receiver user address, and said second network address, as a receiving network address, said first terminal sends a first user frame comprising both said first user address and said second user address, and said first user frame inputs to said first access control apparatus from said first logical terminal via said first logical communication line, said first access control apparatus obtains said record comprising said first network address assigned to said first logical terminal and said second user address and then obtains said receiving second network address included in said record, said first access control apparatus converts said first user frame into a first network frame, said first network frame comprising said first user frame and said second network address, as a destination address, said first access control apparatus sends said first network frame, and said first network frame is transferred in said communication network and reaches said second access control apparatus, said second access control apparatus restores said first user frame from said first network frame, and said restored first user frame reaches said second terminal via said second logical terminal and said second logical communication line, said first terminal send out a second user frame including a telephone number of said second terminal to said communication network, said communication network converts said telephone number into said second user address and sends a third user frame including said converted second user address to said first terminal, said first terminal sends a fourth user frame including digitized telephone voice, said fourth user frame including said digitalized telephone voice is converted into a second network frame, comprising said second user frame, by said first access control apparatus, and said second network frame is transferred in said communication network and then reaches said second access control apparatus, and said second access control apparatus restores said fourth user frame from said second network frame, and said restored fourth user frame reaches said second terminal via said second logical terminal and said second logical communication line.

3. An integrated information communications system according to claim 2, wherein said communication network uses a domain name in place of said telephone number, so that said first terminal sends a second user frame including said domain name of said second terminal, and said communication network converts said domain name into said second user address and sends a third user frame including said converted second user address to said first terminal.

* * * * *